United States Patent
Tateishi et al.

(10) Patent No.: US 8,177,861 B2
(45) Date of Patent: May 15, 2012

(54) AZO PIGMENT, PIGMENT DISPERSION CONTAINING THE AZO PIGMENT, AND COLORING COMPOSITION

(75) Inventors: Keiichi Tateishi, Shizuoka (JP); Yoshiaki Nagata, Shizuoka (JP); Nobuo Seto, Shizuoka (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 12/921,331

(22) PCT Filed: Mar. 5, 2009

(86) PCT No.: PCT/JP2009/054176
§ 371 (c)(1),
(2), (4) Date: Oct. 6, 2010

(87) PCT Pub. No.: WO2009/110553
PCT Pub. Date: Sep. 11, 2009

(65) Prior Publication Data
US 2011/0021764 A1  Jan. 27, 2011

(30) Foreign Application Priority Data

| Mar. 7, 2008 | (JP) | P2008-058706 |
| Mar. 7, 2008 | (JP) | P2008-058709 |
| Mar. 7, 2008 | (JP) | P2008-058710 |
| Mar. 7, 2008 | (JP) | P2008-058714 |
| Mar. 7, 2008 | (JP) | P2008-058715 |
| Mar. 7, 2008 | (JP) | P2008-058716 |
| Mar. 7, 2008 | (JP) | P2008-058717 |
| May 19, 2008 | (JP) | P2008-131042 |

(51) Int. Cl.
*C09B 67/22* (2006.01)
*C09D 11/00* (2006.01)

(52) U.S. Cl. ......... 8/637.1; 8/639; 8/662; 8/670; 8/688; 8/690; 8/691; 8/692; 106/31.6

(58) Field of Classification Search .......... 8/637.1, 8/639, 662, 670, 682, 688, 690, 691, 692; 106/31.5
See application file for complete search history.

(56) References Cited

U.S. PATENT DOCUMENTS
2,936,306 A  5/1960  Schmid et al.
(Continued)

FOREIGN PATENT DOCUMENTS
JP  56-38354 A  4/1981
(Continued)

OTHER PUBLICATIONS
STIC Search Report dated Jun. 3, 2011.*
(Continued)

*Primary Examiner* — Eisa Elhilo
(74) *Attorney, Agent, or Firm* — Sughrue Mion, PLLC

(57) ABSTRACT

An azo pigment of formula (1), a tautomer of the azo pigment, or a salt or hydrate thereof, are provided:

Formula (1):

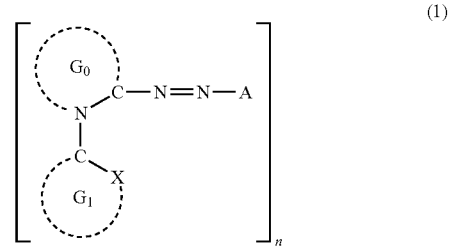

(1)

$G_0$ and $G_1$ each is a non-metal atomic group which can form a 5- or 6-membered heterocyclic ring, The rings may be monocyclic or condensed and are optionally substituted. X is a hetero atom. n is an integer of 1 to 4. When n=2, 3, or 4, the compound is a dimer, trimer, or tetramer, respectively. A is a substituent. The azo pigment has excellent coloring characteristics such as high tinctorial strength and hue. It also has excellent durability including high resistance to light and ozone. A pigment dispersion containing the azo pigment and a coloring composition are also provided.

17 Claims, 21 Drawing Sheets

U.S. PATENT DOCUMENTS

| | | | |
|---|---|---|---|
| 4,870,164 A | 9/1989 | Kuhne et al. | |
| 7,108,743 B2 * | 9/2006 | Fujiwara et al. | 106/31.48 |

FOREIGN PATENT DOCUMENTS

| | | |
|---|---|---|
| JP | 11-100519 A | 4/1999 |
| JP | 2001-271001 A | 10/2001 |
| JP | 2001-335714 A | 12/2001 |
| JP | 2002-38041 A | 2/2002 |
| JP | 2003-277662 A | 10/2003 |
| JP | 2004-26930 A | 1/2004 |
| JP | 2005-162812 A | 6/2005 |
| JP | 2007-191650 A | 8/2007 |
| JP | 2007-229982 A | 9/2007 |
| WO | 2005/030887 A1 | 4/2005 |

OTHER PUBLICATIONS

International Search Report for PCT/JP2009/054176 dated May 19, 2009 [PCT/ISA/210].

Written Opinion for PCT/JP2009/054176 [PCT/ISA/237].

* cited by examiner

AZO PIGMENT, PIGMENT DISPERSION CONTAINING THE AZO PIGMENT, AND COLORING COMPOSITION

TECHNICAL FIELD

The present invention relates to an azo pigment, a pigment dispersion containing the azo pigment, and a coloring composition.

RELATED ART

In recent years, in particular, color image-forming materials have been the mainstream of image-recording materials and, specifically, inkjet-type recording materials, thermal transfer-type recording materials, electrophotographic recording materials, transfer-type silver halide photosensitive materials, printing inks, recording pens, and the like have been widely used. Also, in image pick-up devices such as CCDs for photographing equipment, and in LCDs and PDPs for display, color filters are used for recording or reproducing a color image. In these color image-recording materials and color filters, colorants (dyes or pigments) of three primary colors of a so-called additive color mixing process or subtractive color mixing process have been used in order to display or record full-color images. At present, however, there is no fast colorant having absorption characteristics capable of realizing a favorable color reproduction range and resisting various use conditions and environmental conditions. Thus, the improvement thereof has been strongly desired.

The dyes or pigments to be used for the above-stated uses are required to have in common the following properties. That is, they are required to have favorable absorption characteristics with regard to color reproduction and have good fastness under the conditions of the environment wherein they are used, for example, resistance to light, heat, and an oxidative gas such as ozone. In addition, where the colorant is a pigment, the pigment is further required to be substantially insoluble in water or in an organic solvent, to have a good fastness to chemicals, and not to lose favorable absorption characteristics it shows in a molecularly dispersed state even when used as particles.

Although the required properties described above can be controlled by adjusting the intensity of intermolecular interaction, both of them are in a trade-off relation with each other, thus making it difficult to allow them to be compatible with each other.

Besides, in the case of using a colorant as the pigment, the pigment is additionally required to have a particle diameter and a particle shape necessary for realizing desired transparency or masking property, to have good fastness under the conditions of the environment wherein it is used, for example, resistance to light, heat, and an oxidative gas such as ozone, to have good fastness to an organic solvent and chemicals such as a sulfurous acid gas, and to be capable of being dispersed in a used medium to a level of fine particles, with the dispersed state being stable. Since these properties are significantly affected by the chemical structure as well as the particle diameter or particle shape, and crystallinity, such control is very important (for example, see Patent Document 1). In particular, there is a strong demand for a pigment which has a good yellow hue and a high tinctorial strength and is fast to light, moist heat, and active gases in the environment.

That is, in comparison with a dye which is required to have properties as colorant molecules, the pigment is required to have more properties, i.e., it is required to satisfy all of the above-stated requirements as a solid of a colorant molecule aggregate (dispersion of fine particles) as well as the properties as a colorant molecule. As a result, a group of compounds which can be used as pigments are extremely limited in comparison with dyes. Even when high-performance dyes are converted to pigments, few of them can satisfy the requirement for the properties as a dispersion of fine particles. Thus, such pigments are difficult to develop. This can be confirmed from the fact that the number of pigments registered in Color Index is no more than $1/10$ of the number of dyes.

Azo pigments are excellent in hue and tinctorial strength which are characteristics of coloring, and hence they have been widely used in printing inks, inks for an ink jet system, electrophotographic materials, and the like. Of these pigments, diarylide pigments are the most typically used yellow azo pigments. Examples of such diarylide pigments include C.I. pigment yellow 12, C.I. pigment yellow 13, C.I. pigment yellow 17, and the like. However, the diarylide pigments are inferior in fastness, particularly light resistance, and hence they decompose to fade when prints printed with them are exposed to light, thus being inappropriate for prints which are to be stored for a long time.

In order to remove such disadvantages, there have been disclosed azo pigments having a fastness improved by increasing molecular weight or by introducing a group having a strong intermolecular interaction (for example, see Patent Documents 2 through 4). However, even the improved pigments, for example, the pigments described in Patent Document 2 have the disadvantage that they still have insufficient light resistance though improved to some extent, and pigments described in, for example, Patent Documents 3 and 4 have a greenish hue and a low tinctorial strength, thus being inferior in coloring characteristics.

Also, Patent Document 5 discloses colorants which have absorption characteristics of excellent color reproducibility and sufficient fastness. However, all of the specific compounds described in Patent Document 5 are soluble in water or in an organic solvent, thus being insufficient in fastness to chemicals.

In the case of expressing a full-color image based on the subtractive color mixing process using three colors of yellow, magenta, and cyan or using four colors further including black, the use of a pigment having an inferior fastness as a yellow pigment would change gray balance of the prints with the lapse of time, and the use of a pigment having inferior coloring characteristics would reduce color reproducibility when printing. Thus, in order to obtain prints which can maintain high color reproducibility over a long time, there have been desired a yellow pigment and a pigment dispersion which have both good coloring characteristics and good fastness.

Patent Document 1: JP-A-2004-26930
Patent Document 2: JP-A-56-38354
Patent Document 3: Specification of U.S. Pat. No. 2,936,306
Patent Document 4: JP-A-11-100519
Patent Document 5: JP-A-2003-277662

DISCLOSURE OF THE INVENTION

Problems to be Solved by the Invention

An object of the present invention is to provide an azo pigment having excellent coloring characteristics such as high tinctorial strength and hue and having excellent durability such as high resistance to light and ozone, a pigment dispersion containing the azo pigment, and a coloring composition.

Means for Solving the Problems

As a result of intensive investigations in consideration of the above-stated circumstances, the inventors have obtained a novel azo pigment and have found that such an azo pigment is excellent in both coloring characteristics and durability, and when an azo pigment having a specific colorant structure is used as a pigment, this pigment meets the required performance of the pigment at a high level. The present invention has been completed based on these findings.

That is, the present invention is as follows.

[1] An azo pigment represented by the following general formula (1), a tautomer of the azo pigment, and a salt or a hydrate thereof:

General formula (1):

[Chem. 1]

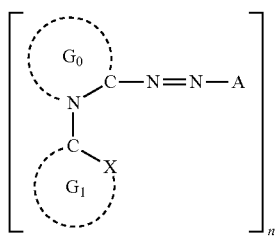

(1)

(In the general formula (1), $G_0$ and $G_1$ each independently represents a non-metal atomic group which can form a 5- or 6-membered heterocyclic ring wherein each heterocyclic ring may be unsubstituted or may have a substituent; each heterocyclic ring may be a monocyclic ring or a condensed ring; X-represents a hetero atom; n represents an integer of 1 to 4; when n=2, the compound of formula (1) represents a dimer formed via A or a heterocyclic group represented by $G_0$ or $G_1$; when n=3, the compound of formula (1) represents a trimer formed via A and/or a heterocyclic group represented by $G_0$ or $G_1$; when n=4, the compound of formula (1) represents a tetramer formed via A and/or a heterocyclic group represented by $G_0$ or $G_1$; A represents any one selected from the group of substituents represented by (A-1) to (A-44) in the following general formula (2); * represents the binding site to the N atom in the general formula (1).)

General formula (2):

[Chem. 2]

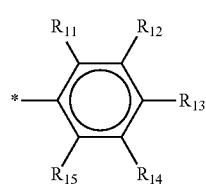

(A-1)

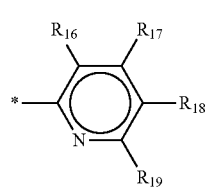

(A-2)

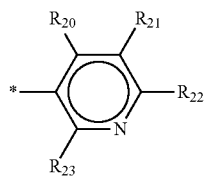

(A-3)

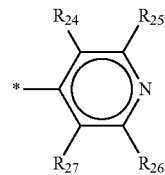

(A-4)

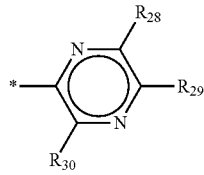

(A-5)

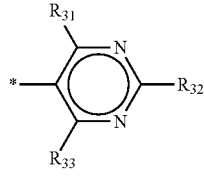

(A-6)

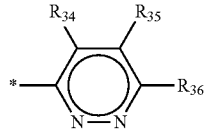

(A-7)

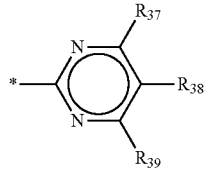

(A-8)

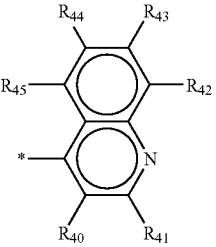

(A-9)

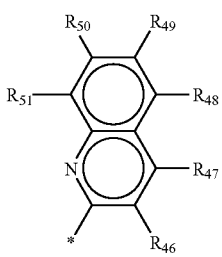

(A-10)

-continued
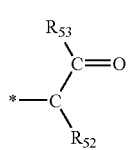 (A-11)
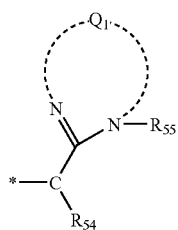 (A-12)
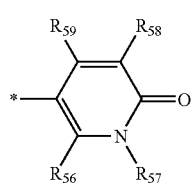 (A-13)
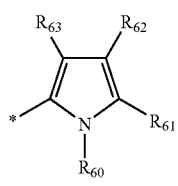 (A-14)
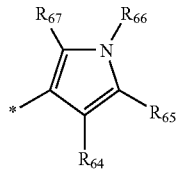 (A-15)
[Chem. 3]
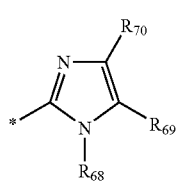 (A-16)
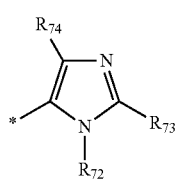 (A-17)
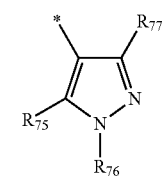 (A-18)
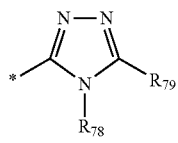 (A-19)
-continued
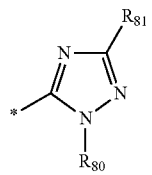 (A-20)
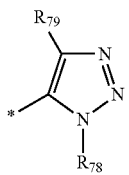 (A-21)
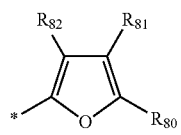 (A-22)
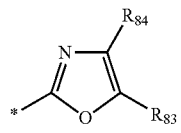 (A-23)
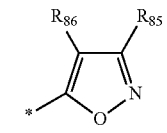 (A-24)
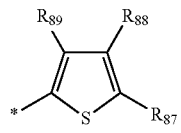 (A-25)
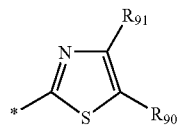 (A-26)
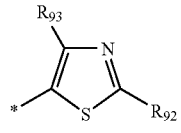 (A-27)
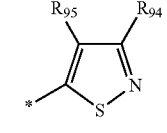 (A-28)
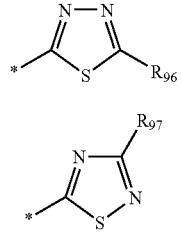 (A-29)
(A-30)

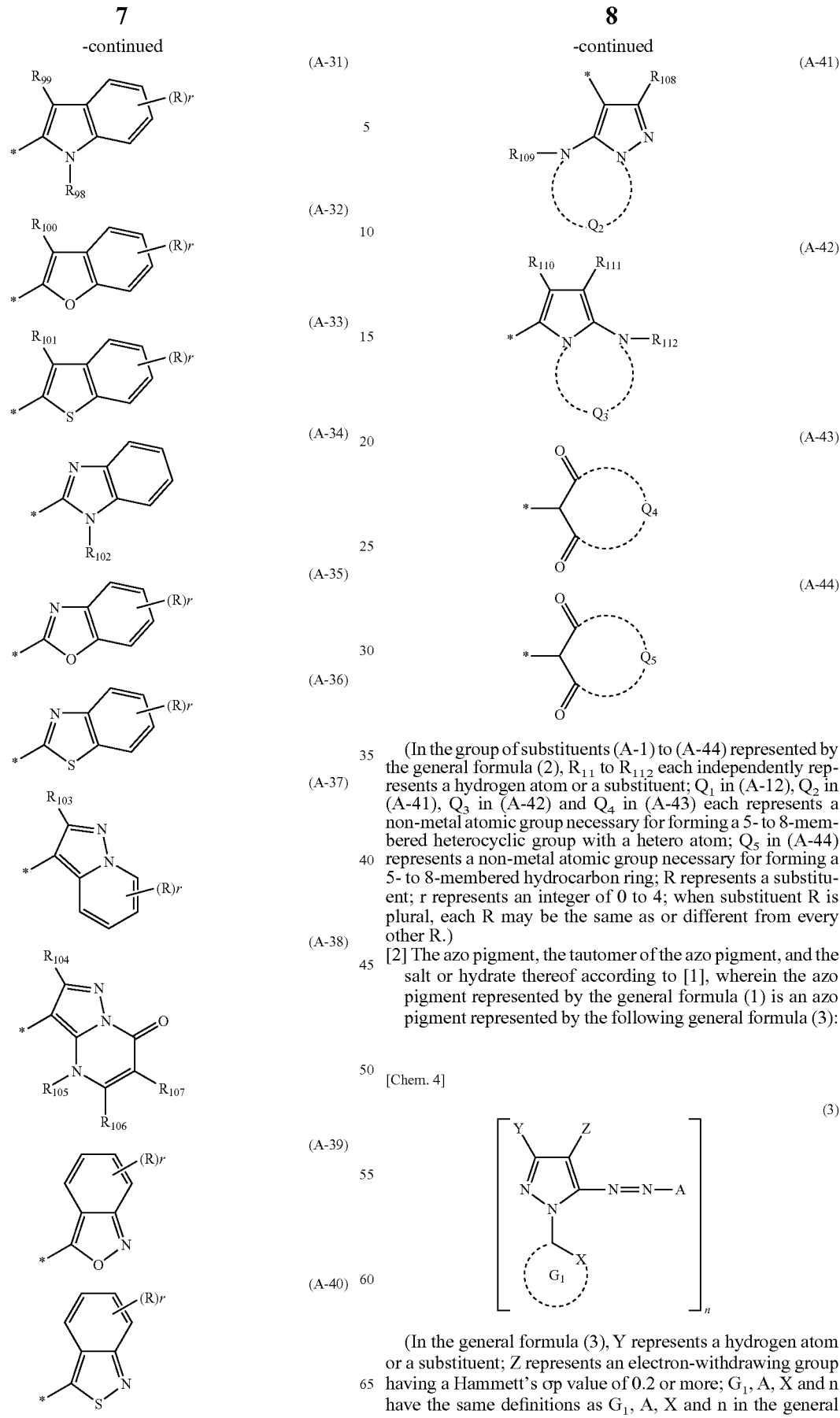

(In the group of substituents (A-1) to (A-44) represented by the general formula (2), $R_{11}$ to $R_{112}$ each independently represents a hydrogen atom or a substituent; $Q_1$ in (A-12), $Q_2$ in (A-41), $Q_3$ in (A-42) and $Q_4$ in (A-43) each represents a non-metal atomic group necessary for forming a 5- to 8-membered heterocyclic group with a hetero atom; $Q_5$ in (A-44) represents a non-metal atomic group necessary for forming a 5- to 8-membered hydrocarbon ring; R represents a substituent; r represents an integer of 0 to 4; when substituent R is plural, each R may be the same as or different from every other R.)

[2] The azo pigment, the tautomer of the azo pigment, and the salt or hydrate thereof according to [1], wherein the azo pigment represented by the general formula (1) is an azo pigment represented by the following general formula (3):

[Chem. 4]

(In the general formula (3), Y represents a hydrogen atom or a substituent; Z represents an electron-withdrawing group having a Hammett's σp value of 0.2 or more; $G_1$, A, X and n have the same definitions as $G_1$, A, X and n in the general formula (1).)

[3] The azo pigment, the tautomer of the azo pigment, and the salt or hydrate thereof according to [1] or [2], wherein the azo pigment represented by the general formula (1) or (3) is an azo pigment represented by the following general formula (4):

[Chem. 5]

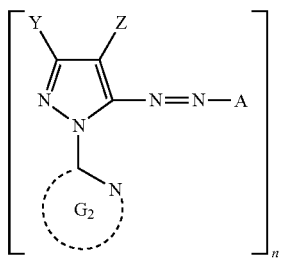

(4)

In the general formula (4), Y represents a hydrogen atom or a substituent; Z represents an electron-withdrawing group having a Hammett's σp value of 0.2 or more; $G_2$ represents a non-metal atomic group which can form a 5- or 6-membered nitrogen-containing heterocyclic group, wherein the heterocyclic group may be unsubstituted or may have a substituent; the heterocyclic group may be a monocyclic ring or a condensed ring; A and n have the same definitions as A and n in the general formula (1).

[4] The azo pigment, the tautomer of the azo pigment, and the salt or hydrate thereof according to [3], wherein the azo pigment represented by the general formula (4) is an azo pigment represented by the following general formula (5):

[Chem. 6]

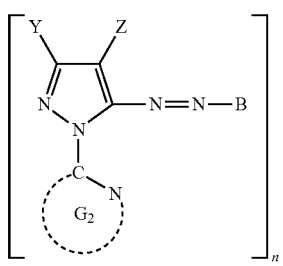

(5)

(In the general formula (5), $G_2$, Y, Z and n have the same definitions as $G_2$, Y, Z and n in the general formula (4); B represents any one selected from the group of substituents represented by (B-1) to (B-24) in the following general formula (6); * represents the binding site to the N atom in the general formula (5).)

General formula (6):
[Chem. 7]

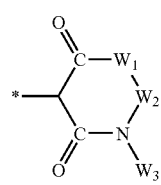
(B-1)

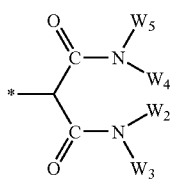
(B-2)

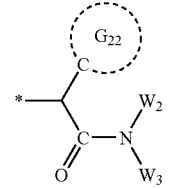
(B-3)

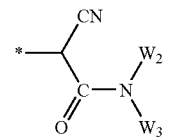
(B-4)

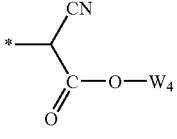
(B-5)

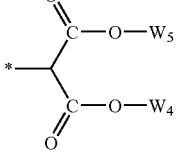
(B-6)

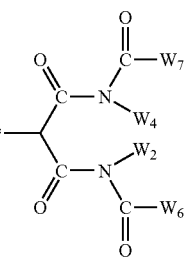
(B-7)

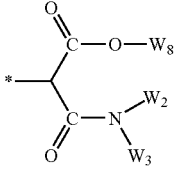
(B-8)

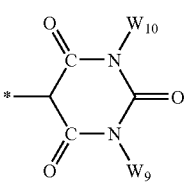
(B-9)

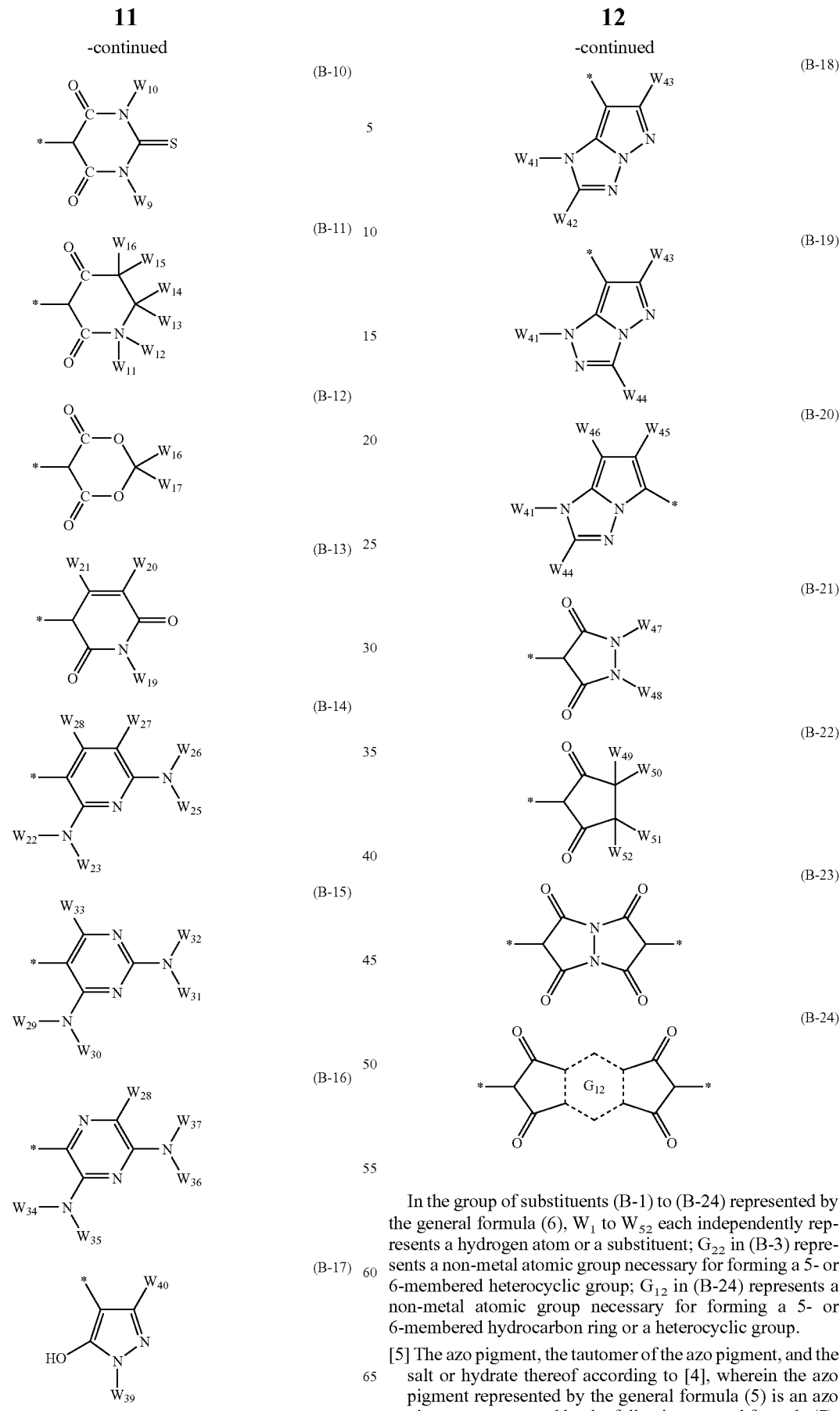

In the group of substituents (B-1) to (B-24) represented by the general formula (6), $W_1$ to $W_{52}$ each independently represents a hydrogen atom or a substituent; $G_{22}$ in (B-3) represents a non-metal atomic group necessary for forming a 5- or 6-membered heterocyclic group; $G_{12}$ in (B-24) represents a non-metal atomic group necessary for forming a 5- or 6-membered hydrocarbon ring or a heterocyclic group.

[5] The azo pigment, the tautomer of the azo pigment, and the salt or hydrate thereof according to [4], wherein the azo pigment represented by the general formula (5) is an azo pigment represented by the following general formula (7).

General formula (7):

[Chem. 8]

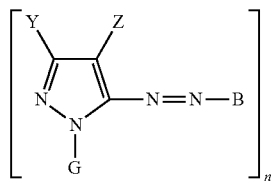
(7)

In the general formula (7), Y, Z and n have the same definitions as Y, Z and n in the general formula (5); B represents any one selected from the group of substituents represented by (B-1) to (B-24) in the following general formula (6); * in the general formula (6) represents the binding site to the N atom; G represents any one selected from the group of substituents represented by (G-1) to (G-13) in the following general formula (8); * in the general formula (8) represents the binding site to the N atom; $G_{11}$ in (G-13) represents a non-metal atomic group which can form a 5- or 6-membered heterocyclic group, wherein the heterocyclic group represented by $G_{11}$ may be unsubstituted or may have a substituent; the heterocyclic group may be a monocyclic ring or a condensed ring; $Y_1$ to $Y_{11}$ each independently represents a hydrogen atom or a substituent.

General formula (8):

[Chem. 9]

(G-1)

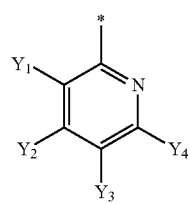

(G-2)

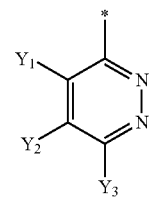

(G-3)

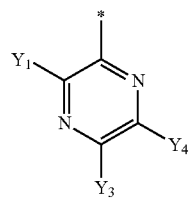

(G-4)

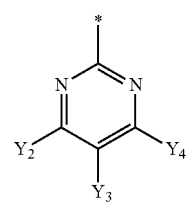

(G-5)

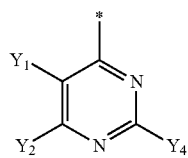

(G-6)

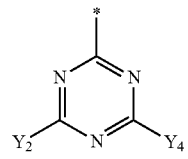

(G-7)

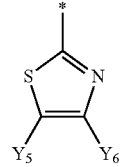

(G-8)

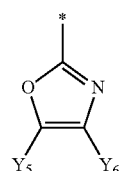

(G-9)

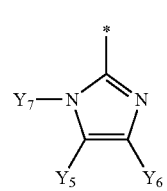

(G-10)

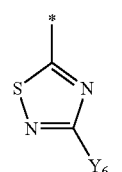

(G-11)

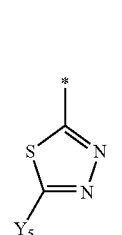

(G-12)

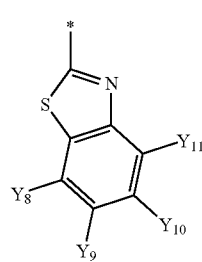

-continued (G-13)

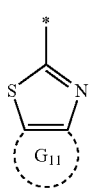

[6] An azo pigment represented by the following general formula (6-1), a tautomer of the azo pigment, and a salt or a hydrate thereof:

[Chem. 10]

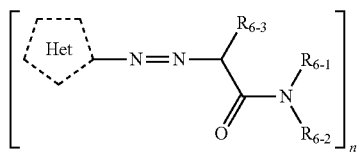

(6-1)

(In the general formula (6-1), Het represents a group selected from the aromatic heterocyclic group represented by the following general formulae (I-1) to (I-9); $R_{6-10}$ and $R_{6-2}$ each independently represents a hydrogen atom or a substituent; $R_{6-3}$ represents a heterocyclic group; n represents an integer of 1 to 4; when n=2, the compound of formula (6-1) represents a dimer formed via $R_{6-1}$, $R_{6-2}$, $R_{6-3}$ or Het; when n=3, the compound of formula (6-1) represents a trimer formed via $R_{6-1}$, $R_{6-2}$, $R_{6-3}$ or Het; when n=4, the compound of formula (6-1) represents a tetramer formed via $R_{6-1}$, $R_{6-2}$, $R_{6-3}$ or Het.)

[Chem. 11]

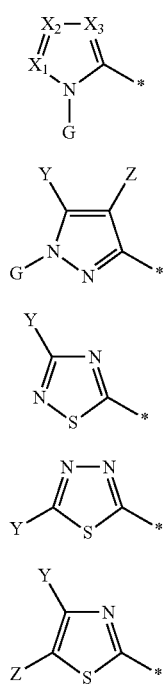

-continued

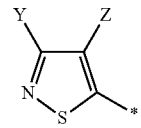
(I-6)

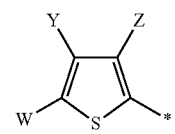
(I-7)

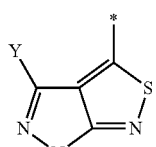
(I-8)

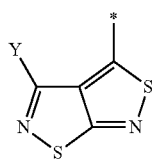
(I-9)

(In the general formulae (I-1) to (I-9), Z, Y, G and W each independently represents a hydrogen atom or a substituent; $X_1$, $X_2$ and $X_3$ each independently is interchangeably used with $X_{6-1}$, $X_{6-2}$ and $X_{6-3}$ and represents a nitrogen atom or a —C($R_{6-11}$)═ group; $R_{6-11}$ represents a hydrogen atom or a substituent; * represents the binding site to the azo group in the general formula (6-1).)

[7] The azo pigment, the tautomer of the azo pigment, and the salt or hydrate thereof according to [1] or [6], wherein the azo pigment represented by the general formula (1) or (6-1) is an azo pigment represented by the following general formula (6-3).

[Chem. 12]

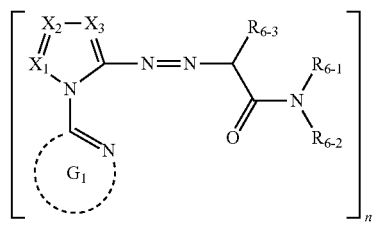
(6-3)

(In the general formula (6-3), $G_1$ represents a non-metal atomic group necessary for forming a 5- or 6-membered ring with a carbon atom and a nitrogen atom, and the heterocyclic group may be an aromatic ring or a condensed ring; $X_1$, $X_2$ and $X_3$ each independently is interchangeably used with $X_{6-1}$, $X_{6-2}$ and $X_{6-3}$ and represents a nitrogen atom or a —C($R_{6-11}$)═ group; $R_{6-11}$ represents a hydrogen atom or a substituent; $R_{6-1}$ and $R_{6-2}$ each independently represents a hydrogen atom or a substituent; $R_{6-3}$ represents a heterocyclic group; n represents an integer of 1 to 3; when n=2, the compound of formula (6-3) represents a dimer formed via $G_1$, $R_{6-1}$, $R_{6-2}$, $R_{6-3}$ or $R_{6-11}$; when n=3, the compound of formula (6-3) represents a trimer formed via $G_1$, $R_{6-1}$, $R_{6-2}$, $R_{6-3}$ or $R_{6-11}$; when n=4, the compound of formula (6-3) represents a tetramer formed via $G_1$, $R_{6-1}$, $R_{6-2}$, $R_{6-3}$ or $R_{6-11}$.)

[8] The azo pigment, the tautomer of the azo pigment, and the salt or hydrate thereof according to any one of [1], [6] or [7], wherein n in the general formulae (1), (6-1) or (6-3) is 1.

[9] The azo pigment, the tautomer of the azo pigment, and the salt or hydrate thereof according to any one of [1], [6] to [8], wherein the azo pigment represented by the general formula (1), (6-1) or (6-3) is an azo pigment represented by the following general formula (6-4):

[Chem. 13]

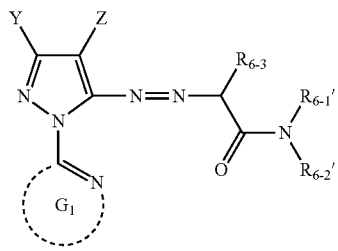

(6-4)

(In the general formula (6-4), $G_1$ represents a non-metal atomic group necessary for forming a 5- or 6-membered ring with a carbon atom and a nitrogen atom, and the heterocyclic group may be an aromatic ring or a condensed ring; Z and Y each independently represents a hydrogen atom or a substituent; $R_{6-3}$ represents a heterocyclic group; $R_{6-1}'$ and $R_{6-2}'$ each independently represents a hydrogen atom, an alkyl group, an aryl group or a heterocyclic group.)

[10] The azo pigment, the tautomer of the azo pigment, and the salt or hydrate thereof according to any one of [1] and [6] to [8], wherein the azo pigment represented by the general formulae (1), (6-1) or (6-3) is an azo pigment represented by the following general formula (6-5):

[Chem. 14]

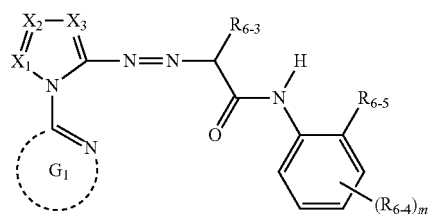

(6-5)

(In the general formula (6-5), $G_1$ represents a non-metal atomic group necessary for forming a 5- or 6-membered ring with a carbon atom and a nitrogen atom, and the heterocyclic group may be an aromatic ring or a condensed ring; $X_1$, $X_2$ and $X_3$ each independently is interchangeably used with $X_{6-1}$, $X_{6-2}$ and $X_{6-3}$ and represents a nitrogen atom or a —$C(R_{6-11})$= group; $R_{6-11}$ represents a hydrogen atom or a substituent; $R_{6-3}$ represents a heterocyclic group; $R_{6-4}$ and $R_{6-5}$ represent a halogen atom, an alkyl group, an alkoxy group, an alkoxycarbonyl group, a carbamoyl group, an acylamino group, a sulfamoyl group, a trifluoromethyl group, a nitro group, a cyano group or a heterocyclic group; m represents an integer of 0 to 4.)

[11] The azo pigment, the tautomer of the azo pigment, and the salt or hydrate thereof of [1], wherein the azo pigment represented by the general formula (1) is an azo pigment represented by the following general formula (7-1):

[Chem. 15]

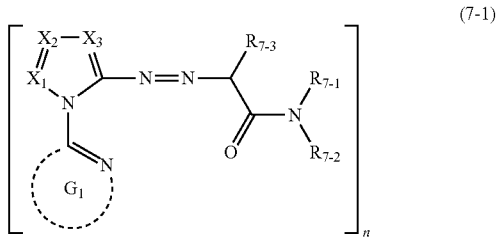

(7-1)

(In the general formula (7-1), $G_1$ represents an atomic group that forms a 5- or 6-membered heterocyclic ring which may be a condensed ring; $X_1$, $X_2$ and $X_3$ each independently is interchangeably used with $X_{7-1}$, $X_{7-2}$ and $X_{7-3}$ and represents a nitrogen atom or a —$C(R_{7-11})$= group; $R_{7-11}$ represents a hydrogen atom or a substituent; $R_{7-1}$ and $R_{7-2}$ each independently represents a hydrogen atom or a substituent; $R_{7-3}$ represents a group represented by —$COR_{7-12}$, —$COOR_{7-13}$ or —$CONR_{7-14}R_{7-15}$; $R_{7-12}$ and $R_{7-13}$ represent an alkyl group, an aryl group or a heterocyclic group; $R_{7-14}$ and $R_{7-15}$ each independently represents a hydrogen atom, an alkyl group, an aryl group or a heterocyclic group; n represents an integer of 1 to 4; when n=2, the compound of formula (7-1) represents a dimer formed via $G_1$, $R_{7-1}$, $R_{7-2}$, $R_{7-3}$ or $R_{7-11}$; when n=3, the compound of formula (7-1) represents a trimer formed via $G_1$, $R_{7-1}$, $R_{7-2}$, $R_{7-3}$ or $R_{7-11}$; when n=4, the compound of formula (7-1) represents a tetramer formed via $G_1$, $R_{7-1}$, $R_{7-2}$, $R_{7-3}$ or $R_{7-11}$.)

[12] The azo pigment, the tautomer of the azo pigment, and the salt or hydrate thereof of [1] or [11], wherein the azo pigment represented by the general formula (1) or (7-1) is an azo pigment represented by the following general formula (7-2).

[Chem. 16]

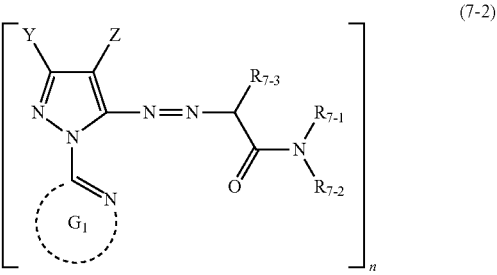

(7-2)

(In the general formula (7-2), $G_1$ represents a non-metal atomic group necessary for forming a 5- or 6-membered ring with a carbon atom and a nitrogen atom; Z and Y each independently represents a hydrogen atom or a substituent; $R_{7-1}$ and $R_{7-2}$ each independently represents a hydrogen atom or a substituent; $R_{7-3}$ represents a group represented by —$COR_{7-12}$, —$COOR_{7-13}$ or —$CONR_{7-14}R_{7-15}$; $R_{7-12}$ and $R_{7-13}$ represent an alkyl group, an aryl group or a heterocyclic group; $R_{7-14}$ and $R_{7-15}$ each independently represents a hydrogen atom, an alkyl group, an aryl group or a heterocyclic group; n represents an integer of 1 to 4; when n=2, the compound of formula (7-2) represents a dimer formed via $G_1$, $R_{7-1}$, $R_{7-2}$, $R_{7-3}$ or $R_{7-11}$; when n=3, the compound of formula (7-2) represents a trimer formed via $G_1$, $R_{7-1}$, $R_{7-2}$, $R_{7-3}$ or $R_{7-11}$; when n=4, the compound of formula (7-2) represents a tetramer formed via $G_1$, $R_{7-1}$, $R_{7-2}$, $R_{7-3}$ or Y.)

[13] The azo pigment, the tautomer of the azo pigment, and the salt or hydrate thereof according to any one of [1], [11] or [12], wherein the azo pigment represented by the general formula (1) or (7-1) is an azo pigment represented by the following general formula (7-3):

[Chem. 17]

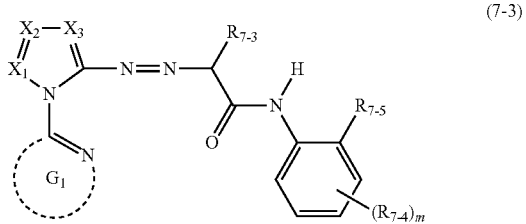

(7-3)

(In the general formula (7-3), $G_1$ represents a non-metal atomic group necessary for forming a 5- or 6-membered ring with a carbon atom and a nitrogen atom; $X_1$, $X_2$ and $X_3$ each independently is interchangeably used with $X_{7-1}$, $X_{7-2}$ and $X_{7-3}$ and represents a nitrogen atom or a —C($R_{7-11}$)= group; $R_{7-11}$ represents a hydrogen atom or a substituent; $R_{7-3}$ represents a group represented by —$COR_{7-12}$, —$COOR_{7-13}$ or —$CONR_{7-14}R_{7-15}$; $R_{7-12}$ and $R_{7-13}$ represent an alkyl group, an aryl group or a heterocyclic group; $R_{7-14}$ and $R_{7-15}$ each independently represents a hydrogen atom, an alkyl group, an aryl group or a heterocyclic group; $R_{7-4}$ and $R_{7-5}$ represent a halogen atom, an alkyl group, an alkoxy group, an alkoxycarbonyl group, a carbamoyl group, an acylamino group, a sulfamoyl group, a trifluoromethyl group, a nitro group, a cyano group or a heterocyclic group; m represents an integer of 0 to 4.)

[14] A pigment dispersion containing at least one of the azo pigment, the tautomer of the azo pigment, and the salt or the hydrate thereof according to any one of [1] to [13].

[15] A coloring composition containing at least one of the azo pigment, the tautomer of the azo pigment, and the salt or the hydrate thereof according to any one of [1] to [13].

[16] An inkjet recording ink using the pigment dispersion according to [14].

[17] An azo compound represented by the following general formula (6-4), a tautomer of the azo compound, and a salt or a hydrate thereof:

[Chem. 18]

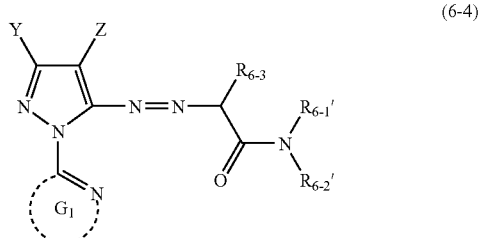

(6-4)

(In the general formula (6-4), $G_1$ represents a non-metal atomic group necessary for forming a 5- or 6-membered ring with a carbon atom and a nitrogen atom, and the heterocyclic group may be an aromatic ring or a condensed ring; Z and Y each independently represents a hydrogen atom or a substituent; $R_{6-3}$ represents a heterocyclic group; $R_{6-1}'$ and $R_{6-2}'$ each independently represents a hydrogen atom, an alkyl group, an aryl group or a heterocyclic group.)

BEST MODE FOR CARRYING OUT THE INVENTION

Figure 1:
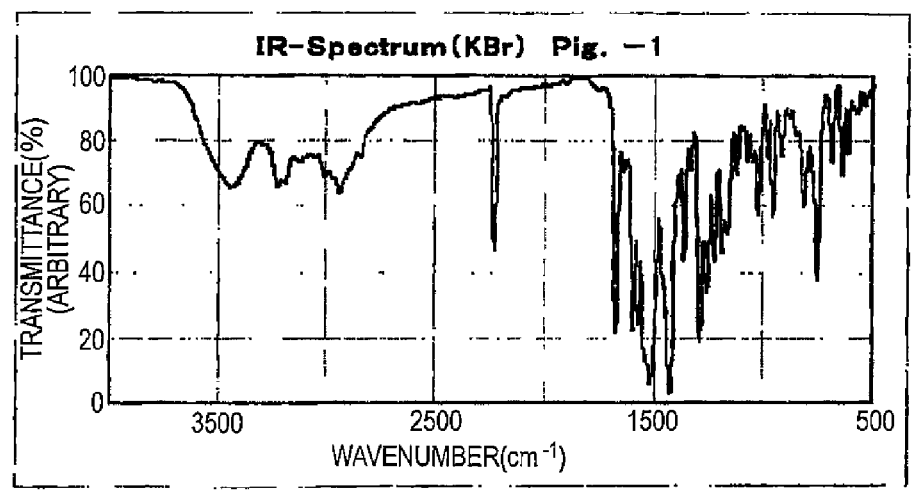
FIG. 1 is an infrared absorption spectrum of an azo pigment Pig.-1 obtained in Synthesis Example 1.

Hereinafter, the present invention will be described in more detail.

The term "Hammett's substituent constant σp" used herein will be briefly described.

Hammett's rule is an empirical rule proposed by L. P. Hammett in 1935 to quantitatively describe the effect of substituents on the reaction or equilibrium of benzene derivatives. Its validity is now widely accepted. The substituent constants determined according to Hammett's rule include a σp value and a σm value, and these values may be found in many general textbooks. For example, these values are described in detail in J. A. Dean Ed., Lange's Handbook of Chemistry, 12th Ed., 1979, McGraw-Hill, or in The Realm of Chemistry (Kagaku no Ryoiki) (extra issue) Vol. 122, pp. 96-103, 1979, Nankodo. Each substituent with a specific Hammett's substituent constant σp defined or described herein is not intended to limit the substituents to values found in disclosed literature, such as the above textbooks, and any substituent with a value that is in the above range when measured according to Hammett's rule also falls within the scope of the present invention, even if there is no literature showing the value. The compounds represented by formulae (1) to (8) used in the present invention are not benzene derivatives. However, the σp value may be used as a scale of the electron effect of substituents, regardless of the position of the substituents. Hereinafter in the present invention, the σp value is used for this purpose.

[Azo Pigments]

The azo pigment of the present invention is represented by the foregoing general formula (1).

Hereinafter, an azo pigment represented by the following general formula (1), a tautomer of the azo pigment, and a salt or a hydrate thereof will be described in more detail.

[Chem. 19]

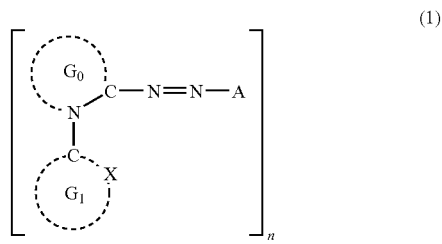

In the general formula (1), $G_0$ and $G_1$ each independently represents a non-metal atomic group which can form a 5- or 6-membered heterocyclic ring wherein each heterocyclic ring may be unsubstituted or may have a substituent. Each heterocyclic ring may be a monocyclic ring or a condensed ring. X represents a hetero atom. n represents an integer of 1 to 4. When n=2, the compound of formula (1) represents a dimer formed via A or a heterocyclic group represented by $G_0$ or $G_1$. When n=3, the compound of formula (1) represents a trimer formed via A and/or a heterocyclic group represented by $G_0$ or $G_1$. When n=4, the compound of formula (1) represents a tetramer formed via A and/or a heterocyclic group represented by $G_0$ or $G_1$. A represents any one selected from the group of substituents represented by (A-1) to (A-44) in the following general formula (2). * represents the binding site to the N atom in the general formula (1).

General formula (2):

[Chem. 20]

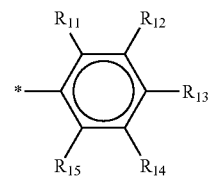
(A-1)

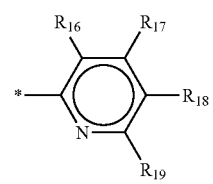
(A-2)

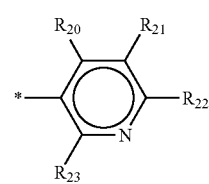
(A-3)

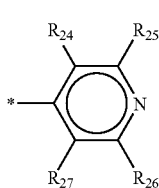 (A-4)
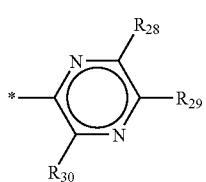 (A-5)
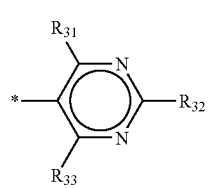 (A-6)
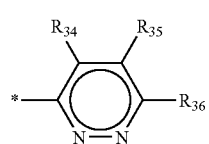 (A-7)
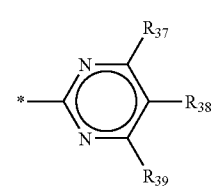 (A-8)
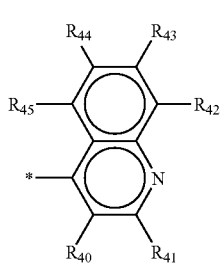 (A-9)
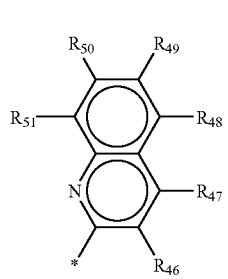 (A-10)
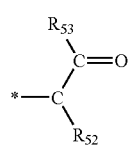 (A-11)
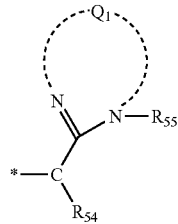 (A-12)
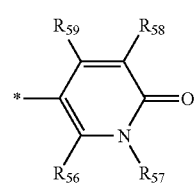 (A-13)
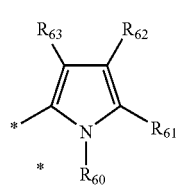 (A-14)
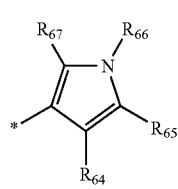 (A-15)
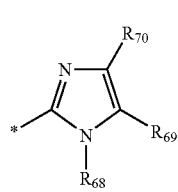 (A-16)
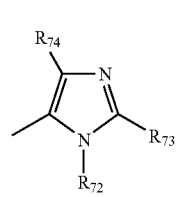 (A-17)
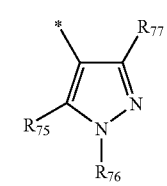 (A-18)
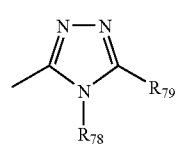 (A-19)

-continued
(A-20) 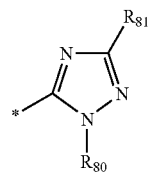
(A-21) 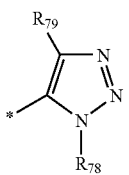
(A-22) 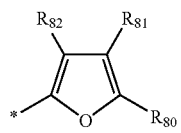
(A-23) 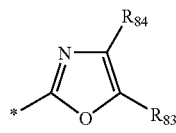
(A-24) 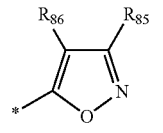
[Chem. 21]
(A-25) 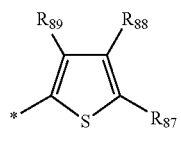
(A-26) 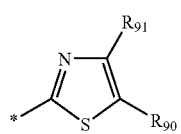
(A-27) 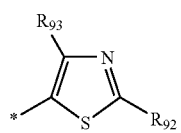
(A-28) 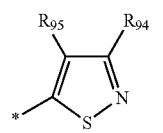
(A-29) 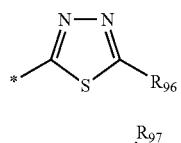
(A-30) 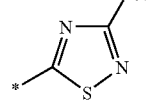
-continued
(A-31) 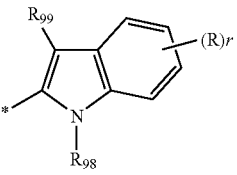
(A-32) 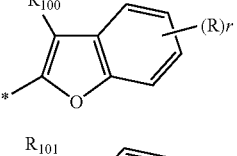
(A-33) 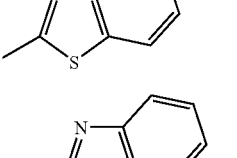
(A-34) 
(A-35) 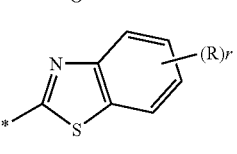
(A-36) 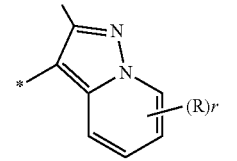
(A-37) 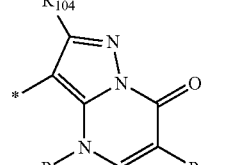
(A-38) 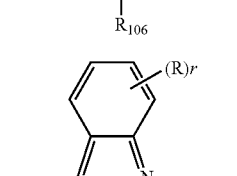
(A-39) 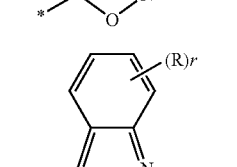
(A-40)

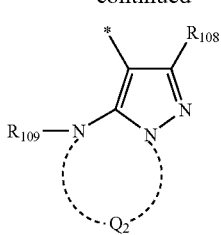

(A-41)

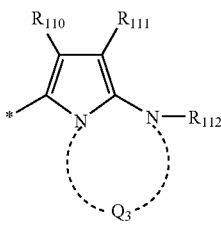

(A-42)

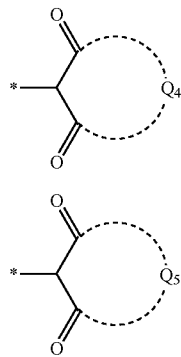

(A-43)

(A-44)

In the group of substituents (A-1) to (A-44) represented by the general formula (2), $R_{11}$ to $R_{112}$ each independently represents a hydrogen atom or a substituent. $Q_1$ in (A-12), $Q_2$ in (A-41), $Q_3$ in (A-42) and $Q_4$ in (A-43) each represents a non-metal atomic group necessary for forming a 5- to 8-membered heterocyclic group with a hetero atom. $Q_5$ in (A-44) represents a non-metal atomic group necessary for forming a 5- to 8-membered hydrocarbon ring. $Q_1$ to $Q_5$ each independently may form a dimer or trimer structure via a heterocyclic group or a hydrocarbon ring. R represents a substituent. r represents an integer of 0 to 4. When substituent R is plural, each R may be the same as or different from every other R.

Hereinafter, the foregoing general formula (1) will be described in detail.

In the general formula (1), $G_0$ and $G_1$ each independently represents a non-metal atomic group that can form a 5- or 6-membered heterocyclic group. Each heterocyclic group may be non-aromatic heterocyclic group or aromatic heterocyclic group. Each heterocyclic group may be unsubstituted or may have a substituent. Moreover, each heterocyclic group may be a monocyclic ring or a condensed ring.

The heterocyclic group represented by $G_0$ or $G_1$ is a monovalent group formed by removing one hydrogen atom from a heterocyclic group.

The heterocyclic group represented by $G_0$ or $G_1$ is more preferably a 5- or 6-membered aromatic heterocyclic group having 3 to 18 carbon atoms, and particularly preferably a 5- or 6-membered aromatic nitrogen-containing heterocyclic group having 3 to 12 carbon atoms. Among them, preferred is a 5- or 6-membered, aromatic, nitrogen-containing heterocyclic group having 3 to 8 carbon atoms.

Preferred examples of the heterocyclic group represented by $G_0$ or $G_1$ without restricting the substitution position include pyridyl, pyrazinyl, pyridazinyl, pyrimidinyl, triazinyl, quinolinyl, isoquinolinyl, quinazolinyl, cinnolinyl, phthalazinyl, quinoxalinyl, pyrrolyl, indolyl, furyl, benzofuryl, thienyl, benzothienyl, pyrazolyl, imidazolyl, benzimidazolyl, triazolyl, oxazolyl, benzoxazolyl, thiazolyl, benzothiazolyl, isothiazolyl, benzisothiazolyl, thiadiazolyl, isoxazolyl, benzisoxazolyl, pyrrolidinyl, piperidyl, piperazinyl, imidazolyl, thiazolyl, and the like.

More preferred examples of the heterocyclic group represented by $G_0$ without restricting the substitution position preferably include pyrazolyl, 1,2,3-triazolyl, 1,2,4-triazolyl and imidazolyl, particularly preferably pyrazolyl, 1,2,4-triazolyl and imidazolyl, particularly preferably pyrazolyl and 1,2,4-triazolyl, and most preferably pyrazolyl.

In the general formula (1), a hetero atom represented by X may be contained in a singular or plural form in the heterocyclic group. When plural hetero atoms are contained, each hetero atom X in the heterocyclic group may be the same as or different from every other X. X is preferably a nitrogen atom, an oxygen atom or a sulfur atom. Particularly, preferred is a case of forming an aromatic nitrogen-containing heterocyclic group containing at least one or more nitrogen atoms as X.

More preferred examples of the heterocyclic group represented by $G_1$ without restricting the substitution position preferably include pyrrolyl, pyrazolyl, 1,2,3-triazolyl, 1,2,4-triazolyl, thiazolyl, isothiazolyl, 1,2,4-thiadiazolyl, 1,3,4-thiadiazolyl, benzothiazolyl, benzisothiazolyl, pyridyl, pyrimidyl, pyridazinyl, pyrazinyl and triazinyl, more preferably pyrazolyl, 1,2,4-triazolyl, thiazolyl, isothiazolyl, 1,2,4-thiadiazolyl, 1,3,4-thiadiazolyl, benzothiazolyl, benzisothiazolyl, pyridyl, pyrimidyl, pyridazinyl, pyrazinyl and s-triazinyl, still more preferably pyrazolyl, 1,2,4-triazolyl, 1,2,4-thiadiazolyl, 1,3,4-thiadiazolyl, pyridyl, pyrimidyl, pyridazinyl, pyrazinyl and s-triazinyl, particularly preferably pyridyl, pyrimidyl, pyrazinyl and s-triazinyl, and most preferably pyridyl, and pyrimidinyl.

When the heterocyclic group represented by $G_0$ or $G_1$ has a substituent, examples of the substituent for $G_0$ and $G_1$ each independently include a linear or branched alkyl group having 1 to 12 carbon atoms, a linear or branched aralkyl group having 7 to 18 carbon atoms, a linear or branched alkenyl group having 2 to 12 carbon atoms, a linear or branched alkynyl group having 2 to 12 carbon atoms, a linear or branched cycloalkyl group having 3 to 12 carbon atoms, a linear or branched cycloalkenyl group having 3 to 12 carbon atoms (for example, methyl, ethyl, n-propyl, i-propyl, n-butyl, i-butyl, sec-butyl, t-butyl, 2-ethylhexyl, 2-methylsulfonylethyl, 3-phenoxypropyl, trifluoromethyl or cyclopentyl), a halogen atom (for example, a chlorine atom or a bromine atom), an aryl group (for example, phenyl, 4-t-butylphenyl or 2,4-di-t-amylphenyl), a heterocyclic group (for example, imidazolyl, pyrazolyl, triazolyl, 2-furyl, 2-thienyl, 2-pyrimidyl or 2-benzothiazolyl), a cyano group, a hydroxyl group, a nitro group, a carboxyl group, an amino group, an alkyloxy group (for example, methoxy, ethoxy, 2-methoxyethoxy or 2-methylsulfonylethoxy), an aryloxy group (for example, phenoxy, 2-methylphenoxy, 4-t-butylphenoxy, 3-nitrophenoxy, 3-t-butyloxycarbonylphenoxy or 3-methoxycarbonylphenyloxy), an acylamino group (for example, acetamide, benzamide or 4-(3-t-butyl-4-hydroxyphenoxy)butanamide), an alkylamino group (for example, methylamino, butylamino, diethylamino or methylbutylamino), an arylamino group (for example, phenylamino or 2-chloroanilino), an ureido group (for example, phenylureido, methylureido or N,N-dibutylureido), a sulfamoylamino group (for example, N,N-dipropylsulfamoylamino), an alkylthio group (for example, methylthio, octylthio or 2-phenoxyethylthio), an arylthio group (for example, phenylthio, 2-butoxy-5-t-octylphenylthio or 2-carboxyphenylthio), an alkyloxycarbonylamino group (for example, methoxycarbonylamino), an alkylsulfonylamino group and an arylsulfonylamino group (for example, methylsulfonylamino, phenylsulfonylamino or p-toluenesulfonylamino), a carbamoyl group (for example, N-ethylcarbamoyl or N,N-dibutylcarbamoyl), a sulfamoyl group (for example, N-ethylsulfamoyl, N,N-dipropylsulfamoyl or N-phenylsulfamoyl), a sulfonyl group (for example, methylsulfonyl, octylsulfonyl, phenylsulfonyl or p-toluenesulfonyl), an alkyloxycarbonyl group (for example, methoxycarbonyl or butyloxycarbonyl), a heterocyclic oxy group (for example, 1-phenyltetrazol-5-oxy or 2-tetrahydropyranyloxy), an azo group (for example, phenylazo, 4-methoxyphenylazo, 4-pivaloylaminophenylazo or 2-hydroxy-4-propanoylphenylazo), an acyloxy group (for example, acetoxy), a carbamoyloxy group (for example, N-methylcarbamoyloxy or N-phenylcarbamoyloxy), a silyloxy group (for example, trimethylsilyloxy or dibutylmethylsilyloxy), an aryloxycarbonylamino group (for example, phenoxycarbonylamino), an imido group (for example, N-succinimido or N-phthalimido), a heterocyclic thio group (for example, 2-benzothiazolylthio, 2,4-diphenoxy-1,3,5-triazole-6-thio or 2-pyridylthio), a sulfinyl group (for example, 3-phenoxypropylsulfinyl), a phosphonyl group (for example, phenoxyphosphonyl, octyloxyphosphonyl or phenylphosphonyl), an aryloxycarbonyl group (for example, phenoxycarbonyl), an acyl group (for example, acetyl, 3-phenylpropanoyl or benzoyl), and an ionic hydrophilic group (for example, a carboxyl group, a sulfo group, a phosphono group or a quaternary ammonium group).

When the azo pigment of the present invention contains an ionic hydrophilic group as a substituent, the azo pigment is preferably a salt with a polyvalent metal cation (for example, magnesium, calcium or barium), and particularly preferably a lake pigment.

In the general formula (1), an integer of 1 to 4 represented by n is preferably n=an integer of 1 to 3, particularly preferable n=an integer of 1 to 2, and most preferably n=1.

In the general formula (1), the group represented by A represents a group selected from the group of (A-1) to (A-44) represented by the general formula (2), wherein these substituents may be taken together to be condensed. * represents the binding site to the N atom in the general formula (1).

An example of A is preferably (A-1), (A-2), (A-3), (A-4), (A-5), (A-6), (A-7), (A-8), (A-11), (A-12), (A-13), (A-18), (A-27), (A-38), (A-41), (A-42), (A-43) or (A-44), more preferably (A-1), (A-3), (A-6), (A-11), (A-12), (A-13), (A-18), (A-27), (A-41), (A-43) or (A-44), particularly preferably (A-1), (A-3), (A-6), (A-11), (A-12), (A-13), (A-18), (A-27), (A-41) or (A-43), still more preferably (A-1), (A-11), (A-12), (A-13), (A-18), (A-27) or (A-43), and most preferably (A-11), (A-12) or (A-18).

In the group of substituents (A-1) to (A-44) represented by the general formula (2), $R_{11}$ to $R_{112}$ each independently represents a hydrogen atom or a substituent. $Q_1$ in (A-12), $Q_2$ in (A-41), $Q_3$ in (A-42) and $Q_4$ in (A-43) each represents a non-metal atomic group necessary for forming 5- to 8-membered heterocyclic group with a hetero atom. $Q_5$ in (A-44) represents a non-metal atomic group necessary for forming a 5- to 8-membered hydrocarbon ring. $Q_1$ to $Q_5$ each independently may form a dimer or trimer structure via a heterocyclic group or a hydrocarbon ring. R represents a substituent. r represents an integer of 0 to 4. When substituent R is plural, each R may be the same as or different from every other R.

Preferred examples of the case where $R_{11}$ to $R_{112}$ and R in the general formula (2) represent a substituent will be described in more detail hereinafter.

When $R_{11}$ to $R_{112}$ and R represent a monovalent substituent, examples of each monovalent substituent independently include a halogen atom, an alkyl group, a cycloalkyl group, aralkyl group, alkenyl group, alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, alkoxycarbonyloxy group, aryloxycarbonyloxy group, an amino group (an alkylamino group, an arylamino group), an acylamino group (amide group), an aminocarbonylamino group (an ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphinyl group, phosphinyloxy group, a phosphinylamino group, a silyl group, an azo group, an imido group, a phosphoryl group, and an ionic hydrophilic group, each of which may be further substituted.

A particularly preferred example of $R_{11}$ to $R_{112}$ and R each independently is preferably a hydrogen atom, a halogen atom, an alkyl group, an aryl group, a heterocyclic group, a cyano group, a hydroxyl group, an alkoxy group, amide group, an ureido group, an alkylsulfonylamino group, an arylsulfonylamino group, a sulfamoyl group, an alkylsulfonyl group, an arylsulfonyl group, a carbamoyl group or an alkoxycarbonyl group, particularly preferably a hydrogen atom, a halogen atom, an alkyl group, an aryl group, a cyano group, a hydroxyl group, an alkylsulfonyl group, an arylsulfonyl group, a heterocyclic group or an alkoxycarbonyl group, and most preferably a hydrogen atom, an alkyl group, an aryl group, a hydroxyl group or an alkoxycarbonyl group.

Hereinafter, $R_{11}$ to $R_{112}$ and R will be described in more detail.

The halogen atom represented by $R_{11}$ to $R_{112}$ and R represents a chlorine atom, a bromine atom or an iodine atom. Among them, a chlorine atom or a bromine atom is preferable, and a chlorine atom is particularly preferable.

The alkyl group represented by $R_{11}$ to $R_{112}$ and R includes a substituted or unsubstituted alkyl group. The substituted or unsubstituted alkyl group is preferably an alkyl group having 1 to 30 carbon atoms. Examples of the substituent are the same as those which may be contained in the heterocyclic group represented by $G_0$ or $G_1$ in the general formula (1). Among them, preferred is a hydroxyl group, an alkoxy group, a cyano group, a halogen atom, a sulfo group (which may be in a salt form) or a carboxyl group (which may be in a salt form). Examples of the alkyl group include methyl, ethyl, n-propyl, i-propyl, n-butyl, i-butyl, s-butyl, t-butyl, n-octyl, eicosyl, 2-chloroethyl, hydroxyethyl, cyanoethyl and 4-sulfobutyl.

The cycloalkyl group represented by $R_{11}$ to $R_{112}$ and R includes a substituted or unsubstituted cycloalkyl group. The substituted or unsubstituted cycloalkyl group is preferably a cycloalkyl group having 5- to 30 carbon atoms. Examples of the substituent are the same as those which may be contained in the heterocyclic group represented by $G_0$ or $G_1$ in the general formula (1). Examples of the cycloalkyl group include cyclohexyl, cyclopentyl, and 4-n-dodecylcyclohexyl.

The aralkyl group represented by $R_{11}$ to $R_{112}$ and R includes a substituted or unsubstituted aralkyl group. The substituted or unsubstituted aralkyl group is preferably an aralkyl group having 7 to 30 carbon atoms. Examples of the substituent are the same as those which may be contained in the heterocyclic group represented by $G_0$ or $G_1$ in the general formula (1). Examples of the aralkyl include benzyl and 2-phenethyl.

The alkenyl group represented by $R_{11}$ to $R_{112}$ and R represents a linear, branched or cyclic, substituted or unsubstituted alkenyl group. The alkenyl group is preferably a substituted or unsubstituted alkenyl group having 2 to 30 carbon atoms, and examples thereof include vinyl, allyl, prenyl, geranyl, oleyl, 2-cyclopenten-1-yl, 2-cyclohexen-1-yl, and the like.

The alkynyl group represented by $R_{11}$ to $R_{112}$ and R is a substituted or unsubstituted alkynyl group having 2 to 30 carbon atoms, and examples thereof include ethynyl, and propargyl.

The aryl group represented by $R_{11}$ to $R_{112}$ and R is a substituted or unsubstituted aryl group having 6 to 30 carbon atoms, and examples thereof include phenyl, p-tolyl, naphthyl, m-chlorophenyl, and o-hexadecanoylaminophenyl. Examples of the substituent are the same as those which may be contained in the heterocyclic group represented by $G_0$ or $G_1$ in the general formula (1).

The heterocyclic group represented by $R_{11}$ to $R_{112}$ and R is a monovalent group formed by removing one hydrogen atom from a 5- or 6-membered, substituted or unsubstituted, aromatic or non-aromatic heterocyclic compound, which may be further condensed. More preferred is a 5- or 6-membered aromatic heterocyclic group having 3 to 30 carbon atoms. Examples of the substituent are the same as those which may be contained in the heterocyclic group represented by $G_0$ or $G_1$ in the general formula (1). Examples of the heterocyclic group without restricting the substitution position include pyridyl, pyrazinyl, pyridazinyl, pyrimidinyl, triazinyl, quinolinyl, isoquinolinyl, quinazolinyl, cinnolinyl, phthalazinyl, quinoxalinyl, pyrrolyl, indolyl, furyl, benzofuryl, thienyl, benzothienyl, pyrazolyl, imidazolyl, benzimidazolyl, triazolyl, oxazolyl, benzoxazolyl, thiazolyl, benzothiazolyl, isothiazolyl, benzisothiazolyl, thiadiazolyl, isoxazolyl, benzisoxazolyl, pyrrolidinyl, piperidyl, piperazinyl, imidazolyl, thiazolyl, and the like.

The alkoxy group represented by $R_{11}$ to $R_{112}$ and R includes a substituted or unsubstituted alkoxy group. The substituted or unsubstituted alkoxy group is preferably an alkoxy group having 1 to 30 carbon atoms. Examples of the substituent are the same as those which may be contained in the heterocyclic group represented by $G_0$ or $G_1$ in the general formula (1). Examples of the alkoxy group include methoxy, ethoxy, isopropoxy, n-octyloxy, methoxyethoxy, hydroxyethoxy, 3-carboxypropoxy, and the like.

The aryloxy group represented by $R_{11}$ to $R_{112}$ and R is preferably a substituted or unsubstituted aryloxy group having 6 to 30 carbon atoms. Examples of the substituent are the same as those which may be contained in the heterocyclic group represented by $G_0$ or $G_1$ in the general formula (1). Examples of the aryloxy group include phenoxy, 2-methylphenoxy, 4-t-butylphenoxy, 3-nitrophenoxy, 2-tetradecanoylaminophenoxy, and the like.

The silyloxy group represented by $R_{11}$ to $R_{112}$ and R is preferably a silyloxy group having 3 to 20 carbon atoms, and examples thereof include trimethylsilyloxy, t-butyldimethylsilyloxy, and the like.

The heterocyclic oxy group represented by $R_{11}$ to $R_{112}$ and R is preferably a substituted or unsubstituted heterocyclic oxy group having 2 to 30 carbon atoms. Examples of the substituent are the same as those which may be contained in the heterocyclic group represented by $G_0$ or $G_1$ in the general formula (1). Examples of the heterocyclic oxy group include 1-phenyltetrazol-5-oxy, and the like.

The acyloxy group represented by $R_{11}$ to $R_{112}$ and R is preferably a formyloxy group, a substituted or unsubstituted alkylcarbonyloxy group having 2 to 30 carbon atoms, or a substituted or unsubstituted arylcarbonyloxy group having 6 to 30 carbon atoms. Examples of the substituent are the same as those which may be contained in the heterocyclic group represented by $G_0$ or $G_1$ in the general formula (1). Examples of the acyloxy group include formyloxy, acetyloxy, pivaloyloxy, stearoyloxy, benzoyloxy, p-methoxyphenylcarbonyloxy, and the like.

The carbamoyloxy group represented by $R_{11}$ to $R_{112}$ and R is preferably a substituted or unsubstituted carbamoyloxy group having 1 to 30 carbon atoms. Examples of the substituent are the same as those which may be contained in the heterocyclic group represented by $G_0$ or $G_1$ in the general formula (1). Examples of the carbamoyloxy group include N,N-dimethylcarbamoyloxy, N,N-diethylcarbamoyloxy, morpholinocarbonyloxy, N,N-di-n-octylaminocarbonyloxy, N-n-octylcarbamoyloxy, and the like.

The alkoxycarbonyloxy group represented by $R_{11}$ to $R_{112}$ and R is preferably a substituted or unsubstituted alkoxycarbonyloxy group having 2 to 30 carbon atoms. Examples of the substituent are the same as those which may be contained in the heterocyclic group represented by $G_0$ or $G_1$ in the general formula (1). Examples of the alkoxycarbonyloxy group include methoxycarbonyloxy, ethoxycarbonyloxy, t-butoxycarbonyloxy, n-octylcarbonyloxy, and the like.

The aryloxycarbonyloxy group represented by $R_{11}$ to $R_{112}$ and R is preferably a substituted or unsubstituted aryloxycarbonyloxy group having 7 to 30 carbon atoms. Examples of the substituent are the same as those which may be contained in the heterocyclic group represented by $G_0$ or $G_1$ in the general formula (1). Examples of the aryloxycarbonyloxy group include phenoxycarbonyloxy, p-methoxyphenoxycarbonyloxy, p-n-hexadecyloxyphenoxycarbonyloxy, and the like.

The amino group represented by $R_{11}$ to $R_{112}$ and R is preferably a substituted or unsubstituted alkylamino group having 1 to 30 carbon atoms or a substituted or unsubstituted arylamino group having 6 to 30 carbon atoms. Examples of the substituent are the same as those which may be contained in the heterocyclic group represented by $G_0$ or $G_1$ in the general formula (1). Examples of the amino group include amino, methylamino, dimethylamino, anilino, N-methylanilino, diphenylamino, hydroxyethylamino, carboxyethylamino, sulfoethylamino, 3,5-dicarboxyanilino, and the like.

The acylamino group represented by $R_{11}$ to $R_{112}$ and R is preferably a formylamino group, a substituted or unsubstituted alkylcarbonylamino group having 1 to 30 carbon atoms, or a substituted or unsubstituted arylcarbonylamino group having 6 to 30 carbon atoms. Examples of the substituent are the same as those which may be contained in the heterocyclic group represented by $G_0$ or $G_1$ in the general formula (1). Examples of the acylamino group include formylamino, acetylamino, pivaloylamino, lauroylamino, benzoyl amino, 3,4,5-tri-n-octyloxyphenylcarbonylamino, and the like.

The aminocarbonylamino group represented by $R_{11}$ to $R_{112}$ and R is preferably a substituted or unsubstituted aminocarbonylamino group having 1 to 30 carbon atoms. Examples of the substituent are the same as those which may be contained in the heterocyclic group represented by $G_0$ or $G_1$ in the general formula (1). Examples of the aminocarbonylamino group include carbamoylamino, N,N-dimethylaminocarbonylamino, N,N-diethylaminocarbonylamino, morpholinocarbonylamino, and the like.

The alkoxycarbonylamino group represented by $R_{11}$ to $R_{112}$ and R is preferably a substituted or unsubstituted alkoxycarbonylamino group having 2 to 30 carbon atoms.

Examples of the substituent are the same as those which may be contained in the heterocyclic group represented by $G_0$ or $G_1$ in the general formula (1). Examples of the alkoxycarbonylamino group include methoxycarbonylamino, ethoxycarbonylamino, t-butoxycarbonylamino, n-octadecyloxycarbonylamino, N-methylmethoxycarbonylamino, and the like.

The aryloxycarbonylamino group represented by $R_{11}$ to $R_{112}$ and R is preferably a substituted or unsubstituted aryloxycarbonylamino group having 7 to 30 carbon atoms. Examples of the substituent are the same as those which may be contained in the heterocyclic group represented by $G_0$ or $G_1$ in the general formula (1). Examples of the aryloxycarbonylamino group include phenoxycarbonylamino, p-chlorophenoxycarbonylamino, m-n-octyloxyphenoxycarbonylamino, and the like.

The sulfamoylamino group represented by $R_{11}$ to $R_{112}$ and R is preferably a substituted or unsubstituted sulfamoylamino group having 0 to 30 carbon atoms. Examples of the substituent are the same as those which may be contained in the heterocyclic group represented by $G_0$ or $G_1$ in the general formula (1). Examples of the sulfamoylamino group include sulfamoylamino, N,N-dimethylaminosulfonylamino, N-n-octylaminosulfonylamino, and the like.

The alkyl- or aryl-sulfonylamino group represented by $R_{11}$ to $R_{112}$ and R is preferably a substituted or unsubstituted alkylsulfonylamino group having 1 to 30 carbon atoms, or a substituted or unsubstituted arylsulfonylamino group having 6 to 30 carbon atoms. Examples of the substituent are the same as those which may be contained in the heterocyclic group represented by $G_0$ or $G_1$ in the general formula (1). Examples of the alkylsulfonylamino group and the arylsulfonylamino group include methylsulfonylamino, butyl sulfonylamino, phenylsulfonylamino, 2,3,5-trichlorophenylsulfonylamino, p-methylphenylsulfonylamino, and the like.

The alkylthio group represented by $R_{11}$ to $R_{112}$ and R is preferably a substituted or unsubstituted alkylthio group having 1 to 30 carbon atoms. Examples of the substituent are the same as those which may be contained in the heterocyclic group represented by $G_0$ or $G_1$ in the general formula (1). Examples of the alkylthio group include methylthio, ethylthio, n-hexadecylthio, and the like.

The arylthio group represented by $R_{11}$ to $R_{112}$ and R is preferably a substituted or unsubstituted arylthio group having 6 to 30 carbon atoms. Examples of the substituent are the same as those which may be contained in the heterocyclic group represented by $G_0$ or $G_1$ in the general formula (1). Examples of the arylthio group include phenylthio, p-chlorophenylthio, m-methoxyphenylthio, and the like.

The heterocyclic thio group represented by $R_{11}$ to $R_{112}$ and R is preferably a substituted or unsubstituted heterocyclic thio group having 2 to 30 carbon atoms. Examples of the substituent are the same as those which may be contained in the heterocyclic group represented by $G_0$ or $G_1$ in the general formula (1). Preferred is a 5- or 6-membered heterocyclic group. Examples of the substituent include an ionic hydrophilic group. Examples of the heterocyclic thio group include a 2-pyridylthio group, 2-benzothiazolylthio, 1-phenyltetrazolyl-5-ylthio, and the like.

The sulfamoyl group represented by $R_{11}$ to $R_{112}$ and R is preferably a substituted or unsubstituted sulfamoyl group having 0 to 30 carbon atoms. Examples of the substituent are the same as those which may be contained in the heterocyclic group represented by $G_0$ or $G_1$ in the general formula (1). Examples of the sulfamoyl group include N-ethylsulfamoyl, N-(3-dodecyloxypropyl)sulfamoyl, N,N-dimethylsulfamoyl, N-acetylsulfamoyl, N-benzoylsulfamoyl, N-(N'-phenylcarbamoyl)sulfamoyl), and the like.

The alkyl- or aryl-sulfinyl group represented by $R_{11}$ to $R_{112}$ and R is preferably a substituted or unsubstituted alkylsulfinyl group having 1 to 30 carbon atoms, or a substituted or unsubstituted arylsulfinyl group having 6 to 30 carbon atoms. Examples of the substituent are the same as those which may be contained in the heterocyclic group represented by $G_0$ or $G_1$ in the general formula (1). Examples of the alkyl- or aryl-sulfinyl group include methylsulfinyl, ethylsulfinyl, phenylsulfinyl, p-methylphenylsulfinyl, a 3-sulfopropylsulfinyl group, a 3-carboxypropylsulfinyl group, and the like.

The alkyl- or aryl-sulfonyl group represented by $R_{11}$ to $R_{112}$ and R is preferably a substituted or unsubstituted alkylsulfonyl group having 1 to 30 carbon atoms or a substituted or unsubstituted arylsulfonyl group having 6 to 30 carbon atoms. Examples of the substituent are the same as those which may be contained in the heterocyclic group represented by $G_0$ or $G_1$ in the general formula (1). Examples of the alkyl- or aryl-sulfonyl group include methylsulfonyl, ethylsulfonyl, phenylsulfonyl, p-toluenesulfonyl, and the like.

The acyl group represented by $R_{11}$ to $R_{112}$ and R is preferably a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 4 to 30 carbon atoms wherein the heterocyclic ring is connected to the carbonyl group via a carbon atom. Examples of the substituent are the same as those which may be contained in the heterocyclic group represented by $G_0$ or $G_1$ in the general formula (1). The acyl group is preferably an acyl group which has 1 to 12 carbon atoms upon exclusion of the substituent. Examples of the acyl group include acetyl, pivaloyl, 2-chloroacetyl, stearoyl, benzoyl, p-n-octyloxyphenylcarbonyl, 2-pyridylcarbonyl, 2-furylcarbonyl, and the like. Examples of the substituent include an ionic hydrophilic group.

The aryloxycarbonyl group represented by $R_{11}$ to $R_{112}$ and R is preferably a substituted or unsubstituted aryloxycarbonyl group having 7 to 30 carbon atoms. Examples of the substituent are the same as those which may be contained in the heterocyclic group represented by $G_0$ or $G_1$ in the general formula (1). Examples of the aryloxycarbonyl group include phenoxycarbonyl, o-chlorophenoxycarbonyl, m-nitrophenoxycarbonyl, p-t-butylphenoxycarbonyl, and the like.

The alkoxycarbonyl group represented by $R_{11}$ to $R_{112}$ and R is preferably a substituted or unsubstituted alkoxycarbonyl group having 2 to 30 carbon atoms. Examples of the substituent are the same as those which may be contained in the heterocyclic group represented by $G_0$ or $G_1$ in the general formula (1). Examples of the alkoxycarbonyl group include methoxycarbonyl, ethoxycarbonyl, t-butoxycarbonyl, n-octadecyloxycarbonyl, and the like.

The carbamoyl group represented by $R_{11}$ to $R_{112}$ and R is preferably a substituted or unsubstituted carbamoyl group having 1 to 30 carbon atoms. Examples of the substituent are the same as those which may be contained in the heterocyclic group represented by $G_0$ or $G_1$ in the general formula (1). Examples of the carbamoyl group include carbamoyl, N-methylcarbamoyl, N,N-dimethylcarbamoyl, N,N-di-n-octylcarbamoyl, N-(methylsulfonyl)carbamoyl, and the like.

The phosphino group represented by $R_{11}$ to $R_{112}$ and R is preferably a substituted or unsubstituted phosphino group having 2 to 30 carbon atoms. Examples of the substituent are the same as those which may be contained in the heterocyclic group represented by $G_0$ or $G_1$ in the general formula (1). Examples of the phosphino group include dimethylphosphino, diphenylphosphino, methylphenoxyphosphino, and the like.

The phosphinyl group represented by $R_{11}$ to $R_{112}$ and R is preferably a substituted or unsubstituted phosphinyl group having 2 to 30 carbon atoms. Examples of the substituent are the same as those which may be contained in the heterocyclic group represented by $G_0$ or $G_1$ in the general formula (1). Examples of the phosphinyl group include phosphinyl, dioctyloxyphosphinyl, diethoxyphosphinyl, and the like.

The phosphinyloxy group represented by $R_{11}$ to $R_{112}$ and R is preferably a substituted or unsubstituted phosphinyloxy group having 2 to 30 carbon atoms. Examples of the substituent are the same as those which may be contained in the heterocyclic group represented by $G_0$ or $G_1$ in the general formula (1). Examples of the phosphinyloxy group include diphenoxyphosphinyloxy, dioctyloxyphosphinyloxy, and the like.

The phosphinylamino group represented by $R_1$ to $R_{112}$ and R is preferably a substituted or unsubstituted phosphinylamino group having 2 to 30 carbon atoms. Examples of the substituent are the same as those which may be contained in the heterocyclic group represented by $G_0$ or $G_1$ in the general formula (1). Examples of the phosphinylamino group include dimethoxyphosphinylamino, dimethylaminophosphinylamino, and the like.

The silyl group represented by $R_{11}$ to $R_{112}$ and R is preferably a substituted or unsubstituted silyl group having 3 to 30 carbon atoms. Examples of the substituent are the same as those which may be contained in the heterocyclic group represented by $G_0$ or $G_1$ in the general formula (1). Examples of the silyl group include trimethylsilyl, t-butyldimethylsilyl, phenyldimethylsilyl, and the like.

Examples of the azo group represented by $R_{11}$ to $R_{112}$ and R include phenylazo, 4-methoxyphenylazo, 4-pivaloylaminophenylazo, 2-hydroxy-4-propanoylphenylazo, and the like.

Examples of the imido group represented by $R_{11}$ to $R_{112}$ and R include N-succinimido, N-phthalimido, and the like.

Examples of the phosphoryl group represented by $R_{11}$ to $R_{112}$ and R include a phosphoryl group having a substituent and an unsubstituted phosphoryl group. Examples of the phosphoryl group include a phenoxyphosphoryl group and a phenylphosphoryl group.

Examples of the ionic hydrophilic group represented by $R_{11}$ to $R_{112}$ and R include a sulfo group, a carboxyl group, a phosphono group, a quaternary ammonium group, and the like. The ionic hydrophilic group is preferably a carboxyl group or a sulfo group. The carboxyl group and the sulfo group may be in the form of a salt, and examples of a counterion forming the salt include an ammonium ion, an alkali metal ion (for example, calcium ion or barium ion) and an organic cation (for example, tetramethylguanidium ion).

When $R_{11}$ to $R_{112}$ and R represent a divalent group, it is preferable that the divalent group is an alkylene group (for example, methylene, ethylene, propylene, butylene or pentylene), an alkenylene group (for example, ethenylene or propenylene), an alkynylene group (for example, ethynylene or propynylene), an arylene group (for example, phenylene or naphthylene), a divalent heterocyclic group (for example, a 6-chloro-1,3,5-triazine-2,4-diyl group, a pyrimidine-2,4-diyl group, a pyrimidine-4,6-diyl group, a quinoxaline-2,3-diyl group or a pyridazine-3,6-diyl group), —O—, —CO—, —NR'— wherein R' represents a hydrogen atom, an alkyl group or an aryl group, —S—, —$SO_2$—, —SO—, or a combination thereof (for example, —$NHCH_2CH_2NH$—, —NHCONH—, etc.).

Each of the alkylene group, the alkenylene group, the alkynylene group, the arylene group, the divalent heterocyclic group, and the alkyl group or aryl group of R' may have a substituent.

Examples of the substituent include the same as those recited for $R_{11}$ to $R_{112}$ and R in the general formula (2).

The alkyl group and the aryl group of R' each have the same definitions as the substituent recited when $R_{11}$ to $R_{112}$ and R represent an alkyl group or an aryl group.

As the divalent group, an alkylene group having 10 or fewer carbon atoms, an alkenylene group having 10 or fewer carbon atoms, an alkynylene group having 10 or fewer carbon atoms, an arylene group having from 6 to 10 carbon atoms, a divalent heterocyclic group, —S—, —SO—, —$SO_2$—, or a combination thereof (for example, —$SCH_2CH_2S$—, —$SCH_2CH_2CH_2S$—, etc.) are more preferable.

A total carbon atom number of the divalent linking group is preferably in the range of 0 to 50, more preferably 0 to 30, and most preferably 0 to 10.

When $R_{11}$ to $R_{112}$ and R represent a trivalent group, it is preferable that the trivalent group is a trivalent hydrocarbon group, a trivalent heterocyclic group, >N—, or a combination thereof with a divalent group (for example, >$NCH_2CH_2NH$—, >NCONH—, etc.).

A total carbon atom number of the trivalent linking group is preferably in the range of 0 to 50, more preferably 0 to 30, and most preferably 0 to 10.

With respect to a preferred combination of the substituents in the azo pigment of the present invention represented by the general formula (1), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (1) contain the following (a) to (d).

(a) More preferred examples of the heterocyclic group represented by $G_0$ without restricting the substitution position preferably include pyrazolyl, 1,2,3-triazolyl, 1,2,4-triazolyl and imidazolyl, particularly preferably pyrazolyl, 1,2,4-triazolyl and imidazolyl, particularly preferably pyrazolyl and 1,2,4-triazolyl, and most preferably pyrazolyl.

(b) More preferred examples of the heterocyclic group represented by $G_1$ without restricting the substitution position preferably include pyrrolyl, pyrazolyl, 1,2,3-triazolyl, 1,2,4-triazolyl, thiazolyl, isothiazolyl, 1,2,4-thiadiazolyl, 1,3,4-thiadiazolyl, benzothiazolyl, benzisothiazolyl, pyridyl, pyrimidinyl, pyridazinyl, pyrazinyl and triazinyl, particularly preferably pyrazolyl, 1,2,4-triazolyl, thiazolyl, isothiazolyl, 1,2,4-thiadiazolyl, 1,3,4-thiadiazolyl, benzothiazolyl, benzisothiazolyl, pyridyl, pyrimidinyl, pyridazinyl, pyrazinyl and s-triazinyl, still more preferably particularly pyrazolyl, 1,2,4-triazolyl, 1,2,4-thiadiazolyl, 1,3,4-thiadiazolyl, pyridyl, pyrimidinyl, pyridazinyl, pyrazinyl and s-triazinyl, particularly pyridyl, pyrimidinyl, pyrazinyl and s-triazinyl, and most preferably pyridyl and pyrimidinyl.

(c) n represents an integer of 1 to 4, preferably 1 to 3, particularly preferable 1 to 2, and most preferably 1.

(d) More preferred examples of the substituent represented by A preferably include (A-1), (A-2), (A-3), (A-4), (A-5), (A-6), (A-7), (A-8), (A-11), (A-12), (A-13), (A-18), (A-27), (A-38), (A-41), (A-42), (A-43) and (A-44), more preferably (A-1), (A-3), (A-6), (A-11), (A-12), (A-13), (A-18), (A-27), (A-41), (A-43) and (A-44), particularly preferably (A-1), (A-3), (A-6), (A-11), (A-12), (A-13), (A-18), (A-27), (A-41) and (A-43), still more preferably (A-1), (A-11), (A-12), (A-13), (A-18), (A-27) and (A-43), and most preferably (A-11), (A-12) and (A-18).

The present invention also includes in its scope tautomers of the azo pigments represented by the general formulae (1), (3), (4), (5) and (7). Although the general formulae (1), (3), (4), (5) and (7) are shown in the form of limiting structure among several tautomer forms which are possible in view of chemical structure, the azo pigments may be tautomers of other structures than the ones shown, and may be used as a mixture containing plural tautomers. For example, with regard to the pigment represented by the general formula (1), an azo-hydrazone tautomer represented by the following general formula (1') can be considered.

The present invention also includes in its scope a compound represented by the general formula (1'), which is a tautomer of the azo pigment represented by the general formula (1).

[Chem. 22]

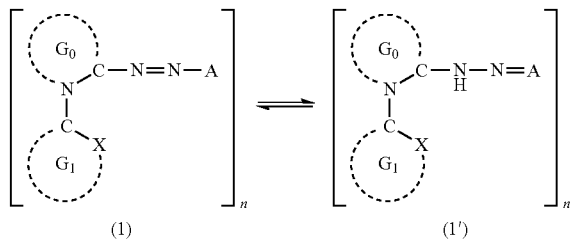

(In the general formula (1'), $G_0$, $G_1$, X, n and A have the same definitions as in the general formula (1).)

The azo pigment represented by the general formula (1) is preferably an azo pigment represented by the following general formula (3).

Hereinafter, the general formula (3) will be described in more detail.

[Chem. 23]

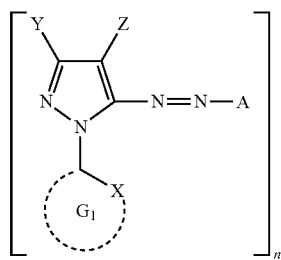

In the general formula (3), Y represents a hydrogen atom or a substituent. Z represents an electron-withdrawing group having a Hammett's σp value of 0.2 or more. $G_1$, A, X and n have the same definitions as $G_1$, A, X and n in the general formula (1).

In the general formula (3), a preferred example of the substituent represented by Z is an electron-withdrawing group, especially having a Hammett's substituent constant σp value of 0.2 or more, and more preferably 0.3 or more. The upper limit of the σp value of the electron-withdrawing group is 1.0 or less.

Specific examples of Z, the electron-withdrawing group having the σp value of 0.2 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with other electron-withdrawing group(s) having the σp value of 0.2 or more, a heterocyclic group, a halogen atom, an azo group, and a selenocyanate group.

Preferred examples of Z include an acyl group having 2 to 12 carbon atoms, an acyloxy group having 2 to 12 carbon atoms, a carbamoyl group having 1 to 12 carbon atoms, an alkyloxycarbonyl group having 2 to 12 carbon atoms, an aryloxycarbonyl group having 7 to 18 carbon atoms, a cyano group, a nitro group, an alkylsulfinyl group having 1 to 12 carbon atoms, an arylsulfinyl group having 6 to 18 carbon atoms, an alkylsulfonyl group having 1 to 12 carbon atoms, an arylsulfonyl group having 6 to 18 carbon atoms, a sulfamoyl group having 0 to 12 carbon atoms, a halogenated alkyl group having 1 to 12 carbon atoms, a halogenated alkyloxy group having 1 to 12 carbon atoms, a halogenated alkylthio group having 1 to 12 carbon atoms, a halogenated aryloxy group having 7 to 18 carbon atoms, an aryl group having 7 to 18 carbon atoms and substituted with at least two other electron-withdrawing groups having the σp value of 0.20 or more, and a 5- to 8-membered heterocyclic group having 1 to 18 carbon atoms and containing a nitrogen atom, an oxygen atom or a sulfur atom.

More preferred is a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

In the general formula (3), Y represents a hydrogen atom or a substituent. When Y represents a substituent, examples of the substituent include the same as those recited for $R_{11}$ to $R_{112}$ and R in the general formula (2). The same also applies to preferred examples thereof.

With more preferred Y, a hydrogen atom, a substituted or unsubstituted alkyl group having a total of 1 to 12 carbon atoms, a substituted or unsubstituted aryl group having a total of 6 to 18 carbon atoms or a substituted or unsubstituted heterocyclic group having a total of 4 to 12 carbon atoms is preferable. Among them, a hydrogen atom or a linear and/or branched alkyl group having a total of 1 to 8 carbon atoms is preferable, a hydrogen atom or an alkyl group having 1 to 8 carbon atoms is particularly preferable, and a hydrogen atom is most preferable.

When Y further has a substituent, examples of such a substituent include the same as those recited for $R_{11}$ to $R_{112}$ and R in the general formula (2). The same also applies to preferred examples thereof.

In the general formula (3), a hetero atom represented by X may be contained in a singular or plural form in the heterocyclic group. When plural hetero atoms are contained, each hetero atom X in the heterocyclic group may be the same as or different from every other X. X is preferably a nitrogen atom, an oxygen atom or a sulfur atom. Particularly, preferred is a case of forming an aromatic nitrogen-containing heterocyclic group containing at least one or more nitrogen atoms as X.

In the general formula (3), more preferred examples of the heterocyclic group represented by $G_1$ include the same as those recited for $G_1$ in the general formula (1). The same also applies to preferred examples thereof.

In the general formula (3), n represents an integer of 1 to 4, preferably 1 to 3, particularly 1 to 2, and most preferably 1.

In the general formula (3), examples of the substituent represented by A include the same as those recited for A in the general formula (1). The same also applies to preferred examples thereof.

With respect to a preferred combination of the substituents in the azo pigment of the present invention represented by the general formula (3), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (3) contain the following (a) to (e).

(a) More preferred examples of the heterocyclic group represented by $G_1$ without restricting the substitution position preferably include pyrrolyl, pyrazolyl, 1,2,3-triazolyl, 1,2,4-triazolyl, thiazolyl, isothiazolyl, 1,2,4-thiadiazolyl, 1,3,4-thiadiazolyl, benzothiazolyl, benzisothiazolyl, pyridyl, pyrimidinyl, pyridazinyl, pyrazinyl and triazinyl, particularly preferably pyrazolyl, 1,2,4-triazolyl, thiazolyl, isothiazolyl, 1,2,4-thiadiazolyl, 1,3,4-thiadiazolyl, benzothiazolyl, benzisothiazolyl, pyridyl, pyrimidinyl, pyridazinyl, pyrazinyl and s-triazinyl, still more preferably particularly pyrazolyl, 1,2,4-triazolyl, 1,2,4-thiadiazolyl, 1,3,4-thiadiazolyl, pyridyl, pyrimidinyl, pyridazinyl, pyrazinyl and s-triazinyl, particularly pyridyl, pyrimidinyl, pyrazinyl and s-triazinyl, and most preferably pyridyl and pyrimidinyl.

(b) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(c) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(d) n represents an integer of 1 to 4, preferably 1 to 3, particularly preferable 1 to 2, and most preferably 1.

(e) More preferred examples of the substituent represented by A preferably include (A-1), (A-2), (A-3), (A-4), (A-5), (A-6), (A-7), (A-8), (A-11), (A-12), (A-13), (A-18), (A-27), (A-38), (A-41), (A-42), (A-43) and (A-44), more preferably (A-1), (A-3), (A-6), (A-11), (A-12), (A-13), (A-18), (A-27), (A-41), (A-43) and (A-44), particularly preferably (A-1), (A-3), (A-6), (A-11), (A-12), (A-13), (A-18), (A-27), (A-41) and (A-43), still more preferably (A-1), (A-11), (A-12), (A-13), (A-18), (A-27) and (A-43), and most preferably (A-11), (A-12) and (A-18).

The present invention also includes in its scope a tautomer of the azo pigment represented by the general formula (3). Although the general formula (3) is shown in the form of limiting structure among several tautomer forms which are possible in view of chemical structure, the azo pigments may be tautomers of other structures than the ones shown, and may be used as a mixture containing plural tautomers. For example, with regard to the pigment represented by the general formula (3), an azo-hydrazone tautomer represented by the following general formula (3') can be considered.

The present invention also includes in its scope a compound represented by the general formula (3'), which is a tautomer of the azo pigment represented by the general formula (3).

[Chem. 24]

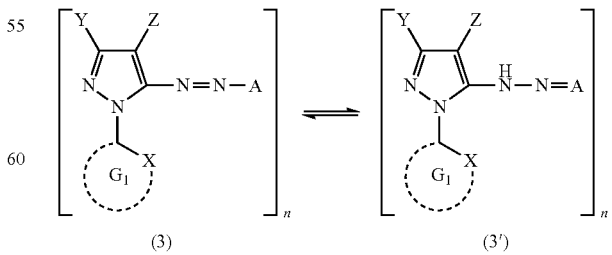

(In the general formula (3'), Y, Z, $G_1$, X, n and A have the same definitions as in the general formula (3).)

The azo pigment represented by the general formula (3) is preferably an azo pigment represented by the following general formula (4).

Hereinafter, the general formula (4) will be described in more detail.

[Chem. 25]

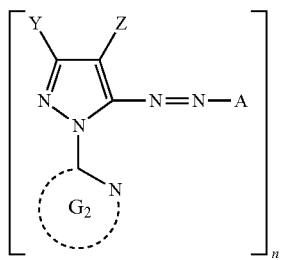

(4)

In the general formula (4), Y represents a hydrogen atom or a substituent. Z represents an electron-withdrawing group having a Hammett's σp value of 0.2 or more. $G_2$ represents a non-metal atomic group which can form a 5- or 6-membered nitrogen-containing heterocyclic group. The heterocyclic group may be unsubstituted or may have a substituent. Moreover, the heterocyclic group may be a monocyclic ring or a condensed ring. A and n have the same definitions as A and n in the general formula (1).

In the general formula (4), examples of the substituent for Z include the same as those recited for Z in the general formula (3). The same also applies to preferred examples thereof.

In the general formula (4), when Y represents a substituent, examples of the substituent include the same as those recited for Y in the general formula (3). The same also applies to preferred examples thereof.

In the general formula (4), more preferred examples of the heterocyclic group represented by $G_2$ include the same as those recited for $G_2$ in the general formula (3). The same also applies to preferred examples thereof.

In the general formula (4), n represents an integer of 1 to 4, preferably 1 to 3, particularly 1 to 2, and most preferably 1.

In the general formula (4), preferred examples of the substituent represented by A include the same as those recited for A in the general formula (3). The same also applies to preferred examples thereof.

With respect to a preferred combination of the substituents in the pigment of the present invention represented by the general formula (4), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (4) contain the following (a) to (e).

(a) More preferred examples of the heterocyclic group represented by $G_2$ without restricting the substitution position preferably include pyrrolyl, pyrazolyl, 1,2,3-triazolyl, 1,2,4-triazolyl, thiazolyl, isothiazolyl, 1,2,4-thiadiazolyl, 1,3,4-thiadiazolyl, benzothiazolyl, benzisothiazolyl, pyridyl, pyrimidinyl, pyridazinyl, pyrazinyl and triazinyl, particularly preferably pyrazolyl, 1,2,4-triazolyl, thiazolyl, isothiazolyl, 1,2,4-thiadiazolyl, 1,3,4-thiadiazolyl, benzothiazolyl, benzisothiazolyl, pyridyl, pyrimidinyl, pyridazinyl, pyrazinyl and s-triazinyl, still more preferably particularly pyrazolyl, 1,2,4-triazolyl, 1,2,4-thiadiazolyl, 1,3,4-thiadiazolyl, pyridyl, pyrimidinyl, pyridazinyl, pyrazinyl and s-triazinyl, particularly pyridyl, pyrimidinyl, pyrazinyl and s-triazinyl, and most preferably pyridyl and pyrimidinyl.

(b) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(c) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(d) n represents an integer of 1 to 4, preferably 1 to 3, particularly preferable 1 to 2, and most preferably 1.

(e) More preferred examples of the substituent represented by A preferably include (A-1), (A-2), (A-3), (A-4), (A-5), (A-6), (A-7), (A-8), (A-11), (A-12), (A-13), (A-18), (A-27), (A-38), (A-41), (A-42), (A-43) and (A-44), more preferably (A-1), (A-3), (A-6), (A-11), (A-12), (A-13), (A-18), (A-27), (A-41), (A-43) and (A-44), particularly preferably (A-1), (A-3), (A-6), (A-11), (A-12), (A-13), (A-18), (A-27), (A-41) and (A-43), still more preferably (A-1), (A-11), (A-12), (A-13), (A-18), (A-27) and (A-43), and most preferably (A-11), (A-12) and (A-18).

The present invention also includes in its scope a tautomer of the azo pigment represented by the general formula (4). Although the general formula (4) is shown in the form of limiting structure among several tautomer forms which are possible in view of chemical structure, the azo pigments may be tautomers of other structures than the ones shown, and may be used as a mixture containing plural tautomers. For example, with regard to the pigment represented by the general formula (4), an azo-hydrazone tautomer represented by the following general formula (4') can be considered.

The present invention also includes in its scope a compound represented by the general formula (4'), which is a tautomer of the azo pigment represented by the general formula (4).

[Chem. 26]

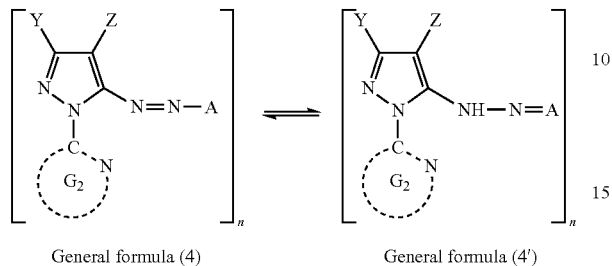

General formula (4)        General formula (4')

(In the general formula (4'), Y, Z, $G_2$, n and A have the same definitions as in the general formula (4).)

The azo pigment represented by the general formula (4) is preferably an azo pigment represented by the following general formula (5).

Hereinafter, the general formula (5) will be described in more detail.

[Chem. 27]

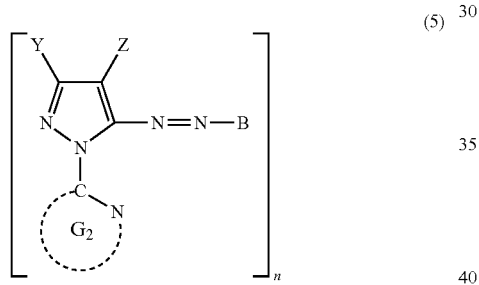

(5)

In the general formula (5), $G_2$, Y, Z and n have the same definitions as $G_2$, Y, Z and n in the general formula (4). B represents any one selected from the group of substituents represented by (B-1) to (B-24) in the following general formula (6). * represents the binding site to the N atom in the general formula (5).

General formula (6):

[Chem. 28]

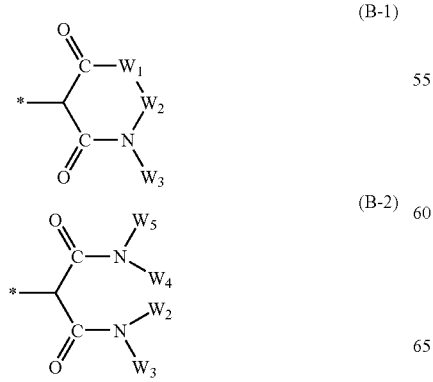

(B-1)

(B-2)

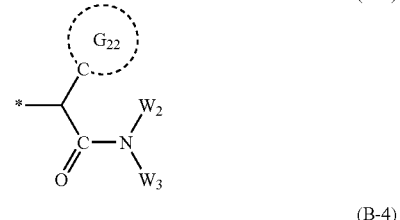

(B-3)

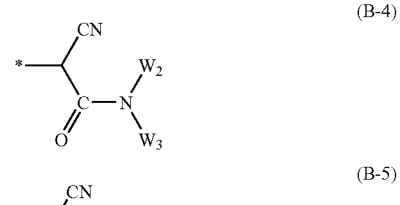

(B-4)

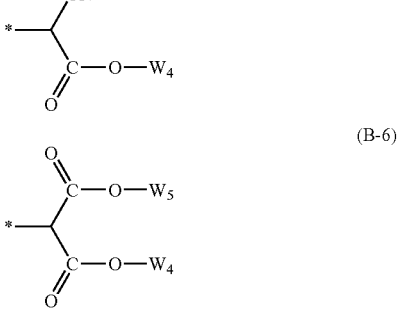

(B-5)

(B-6)

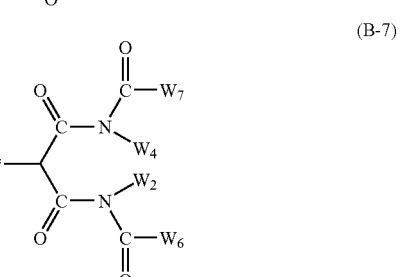

(B-7)

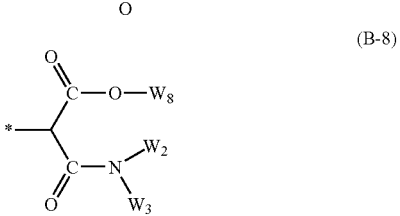

(B-8)

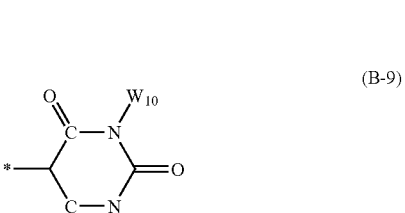

(B-9)

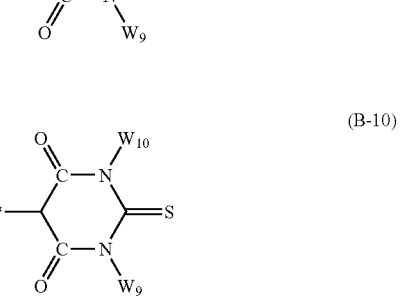

(B-10)

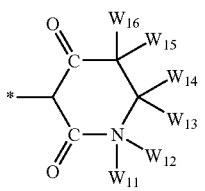 (B-11)

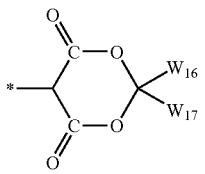 (B-12)

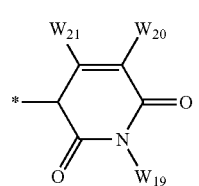 (B-13)

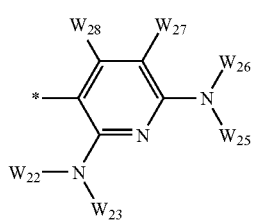 (B-14)

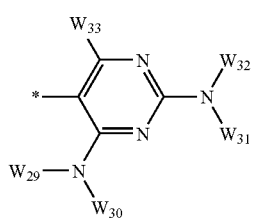 (B-15)

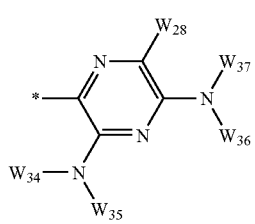 (B-16)

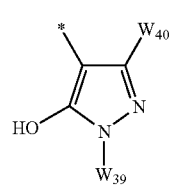 (B-17)

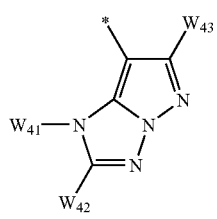 (B-18)

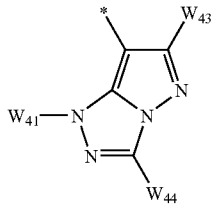 (B-19)

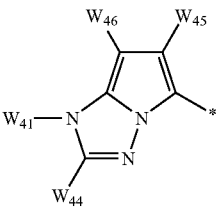 (B-20)

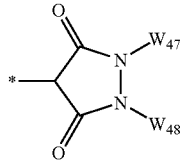 (B-21)

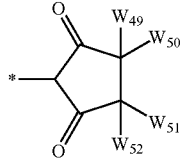 (B-22)

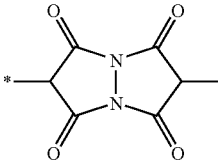 (B-23)

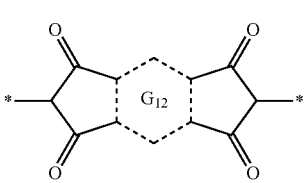 (B-24)

In the group of substituents (B-1) to (B-24) represented by the general formula (6), $W_1$ to $W_{52}$ each independently represents a hydrogen atom or a substituent. $G_{22}$ in (B-3) represents a non-metal atomic group necessary for forming a 5- or 6-membered heterocyclic group. $G_{12}$ in (B-24) represents a non-metal atomic group necessary for forming a 5- or 6-membered hydrocarbon ring or a heterocyclic group.

In the general formula (5), examples of the substituent for Z include the same as those recited for Z in the general formula (4). The same also applies to preferred examples thereof.

In the general formula (5), when Y represents a substituent, examples of the substituent include the same as those recited for Y in the general formula (4). The same also applies to preferred examples thereof.

In the general formula (5), more preferred examples of the heterocyclic group represented by $G_2$ include the same as those recited for $G_2$ in the general formula (4). The same also applies to preferred examples thereof.

In the general formula (5), n represents an integer of 1 to 4, preferably 1 to 3, particularly 1 to 2, and most preferably 1.

In the general formula (5), preferred examples of the substituent represented by B preferably include (B-1), (B-3), (B-9), (B-11), (B-13), (B-14), (B-15), (B-17), (B-18), (B-19), (B-20), (B-21), (B-23) and (B-24), more preferably (B-1), (B-3), (B-13), (B-14), (B-15), (B-17), (B-18), (B-19), (B-20), (B-21), (B-23) and (B-24), particularly preferably (B-1), (B-3), (B-13), (B-14), (B-15), (B-17), (B-18), (B-19) and (B-21), and most preferably (B-1), (B-3), (B-13), (B-17) and (B-18).

$W_1$ to $W_{52}$ each independently represents a hydrogen atom or a substituent. When $W_1$ to $W_{52}$ represent a substituent, $W_1$ to $W_{52}$ are the same as those recited for $R_{11}$ to $R_{112}$ and R in the general formula (2). The same also applies to preferred examples thereof.

With respect to a preferred combination of the substituents in the azo pigment of the present invention represented by the general formula (5), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (5) contain the following (a) to (e).

(a) More preferred examples of the heterocyclic group represented by $G_2$ without restricting the substitution position preferably include pyrrolyl, pyrazolyl, 1,2,3-triazolyl, 1,2,4-triazolyl, thiazolyl, isothiazolyl, 1,2,4-thiadiazolyl, 1,3,4-thiadiazolyl, benzothiazolyl, benzisothiazolyl, pyridyl, pyrimidinyl, pyridazinyl, pyrazinyl and triazinyl, particularly preferably pyrazolyl, 1,2,4-triazolyl, thiazolyl, isothiazolyl, 1,2,4-thiadiazolyl, 1,3,4-thiadiazolyl, benzothiazolyl, benzisothiazolyl, pyridyl, pyrimidinyl, pyridazinyl, pyrazinyl and s-triazinyl, still more preferably particularly pyrazolyl, 1,2,4-triazolyl, 1,2,4-thiadiazolyl, 1,3,4-thiadiazolyl, pyridyl, pyrimidinyl, pyridazinyl, pyrazinyl and s-triazinyl, particularly pyridyl, pyrimidinyl, pyrazinyl and s-triazinyl, and most preferably pyridyl and pyrimidinyl.

(b) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(c) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(d) n represents an integer of 1 to 4, preferably 1 to 3, particularly preferable 1 to 2, and most preferably 1.

(e) More preferred examples of the substituent represented by B preferably include (B-1), (B-3), (B-9), (B-11), (B-13), (B-14), (B-15), (B-17), (B-18), (B-19), (B-20), (B-21), (B-23) and (B-24), more preferably (B-1), (B-3), (B-13), (B-14), (B-15), (B-17), (B-18), (B-19), (B-20), (B-21), (B-23) and (B-24), particularly preferably (B-3), (B-14), (B-15), (B-18), (B-19) and (B-21), and most preferably (B-3), (B-18) and (B-21).

The present invention also includes in its scope a tautomer of the azo pigment represented by the general formula (5). Although the general formula (5) is shown in the form of limiting structure among several tautomer forms which are possible in view of chemical structure, the azo pigments may be tautomers of other structures than the ones shown, and may be used as a mixture containing plural tautomers. For example, with regard to the pigment represented by the general formula (5), an azo-hydrazone tautomer represented by the following general formula (5') can be considered. The present invention also includes in its scope a compound represented by the general formula (5'), which is a tautomer of the azo pigment represented by the general formula (5).

[Chem. 29]

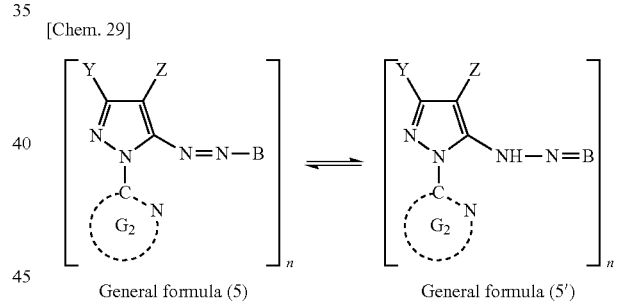

General formula (5)    General formula (5')

(In the general formula (5'), Y, Z, $G_2$, n and B have the same definitions as in the general formula (5).)

The azo pigment represented by the general formula (5) is preferably an azo pigment represented by the following general formula (7).

Hereinafter, the general formula (7) will be described in more detail.

[Chem. 30]

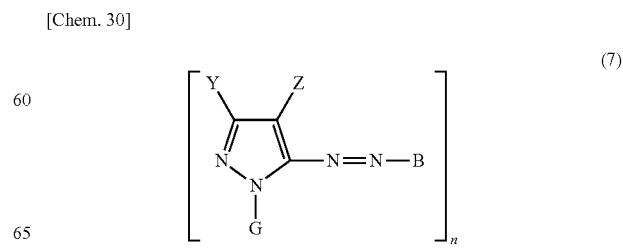

In the general formula (7), Y, Z and n have the same definitions as Y, Z and n in the general formula (5). B represents any one selected from the group of substituents represented by (B-1) to (B-24) in the following general formula (6). * in the general formula (6) represents the binding site to the N atom in the general formula (5). G represents any one selected from the group of substituents represented by (G-1) to (G-13) in the following general formula (8). * in the general formula (8) represents the binding site to the N atom in the general formula (5). $G_{11}$ represents a non-metal atomic group which can form a 5- or 6-membered heterocyclic group, wherein the heterocyclic group represented by $G_{11}$ may be unsubstituted or may have a substituent. The heterocyclic group may be a monocyclic ring or a condensed ring. $Y_1$ to $Y_{11}$ each independently represents a hydrogen atom or a substituent.

General formula (8):

[Chem. 31]

(G-1)

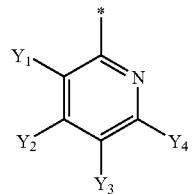

(G-2)

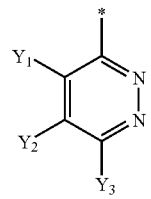

(G-3)

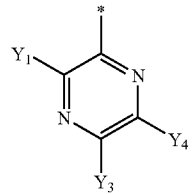

(G-4)

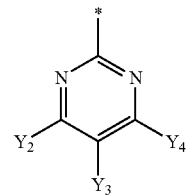

(G-5)

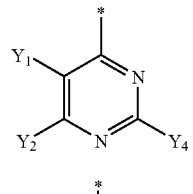

(G-6)

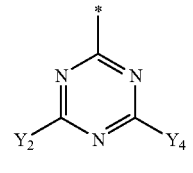

(G-7)

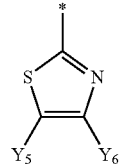

(G-8)

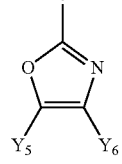

(G-9)

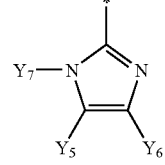

(G-10)

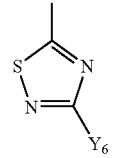

(G-11)

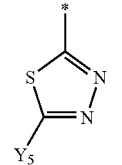

(G-12)

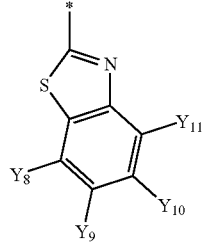

(G-13)

(In the general formula (8), $G_{11}$ represents a non-metal atomic group which can form a 5- or 6-membered heterocyclic group. The heterocyclic group represented by $G_{11}$ may be unsubstituted or may have a substituent. The heterocyclic group may be a monocyclic ring or a condensed ring. $Y_1$ to $Y_{11}$ each independently represents a hydrogen atom or a substituent. * represents the binding site to the N atom on the pyrazolyl group.)

In the general formula (8), preferred examples of the non-metal atomic group which can form a 5- or 6-membered, nitrogen-containing heterocyclic group represented by $G_{11}$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), and most preferably (G-1), (G-3) and (G-4).

In the general formula (7), examples of the substituent for Z are the same as those recited for Z in the general formula (5). The same also applies to preferred examples thereof.

In the general formula (7), when Y represents a substituent, examples thereof are the same as those recited for Y in the general formula (5). The same also applies to preferred examples thereof.

In the general formula (7), n represents an integer of 1 to 4, preferably 1 to 3, particularly preferably 1 to 2, and most preferably 1.

In the general formula (7), examples of the substituent represented by B are the same as those recited for B in the general formula (5). The same also applies to preferred examples thereof.

In the general formula (7), preferred examples of the substituent represented by G preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), more particularly preferably (G-1), (G-3) and (G-4), and most preferably (G-1) and (G-4).

In the general formula (7), examples of the substituent represented by $Y_1$ to $Y_{11}$ are the same as those recited for substituents of $R_{11}$ to $R_{112}$ and R in the general formula (2). The same also applies to preferred examples thereof.

With respect to a preferred combination of the substituents in the pigment of the present invention represented by the general formula (7), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (7) contain the following (a) to (e).

(a) More preferred examples of the heterocyclic group represented by G preferably include (G-1), (G-2), (G-3), (G-4), (G-5), (G-6), (G-7), (G-10), (G-11) and (G-12), more preferably (G-1), (G-2), (G-3), (G-4), (G-5), and (G-6), particularly preferably (G-1), (G-3), (G-4) and (G-6), more particularly preferably (G-1), (G-3) and (G-4), and most preferably (G-1) and (G-4).

(b) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(c) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(d) n represents an integer of 1 to 4, preferably 1 to 3, particularly preferable 1 to 2, and most preferably 1.

(e) More preferred examples of the substituent represented by B preferably include (B-1), (B-3), (B-9), (B-11), (B-13), (B-14), (B-15), (B-17), (B-18), (B-19), (B-20), (B-21), (B-23) and (B-24), more preferably (B-1), (B-3), (B-13), (B-14), (B-15), (B-17), (B-18), (B-19), (B-20), (B-21), (B-23) and (B-24), particularly preferably (B-3), (B-14), (B-15), (B-18), (B-19) and (B-21), and most preferably (B-3), (B-18) and (B-21).

The present invention also includes in its scope a tautomer of the azo pigment represented by the general formula (7). Although the general formula (7) is shown in the form of limiting structure among several tautomer forms which are possible in view of chemical structure, the azo pigments may be tautomers of other structures than the ones shown, and may be used as a mixture containing plural tautomers.

For example, with regard to the pigment represented by the general formula (7), an azo-hydrazone tautomer represented by the following general formula (7') can be considered.

The present invention also includes in its scope a compound represented by the following general formula (7'), which is a tautomer of the azo pigment represented by the general formula (7).

[Chem. 32]

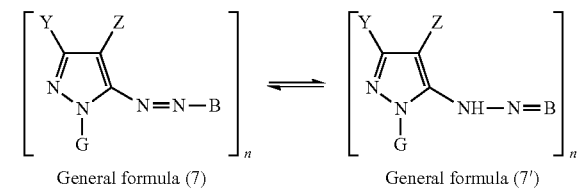

General formula (7)　　　　General formula (7')

(In the general formula (7'), Y, Z, G, n and B have the same definitions as in the general formula (7).)

The azo pigment represented by the general formula (7) is preferably an azo pigment represented by the following general formulae (71) to (80). Preferred is an azo pigment represented by the following general formulae (71) to (80).

General formula (71):

[Chem. 33]

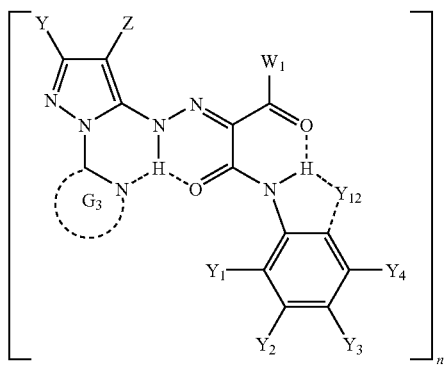

In the general formula (71), Y, Z and n have the same definitions as Y, Z and n in the general formula (3). $Y_1$ to $Y_4$ and $Y_{12}$ represent a hydrogen atom or a substituent. Examples of the substituent are the same as those which may be contained in the heterocyclic group represented by $G_0$ or $G_1$ in the general formula (1). $W_i$ is the same as when $G_0$ and $G_1$ in the general formula (1) represent an alkyl group, a cycloalkyl group, an aralkyl group, an alkenyl group, an alkynyl group, an aryl group or a heterocyclic group. $G_3$ represents a nonmetal atomic group which can form a 5- or 6-membered, nitrogen-containing heterocyclic group. A preferred example thereof is any one of (G-1) to (G-13) in the general formula (8).

With respect to a preferred combination of the substituents in the pigment of the present invention represented by the general formula (71), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (71) contain the following (a) to (g).
(a) More preferred examples of the nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), more particularly preferably (G-1), (G-3) and (G-4), and most preferably (G-1) and (G-4).
(b) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.
(c) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.
(d) $W_1$ preferably represents an alkyl group, a cycloalkyl group, an aralkyl group, an alkenyl group, an alkynyl group, an aryl group, or a heterocyclic group, particularly preferably represents a linear or branched alkyl group having 1 to 12 carbon atoms, a linear or branched aralkyl group having 7 to 18 carbon atoms, a linear or branched alkenyl group having 2 to 12 carbon atoms, a linear or branched alkynyl group having 2 to 12 carbon atoms, a linear or branched cycloalkyl group having 3 to 12 carbon atoms, a linear or branched cycloalkenyl group having 3 to 12 carbon atoms, an aryl group or a heterocyclic group, more particularly preferably a methyl group, an ethyl group, an n-propyl group, an i-propyl group, an n-butyl group, an i-butyl group, a sec-butyl group, a t-butyl group, a phenyl group, a 4-methoxy-phenyl group, a 2-furyl group, a 2-thienyl group, a 2-pyridinyl group, a 2-pyrimidinyl group or a 2-benzothiazolyl group, and most preferably a methyl group.
(e) $Y_{12}$ preferably represents a hydrogen atom, a halogen atom, an alkyloxy group, an alkoxycarbonyl group, a carbamoyl group, an amino group or an acylamino group, particularly preferably a halogen atom, an alkyloxy group, an alkoxycarbonyl group, a carbamoyl group or an acylamino group, still more preferably a chlorine atom, a methoxy group, a methoxycarbonyl group, a carbamoyl group or an acetylamino group, and most preferably a chlorine atom or a methoxy group.
(f) $Y_1$, $Y_2$, $Y_3$ and $Y_4$ each independently preferably represents a hydrogen atom, a halogen atom, an alkyloxy group, an alkoxycarbonyl group, a carbamoyl group, an amino group or an acylamino group, more preferably a hydrogen atom, an alkyloxy group, an alkoxycarbonyl group, a carbamoyl group or an acylamino group, still more preferably a hydrogen atom, a chlorine atom, a methoxy group, a methoxycarbonyl group, a carbamoyl group or an acetylamino group, particularly more preferably a hydrogen atom, a chlorine atom, a methoxy group or a methoxycarbonyl group, $Y_1$ represents a hydrogen atom, $Y_2$ represents a hydrogen atom, a chlorine atom, a methoxy group or a methoxycarbonyl group, $Y_3$ represents a hydrogen atom, a chlorine atom, a methoxy group or a methoxycarbonyl group, and $Y_4$ represents a hydrogen atom.
(g) n represents an integer of 1 to 4, preferably 1 to 3, particularly preferable 1 to 2, and most preferably 1.

General formula (72):

[Chem. 34]

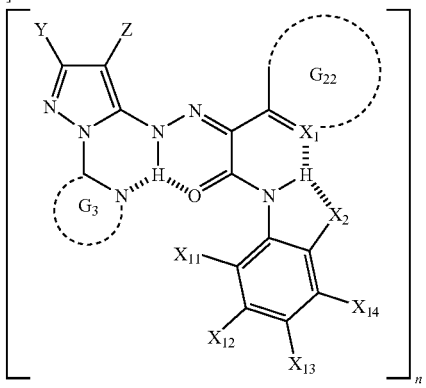

In the general formula (72), Y, Z and n have the same definitions as Y, Z and n in the general formula (3). $X_{11}$ to $X_{14}$ and $X_2$ represent a hydrogen atom or a substituent. Examples of the substituent are the same as those which may be contained in the heterocyclic group represented by $G_0$ or $G_1$ in the general formula (1). $X_1$ represents a hetero atom. $G_{22}$ represents a non-metal atomic group which forms a 5- or 6-membered heterocyclic group with a hetero atom $X_1$. $G_3$ represents a non-metal atomic group which can form a 5- or 6-membered, nitrogen-containing heterocyclic group. A preferred example thereof is any one of (G-1) to (G-13) in the general formula (8).

In the general formula (8), preferred examples of the non-metal atomic group which can form a 5- or 6-membered, nitrogen-containing heterocyclic group represented by $G_{11}$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), and most preferably (G-1), (G-3) and (G-4).

With respect to a preferred combination of the substituents in the pigment of the present invention represented by the general formula (72), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (72) contain the following (a) to (g).

(a) More preferred examples of the nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), more particularly preferably (G-1), (G-3) and (G-4), and most preferably (G-1) and (G-4).

(b) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(c) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(d) $G_{22}$ preferably represents an s-triazinyl group, a benzimidazolyl group, a benzquinazolino group, a benzoxazolyl group or benzothiazolyl group, more preferably an s-triazinyl group, a benzimidazolyl group, a benzquinazolino group or a benzoxazolyl group, still more preferably a benzimidazolyl group, a benzquinazolino group or a benzoxazolyl group, and most preferably a benzquinazolino group.

(e) $X_2$ preferably represents a hydrogen atom, a halogen atom, an alkyloxy group, an alkoxycarbonyl group, a carbamoyl group, an amino group or an acylamino group, particularly preferably a halogen atom, an alkyloxy group, an alkoxycarbonyl group, a carbamoyl group or an acylamino group, still more preferably a chlorine atom, a methoxy group, a methoxycarbonyl group, a carbamoyl group or an acetylanamino group, and most preferably a chlorine atom or a methoxy group.

(f) $X_1$, $X_2$, $X_3$ and $X_4$ each independently preferably represents a hydrogen atom, a halogen atom, an alkyloxy group, an alkoxycarbonyl group, a carbamoyl group, an amino group or an acylamino group, more preferably a hydrogen atom, an alkyloxy group, an alkoxycarbonyl group, a carbamoyl group or an acylamino group, still more preferably a hydrogen atom, a chlorine atom, a methoxy group, a methoxycarbonyl group, a carbamoyl group or an acetylamino group, particularly more preferably a hydrogen atom, a chlorine atom, a methoxy group or a methoxycarbonyl group, $X_1$ represents a hydrogen atom, $X_2$ represents a hydrogen atom, a chlorine atom, a methoxy group or a methoxycarbonyl group, $X_3$ represents a hydrogen atom, a chlorine atom, a methoxy group or a methoxycarbonyl group, and $X_4$ represents a hydrogen atom.

(g) n represents an integer of 1 to 4, preferably 1 to 3, particularly preferable 1 to 2, and most preferably 1.

General formula (73):

[Chem. 35]

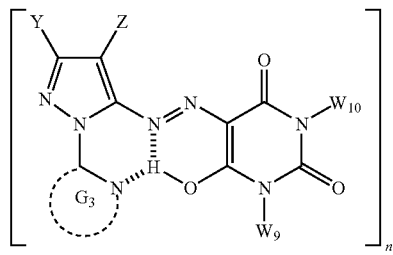

In the general formula (73), Y, Z and n have the same definitions as Y, Z and n in the general formula (3). $W_9$ and $W_{10}$ represent a hydrogen atom or a substituent. Examples of the substituent are the same as those which may be contained in the heterocyclic group represented by $G_0$ or $G_1$ in the general formula (1). $G_3$ represents a non-metal atomic group which can form a 5- or 6-membered, nitrogen-containing heterocyclic group. A preferred example thereof is any one of (G-1) to (G-13) in the general formula (8).

In the general formula (8), preferred examples of the non-metal atomic group which can form a 5- or 6-membered, nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), and most preferably (G-1), (G-3) and (G-4).

With respect to a preferred combination of the substituents in the pigment of the present invention represented by the general formula (73), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (73) contain the following (a) to (e).

(a) More preferred examples of the nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), more particularly preferably (G-1), (G-3) and (G-4), and most preferably (G-1) and (G-4).

(b) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(c) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(d) $W_9$ and $W_{10}$ each independently represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, or a phenyl group, still more preferably a hydrogen atom, a methyl group or a phenyl group, and most preferably a hydrogen atom or a methyl group.

(e) n represents an integer of 1 to 4, preferably 1 to 3, particularly preferable 1 to 2, and most preferably 1.

General formula (74):

[Chem. 36]

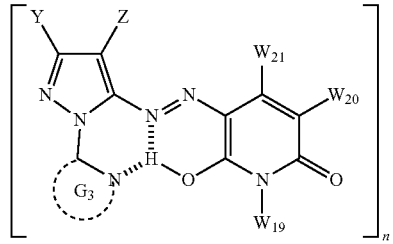

In the general formula (74), Y, Z and n have the same definitions as Y, Z and n in the general formula (3). $W_{19}$ to $W_{21}$ represent a hydrogen atom or a substituent. Examples of the substituent are the same as those which may be contained in the heterocyclic group represented by $G_0$ or $G_1$ in the general formula (1). $G_3$ represents a non-metal atomic group which can form a 5- or 6-membered, nitrogen-containing heterocyclic group. A preferred example thereof is any one of (G-1) to (G-13) in the general formula (8).

In the general formula (8), preferred examples of the non-metal atomic group which can form a 5- or 6-membered, nitrogen-containing heterocyclic group represented by $G_{11}$ preferably include (G-1), (G-2), (G-3), (G-4), (G-5), (G-6), (G-7), (GA 0), (G-11) and (G-12), more preferably (G-1), (G-2), (G-3), (G-4), (G-5) and (G-6), particularly preferably (G-1), (G-3), (G-4) and (G-6), and most preferably (G-1), (G-3) and (G-4).

With respect to a preferred combination of the substituents in the pigment of the present invention represented by the general formula (74), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (74) contain the following (a) to (g).

(a) More preferred examples of the nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), more particularly preferably (G-1), (G-3) and (G-4), and most preferably (G-1) and (G-4).

(b) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(c) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(d) $W_{19}$ represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms or a phenyl group, still more preferably a hydrogen atom, a methyl group or a phenyl group, and most preferably a hydrogen atom or a methyl group.

(e) $W_{20}$ preferably represents a hydrogen atom, a cyano group, a substituted or unsubstituted carbamoyl group having a total of 1 to 12 carbon atoms, or a substituted or unsubstituted alkoxycarbonyl group having a total of 2 to 12 carbon atoms, more preferably a hydrogen atom, a cyano group or a substituted or unsubstituted carbamoyl group having a total of 1 to 4 carbon atoms, still more preferably a hydrogen atom, a cyano group or an unsubstituted carbamoyl group, and most preferably a hydrogen atom or a cyano group.

(f) $W_{21}$ represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, or a phenyl group, still more preferably a hydrogen atom, a methyl group or a phenyl group, and most preferably a hydrogen atom or a methyl group.

(g) n represents an integer of 1 to 4, preferably 1 to 3, particularly preferable 1 to 2, and most preferably 1.

General formula (75):

[Chem. 37]

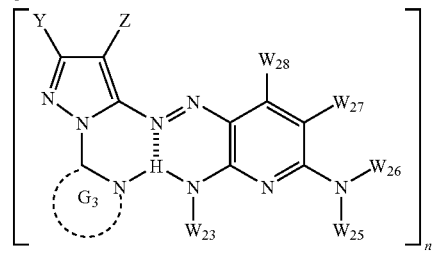

In the general formula (75), Y, Z and n have the same definitions as Y, Z and n in the general formula (3). $W_{23}$, $W_{25}$ to $W_{28}$ each independently represents a hydrogen atom or a substituent. Examples of the substituent are the same as those which may be contained in the heterocyclic group represented by $G_0$ or $G_1$ in the general formula (1). $G_3$ represents a non-metal atomic group which can form a 5- or 6-membered, nitrogen-containing heterocyclic group. A preferred example thereof is any one of (G-1) to (G-13) in the general formula (8).

In the general formula (8), preferred examples of the non-metal atomic group which can form a 5- or 6-membered, nitrogen-containing heterocyclic group represented by $G_{11}$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), still more preferably (G-1), (G-3), (G-4) and (G-6), particularly preferably (G-1), (G-3) and (G-4), and most preferably (G-1) and (G-4).

With respect to a preferred combination of the substituents in the pigment of the present invention represented by the general formula (75), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (75) contain the following (a) to (h).

(a) More preferred examples of the nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), more particularly preferably (G-1), (G-3) and (G-4), and most preferably (G-1) and (G-4).
(b) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.
(c) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.
(d) $W_{23}$ preferably represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, or a substituted or unsubstituted aryl group having a total of 6 to 18 carbon atoms, still more preferably a hydrogen atom, a methyl group or a substituted or unsubstituted phenyl group having a total of 6 to 12 carbon atoms, and most preferably a hydrogen atom, a methyl group or a phenyl group.
(e) $W_{25}$ and $W_{26}$ each independently represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, or a substituted or unsubstituted aryl group having a total of 6 to 18 carbon atoms, still more preferably a hydrogen atom, a methyl group or a substituted or unsubstituted phenyl group having a total of 6 to 12 carbon atoms, and most preferably a hydrogen atom, a methyl group or a phenyl group.
(f) $W_{27}$ preferably represents a hydrogen atom, a cyano group, a substituted or unsubstituted carbamoyl group having a total of 1 to 12 carbon atoms, or a substituted or unsubstituted alkoxycarbonyl group having a total of 2 to 12 carbon atoms, more preferably a hydrogen atom, a cyano group or a substituted or unsubstituted carbamoyl group having a total of 1 to 4 carbon atoms, still more preferably a hydrogen atom, a cyano group or an unsubstituted carbamoyl group, and most preferably a hydrogen atom or a cyano group.
(g) $W_{28}$ represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, or a phenyl group, still more preferably a hydrogen atom, a methyl group or a phenyl group, and most preferably a hydrogen atom or a methyl group.
(h) n represents an integer of 1 to 4, preferably 1 to 3, particularly preferable 1 to 2, and most preferably 1.

General formula (76):

[Chem. 38]

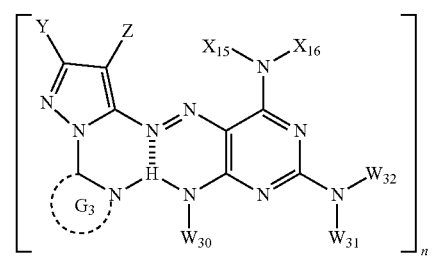

In the general formula (76), Y, Z and n have the same definitions as Y, Z and n in the general formula (3). $G_3$ has the same definition as $G_1$ in the general formula (1). $W_{30}$, $W_{31}$ to $W_{32}$ and $X_{15}$ to $X_{16}$ each independently represents a hydrogen atom or a substituent. Examples of the substituent are the same as those which may be contained in the heterocyclic group represented by $G_0$ or $G_1$ in the general formula (1). $G_3$ represents a non-metal atomic group which can form a 5- or 6-membered, nitrogen-containing heterocyclic group. A preferred example thereof is any one of (G-1) to (G-13) in the general formula (8).

In the general formula (8), preferred examples of the non-metal atomic group which can form a 5- or 6-membered, nitrogen-containing heterocyclic group represented by $G_{11}$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), still more preferably (G-1), (G-3), (G-4) and (G-6), particularly preferably (G-1), (G-3) and (G-4), and most preferably (G-1) and (G-4).

With respect to a preferred combination of the substituents in the pigment of the present invention represented by the general formula (76), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (76) contain the following (a) to (g).

(a) More preferred examples of the nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), more particularly preferably (G-1), (G-3) and (G-4), and most preferably (G-1) and (G-4).

(b) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(c) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(d) $W_{30}$ preferably represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, or a substituted or unsubstituted aryl group having a total of 6 to 18 carbon atoms, still more preferably a hydrogen atom, a methyl group or a substituted or unsubstituted phenyl group having a total of 6 to 12 carbon atoms, and most preferably a hydrogen atom, a methyl group or a phenyl group.

(e) $W_{31}$ and $W_{32}$ each independently represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, or a substituted or unsubstituted aryl group having a total of 6 to 18 carbon atoms, still more preferably a hydrogen atom, a methyl group or a substituted or unsubstituted phenyl group having a total of 6 to 12 carbon atoms, and most preferably a hydrogen atom, a methyl group or a phenyl group.

(f) $X_{15}$ and $X_{16}$ each independently represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, or a substituted or unsubstituted aryl group having a total of 6 to 18 carbon atoms, still more preferably a hydrogen atom, a methyl group or a substituted or unsubstituted phenyl group having a total of 6 to 12 carbon atoms, and most preferably a hydrogen atom, a methyl group or a phenyl group.

(g) n represents an integer of 1 to 4, preferably 1 to 3, particularly preferable 1 to 2, and most preferably 1.

General formula (77):

[Chem. 39]

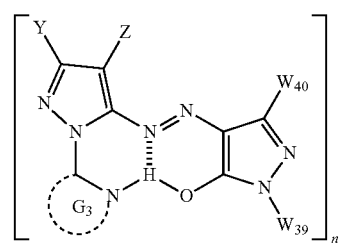

In the general formula (77), Y, Z and n have the same definitions as Y, Z and n in the general formula (3). $W_{39}$ and $W_{40}$ each independently represents a hydrogen atom or a substituent. Examples of the substituent are the same as those which may be contained in the heterocyclic group represented by $G_0$ or $G_1$ in the general formula (1). $G_3$ represents a non-metal atomic group which can form a 5- or 6-membered, nitrogen-containing heterocyclic group. A preferred example thereof is any one of (G-1) to (G-13) in the general formula (8).

In the general formula (8), preferred examples of the non-metal atomic group which can form a 5- or 6-membered, nitrogen-containing heterocyclic group represented by $G_{11}$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), still more preferably (G-1), (G-3), (G-4) and (G-6), particularly preferably (G-1), (G-3) and (G-4), and most preferably (G-1) and (G-4).

With respect to a preferred combination of the substituents in the pigment of the present invention represented by the general formula (77), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (77) contain the following (a) to (f).

(a) More preferred examples of the nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), more particularly preferably (G-1), (G-3) and (G-4), and most preferably (G-1) and (G-4).

(b) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(c) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(d) $W_{39}$ preferably represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, a substituted or unsubstituted aryl group having a total of 6 to 18 carbon atoms or a 5- or 6-membered, substituted or unsubstituted, nitrogen-containing heterocyclic group having a total of 4 to 8 carbon atoms, still more preferably a hydrogen atom, a methyl group, a substituted or unsubstituted phenyl group having a total of 6 to 12 carbon atoms, an s-triazinyl group, a pyrimidinyl group, a pyridazinyl group, a pyrazinyl group, a pyridyl group, an imidazolyl group, a pyrazolyl group or a pyrrolyl group, particularly preferably a hydrogen atom, a methyl group, a phenyl group, an s-triazinyl group, a pyrimidinyl group, a pyridazinyl group, a pyrazinyl group or a pyridyl group, more particularly preferably a hydrogen atom, a methyl group, a phenyl group, a 2-pyridyl group, a 2,4-pyrimidinyl group or a 2,5-pyrazinyl group, and most preferably a phenyl group, a 2-pyridyl group or a 2,4-pyrimidinyl group.

(e) $W_{40}$ preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms, a cyano group, a substituted or unsubstituted carbamoyl group having a total of 1 to 12 carbon atoms, a substituted or unsubstituted alkoxycarbonyl group having a total of 2 to 12 carbon atoms, or a substituted or unsubstituted acylamino group having a total of 2 to 12 carbon atoms, more preferably a hydrogen atom, a substituted or unsubstituted alkyl group having a total of 1 to 4 carbon atoms, a substituted or unsubstituted aryl group having a total of 6 to 12 carbon atoms, a cyano group, a substituted or unsubstituted carbamoyl group having a total of 1 to 4 carbon atoms, a substituted or unsubstituted acylamino group having a total of 2 to 10 carbon atoms, still more preferably a methyl group, a phenyl group, a cyano group or an unsubstituted carbamoyl group, and most preferably a methyl group or a cyano group.

(f) n represents an integer of 1 to 4, preferably 1 to 3, particularly preferable 1 to 2, and most preferably 1.

General formula (78):

[Chem. 40]

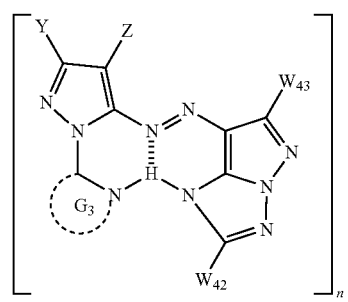

In the general formula (78), Y, Z and n have the same definitions as Y, Z and n in the general formula (3). $W_{42}$ and $W_{43}$ each independently represents a hydrogen atom or a substituent. Examples of the substituent are the same as those which may be contained in the heterocyclic group represented by $G_0$ or $G_1$ in the general formula (1). $G_3$ represents a non-metal atomic group which can form a 5- or 6-membered, nitrogen-containing heterocyclic group. A preferred example thereof is any one of (G-1) to (G-13) in the general formula (8).

In the general formula (8), preferred examples of the non-metal atomic group which can form a 5- or 6-membered, nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), still more preferably (G-1), (G-3), (G-4) and (G-6), particularly preferably (G-1), (G-3) and (G-4), and most preferably (G-1) and (G-4).

With respect to a preferred combination of the substituents in the pigment of the present invention represented by the general formula (78), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (78) contain the following (a) to (f), (a) More preferred examples of the nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), more particularly preferably (G-1), (G-3) and (G-4), and most preferably (G-1) and (G-4).

(b) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(c) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(d) $W_{42}$ preferably represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, a substituted or unsubstituted aryl group having a total of 6 to 18 carbon atoms or a 5- or 6-membered, substituted or unsubstituted, nitrogen-containing heterocyclic group having a total of 4 to 8 carbon atoms, still more preferably a hydrogen atom, a methyl group, a substituted or unsubstituted phenyl group having a total of 6 to 12 carbon atoms, a pyrimidinyl group, a pyridazinyl group, a pyrazinyl group, a pyridyl group, an imidazolyl group, a pyrazolyl group or a pyrrolyl group, particularly preferably a hydrogen atom, a methyl group, a phenyl group, a pyridyl group, a pyrimidinyl group, a pyridazinyl group or a pyrazinyl group, more particularly preferably a hydrogen atom, a methyl group, a phenyl group, a 2-pyridyl group, a 2,4-pyrimidinyl group or a 2,5-pyrazinyl group, and most preferably a methyl group, a phenyl group, a 2-pyridyl group or a 2,4-pyrimidinyl group.

(e) $W_{43}$ preferably represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, a substituted or unsubstituted aryl group having a total of 6 to 18 carbon atoms or a 5- or 6-membered, substituted or unsubstituted, nitrogen-containing heterocyclic group having a total of 4 to 8 carbon atoms, still more preferably a hydrogen atom, a linear or branched alkyl group having a total of 1 to 4 carbon atoms, a substituted or unsubstituted phenyl group having a total of 6 to 12 carbon atoms, a pyrimidinyl group, a pyridazinyl group, a pyrazinyl group, a pyridyl group, an imidazolyl group, a pyrazolyl group or a pyrrolyl group, particularly preferably a methyl group, a t-butyl group, a phenyl group, a pyridyl group, a pyrimidinyl group, a pyridazinyl group or a pyrazinyl group, more particularly preferably a methyl group, a phenyl group, a 2-pyridyl group, a 2,4-pyrimidinyl group or a 2,5-pyrazinyl group, and most preferably a methyl group, a t-butyl group, a phenyl group or a 2-pyridyl group.

(f) n represents an integer of 1 to 4, preferably 1 to 3, particularly preferable 1 to 2, and most preferably 1.

General formula (79):

[Chem. 41]

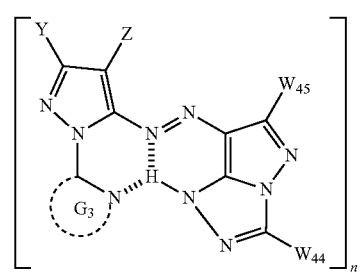

In the general formula (79), Y, Z and n have the same definitions as Y, Z and n in the general formula (3). $W_{44}$ and $W_{45}$ each independently represents a hydrogen atom or a substituent. Examples of the substituent are the same as those which may be contained in the heterocyclic group represented by $G_0$ or $G_1$ in the general formula (1). $G_3$ represents a non-metal atomic group which can form a 5- or 6-membered, nitrogen-containing heterocyclic group. A preferred example thereof is any one of (G-1) to (G-13) in the general formula (8).

In the general formula (8), preferred examples of the non-metal atomic group which can form a 5- or 6-membered, nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), still more preferably (G-1), (G-3), (G-4) and (G-6), particularly preferably (G-1), (G-3) and (G-4), and most preferably (G-1) and (G-4).

With respect to a preferred combination of the substituents in the pigment of the present invention represented by the general formula (79), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (79) contain the following (a) to (f).

(a) More preferred examples of the nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), more particularly preferably (G-1), (G-3) and (G-4), and most preferably (G-1) and (G-4).

(b) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(c) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(d) $W_{44}$ preferably represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, a substituted or unsubstituted aryl group having a total of 6 to 18 carbon atoms or a 5- or 6-membered, substituted or unsubstituted, nitrogen-containing heterocyclic group having a total of 4 to 8 carbon atoms, still more preferably a hydrogen atom, a methyl group, a substituted or unsubstituted phenyl group having a total of 6 to 12 carbon atoms, a pyrimidinyl group, a pyridazinyl group, a pyrazinyl group, a pyridyl group, an imidazolyl group, a pyrazolyl group or a pyrrolyl group, particularly preferably a hydrogen atom, a methyl group, a phenyl group, a pyridyl group, a pyrimidinyl group, a pyridazinyl group or a pyrazinyl group, more particularly preferably a hydrogen atom, a methyl group, a phenyl group, a 2-pyridyl group, a 2,4-pyrimidinyl group or a 2,5-pyrazinyl group, and most preferably a methyl group, a phenyl group, a 2-pyridyl group or a 2,4-pyrimidinyl group.

(e) $W_{45}$ preferably represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, a substituted or unsubstituted aryl group having a total of 6 to 18 carbon atoms or a 5- or 6-membered, substituted or unsubstituted, nitrogen-containing heterocyclic group having a total of 4 to 8 carbon atoms, still more preferably a hydrogen atom, a linear or branched alkyl group having a total of 1 to 4 carbon atoms, a substituted or unsubstituted phenyl group having a total of 6 to 12 carbon atoms, a pyrimidinyl group, a pyridazinyl group, a pyrazinyl group, a pyridyl group, an imidazolyl group, a pyrazolyl group or a pyrrolyl group, particularly preferably a methyl group, a t-butyl group, a phenyl group, a pyridyl group, a pyrimidinyl group, a pyridazinyl group or a pyrazinyl group, more particularly preferably a methyl group, a phenyl group, a 2-pyridyl group, a 2,4-pyrimidinyl group or a 2,5-pyrazinyl group, and most preferably a methyl group, a t-butyl group, a phenyl group or a 2-pyridyl group.

(f) n represents an integer of 1 to 4, preferably 1 to 3, particularly preferable 1 to 2, and most preferably 1.

General formula (80):

[Chem. 42]

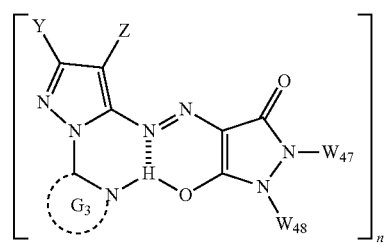

In the general formula (80), Y, Z and n have the same definitions as Y, Z and n in the general formula (3). $G_3$ has the same definition as $G_1$ in the general formula (1). $W_{47}$ and $W_{48}$ each independently represents a hydrogen atom or a substituent. Examples of the substituent are the same as those which may be contained in the heterocyclic group represented by $G_0$ or $G_1$ in the general formula (1). $G_3$ represents a non-metal atomic group which can form a 5- or 6-membered, nitrogen-containing heterocyclic group. A preferred example thereof is any one of (G-1) to (G-13) in the general formula (8).

In the general formula (8), preferred examples of the non-metal atomic group which can form a 5- or 6-membered, nitrogen-containing heterocyclic group represented by $G_{11}$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), still more preferably (G-1), (G-3), (G-4) and (G-6), and most preferably particularly preferably (G-1), (G-3) and (G-4).

With respect to a preferred combination of the substituents in the pigment of the present invention represented by the general formula (80), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (80) contain the following (a) to (e).

(a) More preferred examples of the nitrogen-containing heterocyclic group represented by $G_3$ preferably include (G-1), (G-2), (G-3), (G-4), (G-5), (G-6), (G-7), (G-10), (G-11) and (G-12), more preferably (G-1), (G-2), (G-3), (G-4), (G-5) and (G-6), particularly preferably (G-1), (G-3), (G-4) and (G-6), more particularly preferably (G-1), (G-3) and (G-4), and most preferably (G-1) and (G-4).

(b) Y preferably represents a hydrogen atom, a substituted or unsubstituted alkyl group having a total of 1 to 12 carbon atoms, a substituted or unsubstituted aryl group having a total of 6 to 18 carbon atoms, a substituted or unsubstituted heterocyclic group having a total of 4 to 12 carbon atoms or an alkylthio group having 1 to 12 carbon atoms, more preferably represents a hydrogen atom, a phenyl group, a linear or branched alkyl group having a total of 1 to 8 carbon atoms or an alkylthio group having 1 to 8 carbon atoms, still more preferably represents a hydrogen atom, a phenyl group, an alkyl group having 1 to 4 carbon atoms or an alkylthio group having 1 to 4 carbon atoms, particularly preferably represents a hydrogen atom, a linear or branched alkyl group having 1 to 4 carbon atoms, a phenyl group or a methylthio group, and more particularly preferably represents a hydrogen atom, a methyl group or a methylthio group. A hydrogen atom or a methyl group is particularly preferable from the viewpoint of hue and image fastness. Among them, a hydrogen atom is most preferable from the viewpoint of good hue and improved light fastness.

(c) Z particularly preferably represents a carbamoyl group having 1 to 12 carbon atoms, an alkyloxycarbonyl group having 2 to 12 carbon atoms, a cyano group, an alkylsulfonyl group having 1 to 12 carbon atoms, an arylsulfonyl group having 6 to 18 carbon atoms, or a sulfamoyl group having 0 to 12 carbon atoms. Particularly preferred is a carbamoyl group having 1 to 8 carbon atoms, an alkyloxycarbonyl group having 2 to 8 carbon atoms, a cyano group, an alkylsulfonyl group having 1 to 8 carbon atoms, an arylsulfonyl group having 6 to 12 carbon atoms, or a sulfamoyl group having 0 to 8 carbon atoms. Among them, preferred is a methoxycarbonyl group, a cyano group, a methanesulfonyl group, a phenylsulfonyl group or a sulfamoyl group, more preferred is a methoxycarbonyl group, a cyano group or a methanesulfonyl group, and most preferred is a cyano group.

(d) $W_{47}$ and $W_{48}$ each independently preferably represents a hydrogen atom, a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, more preferably a hydrogen atom, a linear alkyl group having a total of 1 to 4 carbon atoms, a substituted or unsubstituted aryl group having a total of 6 to 12 carbon atoms or a 5- or 6-membered, substituted or unsubstituted, nitrogen-containing heterocyclic group having a total of 4 to 8 carbon atoms, still more preferably a hydrogen atom, a methyl group, a substituted or unsubstituted phenyl group having a total of 6 to 12 carbon atoms, a pyrimidinyl group, a pyridazinyl group, a pyridyl group, a pyridinyl group, an imidazolyl group, a pyrazolyl group or a pyrrolyl group, particularly preferably a hydrogen atom, a methyl group, a phenyl group, a pyridyl group, a pyrimidinyl group, a pyridazinyl group or a pyrazinyl group, more particularly preferably a hydrogen atom, a methyl group, a phenyl group, a 2-pyridyl group, a 2,4-pyrimidinyl group or a 2,5-pyrazinyl group, and most preferably a methyl group, a phenyl group, a 2-pyridyl group or a 2,4-pyrimidinyl group.

(e) n represents an integer of 1 to 4, preferably 1 to 3, particularly preferable 1 to 2, and most preferably 1.

Many tautomers can be considered for the azo pigments represented by the general formulae (1), (3), (4), (5) and (7). Of the azo pigments represented by the general formulae (1), (3), (4), (5) and (7), azo pigments represented by the general formulae (71) to (80) can be illustrated as particularly preferred azo pigments as has been stated hereinbefore.

The reason that such a structure is preferred is that, as is shown by the general formulae (71) to (80), the nitrogen atom(s) constituting the heterocyclic group contained in the azo pigment structure, hydrogen atom(s), and hetero atom(s) (the oxygen atom of the carbonyl group, or the nitrogen atom of the amino group) readily form at least one intramolecular crosslinking hydrogen bond (intramolecular hydrogen bond). As a result, planarity of the molecule is enhanced, the intramolecular and intermolecular interaction is thus further improved, crystallinity of the azo pigment represented by the general formulae (71) to (80) is enhanced (higher structure of the pigment becoming liable to be formed), and hence performances required as pigments, i.e., light fastness, heat stability, moist heat stability, water resistance, gas resistance, and/or solvent resistance, can be markedly improved, such pigments being thus most preferred.

Specific examples (illustrative azo pigments Pig-1 to Pig-31) of the azo pigments represented by the general formulae (1), (3), (4), (5), and (7) will be shown below which, however, do not limit azo pigments to be used in the present invention. Also, each of the following structures of the specific examples is shown in the limiting structural formula selected from among several tautomers possible in view of chemical structure. However, needless to say, the pigments may be in other tautomer structures than the ones described.

[Chem. 43]

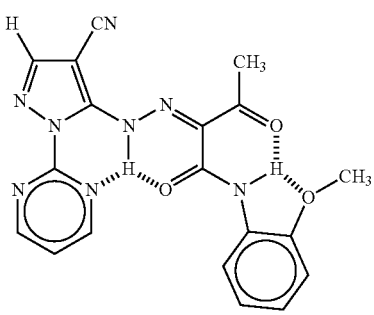

Pig.-1

-continued
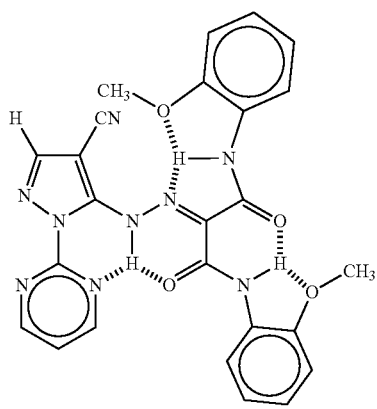
Pig. - 2
[Chem. 44]
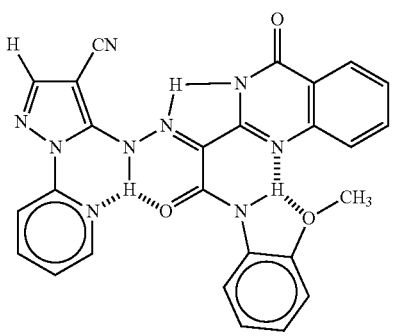
Pig. - 3
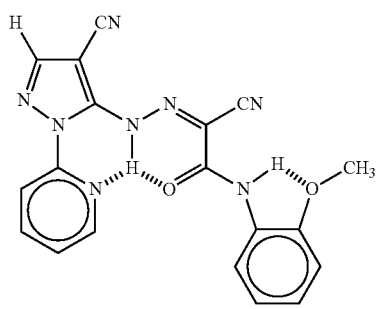
Pig. - 4
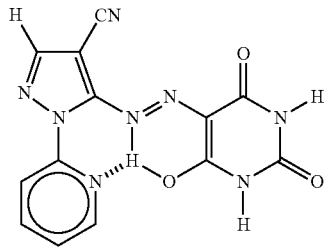
Pig. - 5
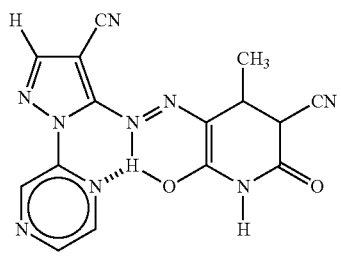
Pig. - 6
-continued
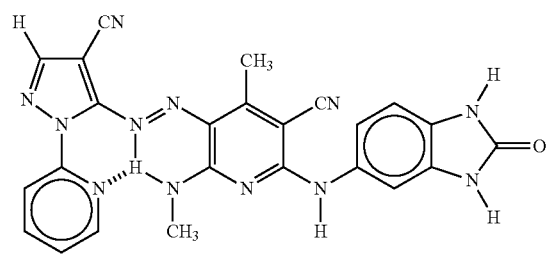
Pig. - 7
[Chem. 45]
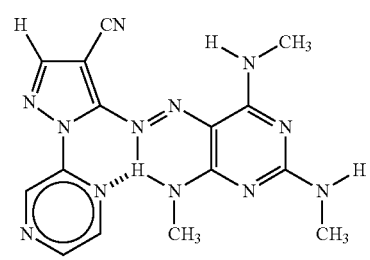
Pig. - 8
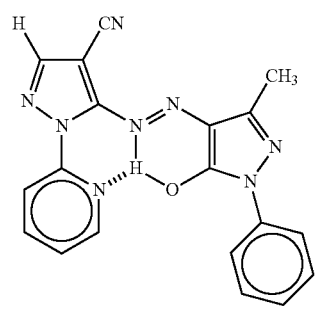
Pig. - 9
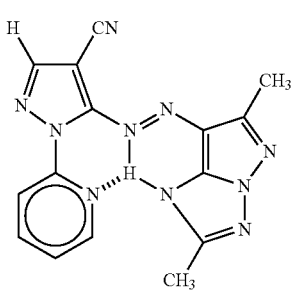
Pig. - 10
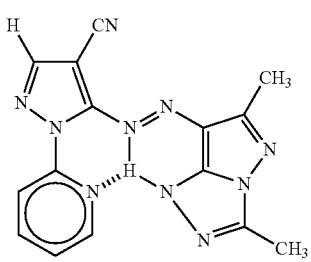
Pig. - 11

[Chem. 46]
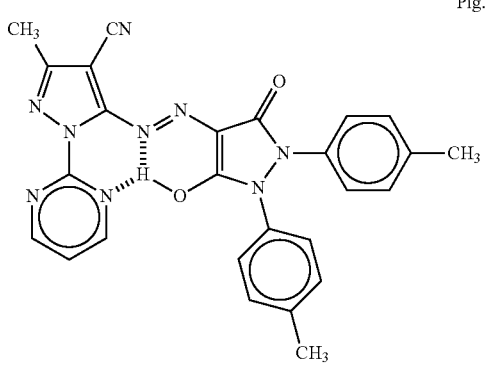
Pig. - 12
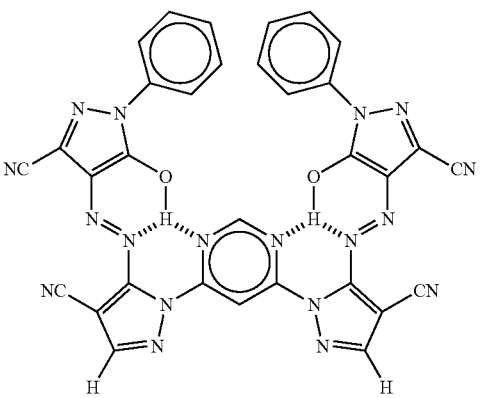
Pig. - 16
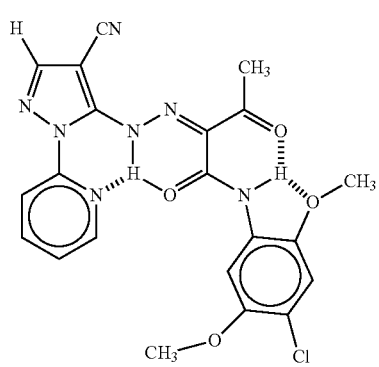
Pig. - 13
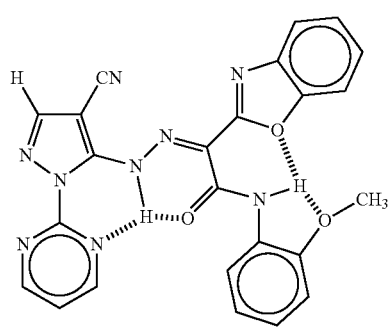
Pig. - 17
[Chem. 48]
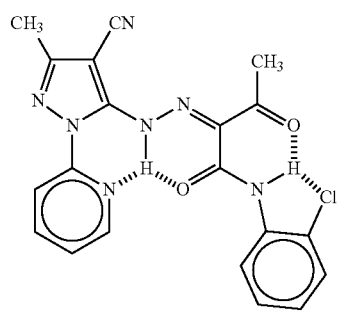
Pig. - 14
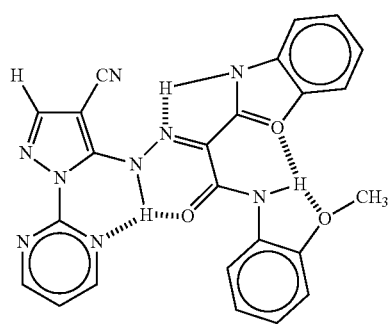
Pig. - 18
[Chem. 47]
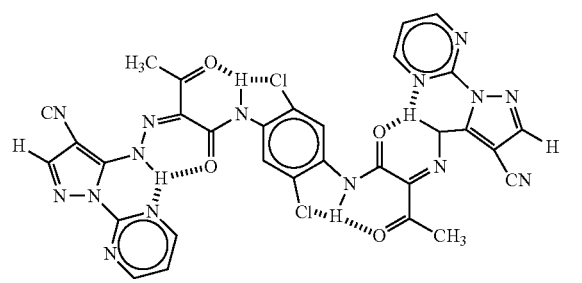
Pig. - 15
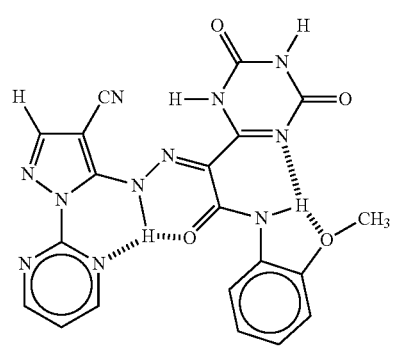
Pig. - 19

Pig. - 20
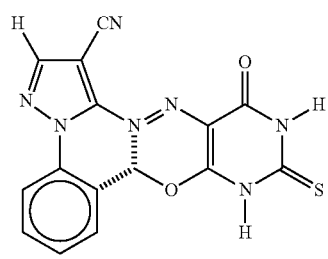
[Chem. 49]
Pig. - 21
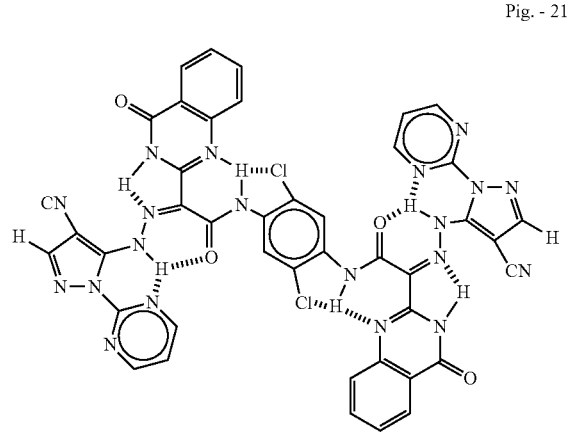
Pig. - 22
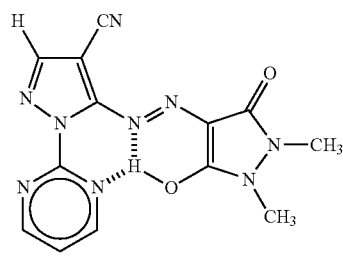
Pig. - 23
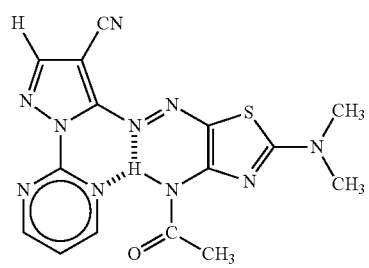
[Chem. 50]
Pig. - 24
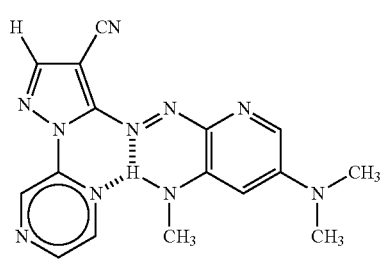
Pig. - 25
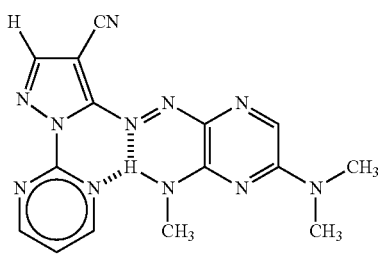
Pig. - 26
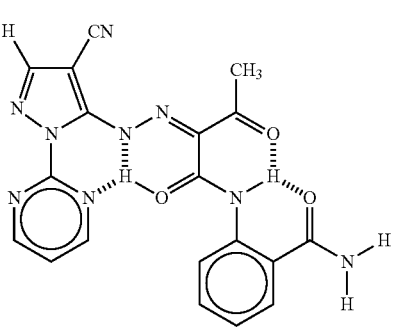
Pig. - 27
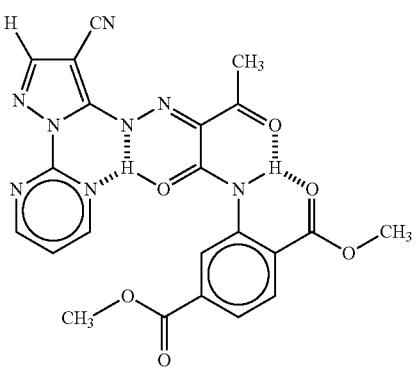
[Chem. 51]
Pig. - 28
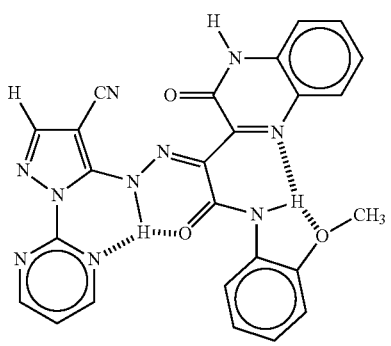

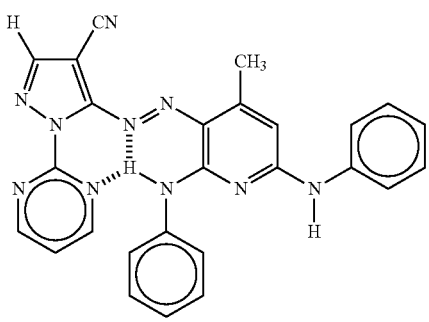

Pig. - 29

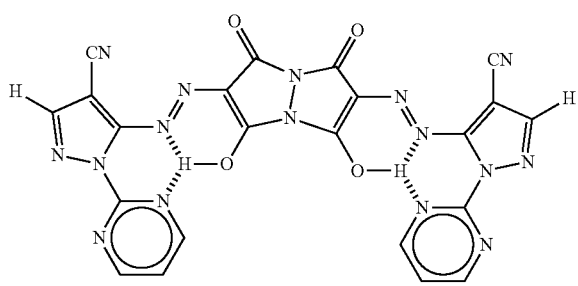

Pig. - 30

[Chem. 52]

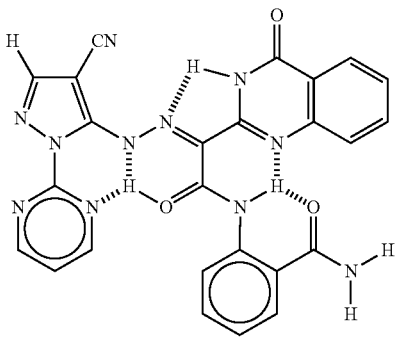

Pig. - 31

Further, the present invention relates to an azo pigment represented by the following general formula (1-1).

The azo pigment has a specific structure represented by the following general formula (1-1), and exhibits excellent coloring characteristics such as high tinctorial strength and hue and having excellent durability such as high resistance to light and ozone.

Hereinafter, the pigment represented by the general formula (1-1) will be described.

[Chem. 53]

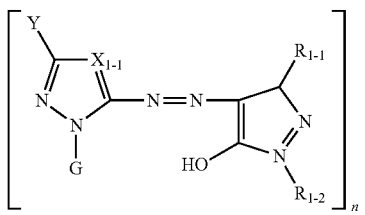

(1-1)

(In the general formula (1-1), G represents an aliphatic group, an aryl group or a heterocyclic group, and Y represents a hydrogen atom or an aliphatic group. $R_{1-1}$ represents a substituent, and $R_{1-2}$ represents an aliphatic group, an aryl group or a heterocyclic group. $X_{1-1}$ represents a nitrogen atom or C—Z. Z represents an electron-withdrawing group having a Hammett's σp value of 0.2 or more. n represents an integer of 1 to 4. When n=2, the compound of formula (1-1) represents a dimer formed via $R_{1-1}$, $R_{1-2}$, Y, Z or G. When n=3, the compound of formula (1-1) represents a trimer formed via $R_{1-1}$, $R_{1-2}$, Y, Z or G. When n=4, the compound of formula (1-1) represents a tetramer formed via $R_{1-1}$, $R_{1-2}$, Y, Z or G.)

The aliphatic group represented by G may have a substituent, may be saturated or unsaturated, and a group wherein the group may be substituted with may be any group as long as it is a replaceable group stated in the aforementioned substituent section. The aliphatic group represented by G is preferably an aliphatic group having a total of 1 to 8 carbon atoms, more preferably an alkyl group having a total of 1 to 4 carbon atoms, and examples thereof include methyl, ethyl, vinyl, cyclohexyl, carbamoylmethyl, and the like.

The aryl group represented by G may be an aromatic ring or a condensed ring, may have a substituent, and a group wherein the group may be substituted with may be any group as long as it is a replaceable group stated in the aforementioned substituent section. The aryl group represented by G is preferably an aryl group having 6 to 12 carbon atoms, more preferably an aryl group having a total of 6 to 10 carbon atoms, and examples thereof include phenyl, 4-nitrophenyl, 4-acetylaminophenyl, 4-methanesulfonylphenyl, and the like.

The heterocyclic group represented by G may have a substituent, may be saturated or unsaturated, and may be a condensed ring, and the heterocyclic group is preferably a heterocyclic group which has a total of 2 to 12 carbon atoms, wherein the heterocyclic ring is connected via a carbon atom, more preferably a 5- or 6-membered unsaturated heterocyclic ring connected via a carbon atom and having a total of 2 to 10 carbon atoms, still more preferably a 5- or 6-membered unsaturated heterocyclic ring connected via a carbon atom and having a total of 2 to 10 carbon atoms, and having a nitrogen atom at the adjacent position bound to the pyrazole ring, and examples thereof include 2-tetrahydrofuryl, 2-furyl, 2-pyrrolyl, 2-thiazolyl, 2-benzothiazolyl, 2-oxazolyl, 2-benzoxazolyl, 2-pyridyl, 2-pyrazinyl, 3-pyridazinyl, 2-pyrimidinyl, 4-pyrimidinyl, 2-imidazolyl, 2-benzimidazolyl, 2-triazinyl, and the like. Such a heterocyclic group may be a tautomer structure with substituent(s). The group wherein the heterocyclic group of G may be substituted with may be any group, as long as it is a replaceable group stated in the aforementioned substituent section. Such a group is preferably an aliphatic group, an aryl group, a hydroxyl group, a halogen atom, an aliphatic oxy group, an aliphatic thio group, an amino group which may be substituted, a carbamoylamino group, an acylamino group, a sulfonamide group, a carbamoyl group, a sulfamoyl group, or the like, more preferably, an aliphatic group, a hydroxyl group, an aliphatic oxy group, an aliphatic thio group, an amino group which may be substituted, a carbamoylamino group, an acylamino group, a carbamoyl group, and the like.

The aliphatic group represented by Y may have a substituent, may be saturated or unsaturated, and a group wherein an aliphatic group of Y may be substituted with may be any group, as long as it is a replaceable group stated in the aforementioned substituent section. The aliphatic group represented by Y is preferably an alkyl group having a total of 1 to 8 carbon atoms, more preferably an alkyl group having a total of 1 to 6 carbon atoms, and examples thereof include methyl, ethyl, vinyl, cyclohexyl, (t)-butyl, carbamoylmethyl, and the like.

The substituent represented by $R_{1-1}$ may be any group, as long as it is a replaceable group stated in the aforementioned substituent section, and is preferably an aliphatic group, an aryl group, a heterocyclic group, an acylamino group, an aliphatic oxy group, an aliphatic oxycarbonyl group, a carbamoyl group, a sulfonamide group, an amino group, an aliphatic amino group, an arylamino group, a heterocyclic amino group, an aliphatic oxycarbonylamino group, a cyano group, a carbamoylamino group, a sulfamoylamino group, or the like, and more preferably an aliphatic group, a heterocyclic group, an acylamino group, an aliphatic oxy group, an aliphatic oxycarbonyl group, a carbamoyl group, an aliphatic amino group, an arylamino group, a cyano group, or the like.

The aliphatic group represented by $R_{1-1}$ and $R_{1-2}$ may have a substituent, may be saturated or unsaturated, and a group wherein the group may be substituted with may be any group as long as it is a replaceable group stated in the aforementioned substituent section. The aliphatic group represented by $R_{1-1}$ and $R_{1-2}$ is preferably an alkyl group having a total of 1 to 8 carbon atoms, more preferably an alkyl group having a total of 1 to 4 carbon atoms, and examples thereof include methyl, ethyl, i-propyl, cyclohexyl, t-butyl, and the like.

The aryl group represented by $R_{1-1}$ and $R_{1-2}$ may have a substituent, and a group wherein the group may be substituted with may be any group as long as it is a replaceable group stated in the aforementioned substituent section. The aryl group represented by $R_{1-1}$ and $R_{1-2}$ is preferably an aryl group having a total of 6 to 14 carbon atoms, more preferably an aryl group having a total of 6 to 10 carbon atoms, and examples thereof include phenyl, 4-acetylaminophenyl, and the like.

The heterocyclic group represented by $R_{1-1}$ may have a substituent, may be saturated or unsaturated, may be a condensed ring, and a group wherein the group may be substituted with may be any group as long as it is a replaceable group stated in the aforementioned substituent section. The heterocyclic group represented by $R_{1-1}$ and $R_{1-2}$ is preferably a heterocyclic group having a total of 2 to 16 carbon atoms, more preferably a 5- or 6-membered heterocyclic group having a total of 2 to 12 carbon atoms, and examples thereof include 1-pyrrolidinyl, 4-morpholinyl, 1-piperidinyl, 1-pyrrolyl, 1-imidazolyl, 2-benzimidazolyl, 2-pyridyl, and the like.

The acylamino group represented by $R_{1-1}$ may have a substituent, may be aliphatic, aromatic or heterocyclic ring, and a group wherein the group may be substituted with may be any group as long as it is a replaceable group stated in the aforementioned substituent section. The acylamino group represented by $R_{1-1}$ is preferably an acylamino group having a total of 1 to 10 carbon atoms, more preferably an acylamino group having a total of 1 to 8 carbon atoms, still more preferably an alkylcarbonylamino group having a total of 1 to 6 carbon atoms, and examples thereof include acetylamino, benzoyl amino, 2-pyridinecarbonylamino, propanoylamino, and the like.

The aliphatic oxy group represented by $R_{1-1}$ may have a substituent, may be saturated or unsaturated, and a group wherein the group may be substituted with may be any group as long as it is a replaceable group stated in the aforementioned substituent section. The aliphatic oxy group represented by $R_{1-1}$ is preferably an alkoxy group having a total of 1 to 8 carbon atoms, more preferably an alkoxy group having a total of 1 to 4 carbon atoms, and examples thereof include methoxy, ethoxy, methoxyethoxy, and the like.

The aliphatic oxycarbonyl group represented by $R_{1-1}$ may have a substituent, may be saturated or unsaturated, and a group wherein the group may be substituted with may be any group as long as it is a replaceable group stated in the aforementioned substituent section. The aliphatic oxycarbonyl group represented by $R_{1-1}$ is preferably an alkoxycarbonyl group having a total of 2 to 9 carbon atoms, more preferably an alkoxycarbonyl group having a total of 2 to 5 carbon atoms, and examples thereof include methoxycarbonyl, ethoxycarbonyl, and the like.

The carbamoyl group represented by $R_{1-1}$ may have a substituent, and a group wherein the group may be substituted with may be any group as long as it is a replaceable group stated in the aforementioned substituent section. The carbamoyl group represented by $R_{1-1}$ is preferably a carbamoyl group having a total of 1 to 12 carbon atoms, more preferably a carbamoyl group having a total of 1 to 7 carbon atoms, still more preferably an unsubstituted or alkyl-substituted carbamoyl group having a total of 1 to 5 carbon atoms, and examples thereof include unsubstituted carbamoyl, N-methylcarbamoyl, N,N-dimethylcarbamoyl, N-ethylcarbamoyl, and the like.

The sulfonamide group represented by $R_{1-1}$ may have a substituent, may be aliphatic, aromatic or heterocyclic, and a group wherein the group may be substituted with may be any group as long as it is a replaceable group stated in the aforementioned substituent section. The sulfonamide group represented by $R_{1-1}$ is preferably a sulfonamide group having a total of 1 to 10 carbon atoms, more preferably a sulfonamide group having a total of 1 to 6 carbon atoms, still more preferably an alkylsulfonamide group having a total of 1 to 4 carbon atoms, and examples thereof include methanesulfonamide, benzenesulfonamide, 2-pyridinesulfonamide, and the like.

The aliphatic amino group represented by $R_{1-1}$ may have a substituent, may be saturated or unsaturated, and a group wherein the group may be substituted with may be any group as long as it is a replaceable group stated in the aforementioned substituent section. The aliphatic amino group represented by $R_{1-1}$ is preferably an aliphatic amino group having a total of 1 to 8 carbon atoms, more preferably an alkylamino group having a total of 1 to 4 carbon atoms, and examples thereof include methylamino, ethylamino, dimethylamino, diethylamino, methoxyethylamino, and the like.

The arylamino group represented by $R_{1-1}$ may have a substituent, and a group wherein the group may be substituted with may be any group as long as it is a replaceable group stated in the aforementioned substituent section. The arylamino group represented by $R_{1-1}$ is preferably an arylamino group having a total of 6 to 12 carbon atoms, more preferably an arylamino group having a total of 6 to 8 carbon atoms, and examples thereof include anilino, 4-acetylaminoanilino, N-methyl-3-methoxyanilino, 3-carbamoylanilino, 3-carbamoylaminoanilino, and the like.

The heterocyclic amino group represented by $R_{1-1}$ may have a substituent, may be saturated or unsaturated, may be a condensed ring, and a group wherein the group may be substituted with may be any group as long as it is a replaceable group stated in the aforementioned substituent section. The heterocyclic amino group represented by $R_{1-1}$ is preferably a heterocyclic amino group having a total of 2 to 12 carbon atoms, more preferably an arylamino group having a total of 2 to 8 carbon atoms, and examples thereof include 2-imidazolylamino, 4-pyridyl amino, N-methyl-3-methoxypyridylamino, 2-pyrimidinylamino, and the like.

The aliphatic oxycarbonylamino group represented by $R_{1-1}$ may have a substituent, may be saturated or unsaturated, and a group wherein the group may be substituted with may be any group as long as it is a replaceable group stated in the aforementioned substituent section. The aliphatic oxycarbonylamino group represented by $R_{1-1}$ is preferably an alkoxycarbonylamino group having a total of 2 to 9 carbon atoms, more preferably an alkoxycarbonylamino group having a total of 2 to 5 carbon atoms, and examples thereof include methoxycarbonylamino, ethoxycarbonylamino, isobutoxycarbonylamino, and the like.

The carbamoylamino group represented by $R_{1-1}$ may have a substituent, and a group wherein the group may be substituted with may be any group as long as it is a replaceable group stated in the aforementioned substituent section. The carbamoylamino group represented by $R_{1-1}$ is preferably a carbamoylamino group having a total of 1 to 12 carbon atoms, more preferably a carbamoylamino group having a total of 1 to 7 carbon atoms, more preferably an unsubstituted or alkyl-substituted carbamoylamino group having a total of 1 to 5 carbon atoms, and examples thereof include unsubstituted carbamoylamino, N-methylcarbamoylamino, N,N-dimethylcarbamoylamino, N-ethylcarbamoylamino, N-phenylcarbamoylamino, and the like.

The sulfamoylamino group represented by $R_{1-1}$ may have a substituent, and a group wherein the group may be substituted with may be any group as long as it is a replaceable group stated in the aforementioned substituent section. The sulfamoylamino group represented by $R_{1-1}$ is preferably a sulfamoylamino group having a total of 0 to 12 carbon atoms, more preferably a sulfamoylamino group having a total of 0 to 6 carbon atoms, still more preferably an unsubstituted or alkyl-substituted sulfamoylamino group having a total of 0 to 4 carbon atoms, and examples thereof include unsubstituted sulfamoylamino, N-methyl sulfamoylamino, N,N-dimethylsulfamoylamino, N-ethylsulfamoylamino, N-phenylsulfamoylamino, and the like.

The heterocyclic group represented by $R_{1-2}$ may have a substituent, may be saturated or unsaturated, may be a condensed ring, and a group wherein the group may be substituted with may be any group as long as it is a replaceable group stated in the aforementioned substituent section. The heterocyclic group represented by $R_{1-2}$ is preferably a heterocyclic group having a total of 2 to 16 carbon atoms and bound connected via a carbon atom, more preferably a 5- or 6-membered heterocyclic group having a total of 2 to 12 carbon atoms, and examples thereof include 3-morpholinyl, 2-piperidinyl, 2-imidazolyl, 2-benzimidazolyl, 2-pyridyl, 2-pyrimidyl, and the like.

In the general formula (1-1), Z represents an electron-withdrawing group having a Hammett's substituent constant σp value of 0.2 or more, and preferably 0.3 or more. The upper limit of the σp value of the electron-withdrawing group is 1.0 or less.

Specific examples of Z, the electron-withdrawing group having the σp value of 0.2 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with other electron-withdrawing group(s) having the σp value of 0.2 or more, a heterocyclic group, a halogen atom, an azo group, and a selenocyanate group.

Z preferably represents a cyano group, a carbamoyl group, an aliphatic oxycarbonyl group, a carboxyl group or a sulfonyl group.

The carbamoyl group represented by Z may have a substituent, and a group wherein the group may be substituted with may be any group as long as it is a replaceable group stated in the aforementioned substituent section. The carbamoyl group represented by Z is preferably a carbamoyl group having a total of 1 to 12 carbon atoms, more preferably a carbamoyl group having a total of 1 to 7 carbon atoms, still more preferably an unsubstituted or alkyl-substituted carbamoyl group having a total of 1 to 5 carbon atoms, most preferably an unsubstituted carbamoyl group, and examples thereof include an unsubstituted carbamoyl, N-methylcarbamoyl, N,N-dimethylcarbamoyl, N-ethylcarbamoyl, and the like.

The aliphatic oxycarbonyl group represented by Z may have a substituent, and a group wherein the group may be substituted with may be any group as long as it is a replaceable group stated in the aforementioned substituent section. The aliphatic oxycarbonyl group represented by Z is preferably an aliphatic oxycarbonyl group having a total of 2 to 12 carbon atoms, more preferably an alkoxycarbonyl group having a total of 2 to 8 carbon atoms, and examples thereof include methoxycarbonyl, ethoxycarbonyl, carbamoylmethoxycarbonyl, and the like.

The sulfonyl group represented by Z may have a substituent and may be aliphatic, aromatic or heterocyclic ring, and the substituent may be any group as long as it is a replaceable group stated in the aforementioned substituent section. The sulfonyl group represented by Z is preferably an alkylsulfonyl group having a total of 2 to 12 carbon atoms, more preferably an alkylsulfonyl group having a total of 2 to 8 carbon atoms, and examples thereof include methanesulfonyl, ethanesulfonyl, benzenesulfonyl, and the like.

From the viewpoint of the effect of the present invention, G in the general formula (1-1) preferably represents an aryl group or a heterocyclic group, and more preferably a heterocyclic group. From the viewpoint of the effect of the present invention, Y in the general formula (1-1) preferably represents a hydrogen atom. From the viewpoint of the effect of the present invention, $R_{1-1}$ in the general formula (1-1) preferably represents an aliphatic group, a heterocyclic group, an acylamino group, an aliphatic oxycarbonyl group, a carbamoyl group, an aliphatic oxycarbonylamino group, a cyano group, a carbamoylamino group, an arylamino group, a heterocyclic amino group, an amino group, more preferably an aliphatic group, an acylamino group, an aliphatic oxycarbonyl group, a carbamoyl group, an aliphatic oxycarbonylamino group, a cyano group or a carbamoylamino group, and most preferably an acylamino group, an aliphatic oxycarbonyl group, a carbamoyl group, a carbamoylamino group or a cyano group.

From the viewpoint of the effect of the present invention, $R_{1-2}$ in the general formula (1-1) preferably represents an alkyl group, an aryl group or a heterocyclic group, more preferably an aryl group or a heterocyclic group, and most preferably an aryl group.

From the viewpoint of the effect of the present invention, $X_{1-1}$ in the general formula (1-1) preferably represents C—Z, wherein Z preferably represents a cyano group, a carbamoyl group or an aliphatic oxycarbonyl group, more preferably a cyano group or a carbamoyl group, and most preferably a cyano group.

From the viewpoint of the effect of the present invention, preferred is the azo compound (pigment) represented by the general formula (1-1) wherein G represents a heterocyclic group, Y represents a hydrogen atom or an aliphatic group, $R_{1-1}$ represents an aliphatic group, an acylamino group, an aliphatic oxycarbonyl group, a carbamoyl group, an aliphatic oxycarbonylamino group, a cyano group or a carbamoylamino group, $R_{1-2}$ represents an aryl group or a heterocyclic group, $X_{1-1}$ represents C—Z, Z represents a cyano group or a carbamoyl group, and n represents 1 or 2.

From the viewpoint of the effect of the present invention, the azo pigment represented by the general formula (1) or (1-1) is preferably an azo pigment represented by the following general formula (1-2).

Hereinafter, the azo pigment represented by the general formula (1-2), a tautomer of the azo pigment, and a salt or a hydrate thereof will be described in more detail.

[Chem. 54]

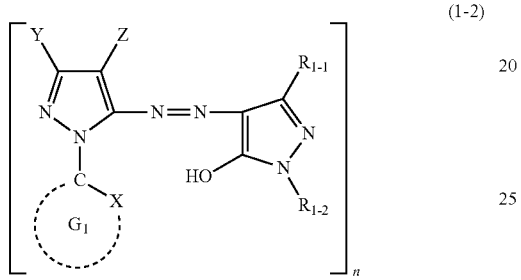

(1-2)

(In the general formula (1-2), Y, $R_{1-1}$, $R_{1-2}$, n and Z have the same definitions as in the general formula (1-1). $G_1$ represents a non-metal atomic group necessary for forming a 5- or 6-membered ring with a carbon atom and a nitrogen atom, and the heterocyclic ring may be an aromatic ring or a condensed ring.)

The 5- or 6-membered heterocyclic ring formed together with a carbon atom and a nitrogen atom, represented by $G_1$ may have a substituent, may be a saturated ring or an unsaturated ring, may be an aromatic ring or a condensed ring, and the heterocyclic ring is preferably a heterocyclic group having a total of 2 to 12 carbon atoms and connected via a carbon atom, more preferably a 5- or 6-membered unsaturated heterocyclic ring having a total of 2 to 10 carbon atoms, and examples thereof include 2-thiazolyl, 2-benzothiazolyl, 2-oxazolyl, 2-benzoxazolyl, 2-pyridyl, 2-pyrazinyl, 3-pyridazinyl, 2-pyrimidinyl, 4-pyrimidinyl, 2-imidazolyl, 2-benzimidazolyl, 2-triazinyl, and the like. Such a heterocyclic group may be a tautomer structure with substituent(s).

A preferred range of the substituent of Y, $R_{1-1}$, $R_{1-2}$, Z and n in the azo pigment represented by the general formula (1-2) is the same as in the general formula (1-1).

In the general formula (1-2), the 5- or 6-membered heterocyclic ring formed together with a carbon atom and a nitrogen atom, represented by $G_1$, is preferably any one of the following (G-1) to (G-13), more preferably any one of the following (G-1) to (G-6), still more preferably (G-1), (G-4) or (G-6), and the most preferably (G-1) or (G-6). * in the general formulae (G-1) to (G-13) represents the binding site to the N atom of the pyrazole ring. $Y_1$ to $Y_{11}$ represent a hydrogen atom or a substituent. $G_{11}$ in (G-13) represents a non-metal atomic group which can form a 5- or 6-membered heterocyclic ring, and the heterocyclic ring represented by $G_{11}$ may be substituted or unsubstituted, and the heterocyclic ring may be a monocyclic ring or a condensed ring. Formulae (G-1) to (G-13) may be a tautomer structure with substituent(s).

[Chem. 55]

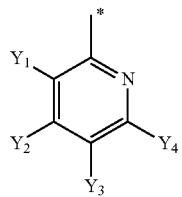

(G-1)

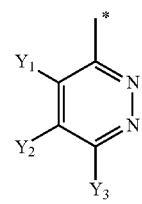

(G-2)

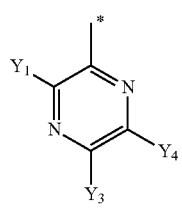

(G-3)

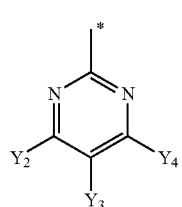

(G-4)

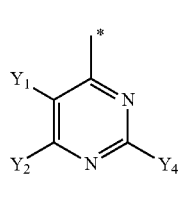

(G-5)

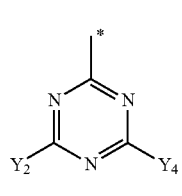

(G-6)

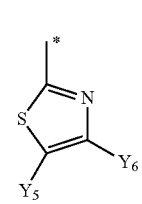

(G-7)

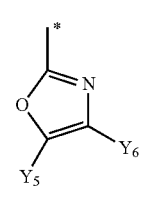

(G-8)

-continued (G-9)
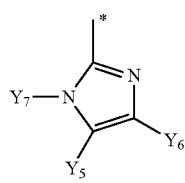

(G-10)
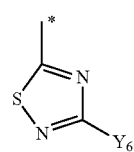

(G-11)
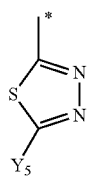

(G-12)
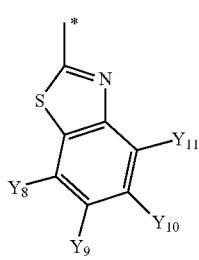

(G-13)
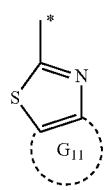

From the viewpoint of the effect of the present invention, the pigment represented by the general formula (1-1) or (1-2) preferably has "total carbon atom number/number of azo groups" of 40 or less, and more preferably 30 or less. From the viewpoint of the effect of the present invention, the pigment represented by the general formula (1-1) or (1-2) preferably has "molecular weight/number of azo groups" of 600 or less. From the viewpoint of the effect of the present invention, it is preferred that the pigment represented by the general formula (1-1) or (1-2) is not substituted by an ionic substituent such as a sulfo group or a carboxyl group.

From the viewpoint of the effect of the present invention, preferred is the azo pigment represented by the general formula (1-2) wherein Y represents a hydrogen atom, $R_{1-1}$ represents an aliphatic group, an acylamino group, an aliphatic oxycarbonyl group, a carbamoyl group, an aliphatic oxycarbonylamino group, a cyano group or a carbamoylamino group, $R_{1-2}$ represents an aryl group or a heterocyclic group, Z represents a cyano group or a carbamoyl group, and n represents 1 or 2.

From the viewpoint of the effect of the present invention, more preferred is the azo pigment represented by the general formula (1-2) wherein Y represents a hydrogen atom, $R_{1-1}$ represents an aliphatic group, an acylamino group, an aliphatic oxycarbonyl group, a carbamoyl group, an aliphatic oxycarbonylamino group, a cyano group or a carbamoylamino group, $R_{1-2}$ represents an aryl group or a heterocyclic group, Z represents a cyano group, $G_1$ represents any one of (G-1) to (G-13) as a 5- or 6-membered heterocyclic ring formed together with a carbon atom and a nitrogen atom, and n represents 1 or 2.

From the viewpoint of the effect of the present invention, still more preferred is the azo pigment represented by the general formula (1-2) wherein Y represents a hydrogen atom, $R_{1-1}$ represents an acylamino group, an aliphatic oxycarbonyl group, a carbamoyl group, a carbamoylamino group or a cyano group, $R_{1-2}$ represents an aryl group, Z represents a cyano group, $G_1$ represents any one of (G-1) to (G-6) as a 5- or 6-membered heterocyclic ring formed together with a carbon atom and a nitrogen atom, and n represents 1.

From the viewpoint of the effect of the present invention, preferred is the azo pigment represented by the general formula (1-2) wherein Y represents a hydrogen atom, $R_{1-1}$ represents an aliphatic group, an acylamino group, an aliphatic oxycarbonyl group, a carbamoyl group, an aliphatic oxycarbonylamino group, a cyano group or a carbamoylamino group, $R_{1-2}$ represents an aryl group or a heterocyclic group, Z represents a cyano group or a carbamoyl group, and n represents 1 or 2.

From the viewpoint of the effect of the present invention, more preferred is the azo pigment represented by the general formula (1-2) wherein Y represents a hydrogen atom, $R_{1-1}$ represents an aliphatic group, an acylamino group, an aliphatic oxycarbonyl group, a carbamoyl group, an aliphatic oxycarbonylamino group, a cyano group or a carbamoylamino group, $R_{1-2}$ represents an aryl group or a heterocyclic group, Z represents a cyano group, $G_1$ represents any one of (G-1) to (G-13) as a 5- or 6-membered heterocyclic ring formed together with a carbon atom and a nitrogen atom, and n represents 1 or 2.

From the viewpoint of the effect of the present invention, still more preferred is the azo pigment represented by the general formula (1-2) wherein Y represents a hydrogen atom, $R_{1-1}$ represents an acylamino group, an aliphatic oxycarbonyl group, a carbamoyl group, a carbamoylamino group or a cyano group, $R_{1-2}$ represents an aryl group, Z represents a cyano group, $G_1$ represents any one of (G-1) to (G-6) as a 5- or 6-membered heterocyclic ring formed together with a carbon atom and a nitrogen atom, and n represents 1.

The pigment of the present invention represented by the general formula (1-1) or (1-2) may have a chemical structure represented by the general formula (1-1) or (1-2) or may be the tautomers thereof, and may be of any crystal form called polymorphic form.

Polymorphism means that crystals having the same chemical composition can be different from each other in the conformation of building block (molecules or ions) in the crystal. The chemical and physical properties of the pigment are determined through the crystal structure, and polymorphic forms of the same pigment can be discriminated from each other by rheology, color, and other color characteristics. Also, different polymorphic forms can be confirmed by X-Ray Diffraction (results of powder X-ray diffractometry) or by X-Ray Analysis (results of X-ray analysis of crystal structure).

In the case where the pigment of the present invention represented by the general.
formulae (1-1) and (1-2) exhibits polymorphism, they may be in any polymorphic form and may be a mixture of two or more polymorphic forms.

The present invention also includes in its scope tautomers of the azo pigments represented by the general formulae (1-1)

and (1-2). Although the general formulae (1-1) and (1-2) are shown in the form of limiting structure among several tautomer forms which are possible in view of chemical structure, the azo pigments may be tautomers of other structures than the ones shown, and may be used as a mixture containing plural tautomers.

For example, with regard to the pigment represented by the general formula (1-1), an azo-hydrazone tautomer represented by the following general formula (1-1') can be considered.

The present invention also includes in its scope a compound represented by the general formula (1-1'), which is a tautomer of the azo pigment represented by the general formula (1-1).

[Chem. 56]

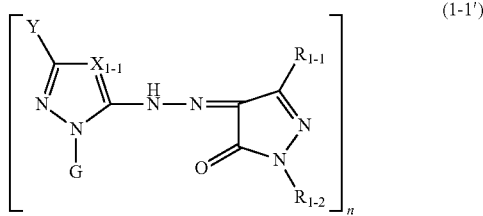

(1-1')

(In the general formula (1-1'), G, Y, $R_{1-1}$, $R_{1-2}$, $X_{1-1}$ and n have the same definitions as in the general formula (1-1).)

The pigment represented by the general formula (1-1) is preferably an azo pigment represented by the following general formula (1-3).

Hereinafter, an azo pigment represented by the general formula (1-3), a tautomer of the azo pigment, and a salt or a hydrate thereof will be described in more detail.

[Chem. 57]

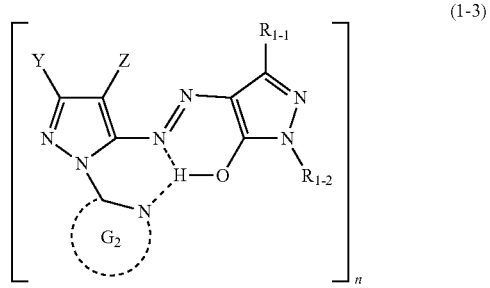

(1-3)

(In the general formula (1-3), Y, $R_{1-1}$, $R_{1-2}$, Z and n have the same definitions as in the general formula (1-2). $G_2$ represents a non-metal atomic group necessary for forming a 6-membered ring with a carbon atom and a nitrogen atom, and the heterocyclic ring may be an aromatic ring or a condensed ring.)

Many tautomers can be considered for the azo pigments represented by the general formulae (1-1) and (1-2). Of the azo pigments represented by the general formulae (1-1) and (1-2), azo pigments represented by the general formula (1-3) can be illustrated as particularly preferred azo pigments as has been stated hereinbefore.

The reason that such a structure is preferred is that, as is shown by the general formula (1-3), the nitrogen atom(s) constituting the heterocyclic ring contained in the azo pigment structure, hydrogen atom(s), and hetero atom(s) (the oxygen atom of the carbonyl group, or the nitrogen atom of the amino group) readily form at least one intramolecular crosslinking hydrogen bond (intramolecular hydrogen bond). As a result, planarity of the molecule is enhanced, the intramolecular and intermolecular interaction is thus further improved, crystallinity of the azo pigment represented by the general formula (1-3) is enhanced (higher structure of the pigment becoming liable to be formed), and hence performances required as pigments, i.e., light fastness, heat stability, moist heat stability, water resistance, gas resistance, and/or solvent resistance, can be markedly improved, such pigments thus being most preferred.

<Azo Compound>

Further, the present invention relates to an azo compound represented by the general formula (1-2), a tautomer of the azo compound, and a salt or a hydrate thereof.

[Chem. 58]

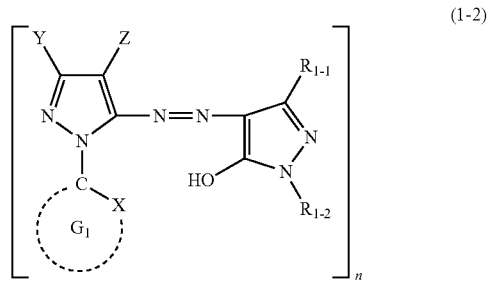

(1-2)

(In the general formula (1-2), Y represents a hydrogen atom or an aliphatic group. $R_{1-1}$ represents a substituent, and $R_{1-2}$ represents an aliphatic group, an aryl group or a heterocyclic group. Z represents an electron-withdrawing group having a Hammett's σp value of 0.2 or more. $G_1$ represents a non-metal atomic group necessary for forming a 5- or 6-membered ring with a carbon atom and a nitrogen atom, and the heterocyclic ring may be an aromatic ring or a condensed ring. n represents an integer of 1 to 4. When n=2, the compound of formula (1-2) represents a dimer formed via $R_{1-1}$, $R_{1-2}$, Y, Z or $G_1$. When n=3, the compound of formula (1-2) represents a trimer formed via $R_{1-1}$, $R_{1-2}$, Y, Z or $G_1$. When n=4, the compound of formula (1-2) represents a tetramer formed via $R_{1-1}$, $R_{1-2}$, Y, Z or $G_1$.)

A salt or hydrate of the azo compound of the present invention represented by the general formula (1-2), and a tautomer thereof may be the same as the azo pigment salt of the present invention, a hydrate and a tautomer thereof.

A novel azo compound of the present invention is useful as an azo pigment.

Specific examples of the azo pigments and azo compounds represented by the general formulae (1-1) and (1-2) will be shown below which, however, do not limit azo pigments and azo compounds to be used in the present invention. Also, each of the following structures of the specific examples is shown in the limiting structural formula selected from among several tautomers possible in view of chemical structure. However, needless to say, the pigments may be in other tautomer structures than the ones described.

[Chem. 59]
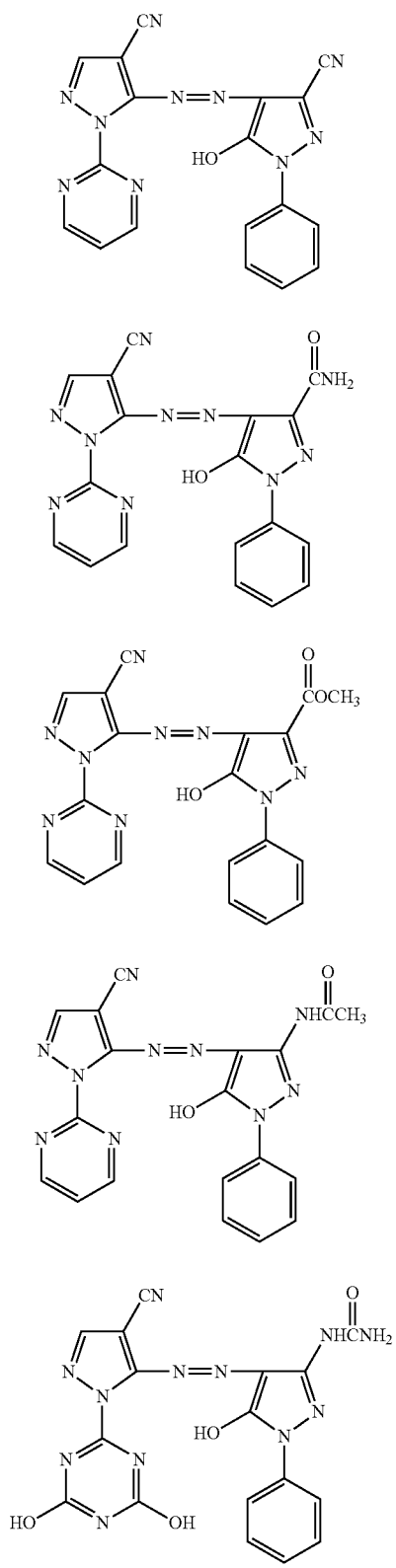
D1-1
D1-2
D1-3
D1-4
D1-5
-continued
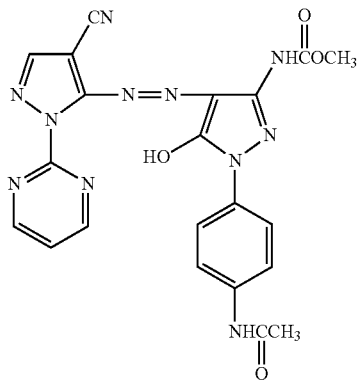
D1-6
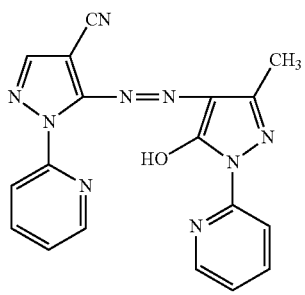
D1-7
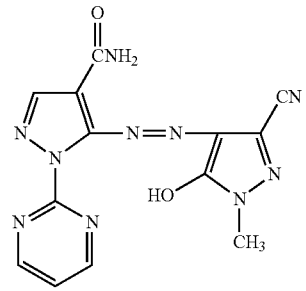
D1-8
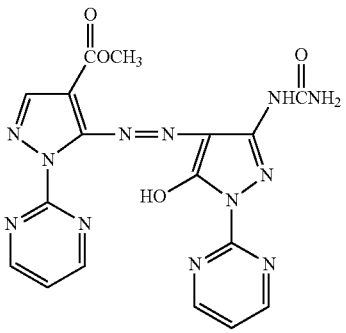
D1-9
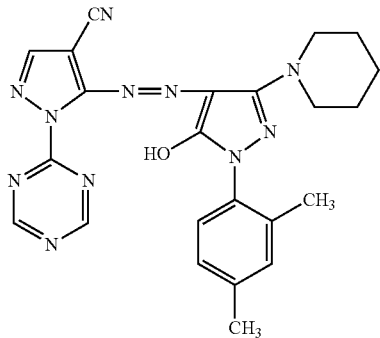
D1-10

[Chem. 60]
D1-11
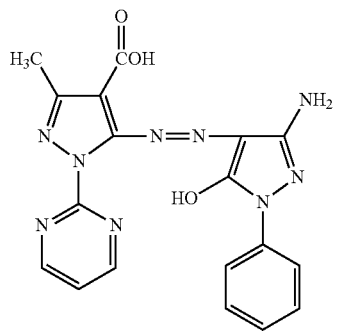
D1-12
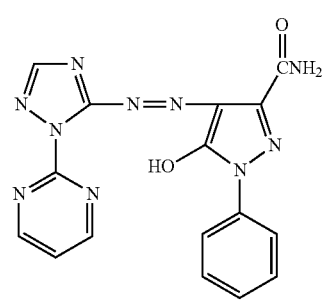
D1-13
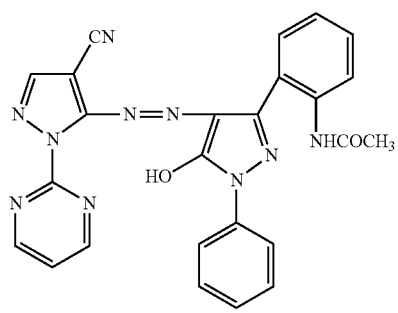
D1-14
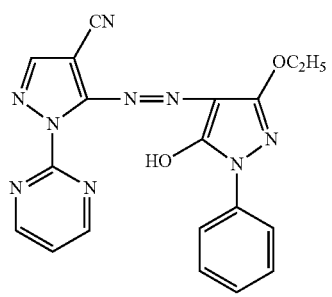
D1-15
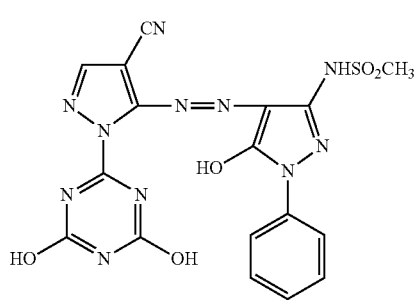
D1-16
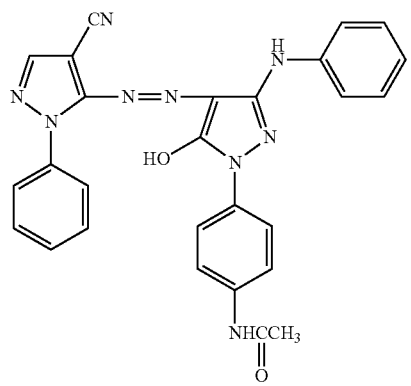
D1-17
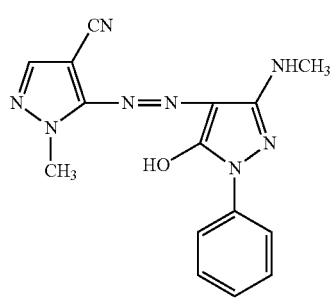
D1-18
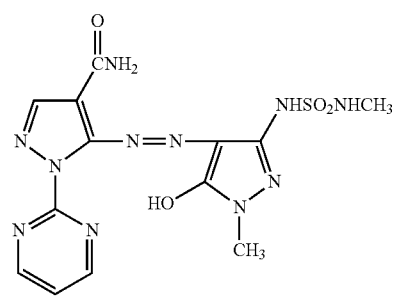
D1-19
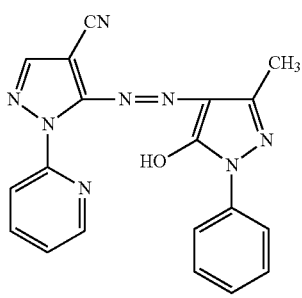
D1-20
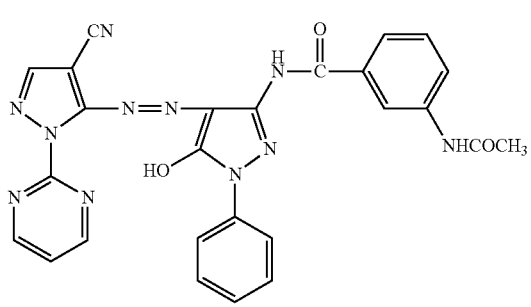

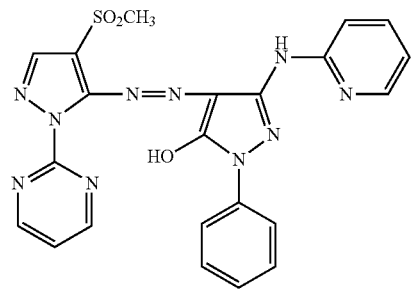

D1-31

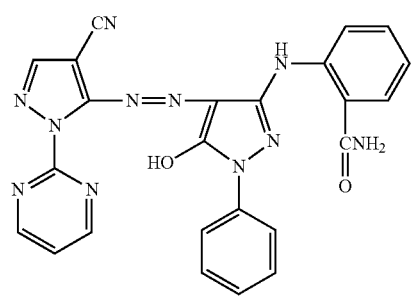

D1-32

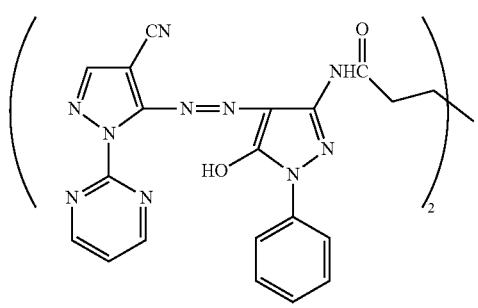

D1-33

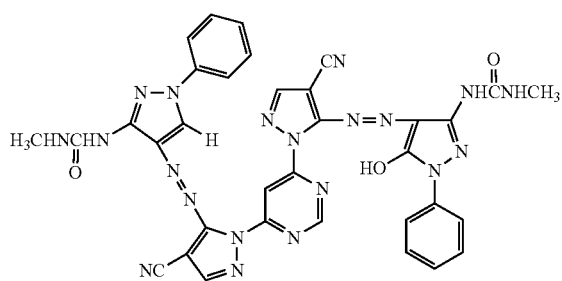

D1-34

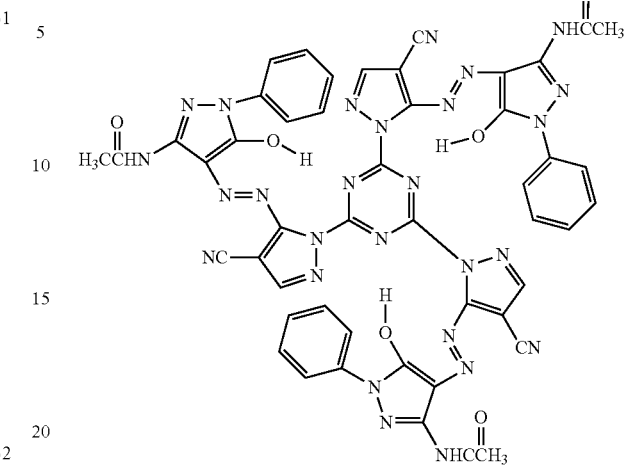

D1-35

Further, the present invention relates to an azo pigment represented by the following general formula (2-1).

Hereinafter, the pigment represented by the general formula (2-1) will be described.

[Chem. 62]

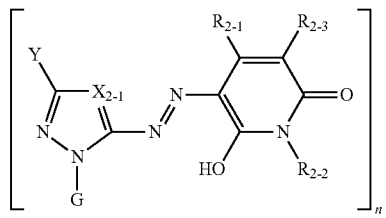

(2-1)

(In the general formula (2-1), G represents an aliphatic group, an aryl group or a heterocyclic group, and Y represents a hydrogen atom or an aliphatic group. $R_{2-1}$ and $R_{2-2}$ represent a hydrogen atom, an aliphatic group, an aryl group or a heterocyclic group. $X_{2-1}$ represents a nitrogen atom or C—Z. $R_{2-3}$ represents a hydrogen atom, a cyano group, a carbamoyl group, an aliphatic oxycarbonyl group or a carboxyl group. Z represents an electron-withdrawing group having a Hammett's σp value of 0.2 or more. n represents an integer of 1 to 4. When n=2, the compound of formula (2-1) represents a dimer formed via $R_{2-1}$, $R_{2-2}$, Y, Z or G. When n=3, the compound of formula (2-1) represents a trimer formed via $R_{2-1}$, $R_{2-2}$, Y, Z or G. When n=4, the compound of formula (2-1) represents a tetramer formed via $R_{2-1}$, $R_{2-2}$, Y, Z or G.)

G and Y in the general formula (2-1) have the same definitions as G and Y in the general formula (1-1).

The aliphatic groups represented by $R_{2-1}$ and $R_{2-2}$ are the same as those recited for $R_{2-1}$ and $R_{2-2}$ in the general formula (1-1).

The aryl group represented by $R_{2-1}$ and $R_{2-2}$ may have a substituent, and a group wherein the group may be substituted with may be any group as long as it is a replaceable group stated in the aforementioned substituent section.

The aryl group represented by $R_{2-1}$ and $R_{2-2}$ is preferably an aryl group having a total of 6 to 16 carbon atoms, more preferably an aryl group having a total of 6 to 12 carbon atoms, and examples thereof include phenyl, 4-acetylaminophenyl, N-methyl-3-methoxyphenyl, 3-carbamoylphenyl, 3-carbamoylaminophenyl, and the like.

The heterocyclic group represented by $R_{2-1}$ and $R_{2-2}$ may have a substituent, may be saturated or unsaturated, may be a condensed ring, and a group wherein the group may be substituted with may be any group as long as it is a replaceable group stated in the aforementioned substituent section. The heterocyclic group represented by $R_{2-1}$ and $R_{2-2}$ is preferably a heterocyclic group having a total of 2 to 16 carbon atoms, more preferably a 5- or 6-membered heterocyclic group having a total of 2 to 12 carbon atoms, and examples thereof include 2-pyrrolyl, 2-imidazolyl, 2-benzimidazolyl, and the like.

In the general formula (2-1), Z has the same definition as Z in the general formula (1-1).

The carbamoyl group represented by $R_{2-3}$ may have a substituent, and a group wherein the group may be substituted with may be any group as long as it is a replaceable group stated in the aforementioned substituent section. The carbamoyl group represented by $R_{2-3}$ is preferably a carbamoyl group having a total of 1 to 7 carbon atoms, more preferably an unsubstituted or alkyl-substituted carbamoyl group having a total of 1 to 5 carbon atoms, still more preferably an unsubstituted carbamoyl group, and examples thereof include unsubstituted carbamoyl, N-methylcarbamoyl, N,N-dimethylcarbamoyl, N-ethylcarbamoyl, and the like.

The aliphatic oxycarbonyl group represented by $R_{2-3}$ may have a substituent, and a group wherein the group may be substituted with may be any group as long as it is a replaceable group stated in the aforementioned substituent section. The aliphatic oxycarbonyl group represented by $R_{2-3}$ is preferably an aliphatic oxycarbonyl group having a total of 2 to 8 carbon atoms, more preferably an alkoxycarbonyl group having a total of 2 to 6 carbon atoms, and examples thereof include methoxycarbonyl, ethoxycarbonyl, carbamoylmethoxycarbonyl, and the like.

n preferably represents 1, 2 or 3, and more preferably 1 or 2.

From the viewpoint of the effect of the present invention, G in the general formula (2-1) preferably represents an aryl group or a heterocyclic group, and more preferably a heterocyclic group. From the viewpoint of the effect of the present invention, Y in the general formula (2-1) preferably represents a hydrogen atom. From the viewpoint of the effect of the present invention, $R_{2-1}$ in the general formula (2-1) preferably represents an aliphatic group, an aryl group or a heterocyclic group, more preferably an aliphatic group or an aryl group, and most preferably an alkyl group. From the viewpoint of the effect of the present invention, $R_{2-2}$ in the general formula (2-1) preferably represents a hydrogen atom, an alkyl group, an aryl group or a heterocyclic group, more preferably a hydrogen atom, an alkyl group or an aryl group, still more preferably a hydrogen atom or an alkyl group, and most preferably an alkyl group. From the viewpoint of the effect of the present invention, $X_{2-1}$ in the general formula (2-1) preferably represents C—Z, Z more preferably represents a cyano group, a carbamoyl group or an aliphatic oxycarbonyl group, still more preferably a cyano group or a carbamoyl group, and most preferably a cyano group. From the viewpoint of the effect of the present invention, $R_{2-3}$ in the general formula (2-1) preferably represents a cyano group, a carbamoyl group or an aliphatic oxycarbonyl group, more preferably a cyano group or a carbamoyl group, and most preferably a cyano group.

From the viewpoint of the effect of the present invention, preferred is the pigment represented by the general formula (2-1) wherein G represents a heterocyclic group, Y represents a hydrogen atom or an aliphatic group, $R_{2-1}$ represents an aliphatic group, an aryl group or a heterocyclic group, $R_{2-2}$ represents a hydrogen atom, an aliphatic group, an aryl group or a heterocyclic group, $X_{2-1}$ represents C—Z, Z represents a cyano group or a carbamoyl group, $R_{2-3}$ represents a cyano group, a carbamoyl group or an aliphatic oxycarbonyl group, and n represents 1 or 2.

From the viewpoint of the effect of the present invention, the pigment represented by the general formula (1) or (2-1) is preferably a pigment represented by the following general formula (2-2).

[Chem. 63]

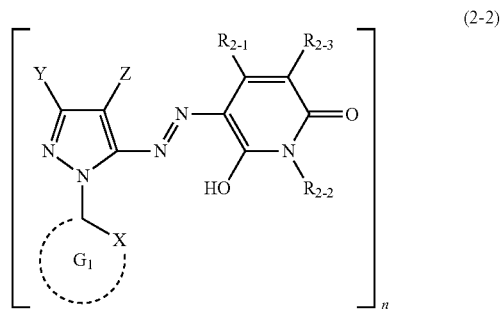

(2-2)

(In the general formula (2-2), Y, $R_{2-1}$, $R_{2-2}$, $R_{2-3}$, Z and n have the same definitions as in the general formula (2-1). $G_1$ represents a non-metal atomic group necessary for forming a 5- or 6-membered ring with a carbon atom and a nitrogen atom, and the heterocyclic ring may be an aromatic ring or a condensed ring.)

$G_1$ in the general formula (2-2) has the same definition as $G_1$ in the general formula (1-2).

A preferred range of the substituent of Y, $R_{2-1}$, $R_{2-2}$, $R_{2-3}$, Z and n in the pigment represented by the general formula (2-2) is the same as in the general formula (2-1).

From the viewpoint of the effect of the present invention, the pigment represented by the general formula (2-1) or (2-2) preferably has "total carbon atom number/number of azo groups" of 40 or less, and more preferably 30 or less. From the viewpoint of the effect of the present invention, the pigment represented by the general formula (2-1) or (2-2) preferably has "molecular weight/number of azo groups" of 600 or less. From the viewpoint of the effect of the present invention, it is preferred that the pigment represented by the general formula (2-1) or (2-2) is not substituted by an ionic substituent such as a sulfo group or a carboxyl group.

From the viewpoint of the effect of the present invention, preferred is the pigment represented by the general formula (2-2) wherein Y represents a hydrogen atom, $R_{2-1}$ represents an aliphatic group, an aryl group or a heterocyclic group, $R_{2-2}$ represents a hydrogen atom, an aliphatic group, an aryl group or a heterocyclic group, Z represents a cyano group or a carbamoyl group, $R_{2-3}$ represents a cyano group, a carbamoyl group or an aliphatic oxycarbonyl group, and n represents 1 or 2.

From the viewpoint of the effect of the present invention, more preferred is the pigment represented by the general formula (2-2) wherein Y represents a hydrogen atom, $R_{2-1}$ represents an alkyl group, an aryl group or a heterocyclic group, $R_{2-2}$ represents a hydrogen atom, an alkyl group, an aryl group or a heterocyclic group, Z represents a cyano group, $R_{2-3}$ represents a cyano group or a carbamoyl group, G$_1$ represents any one of (G-1) to (G-13) as a 5- or 6-membered heterocyclic ring formed together with a carbon atom and a nitrogen atom, and n represents 1 or 2.

From the viewpoint of the effect of the present invention, still more preferred is the pigment represented by the general formula (2-2) wherein Y represents a hydrogen atom, R$_{2-1}$ represents an alkyl group or an aryl group, R$_{2-2}$ represents a hydrogen atom or an alkyl group, Z represents a cyano group, R$_{2-3}$ represents a cyano group, G$_1$ represents (G-1) to (G-6) as a 5- or 6-membered heterocyclic ring formed together with a carbon atom and a nitrogen atom, and n represents 1 or 2.

From the viewpoint of the effect of the present invention, most preferred is the pigment represented by the general formula (2-2) wherein Y represents a hydrogen atom, R$_{2-1}$ represents an alkyl group, R$_{2-2}$ represents an alkyl group, Z represents a cyano group, R$_{2-3}$ represents a cyano group, G$_1$ represents (G-1) to (G-6) as a 5- or 6-membered heterocyclic ring formed together with a carbon atom and a nitrogen atom being bound thereto, and n represents 1 or 2.

<Azo Compound>

Further, the present invention relates to an azo compound represented by the general formula (2-2), a tautomer of the azo compound, and a salt or a hydrate thereof.

[Chem. 64]

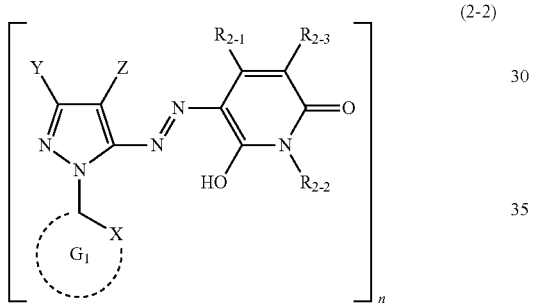

(2-2)

(In the general formula (2-2), Y represents a hydrogen atom or an aliphatic group. R$_{2-1}$ and R$_{2-2}$ represent a hydrogen atom, an aliphatic group, an aryl group or a heterocyclic group. R$_{2-3}$ represents a hydrogen atom, a cyano group, a carbamoyl group, an aliphatic oxycarbonyl group or a carboxyl group. G$_1$ represents a non-metal atomic group necessary for forming a 5- or 6-membered ring with a carbon atom and a nitrogen atom, and the heterocyclic ring may be an aromatic ring or a condensed ring. Z represents an electron-withdrawing group having a Hammett's σp value of 0.2 or more. n represents an integer of 1 to 4. When n=2, the compound of formula (2-2) represents a dimer formed via R$_{2-1}$, R$_{2-2}$, Y, Z or G$_1$. When n=3, the compound of formula (2-2) represents a trimer formed via R$_{2-1}$, R$_{2-2}$, Y, Z or G$_1$. When n=4, the compound of formula (2-2) represents a tetramer formed via R$_{2-1}$, R$_{2-2}$, Y, Z or G$_1$.)

A salt or hydrate of the azo compound of the present invention represented by the general formula (2-2), and a tautomer thereof may be the same as the azo pigment salt of the present invention, a hydrate and a tautomer thereof.

A novel azo compound of the present invention is useful as an azo pigment.

Specific examples of the azo pigments and azo compounds represented by the general formulae (2-1) and (2-2) will be shown below which, however, do not limit azo pigments to be used in the present invention and azo compounds of the present invention. Also, each of the following structures of the specific examples is shown in the limiting structural formula selected from among several tautomers possible in view of chemical structure. However, needless to say, the pigments may be in other tautomer structures than the ones described.

[Chem. 65]

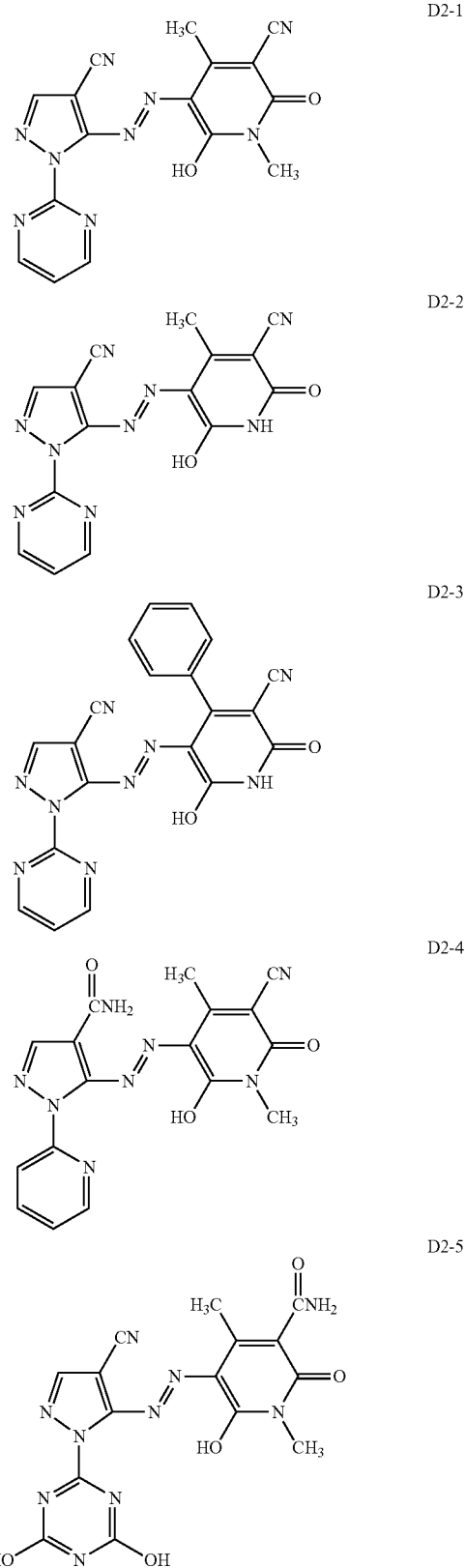

D2-6
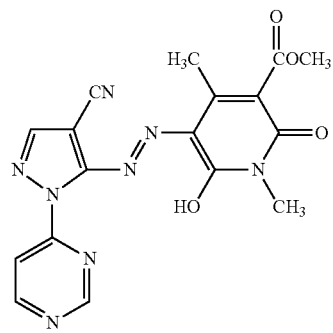
D2-7
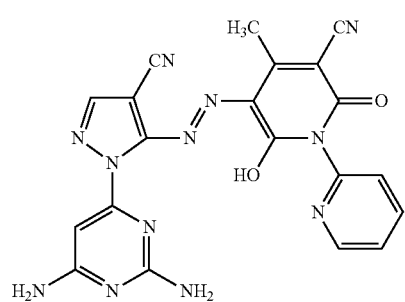
D2-8
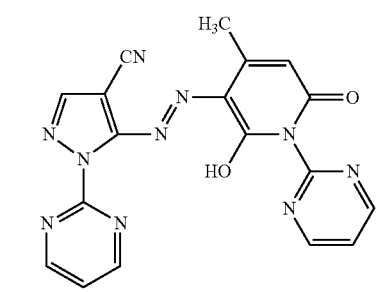
D2-9
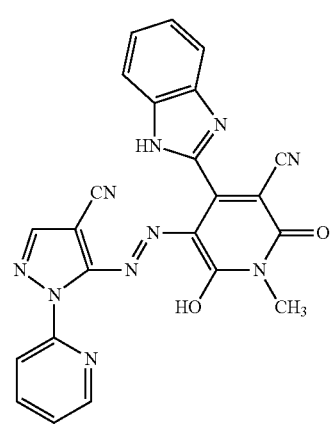
D2-10
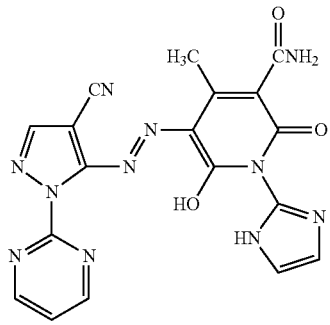
[Chem. 66]
D2-11
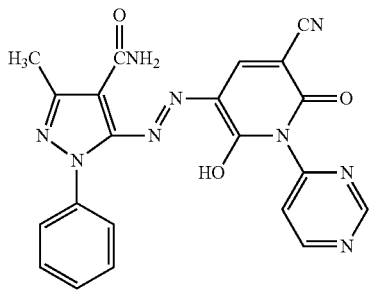
D2-12
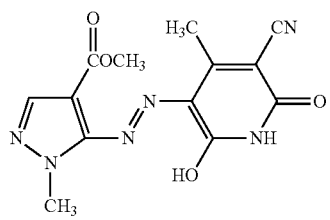
D2-13
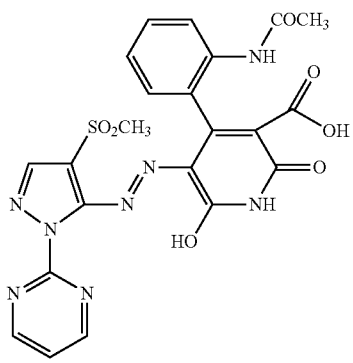
D2-14
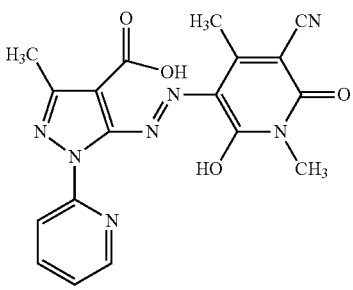

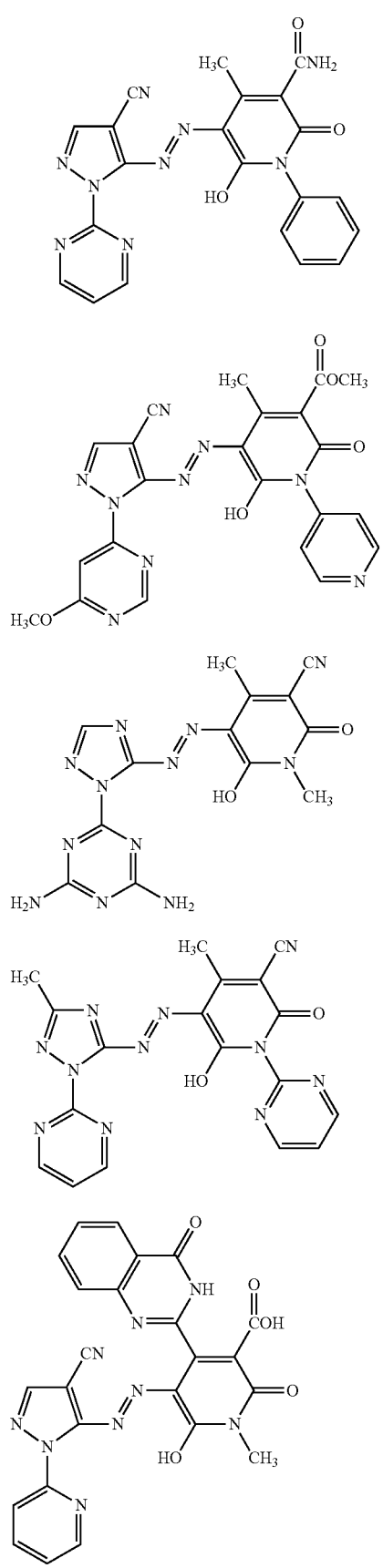
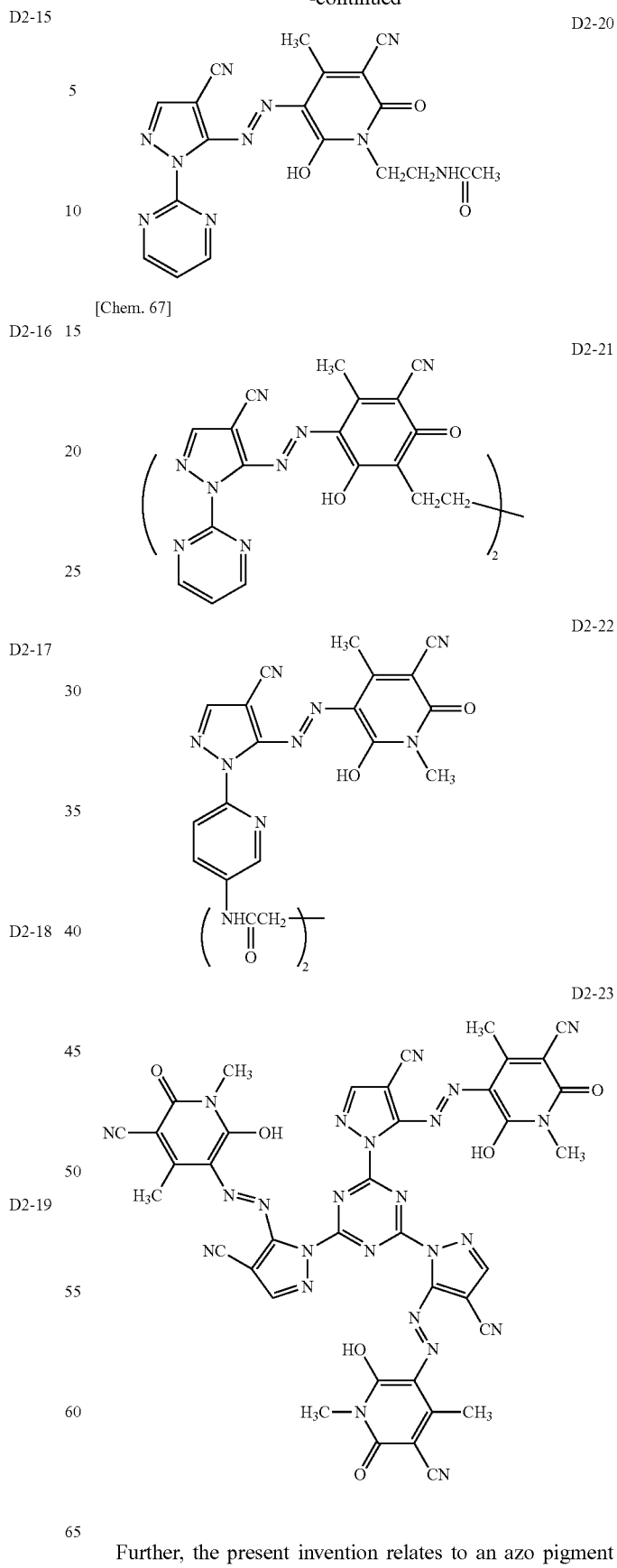
Further, the present invention relates to an azo pigment represented by the following general formula (3-1).

Hereinafter, the pigment represented by the general formula (3-0.1) will be described.

[Chem. 68]

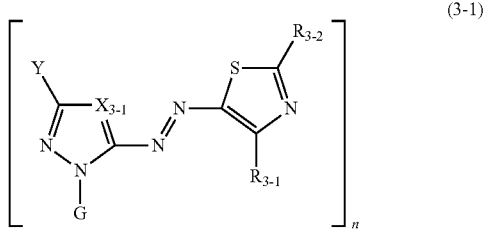

(3-1)

(In the general formula (3-1), G represents an aliphatic group, an aryl group or a heterocyclic group, and Y represents a hydrogen atom or an aliphatic group. $R_{3-1}$ represents an aliphatic group, an aryl group, an aliphatic amino group, an arylamino group, a heterocyclic amino group, an acylamino group, a sulfonamide group, a carbamoylamino group, a sulfamoylamino group or a heterocyclic group, $R_{3-2}$ represents an aliphatic amino group, an arylamino group, a heterocyclic amino group, an acylamino group, a sulfonamide group, an amino group or a heterocyclic group. $X_{3-1}$ represents a nitrogen atom or C—Z. Z represents an electron-withdrawing group having a Hammett's σp value of 0.2 or more. n represents an integer of 1 to 4. When n=2, the compound of formula (3-1) represents a dimer formed via $R_{3-1}$, $R_{3-2}$, Y, Z or G. When n=3, the compound of formula (3-1) represents a trimer formed via $R_{3-1}$, $R_{3-2}$, Y, Z or G. When n=4, the compound of formula (3-1) represents a tetramer formed via $R_{3-1}$, $R_{3-2}$, Y, Z or G.)

G and Y in the general formula (3-1) have the same definitions as G and Y in the general formula (1-1).

The aliphatic group represented by $R_{3-1}$ may have a substituent, may be saturated or unsaturated, and a group wherein the group may be substituted with may be any group as long as it is a replaceable group stated in the aforementioned substituent section. The aliphatic group represented by $R_{3-1}$ is preferably an alkyl group having a total of 1 to 8 carbon atoms, more preferably an alkyl group having a total of 1 to 6 carbon atoms, and examples thereof include methyl, ethyl, i-propyl, cyclohexyl, t-butyl, and the like.

The aryl group represented by $R_{3-1}$ may be a condensed ring, may have a substituent, and a group wherein the group may be substituted with may be any group as long as it is a replaceable group stated in the aforementioned substituent section. The aryl group represented by $R_{3-1}$ is preferably an aryl group having 6 to 12 carbon atoms, more preferably an aryl group having a total of 6 to 10 carbon atoms, and examples thereof include phenyl, 4-chlorophenyl, 4-acetylaminophenyl, 4-methanesulfonylphenyl, and the like.

The aliphatic amino group represented by $R_{3-1}$ and $R_{3-2}$ may have a substituent, may be saturated or unsaturated, a group wherein the group may be substituted with may be any group as long as it is a replaceable group stated in the aforementioned substituent section. The aliphatic amino group represented by $R_{3-1}$ and $R_{3-2}$ is preferably an aliphatic amino group having a total of 1 to 10 carbon atoms, more preferably an alkylamino group having a total of 1 to 6 carbon atoms, and examples thereof include methylamino, ethylamino, dimethylamino, diethylamino, methoxyethylamino, and the like.

The aliphatic amino group represented by $R_{3-1}$ is preferably an aliphatic amino group having a total of 1 to 8 carbon atoms wherein a hydrogen atom is bound to the amino group, more preferably an alkylamino group having a total of 1 to 6 carbon atoms wherein a hydrogen atom is bound to the amino group, and examples thereof include methylamino, ethylamino, methoxyethylamino, acetylaminoethylamino, and the like. The aliphatic amino group represented by $R_{3-2}$ is preferably a dialiphatic amino group having a total of 2 to 8 carbon atoms, more preferably a dialkylamino group having 2 to 6 carbon atoms, and examples thereof include dimethyl, diethylamino, dimethoxyethylamino, N-acetylaminoethyl-N-methylamino, and the like.

The arylamino group represented by $R_{3-1}$ and $R_{3-2}$ may have a substituent, and a group wherein the group may be substituted with may be any group as long as it is a replaceable group stated in the aforementioned substituent section. The arylamino group represented by $R_{3-1}$ and $R_{3-2}$ is preferably an arylamino group having a total of 6 to 16 carbon atoms, more preferably an arylamino group having a total of 6 to 12 carbon atoms, and examples thereof include anilino, 4-acetylaminoanilino, N-methyl-3-methoxyanilino, 3-carbamoylanilino, 3-carbamoylaminoanilino, and the like. The arylamino group represented by $R_{3-1}$ is preferably an arylamino group having a total of 6 to 16 carbon atoms wherein a hydrogen atom is bound to the amino group, more preferably an arylamino group having a total of 6 to 12 carbon atoms wherein a hydrogen atom is bound to the amino group, and examples thereof include anilino, 3,4-benzimidazolone anilino, 4-acetylaminoanilino, and the like. The arylamino group represented by $R_{3-2}$ is preferably a diarylamino group having a total of 6 to 16 carbon atoms, for example diphenylamino.

The heterocyclic amino group represented by $R_{3-1}$ and $R_{3-2}$ may have a substituent, may be saturated or unsaturated, and a group wherein the group may be substituted with may be any group as long as it is a replaceable group stated in the aforementioned substituent section. The heterocyclic amino group represented by $R_{3-1}$ and $R_{3-2}$ is preferably a heterocyclic amino group having a total of 2 to 16 carbon atoms, more preferably a 5- or 6-membered heterocyclic amino group having a total of 2 to 12 carbon atoms, and examples thereof include 2-pyridylamino, 2-pyrimidinylamino, 2-pyrrolidinylamino, and the like. The heterocyclic amino group represented by $R_{3-1}$ is preferably a heterocyclic amino group having a total of 2 to 16 carbon atoms wherein a hydrogen atom is bound to the amino group, more preferably a heterocyclic amino group having a total of 2 to 12 carbon atoms wherein a hydrogen atom is bound to the amino group, and examples thereof include 2-pyridylamino, 2-pyrimidinylamino, and the like. The heterocyclic amino group represented by $R_{3-2}$ is preferably a diheterocyclic amino group having a total of 2 to 16 carbon atoms, for example di-2-pyridylamino.

The acylamino group represented by $R_{3-1}$ and $R_{3-2}$ may have a substituent, may be aliphatic, aromatic or heterocyclic, and a group wherein the group may be substituted with may be any group as long as it is a replaceable group stated in the aforementioned substituent section. The acylamino group represented by $R_{3-1}$ and $R_{3-2}$ is preferably an acylamino group having a total of 2 to 12 carbon atoms, more preferably an acylamino group having a total of 2 to 8 carbon atoms, more preferably an alkylcarbonylamino group having a total of 2 to 8 carbon atoms, and examples thereof include acetylamino, pivaloylamino, benzoylamino, 2-pyridinecarbonylamino, propanoylamino, and the like.

The sulfonamide group represented by $R_{3-1}$ and $R_{3-2}$ may have a substituent, may be aliphatic, aromatic or heterocyclic, and a group wherein the group may be substituted with may be any group as long as it is a replaceable group stated in the aforementioned substituent section. The sulfonamide group represented by $R_{3-1}$ and $R_{3-2}$ is preferably a sulfonamide group having a total of 1 to 12 carbon atoms, more preferably a sulfonamide group having a total of 1 to 8 carbon atoms, more preferably an alkylsulfonamide group having a total of 1 to 8 carbon atoms, and examples thereof include methanesulfonamide, benzenesulfonamide, 2-pyridinesulfonamide, and the like.

The heterocyclic group represented by $R_{3-1}$ and $R_{3-2}$ may have a substituent, may be saturated or unsaturated, may be a condensed ring, and a group wherein the group may be substituted may be any group as long as it is a replaceable group stated in the aforementioned substituent section. The heterocyclic group represented by $R_{3-1}$ is preferably a heterocyclic group having a total of 2 to 16 carbon atoms, more preferably a 5- or 6-membered heterocyclic group having a total of 2 to 12 carbon atoms, and examples thereof include 2-pyridyl, 4-pyridyl, 2-pyrimidyl, 1-pyrrolidinyl, and the like, The heterocyclic group represented by $R_{3-2}$ is preferably a heterocyclic group having a total of 2 to 16 carbon atoms wherein the heterocyclic ring is connected via a nitrogen atom, more preferably a 5- or 6-membered heterocyclic group having a total of 2 to 12 carbon atoms wherein the heterocyclic ring is connected via a nitrogen atom, and examples thereof include 1-piperidinyl, 4-morpholinyl, and the like.

The carbamoylamino group represented by $R_{3-1}$ may have a substituent, may be aliphatic, aromatic or heterocyclic, and a group wherein the group may be substituted with may be any group as long as it is a replaceable group stated in the aforementioned substituent section. The carbamoylamino group represented by $R_{3-1}$ is preferably a carbamoylamino group having a total of 1 to 12 carbon atoms, more preferably a carbamoylamino group having a total of 1 to 8 carbon atoms, more preferably an alkylcarbamoylamino group having a total of 1 to 8 carbon atoms, and examples thereof include carbamoylamino, methylcarbamoyl amino, phenylcarbamoylamino, 2-pyridinecarbamoylamino, dimethylcarbamoylamino, and the like.

The sulfamoylamino group represented by $R_{3-1}$ may have a substituent, may be aliphatic, aromatic or heterocyclic, and a group wherein the group may be substituted with may be any group as long as it is a replaceable group stated in the aforementioned substituent section. The sulfamoylamino group represented by $R_{3-1}$ is preferably a sulfamoylamino group having a total of 0 to 12 carbon atoms, more preferably a sulfamoylamino group having a total of 0 to 8 carbon atoms, more preferably an alkylsulfamoylamino group having a total of 0 to 8 carbon atoms, and examples thereof include sulfamoylamino, dimethylsulfamoylamino, and the like.

Z in the general formula (3-1) has the same definition as Z in the general formula (1-1).

n preferably represents 1, 2 or 3, and more preferably 1 or 2.

From the viewpoint of the effect of the present invention, G in the general formula (3-1) preferably represents an aryl group or a heterocyclic group, and more preferably a heterocyclic group. From the viewpoint of the effect of the present invention, Y in the general formula (3-1) preferably represents a hydrogen atom. From the viewpoint of the effect of the present invention, $R_{3-1}$ in the general formula (3-1) preferably represents an aliphatic group, an aryl group, an aliphatic amino group, an arylamino group, a heterocyclic amino group, an acylamino group, a carbamoylamino group or a heterocyclic group, more preferably an aliphatic group, an aryl group, an aliphatic amino group, an acylamino group, a carbamoylamino group or an arylamino group, and particularly preferably an aliphatic group, an aliphatic amino group, an acylamino group or a carbamoylamino group. From the viewpoint of the effect of the present invention, $R_{3-2}$ in the general formula (3-1) preferably represents an aliphatic amino group, an arylamino group, an amino group or a heterocyclic group, more preferably an aliphatic amino group, an arylamino group or a heterocyclic group, still more preferably an alkylamino group, an arylamino group or a heterocyclic group, and most preferably an alkylamino group or a saturated heterocyclic group wherein the heterocyclic ring is bound to the thiazole ring of the general formula (3-1) via a nitrogen atom. From the viewpoint of the effect of the present invention, $X_{3-1}$ in the general formula (3-1) preferably represents C—Z, and Z more preferably represents a cyano group, a carbamoyl group or an aliphatic oxycarbonyl group, still more preferably a cyano group or a carbamoyl group, and most preferably a cyano group.

From the viewpoint of the effect of the present invention, preferred is the pigment represented by the general formula (3-1) wherein G represents a heterocyclic group, Y represents a hydrogen atom or an aliphatic group, $R_{3-1}$ represents an aryl group, an aliphatic amino group, an arylamino group, a heterocyclic amino group, an acylamino group, a carbamoylamino group or a heterocyclic group, $R_{3-2}$ represents an aliphatic amino group, an arylamino group or a heterocyclic group, $X_{3-1}$ represents C—Z, Z represents a cyano group or a carbamoyl group, and n represents 1 or 2.

From the viewpoint of the effect of the present invention, the azo pigment represented by the general formula (3-1) is preferably an azo pigment represented by the following general formula (3-2).

Hereinafter, an azo pigment represented by the general formula (3-2), a tautomer of the azo pigment, and a salt or a hydrate thereof will be described in more detail.

[Chem. 69]

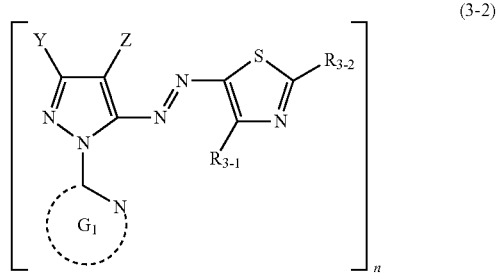

(3-2)

(In the general formula (3-2), $R_{3-1}$, $R_{3-2}$, Y, Z and n have the same definitions as in the general formula (3-1). $G_1$ represents a non-metal atomic group necessary for forming a 5- or 6-membered ring with a carbon atom and a nitrogen atom, and the heterocyclic ring may be an aromatic ring or a condensed ring.)

$G_1$ in the general formula (3-2) has the same definition as $G_1$ in the general formula (1-2).

A preferred range of the substituent of $R_{3-1}$, $R_{3-2}$, Y, Z and n in the pigment represented by the general formula (3-2) is the same as in the general formula (3-1).

From the viewpoint of the effect of the present invention, the pigment represented by the general formula (3-1) or (3-2) preferably has "total carbon atom number/number of azo groups" of 40 or less, and more preferably 30 or less. From the viewpoint of the effect of the present invention, the pigment represented by the general formula (3-1) or (3-2) preferably has "molecular weight/number of azo groups" of 600 or less. From the viewpoint of the effect of the present invention, it is preferred that the pigment represented by the general formula (3-1) or (3-2) is not substituted by an ionic substituent such as a sulfo group or a carboxyl group.

From the viewpoint of the effect of the present invention, preferred is the pigment represented by the general formula (3-2) wherein Y represents a hydrogen atom, $R_{3-1}$ represents an aliphatic group, an aryl group, an aliphatic amino group, an arylamino group, a heterocyclic amino group, an acylamino group, a carbamoylamino group or a heterocyclic group, $R_{3-2}$ represents an aliphatic amino group, an arylamino group, an amino group or a heterocyclic group, Z represents a cyano group or a carbamoyl group, and n represents 1 or 2.

From the viewpoint of the effect of the present invention, more preferred is the pigment represented by the general formula (3-2) wherein Y represents a hydrogen atom, $R_{3-1}$ represents an aliphatic group, an aryl group, an aliphatic amino group, an acylamino group or a heterocyclic group, $R_{3-2}$ represents an aliphatic amino group, an arylamino group, an amino group or a heterocyclic group, Z represents a cyano group, $G_1$ represents any one of (G-1) to (G-13) as a 5- or 6-membered heterocyclic ring formed together with a carbon atom and a nitrogen atom, and n represents 1 or 2.

From the viewpoint of the effect of the present invention, more preferred is the pigment represented by the general formula (3-2) wherein Y represents a hydrogen atom, $R_{3-1}$ represents an alkyl group, an aryl group, an aliphatic amino group or an acylamino group, $R_{3-2}$ represents an alkylamino group, an arylamino group or a heterocyclic group, $G_1$ represents (G-1) to (G-6) as a 5- or 6-membered heterocyclic ring formed together with a carbon atom and a nitrogen atom, and n represents 1 or 2.

From the viewpoint of the effect of the present invention, still more preferred is the pigment represented by the general formula (3-2) wherein Y represents a hydrogen atom, $R_{3-1}$ represents an alkyl group, an aliphatic amino group or an acylamino group, $R_{3-2}$ represents an alkylamino group, an arylamino group or a saturated heterocyclic group bound to the thiazole ring via a nitrogen atom, $G_1$ represents (G-1), (G-4) or (G-6) as a 5- or 6-membered heterocyclic ring formed together with a carbon atom and a nitrogen atom, and n represents 1 or 2.

The present invention also includes in its scope tautomers of the azo pigments represented by the general formulae (3-1) and (3-2). Although the general formulae (3-1) and (3-2) are shown in the form of limiting structure among several tautomer forms which are possible in view of chemical structure, the azo pigments may be tautomers of other structures than the ones shown, and may be used as a mixture containing plural tautomers.

For example, with regard to the pigment represented by the general formula (3-1), an azo-hydrazone tautomer represented by the following general formula (3-1') can be considered.

The present invention also includes in its scope a compound represented by the general formula (3-1'), which is a tautomer of the azo pigment represented by the general formula (3-1).

[Chem. 70]

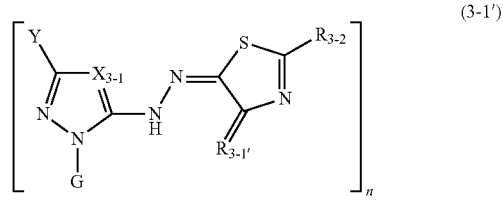

(3-1')

In the general formula (3-1'), G, $R_{3-2}$, Y, $X_{3-1}$ and n have the same definitions as in the general formula (3-1). In the general formula (3-1'), $R_{3-1}'$ represents a group corresponding to $R_{3-1}$ as defined in the general formula (3-1).

The pigment represented by the general formula (3-1) is preferably an azo pigment represented by the following general formula (3-3).

Hereinafter, an azo pigment represented by the general formula (3-3), a tautomer of the azo pigment, and a salt or a hydrate thereof will be described in more detail.

[Chem. 71]

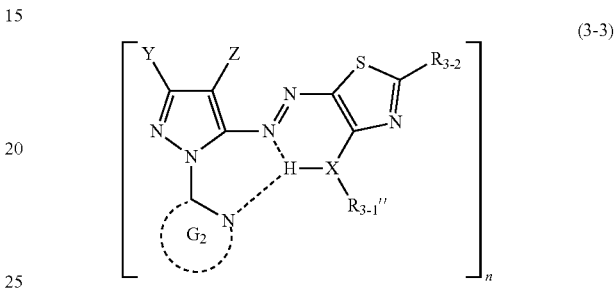

(3-3)

(In the general formula (3-3), Y, Z, $R_{3-2}$ and n have the same definitions as in the general formulae (3-1) and (3-2). X represents a carbon atom or a nitrogen atom, $G_2$ represents a non-metal atomic group necessary for forming a 6-membered ring with a carbon atom and a nitrogen atom, and the heterocyclic ring may be an aromatic ring or a condensed ring. $R_{3-1}''$ taken together with XH represents a group corresponding to $R_{3-1}$ as defined in the general formulae (3-1) and (3-2), and represents a replaceable group present therein.)

Many tautomers can be considered for the azo pigments represented by the general formulae (3-1) and (3-2). Of the azo pigments represented by the general formulae (3-1) and (3-2), azo pigments represented by the general formula (3-3) can be illustrated as particularly preferred azo pigments as has been stated hereinbefore.

The reason that such a structure is preferred is that, as is shown by the general formula (3-3), the nitrogen atom(s) constituting the heterocyclic ring contained in the azo pigment structure, hydrogen atom(s), and hetero atom(s) (the oxygen atom of the carbonyl group, or the nitrogen atom of the amino group) readily form at least one intramolecular crosslinking hydrogen bond (intramolecular hydrogen bond). As a result, planarity of the molecule is enhanced, the intramolecular and intermolecular interaction is thus further improved, crystallinity of the azo pigment represented by the general formula (3-3) is enhanced (higher structure of the pigment becoming liable to be formed), and hence performances required as pigments, i.e., light fastness, heat stability, moist heat stability, water resistance, gas resistance, and/or solvent resistance, can be markedly improved, such pigments thus being most preferred.

<Azo Compound>

Further, the present invention relates to an azo compound represented by the general formula (3-2), a tautomer of the azo compound, and a salt or a hydrate thereof.

[Chem. 72]

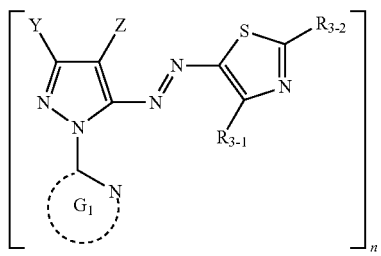

(3-2)

(In the general formula (3-2), Y represents a hydrogen atom or an aliphatic group. $R_{3-1}$ represents an aliphatic group, an aryl group, an aliphatic amino group, an arylamino group, a heterocyclic amino group, an acylamino group, a sulfonamide group, a carbamoylamino group, a sulfamoylamino group, an amino group or a heterocyclic group, and $R_{3-2}$ represents an aliphatic amino group, an arylamino group, a heterocyclic amino group, an acylamino group, a sulfonamide group, an amino group or a heterocyclic group. Z represents an electron-withdrawing group having a Hammett's σp value of 0.2 or more. $G_1$ represents a non-metal atomic group necessary for forming a 5- or 6-membered ring with a carbon atom and a nitrogen atom, and the heterocyclic group may be an aromatic ring or a condensed ring. n represents an integer of 1 to 4. When n=2, the compound of formula (3-2) represents a dimer formed via $R_{3-1}$, $R_{3-2}$, Y, Z or $G_1$. When n=3, the compound of formula (3-2) represents a trimer formed via $R_{3-1}$, $R_{3-2}$, Y, Z or $G_1$. When n=4, the compound of formula (3-2) represents a tetramer formed via $R_{3-1}$, $R_{3-2}$, Y, Z or $G_1$.)

A salt or hydrate of the azo compound of the present invention represented by the general formula (3-2), and a tautomer thereof may be the same as the azo pigment salt of the present invention, a hydrate and a tautomer thereof.

A novel azo compound of the present invention is useful as an azo pigment.

Specific examples of the azo pigments and azo compounds represented by the general formulae (3-1) and (3-2) will be shown below which, however, do not limit azo pigments to be used in the present invention and azo compounds of the present invention. Also, each of the following structures of the specific examples is shown in the limiting structural formula selected from among several tautomers possible in view of chemical structure. However, needless to say, the pigments may be in other tautomer structures than the ones described.

[Chem. 73]

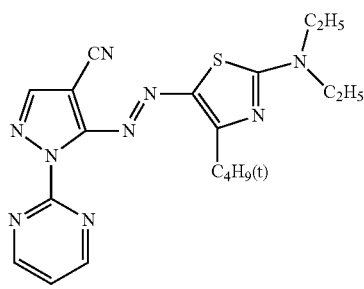

D3-1

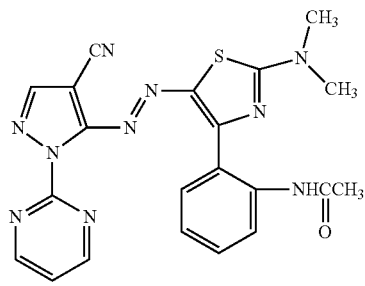

D3-2

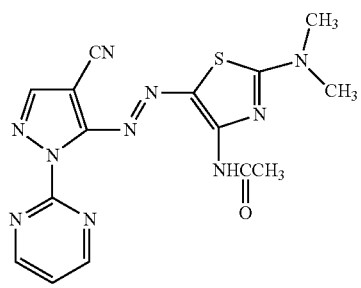

D3-3

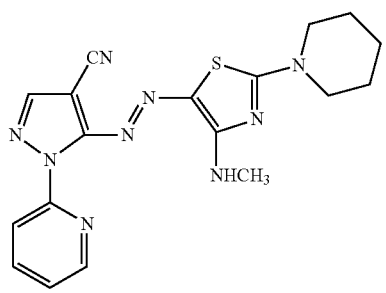

D3-4

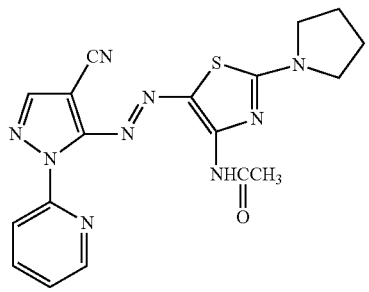

D3-5

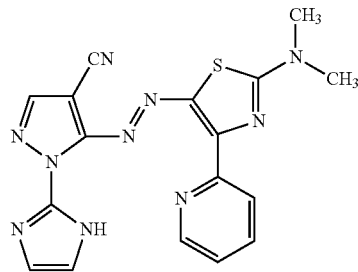

D3-6

D3-7 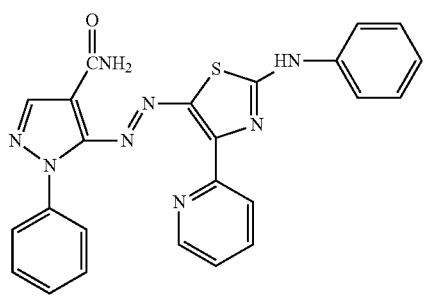
D3-8 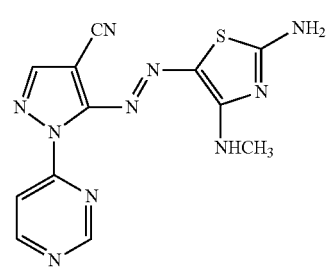
D3-9 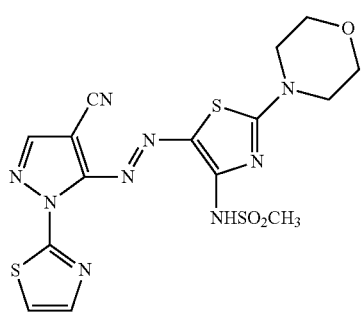
D3-10 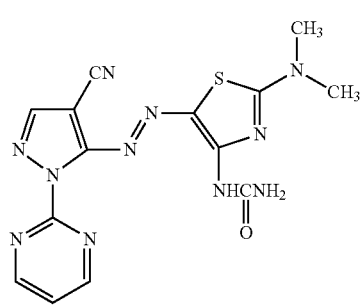
[Chem. 74]
D3-11 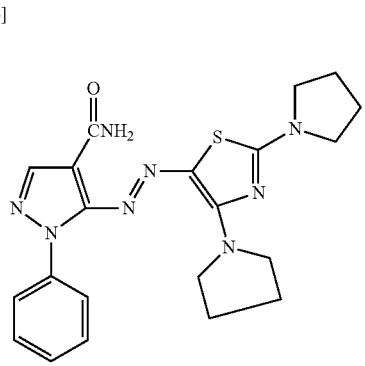
D3-12 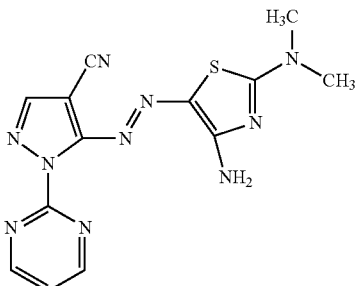
D3-13 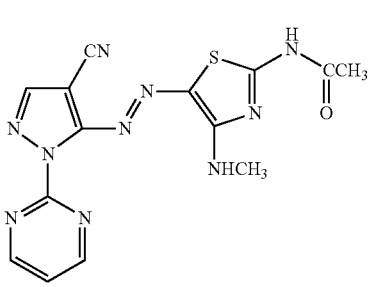
D3-14 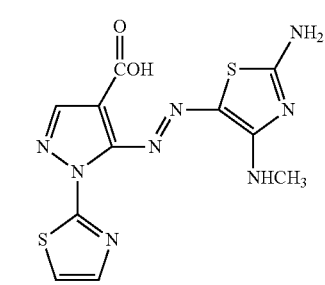
D3-15 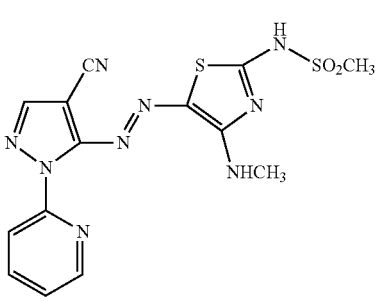
D3-16 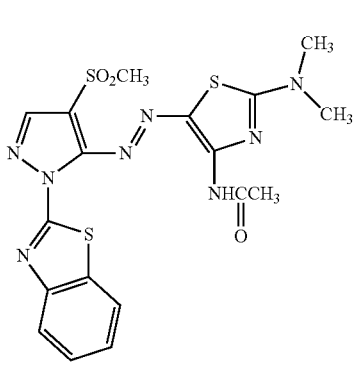

-continued
D3-17
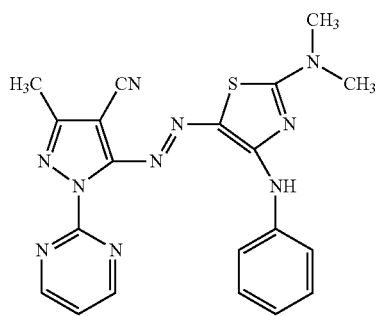
D3-18
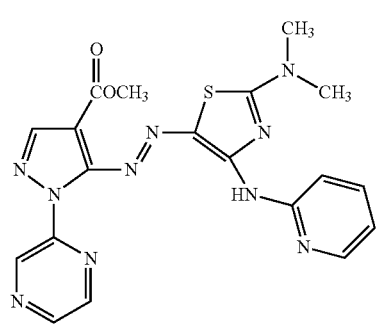
D3-19
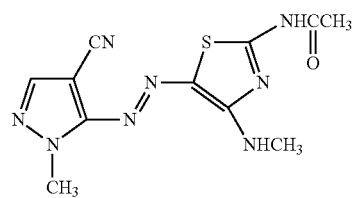
D3-20
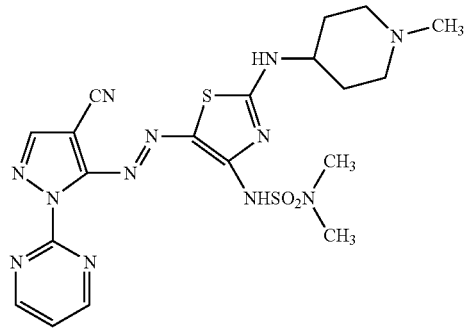
[Chem. 75]
D3-21
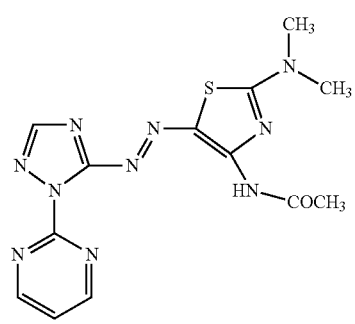
-continued
D3-22
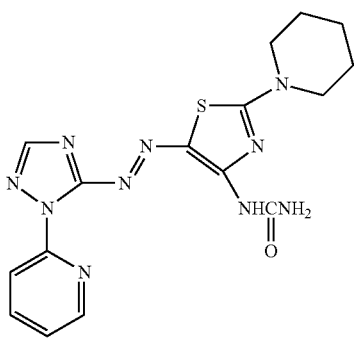
D3-23
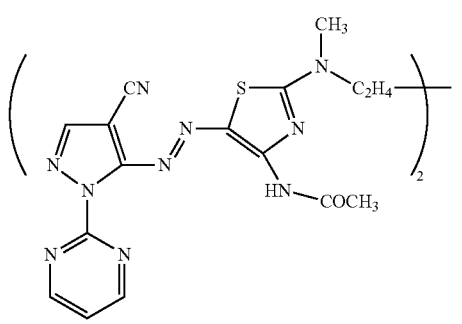
D3-24
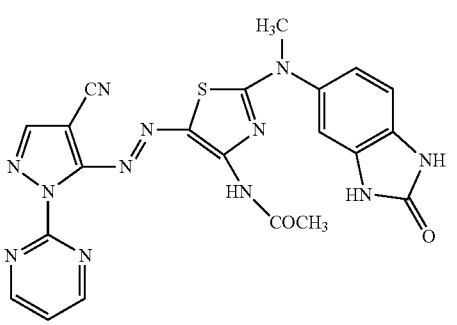
D3-25
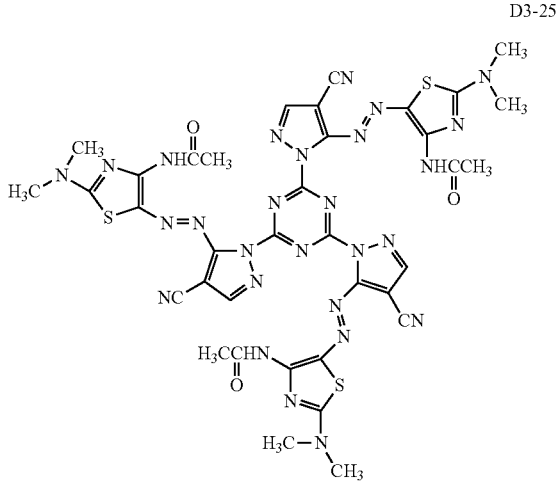

Further, the present invention relates to an azo pigment represented by the following general formula (4-1).

Hereinafter, the pigment represented by the general formula (4-1) will be described.

[Chem. 76]

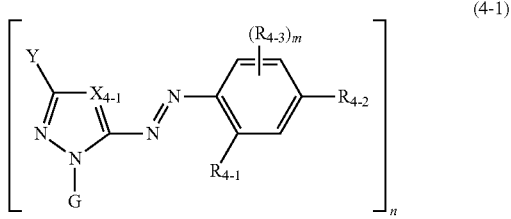

(4-1)

(In the general formula (4-1), G represents an aliphatic group, an aryl group or a heterocyclic group, and Y represents a hydrogen atom or an aliphatic group. $R_{4-1}$ represents a hydrogen atom, an aliphatic group, an aryl group, an aliphatic amino group, an acylamino group, a heterocyclic amino group, an acylamino group, a sulfonamide group, a carbamoylamino group, a sulfamoylamino group, an amino group, a heterocyclic group or an aliphatic oxy group, $R_{4-2}$ represents an aliphatic amino group, an arylamino group, a heterocyclic amino group, a heterocyclic group, a hydroxyl group, an aliphatic oxy group, an aryloxy group or a heterocyclic oxy group, and $R_{4-3}$ represents a substituent. When $R_{4-3}$ is plural, they taken together may form a ring. $X_{4-1}$ represents a nitrogen atom or C—Z. Z represents an electron-withdrawing group having a Hammett's σp value of 0.2 or more. n represents an integer of 1 to 4. When n=2, the compound of formula (4-1) represents a dimer formed via $R_{4-1}$, $R_{4-2}$, $R_{4-3}$, Y, Z or G. When n=3, the compound of formula (4-1) represents a trimer formed via $R_{4-1}$, $R_{4-2}$, $R_{4-3}$, Y, Z or G. When n=4, the compound of formula (4-1) represents a tetramer formed via $R_{4-1}$, $R_{4-2}$, $R_{4-3}$, Y, Z or G m represents an integer of 0 to 3.)

G and Y in the general formula (4-1) have the same definitions as G and Y in the general formula (1-1).

The aliphatic group, aryl group, aliphatic amino group, arylamino group, heterocyclic amino group, acylamino group, sulfonamide group, heterocyclic group, carbamoylamino group, and sulfamoylamino group represented by $R_{4-1}$ are the same as those recited for $R_{3-1}$ in the general formula (3-1).

The aliphatic oxy group represented by $R_{4-1}$ and $R_{4-2}$ may have a substituent, may be saturated or unsaturated, and a group wherein the group may be substituted with may be any group as long as it is a replaceable group stated in the aforementioned substituent section. The aliphatic oxy group represented by $R_{4-1}$ and $R_{4-2}$ is preferably an aliphatic oxy group having a total of 1 to 10 carbon atoms, more preferably an alkoxy group having a total of 1 to 6 carbon atoms, and examples thereof include methoxy, ethoxy, methoxyethoxy, and the like.

The aryloxy group represented by $R_{4-2}$ may have a substituent, and a group wherein the group may be substituted with may be any group as long as it is a replaceable group stated in the aforementioned substituent section. The aryloxy group represented by $R_{4-1}$ and $R_{4-2}$ is preferably an aryloxy group having a total of 6 to 16 carbon atoms, more preferably an aryloxy group having a total of 6 to 12 carbon atoms, and examples thereof include phenoxy, 4-acetylaminophenoxy, 2-nitrophenoxy, 2-acetylaminophenoxy, and the like.

The heterocyclic oxy group represented by $R_{4-2}$ may have a substituent, may be saturated or unsaturated, and a group wherein the group may be substituted with may be any group as long as it is a replaceable group stated in the aforementioned substituent section. The heterocyclic oxy group represented by $R_{4-2}$ is preferably a heterocyclic oxy group having a total of 2 to 16 carbon atoms, more preferably a 5- or 6-membered heterocyclic oxy group having a total of 2 to 12 carbon atoms, and examples thereof include 2-pyridyloxy, 2-pyrimidyloxy, and the like.

The substituent of $R_{4-3}$ may be any replaceable group stated in the aforementioned substituent section, and examples thereof include an aliphatic group, an acylamino group, an aliphatic oxy group, an aliphatic oxycarbonyl group, a carbamoyl group, a sulfamoyl group, an aliphatic sulfonamide group, an amino group, an aliphatic amino group, an aliphatic oxycarbonylamino group, a cyano group, a carbamoylamino group, a sulfamoylamino group, a halogen atom, and the like.

When $R_{4-1}$, $R_{4-2}$ and $R_{4-3}$ are adjacent to one another, they taken together may form a 5- to 7-membered ring. When $R_{4-3}$ is plural, they taken together may form a ring.

m preferably represents 0, 1 or 2, and more preferably 0 or 1.

n preferably represents 1, 2 or 3, and more preferably 1 or 2.

In the general formula (4-1), Z has the same definition as Z in the general formula From the viewpoint of the effect of the present invention, G in the general formula (4-1) preferably represents an aryl group or a heterocyclic group, and more preferably a heterocyclic group. From the viewpoint of the effect of the present invention, Y in the general formula (4-1) preferably represents a hydrogen atom. From the viewpoint of the effect of the present invention, $R_{4-1}$ in the general formula (4-1) preferably represents a hydrogen atom, an aliphatic group, an aryl group, an aliphatic amino group, an arylamino group, a heterocyclic amino group, an acylamino group, a carbamoylamino group, a heterocyclic group or an aliphatic oxy group, more preferably an aliphatic group, an aryl group, an aliphatic amino group, an acylamino group or an aliphatic oxy group, and particularly preferably an aliphatic amino group or an acylamino group. From the viewpoint of the effect of the present invention, $R_{4-2}$ in the general formula (4-1) preferably represents an aliphatic amino group, an arylamino group, a heterocyclic group, a hydroxyl group or an aliphatic oxy group, more preferably an aliphatic amino group, an arylamino group or a heterocyclic group, still more preferably an alkylamino group or a heterocyclic group, and most preferably a saturated heterocyclic group which is bound to the benzene ring via a nitrogen atom. From the viewpoint of the effect of the present invention, $X_{4-1}$ in the general formula (4-1) preferably represents C—Z, Z more preferably represents a cyano group, a carbamoyl group or an aliphatic oxycarbonyl group, still more preferably a cyano group or a carbamoyl group, and most preferably a cyano group.

From the viewpoint of the effect of the present invention, preferred is the pigment represented by the general formula (4-1) wherein G represents an aryl group or a heterocyclic group, Y represents a hydrogen atom or an aliphatic group, $R_{4-1}$ represents a hydrogen atom, an aliphatic group, an aryl group, an aliphatic amino group, an arylamino group, a heterocyclic amino group, an acylamino group, a carbamoylamino group, a heterocyclic group or an aliphatic group, $R_{4-2}$ represents an aliphatic amino group, an arylamino group or a heterocyclic group, $X_{4-1}$ represents C—Z, Z represents a cyano group or a carbamoyl group, and n represents 1 or 2.

From the viewpoint of the effect of the present invention, preferred is the pigment represented by the general formula (4-1) wherein G represents a heterocyclic group, Y represents a hydrogen atom, $R_{4-1}$ represents a hydrogen atom, an aliphatic amino group, an arylamino group, an acylamino group or an aliphatic group, $R_{4-2}$ represents a saturated heterocyclic group which is bound to the benzene ring via a nitrogen atom, $X_{4-1}$ represents C—Z, Z represents a cyano group, and n represents 1 or 2.

From the viewpoint of the effect of the present invention, the pigment represented by the general formulae (1) and (4-1) is preferably a pigment represented by the following general formula (4-2).

Hereinafter, an azo pigment represented by the general formula (4-2), a tautomer of the azo pigment, and a salt or a hydrate thereof will be described in more detail.

[Chem. 77]

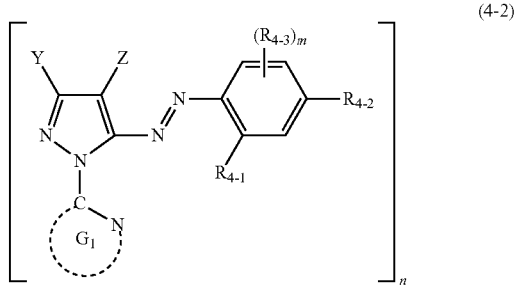

(4-2)

($R_{4-1}$, $R_{4-2}$, $R_{4-3}$, Y, Z, m and n have the same definitions as in the general formula (4-1). $G_1$ represents a non-metal atomic group necessary for forming a 5- or 6-membered ring with a carbon atom and a nitrogen atom, and heterocyclic ring may be an aromatic ring or a condensed ring.)

$G_1$ in the general formula (4-2) has the same definitions as $G_1$ in the general formula (1-2).

A preferred range of the substituent of Y, Z, $R_{4-1}$, $R_{4-2}$, $R_{4-3}$, n and m in the pigment represented by the general formula (4-2) is the same as in the general formula (4-1).

From the viewpoint of the effect of the present invention, the pigment represented by the general formula (4-1) or (4-2) preferably has "total carbon atom number/number of azo groups" of 40 or less, and more preferably 30 or less. From the viewpoint of the effect of the present invention, the pigment represented by the general formula (4-1) or (4-2) preferably has "molecular weight/number of azo groups" of 600 or less. From the viewpoint of the effect of the present invention, it is preferred that the pigment represented by the general formula (4-1) or (4-2) is not substituted by an ionic substituent such as a sulfo group or a carboxyl group.

From the viewpoint of the effect of the present invention, preferred is the pigment represented by the general formula (4-2) wherein Y represents a hydrogen atom, $R_{4-1}$ represents a hydrogen atom, an aliphatic group, an aryl group, an aliphatic amino group, an arylamino group, a heterocyclic amino group, an acylamino group, a carbamoylamino group, a heterocyclic group or an aliphatic group, $R_{4-2}$ represents an aliphatic amino group, an arylamino group, a heterocyclic group, a hydroxyl group, an aliphatic oxy group or a heterocyclic oxy group, Z represents a cyano group or a carbamoyl group, n represents 1 or 2, and m represents 0 or 1.

From the viewpoint of the effect of the present invention, more preferred is the pigment represented by the general formula (4-2) wherein Y represents a hydrogen atom, $R_{4-1}$ represents an aliphatic group, an aliphatic amino group, an acylamino group, a heterocyclic group or an aliphatic oxy group, $R_{4-2}$ represents an aliphatic amino group, an arylamino group or a heterocyclic group, n represents 1 or 2, m represents 0 or 1, $R_{4-3}$ represents an aliphatic group, an acylamino group, an aliphatic oxy group, a carbamoyl group, an aliphatic sulfonamide group, a cyano group, a carbamoylamino group, a sulfamoylamino group or a halogen atom, Z represents a cyano group, and $G_1$ represents any one of (G-1) to (G-13) as a 5- or 6-membered heterocyclic ring formed together with a carbon atom and a nitrogen atom.

From the viewpoint of the effect of the present invention, still more preferred is the pigment represented by the general formula (4-2) wherein Y represents a hydrogen atom, $R_{4-1}$ represents an alkyl group, an aliphatic amino group or an acylamino group, $R_{4-2}$ represents a dialkylamino group or a saturated heterocyclic group which is bound to the benzene ring via a nitrogen atom, n represents 1 or 2, m represents 0 or 1, $R_{4-3}$ represents an aliphatic group, an acylamino group, a carbamoyl group or a carbamoylamino group, Z represents a cyano group, and $G_1$ represents any one of (G-1) to (G-6) as a 5- or 6-membered heterocyclic ring formed together with a carbon atom and a nitrogen atom.

From the viewpoint of the effect of the present invention, particularly preferred is the pigment represented by the general formula (4-2) wherein Y represents a hydrogen atom, $R_{4-1}$ represents an aliphatic amino group or an acylamino group, $R_{4-2}$ represents a saturated heterocyclic group which is bound to the benzene ring via a nitrogen atom, n represents 1 or 2, m represents 0 or 1, $R_{4-3}$ represents an aliphatic group, an acylamino group or a carbamoylamino group, Z represents a cyano group, and $G_1$ represents (G-1), (G-4) or (G-6), more preferably (G-4) or (G-6), as a 5- or 6-membered heterocyclic ring formed together with a carbon atom and a nitrogen atom.

The present invention also includes in its scope tautomers of the azo pigments represented by the general formulae (4-1) and (4-2). Although the general formulae (4-1) and (4-2) are shown in the form of limiting structure among several tautomer forms which are possible in view of chemical structure, the azo pigments may be tautomers of other structures than the ones shown, and may be used as a mixture containing plural tautomers.

For example, with regard to the pigment represented by the general formula (4-1), an azo-hydrazone tautomer represented by the following general formula (4-1') can be considered.

The present invention also includes in its scope a compound represented by the general formula (4-1'), which is a tautomer of the azo pigment represented by the general formula (4-1).

[Chem. 78]

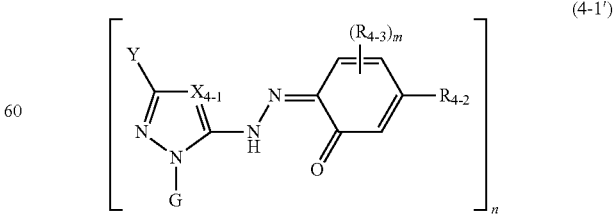

(4-1')

In the general formula (4-1'), Y, G, $R_{4-2}$, $R_{4-3}$, m, n and $X_{4-1}$ have the same definitions as in the general formula (4-1).

The azo pigment represented by the general formulae (4-1) and (4-2) is preferably an azo pigment represented by the following general formula (4-3).

Hereinafter, an azo pigment represented by the general formula (4-3), a tautomer of the azo pigment, and a salt or a hydrate thereof will be described in more detail.

[Chem. 79]

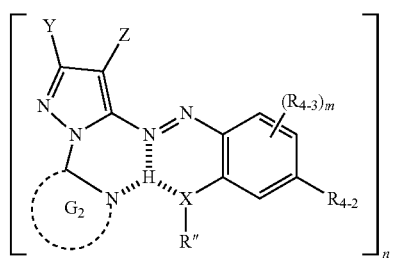

(4-3)

(In the general formula (4-3), Y, Z, $R_{4-2}$, $R_{4-3}$, m and n have the same definitions as in the general formulae (4-1) and (4-2). $G_2$ represents a non-metal atomic group necessary for forming a 6-membered ring with a carbon atom and a nitrogen atom, and the heterocyclic ring may be an aromatic ring or a condensed ring. X represents a carbon atom or a nitrogen atom, R″ taken together with XH represents a group corresponding to $R_{4-1}$ as defined in the general formulae (4-1) and (4-2), and represents a replaceable group present therein.)

Many tautomers can be considered for the azo pigments represented by the general formulae (4-1) and (4-2). Of the azo pigments represented by the general formulae (4-1) and (4-2), azo pigments represented by the general formula (4-3) can be illustrated as particularly preferred azo pigments as has been stated hereinbefore.

The reason that such a structure is preferred is that, as is shown by the general formula (4-3), the nitrogen atom(s) constituting the heterocyclic ring contained in the azo pigment structure, hydrogen atom(s), and hetero atom(s) (the oxygen atom of the carbonyl group, or the nitrogen atom of the amino group) readily form at least one intramolecular crosslinking hydrogen bond (intramolecular hydrogen bond). As a result, planarity of the molecule is enhanced, the intramolecular and intermolecular interaction is thus further improved, crystallinity of the azo pigment represented by the general formula (4-3) is enhanced (higher structure of the pigment becoming liable to be formed), and hence performances required as pigments, i.e., light fastness, heat stability, moist heat stability, water resistance, gas resistance, and/or solvent resistance, can be markedly improved, such pigments thus being most preferred.

Specific examples of the azo pigments represented by the general formulae (4-1) and (4-2) will be shown below which, however, do not limit azo pigments to be used in the present invention. Also, each of the following structures of the specific examples is shown in the limiting structural formula selected from among several tautomers possible in view of chemical structure. However, needless to say, the pigments may be in other tautomer structures than the ones described.

[Chem. 80]

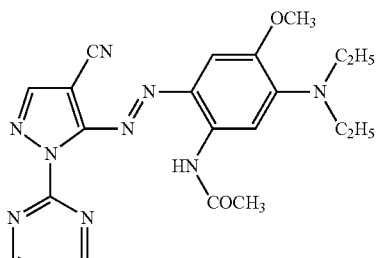

D4-1

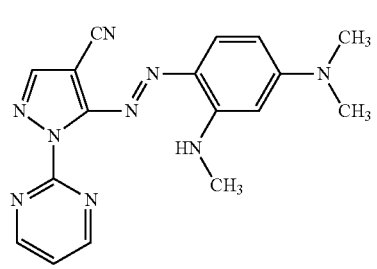

D4-2

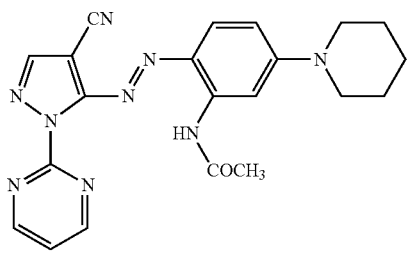

D4-3

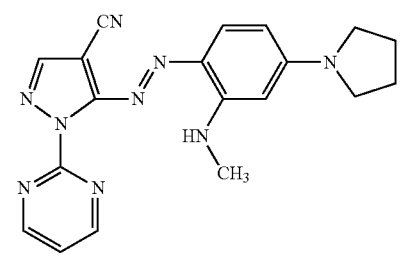

D4-4

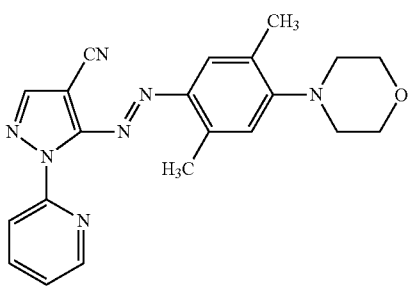

D4-5

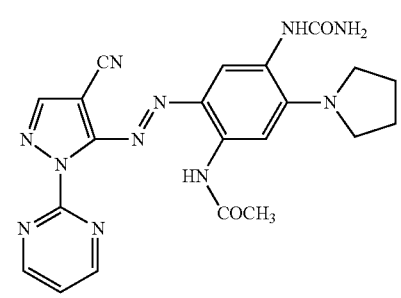

D4-6

-continued
D4-7
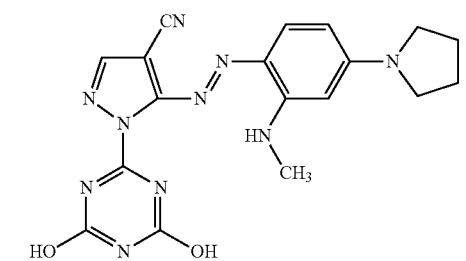
D4-8
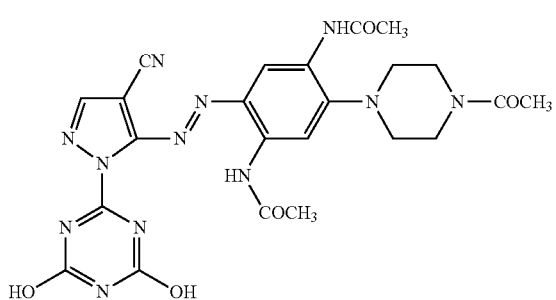
D4-9
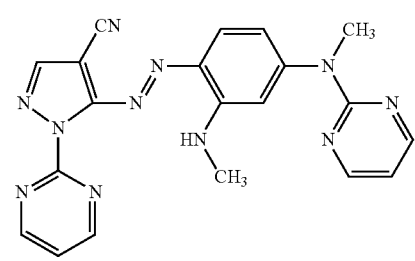
D4-10
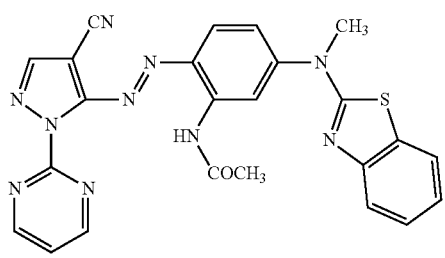
[Chem. 81]
D4-11
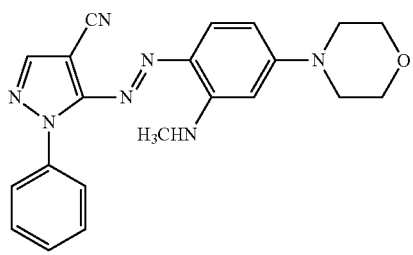
D4-12
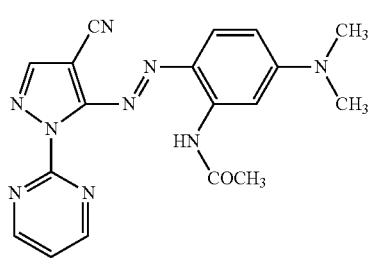
-continued
D4-13
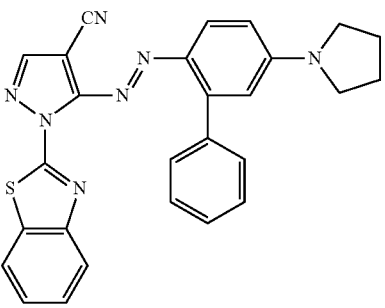
D4-14
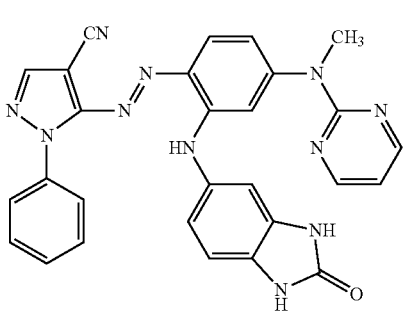
D4-15
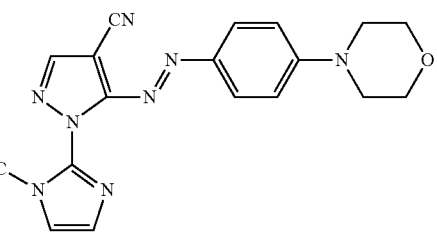
D4-16
D4-17
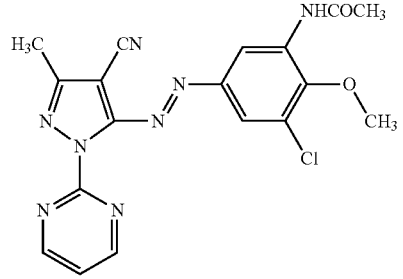

-continued
D4-18
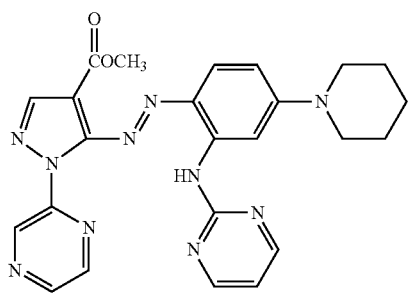
D4-19
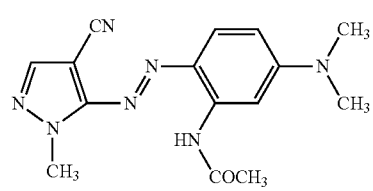
D4-20
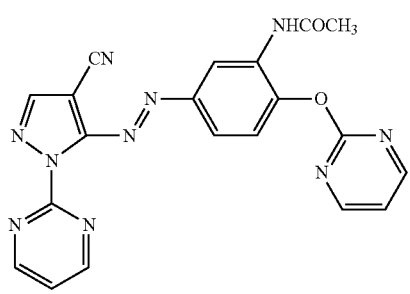
[Chem. 82]
D4-21
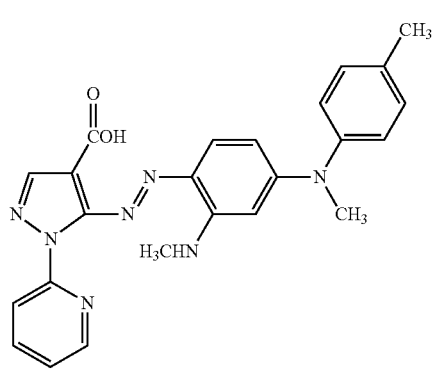
D4-22
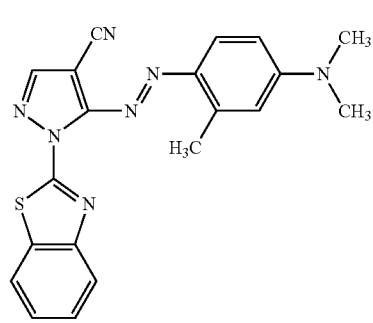
-continued
D4-23
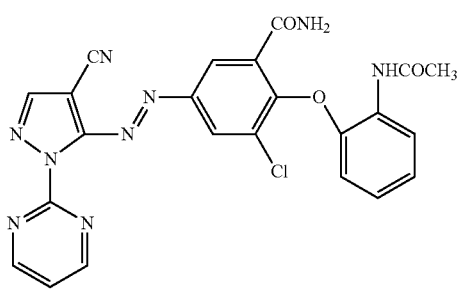
D4-24
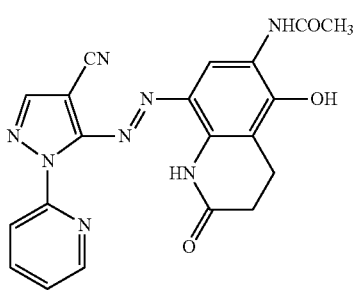
D4-25
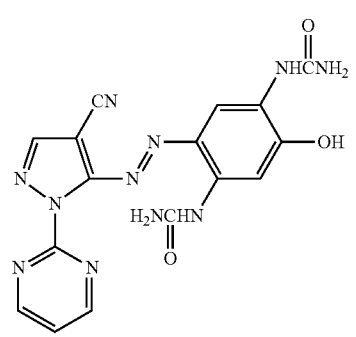
D4-26
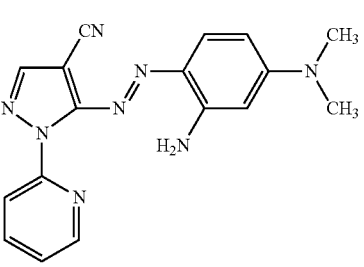
D4-27
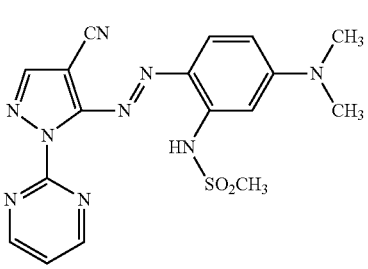

-continued

D4-28
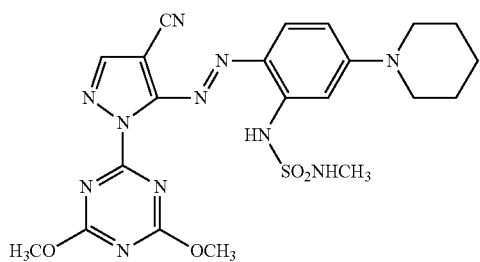

D4-29
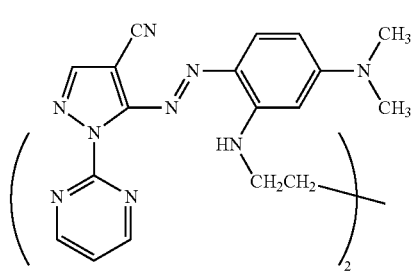

D4-30
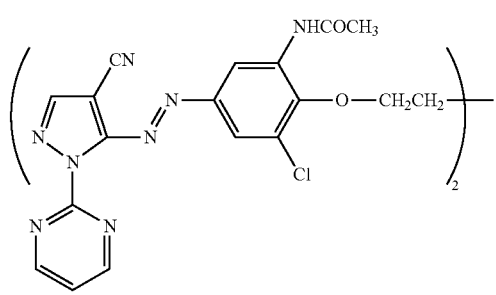

[Chem. 83]

D4-31
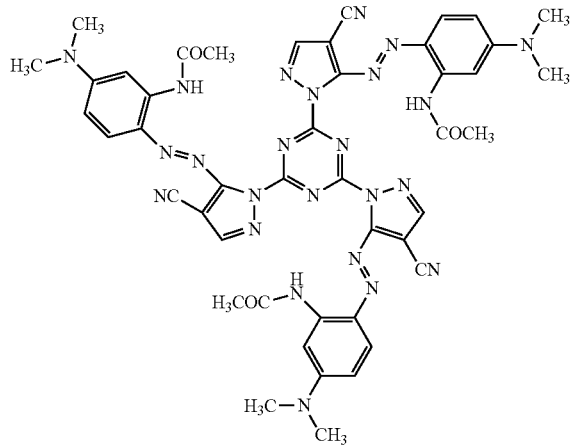

-continued

D4-32
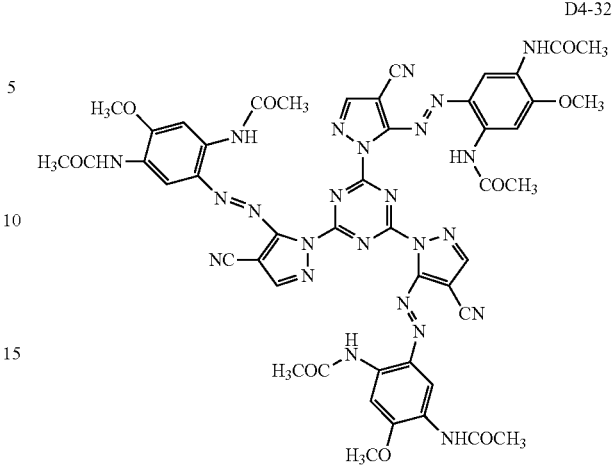

Further, the present invention relates to an azo pigment represented by the following general formula (5-1).

Hereinafter, the azo pigment represented by the general formula (5-1) will be described.

[Chem. 84]

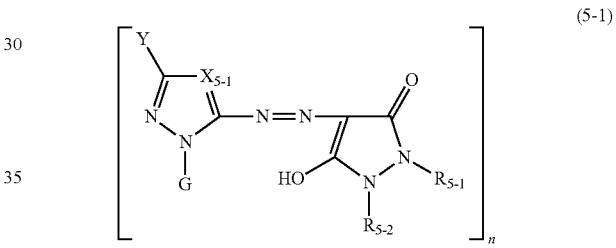

(5-1)

(In the general formula (5-1), G represents an aliphatic group, an aryl group or a heterocyclic group, and Y represents a hydrogen atom or an aliphatic group. $R_{5-1}$ and $R_{5-2}$ represent a hydrogen atom, an aliphatic group, an aryl group or a heterocyclic group. $X_{5-1}$ represents a nitrogen atom or C—Z. Z represents an electron-withdrawing group having a Hammett's σp value of 0.2 or more. n represents an integer of 1 to 4. When n=2, the compound of formula (5-1) represents a dimer formed via $R_{5-1}$, $R_{5-2}$, Y, Z or G. When n=3, the compound of formula (5-1) represents a trimer formed via $R_{5-1}$, $R_{5-2}$, Y, Z or G. When n=4, the compound of formula (5-1) represents a tetramer formed via $R_{5-1}$, $R_{5-2}$, Y, Z or G.)

The aliphatic group represented by G may have a substituent, may be saturated or unsaturated, and a group wherein the group may be substituted with may be any group as long as it is a replaceable group stated in the aforementioned substituent section. The aliphatic group represented by G is preferably an aliphatic group having a total of 1 to 8 carbon atoms, more preferably an alkyl group having a total of 1 to 4 carbon atoms, and examples thereof include methyl, ethyl, vinyl, cyclohexyl, carbamoylmethyl, and the like.

The aryl group represented by G may be a condensed ring, may have a substituent, and a group wherein the group may be substituted with may be any group as long as it is a replaceable group stated in the aforementioned substituent section. The aryl group represented by G is preferably an aryl group having 6 to 12 carbon atoms, more preferably an aryl group having a total of 6 to 10 carbon atoms, and examples thereof include phenyl, 4-nitrophenyl, 4-acetylaminophenyl, 4-methanesulfonylphenyl, and the like.

The heterocyclic group represented by G may have a substituent, may be saturated or unsaturated, may be a condensed ring and it is preferably a heterocyclic group which has a total of 2 to 12 carbon atoms, wherein the heterocyclic ring is connected via a carbon atom, more preferably a 5- or 6-membered unsaturated heterocyclic ring connected via a carbon atom and having a total of 2 to 10 carbon atoms, still more preferably a 5- or 6-membered unsaturated heterocyclic ring connected via a carbon atom and having a total of 2 to 10 carbon atoms, and having a nitrogen atom at the adjacent position bound to the pyrazole ring, and examples thereof include 2-tetrahydrofuryl, 2-furyl, 2-pyrrolyl, 2-thiazolyl, 2-benzothiazolyl, 2-oxazolyl, 2-benzoxazolyl, 2-pyridyl, 2-pyrazinyl, 3-pyridazinyl, 2-pyrimidinyl, 4-pyrimidinyl, 2-imidazolyl, 2-benzimidazolyl, 2-triazinyl, and the like. Such a heterocyclic group may be a tautomer structure with substituent(s). The group wherein the heterocyclic group of G may be substituted with may be any group as long as it is a replaceable group stated in the aforementioned substituent section. Such a group is preferably an aliphatic group, an aryl group, a hydroxyl group, a halogen atom, an aliphatic oxy group, an aliphatic thio group, an amino group which may be substituted, a carbamoylamino group, an acylamino group, a sulfonamide group, a carbamoyl group, a sulfamoyl group, or the like, more preferably, an aliphatic group, a hydroxyl group, an aliphatic oxy group, an aliphatic thio group, an amino group which may be substituted, a carbamoylamino group, an acylamino group, a carbamoyl group, and the like.

The aliphatic group represented by Y may have a substituent, may be saturated or unsaturated, and a group wherein the aliphatic group of Y may be substituted with may be any group as long as it is a replaceable group stated in the aforementioned substituent section. The aliphatic group represented by Y is preferably an alkyl group having a total of 1 to 8 carbon atoms, more preferably an alkyl group having a total of 1 to 6 carbon atoms, and examples thereof include methyl, ethyl, vinyl, cyclohexyl, (t)-butyl, carbamoylmethyl, and the like.

The aliphatic group represented by $R_{5-1}$ and $R_{5-2}$ may have a substituent, may be saturated or unsaturated, a group wherein the group may be substituted with may be any group as long as it is a replaceable group stated in the aforementioned substituent section. The aliphatic group represented by $R_{5-1}$ and $R_{5-2}$ is preferably an alkyl group having a total of 1 to 8 carbon atoms, more preferably an alkyl group having a total of 1 to 4 carbon atoms, and examples thereof include methyl, ethyl, i-propyl, cyclohexyl, t-butyl, and the like.

The aryl group represented by $R_{5-1}$ and $R_{5-2}$ may have a substituent, and a group wherein the group may be substituted with may be any group as long as it is a replaceable group stated in the aforementioned substituent section. The aryl group represented by $R_{5-1}$ and $R_{5-2}$ is preferably an aryl group having a total of 6 to 14 carbon atoms, more preferably an aryl group having a total of 6 to 10 carbon atoms, and examples thereof include phenyl, 4-acetylaminophenyl, and the like.

The heterocyclic group represented by $R_{5-1}$ and $R_{5-2}$ may have a substituent, may be saturated or unsaturated, may be a condensed ring, and a group wherein the group may be substituted with may be any group as long as it is a replaceable group stated in the aforementioned substituent section. The heterocyclic group represented by $R_{5-1}$ and $R_{5-2}$ is preferably a heterocyclic group having a total of 2 to 16 carbon atoms wherein the heterocyclic ring is bound via a carbon atom, more preferably a 5- or 6-membered heterocyclic group having a total of 2 to 12 carbon atoms, and examples thereof include 3-morpholinyl, 2-piperidinyl, 2-imidazolyl, 2-benzimidazolyl, 2-pyridyl, 2-pyrimidyl, and the like.

In the general formula (5-1), Z has the same definition as Z in the general formula n represents an integer of 1 to 4, preferably 1, 2 or 3, and more preferably 1 or 2.

From the viewpoint of the effect of the present invention, G in the general formula (5-1) preferably represents an aryl group or a heterocyclic group, and more preferably a heterocyclic group. From the viewpoint of the effect of the present invention, Y in the general formula (5-1) preferably represents a hydrogen atom. From the viewpoint of the effect of the present invention, at least one of $R_{5-1}$ and $R_{5-2}$ in the general formula (5-1) preferably represents an alkyl group, an aryl group or a heterocyclic group, more preferably an aryl group or a heterocyclic group, and most preferably an aryl group.

From the viewpoint of the effect of the present invention, $X_{5-1}$ in the general formula (5-1) preferably represents C—Z.

From the viewpoint of the effect of the present invention, the pigment represented by the general formulae (1) and (5-1) is preferably an azo pigment represented by the following general formula (5-2).

Hereinafter, an azo pigment represented by the general formula (5-2), a tautomer of the azo pigment, and a salt or a hydrate thereof will be described in more detail.

[Chem. 85]

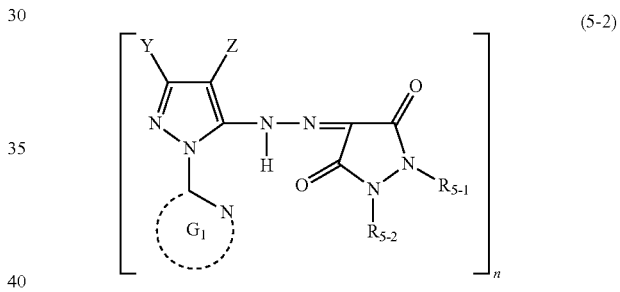

(5-2)

(In the general formula (5-2), Y, Z, $R_{5-1}$, $R_{5-2}$ and n have the same definitions as in the general formula (5-1). $G_1$ represents a non-metal atomic group necessary for forming a 5- or 6-membered ring with a carbon atom and a nitrogen atom, and the heterocyclic ring may be an aromatic ring or a condensed ring.)

$G_1$ in the general formula (5-2) has the same definitions as $G_1$ in the general formula (1-2).

The 5- or 6-membered heterocyclic ring formed together with a carbon atom and a nitrogen atom, represented by $G_1$, may have a substituent, may be saturated or unsaturated, may be a condensed ring, and the heterocyclic group is preferably a heterocyclic group having a total of 2 to 12 carbon atoms and connected via a carbon atom, more preferably a 5- or 6-membered unsaturated heterocyclic ring having a total of 2 to 10 carbon atoms, and examples thereof include 2-thiazolyl, 2-benzothiazolyl, 2-oxazolyl, 2-benzoxazolyl, 2-pyridyl, 2-pyrazinyl, 3-pyridazinyl, 2-pyrimidinyl, 4-pyrimidinyl, 2-imidazolyl, 2-benzimidazolyl, 2-triazinyl, and the like. Such a heterocyclic group may be a tautomer structure with substituent(s).

A preferred range of the substituent of Y, $R_{5-1}$, $R_{5-2}$, Z and n in the azo pigment represented by the general formula (5-2) is the same as in the general formula (5-1).

From the viewpoint of the effect of the present invention, the pigment represented by the general formula (5-1) or (5-2)

preferably has "total carbon atom number/number of azo groups" of 40 or less, and more preferably 30 or less. From the viewpoint of the effect of the present invention, the pigment represented by the general formula (5-1) or (5-2) preferably has "molecular weight/number of azo groups" of 600 or less. From the viewpoint of the effect of the present invention, it is preferred that the pigment represented by the general formula (5-1) or (5-2) is not substituted by an ionic substituent such as a sulfo group or a carboxyl group.

From the viewpoint of the effect of the present invention, preferred is the pigment represented by the general formula (5-2) wherein Y represents a hydrogen atom, at least one of $R_{5-1}$ and $R_{5-2}$ represents an alkyl group, an aryl group or a heterocyclic group, Z represents a cyano group or a carbamoyl group, and n represents 1 or 2.

From the viewpoint of the effect of the present invention, more preferred is the pigment represented by the general formula (5-2) wherein Y represents a hydrogen atom, at least one of $R_{5-1}$ and $R_{5-2}$ represents an aryl group or a heterocyclic group, Z represents a cyano group, n represents 1 or 2, and $G_1$ represents any one of (G-1) to (G-13) as a 5- or 6-membered heterocyclic ring formed together with a carbon atom and a nitrogen atom.

From the viewpoint of the effect of the present invention, still more preferred is the pigment represented by the general formula (5-2) wherein Y represents a hydrogen atom, one of $R_{5-1}$ and $R_{5-2}$ represents an aryl group or a heterocyclic group, the other of $R_{5-1}$ and $R_{5-2}$ represents a hydrogen atom, an aryl group or a heterocyclic group, Z represents a cyano group, n represents 1 or 2, and $G_1$ represents any one of (G-1) to (G-6) as a 5- or 6-membered heterocyclic ring formed together with a carbon atom and a nitrogen atom.

The present invention also includes in its scope tautomers of the azo pigments represented by the general formulae (5-1) and (5-2). Although the general formulae (5-1) and (5-2) are shown in the form of limiting structure among several tautomer forms which are possible in view of chemical structure, the azo pigments may be tautomers of other structures than the ones shown, and may be used as a mixture containing plural tautomers.

For example, with regard to the pigment represented by the general formula (5-1), an azo-hydrazone tautomer represented by the following general formula (5-1') can be considered.

The present invention also includes in its scope a compound represented by the general formula (5-1'), which is a tautomer of the azo pigment represented by the general formula (5-1).

[Chem. 86]

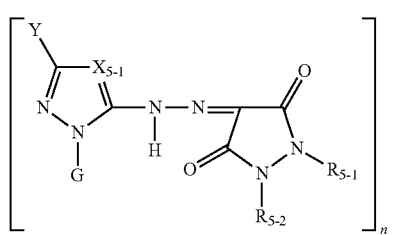

(In the general formula (5-1'), G, Y, $R_{5-1}$, $R_{5-2}$, $X_{5-1}$ and n have the same definitions as in the general formula (5-1).)

The azo pigment represented by the general formulae (5-1) and (5-2) is preferably an azo pigment represented by the following general formula (5-3).

Hereinafter, an azo pigment represented by the general formula (5-3), a tautomer of the azo pigment, and a salt or a hydrate thereof will be described in more detail.

[Chem. 87]

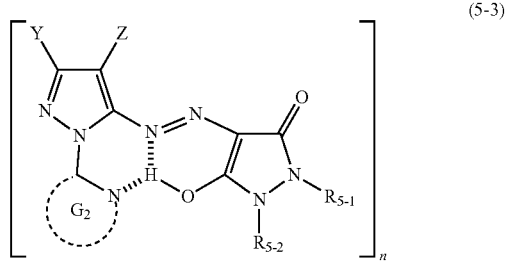

(In the general formula (5-3), $R_{5-1}$, $R_{5-2}$, Y, Z and n have the same definitions as in the general formulae (5-1) and (5-2). $G_2$ represents a non-metal atomic group necessary for forming a 6-membered ring with a carbon atom and a nitrogen atom, and the heterocyclic ring may be an aromatic ring or a condensed ring.)

Many tautomers can be considered for the azo pigments represented by the general formulae (5-1) and (5-2). Of the azo pigments represented by the general formulae (5-1) and (5-2), azo pigments represented by the general formula (5-3) can be illustrated as particularly preferred azo pigments as has been stated hereinbefore.

The reason that such a structure is preferred is that, as is shown by the general formula (5-3), the nitrogen atom(s) constituting the heterocyclic ring contained in the azo pigment structure, hydrogen atom(s), and hetero atom(s) (the oxygen atom of the carbonyl group, or the nitrogen atom of the amino group) readily form at least one intramolecular crosslinking hydrogen bond (intramolecular hydrogen bond). As a result, planarity of the molecule is enhanced, the intramolecular and intermolecular interaction is thus further improved, crystallinity of the azo pigment represented by the general formula (5-3) is enhanced (higher structure of the pigment becoming liable to be formed), and hence performances required as pigments, i.e., light fastness, heat stability, moist heat stability, water resistance, gas resistance, and/or solvent resistance, can be markedly improved, such pigments thus being most preferred.

<Azo Compound>

Further, the present invention relates to an azo compound represented by the general formula (5-2), a tautomer of the azo compound, and a salt or a hydrate thereof.

[Chem. 88]

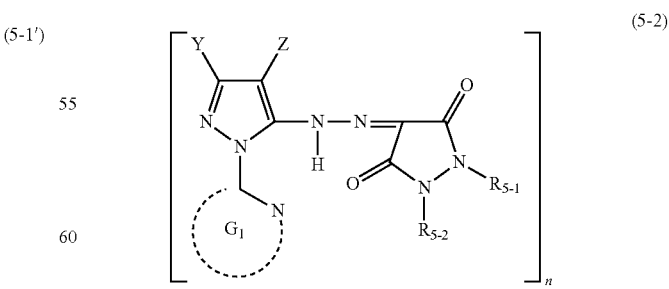

(Y represents a hydrogen atom or an aliphatic group. $R_{5-1}$ and $R_{5-2}$ represent a hydrogen atom, an aliphatic group, an aryl group or a heterocyclic group. $G_1$ represents a non-metal atomic group necessary for forming a 5- or 6-membered ring with a carbon atom and a nitrogen atom, and the heterocyclic ring may be an aromatic ring or a condensed ring. Z represents an electron-withdrawing group having a Hammett's σp value of 0.2 or more. n represents an integer of 1 to 4. When n=2, the compound of formula (5-2) represents a dimer formed via $R_{5-1}$, $R_{5-2}$, Y, Z or $G_1$. When n=3, the compound of formula (5-2) represents a trimer formed via $R_{5-1}$, $R_{5-2}$, Y, Z or $G_1$. When n=4, the compound of formula (5-2) represents a tetramer formed via $R_{5-1}$, $R_{5-2}$, Y, Z or $G_1$.)

A salt or hydrate of the azo compound of the present invention represented by the general formula (5-2), and a tautomer thereof may be the same as the azo pigment salt of the present invention, a hydrate and a tautomer thereof.

A novel azo compound of the present invention is useful as an azo pigment.

Specific examples of the azo pigments and azo compounds represented by the general formulae (5-1), (5-2), and (5-3) will be shown below which, however, do not limit azo pigments to be used in the present invention and azo compounds of the present invention. Also, each of the following structures of the specific examples is shown in the limiting structural formula selected from among several tautomers possible in view of chemical structure. However, needless to say, the pigments may be in other tautomer structures than the ones described.

[Chem. 89]

D5-1

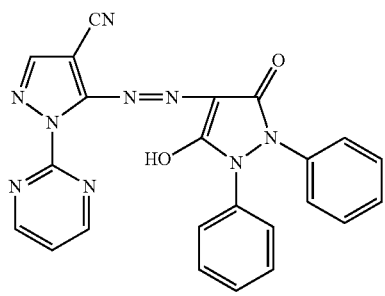

D5-2

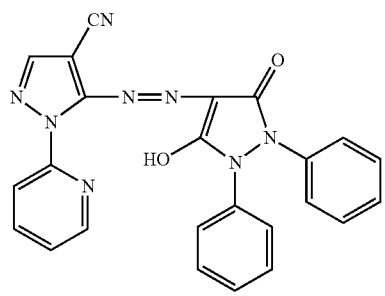

D5-3

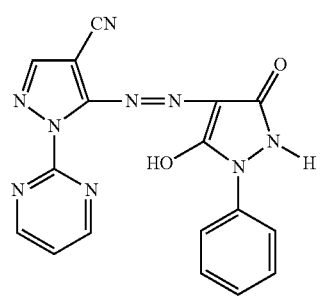

-continued

D5-4

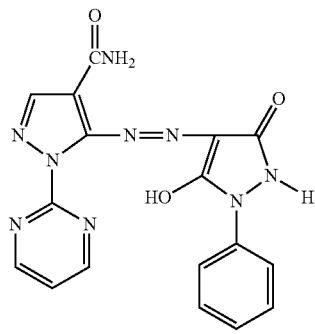

D5-5

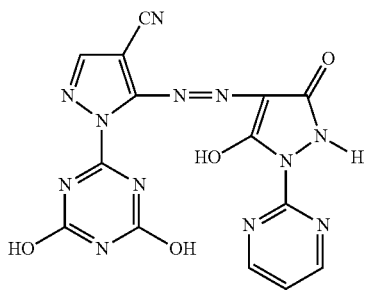

D5-6

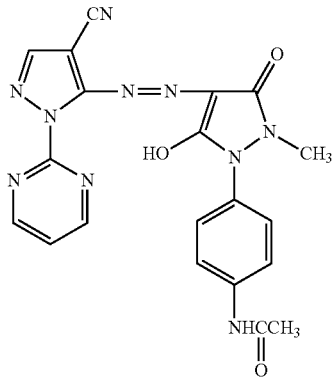

D5-7

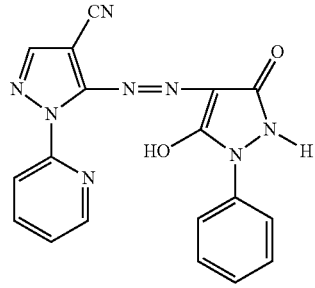

D5-8

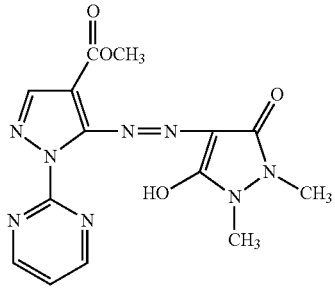

-continued
D5-9
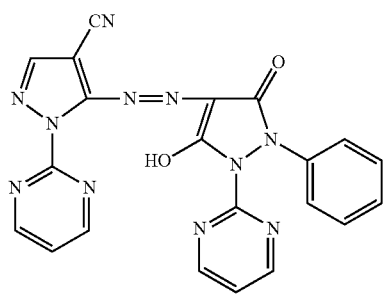
D5-10
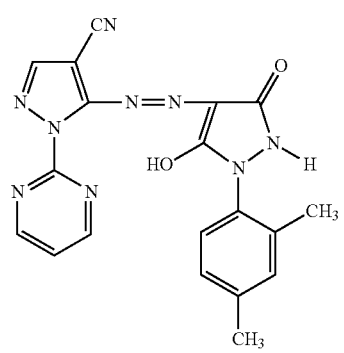
[Chem. 90]
D5-11
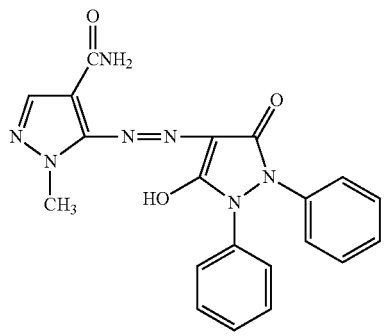
D5-12
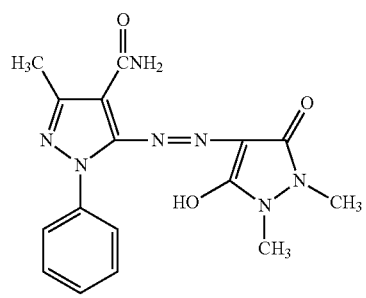
D5-13
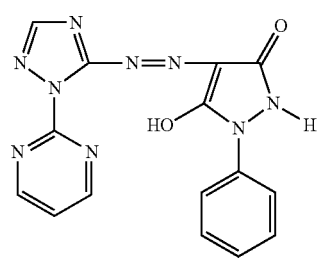
-continued
D5-14
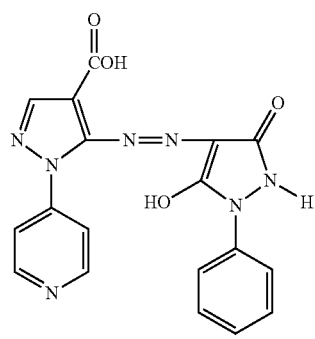
D5-15
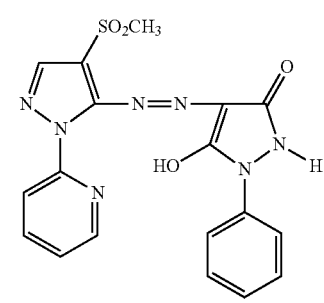
D5-16
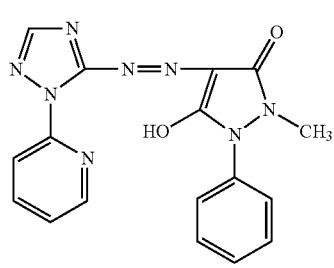
D5-17
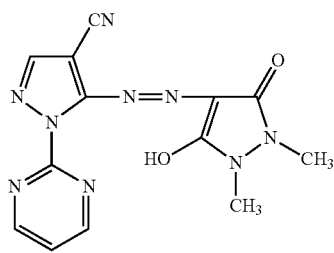
D5-18
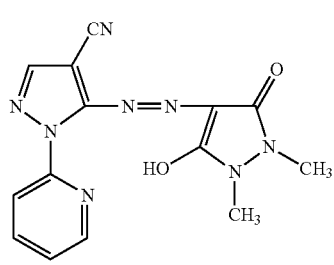

-continued

D5-19
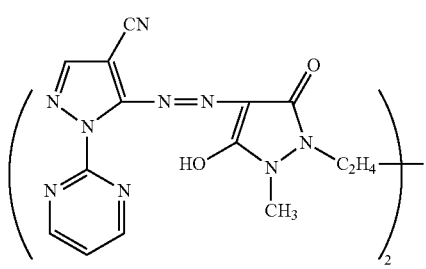

D5-20
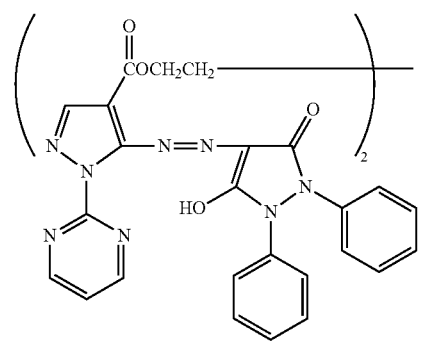

[Chem. 91]

D5-21
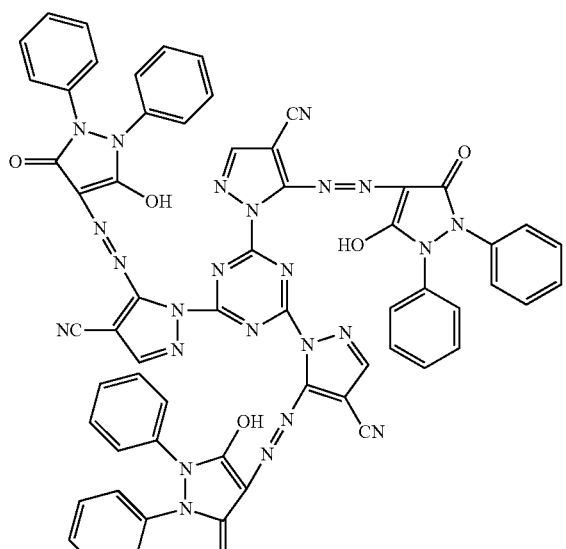

Further, the present invention relates to an azo pigment represented by the following general formula (6-1).

Hereinafter, the azo pigment represented by the general formula (6-1) will be described.

[Chem. 92]

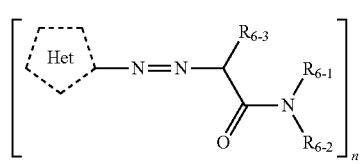
(6-1)

(In the general formula (6-1), Het represents a group selected from the aromatic heterocyclic group represented by the following general formulae (I-1) to (I-9). $R_{6-1}$ and $R_{6-2}$ each independently represents a hydrogen atom or a substituent. $R_{6-3}$ represents a heterocyclic group. n represents an integer of 1 to 4. When n=2, the compound of formula (6-1) represents a dimer formed via $R_{6-1}$, $R_{6-2}$, $R_{6-3}$ or Het. When n=3, the compound of formula (6-1) represents a trimer formed via $R_{6-1}$, $R_{6-2}$, $R_{6-3}$ or Het. When n=4, the compound of formula (6-1) represents a tetramer formed via $R_{6-1}$, $R_{6-2}$, $R_{6-3}$ or Het.)

[Chem. 93]

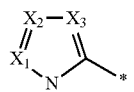
(I-1)

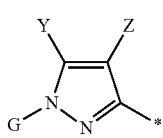
(I-2)

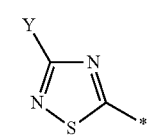
(I-3)

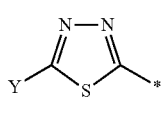
(I-4)

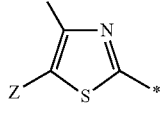
(I-5)

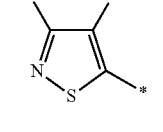
(I-6)

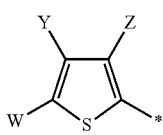
(I-7)

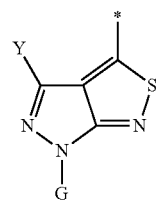
(I-8)

-continued

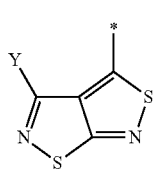
(I-9)

(In the general formulae (I-1) to (I-9), Z, Y, G and W each independently represents a hydrogen atom or a substituent. $X_1$, $X_2$ and $X_3$ each independently is interchangeably used with $X_{6-1}$, $X_{6-2}$ and $X_{6-3}$ and represents a nitrogen atom or a —C($R_{6-11}$)= group. $R_{6-11}$ represents a hydrogen atom or a substituent. * represents the binding site to the azo group in the general formula (6-1).)

Hereinafter, the general formula (6-1) will be described in more detail.

In the general formula (6-1), the heterocyclic group represented by Het represents a group selected from the aromatic heterocyclic group represented by the following general formulae (I-1) to (I-9). * represents the binding site to the azo group in the general formula (6-1).

The heterocyclic group is preferably (I-1), (I-2), (I-3), (I-4), (I-5), (I-6) or (I-7), more preferably (I-1) or (I-6), and most preferably (I-1).

In the general formulae (I-1) to (I-9), Z, Y, G and W each independently represents a hydrogen atom or a substituent.

When Z, Y, G and W represent a monovalent substituent, examples of the monovalent substituent include a halogen atom, a linear or branched alkyl group having 1 to 12 carbon atoms, a linear or branched aralkyl group having 7 to 18 carbon atoms, a linear or branched alkenyl group having 2 to 12 carbon atoms, a linear or branched alkynyl group having 2 to 12 carbon atoms, a linear or branched cycloalkyl group having 3 to 12 carbon atoms, a linear or branched cycloalkenyl group having 3 to 12 carbon atoms (for example, methyl, ethyl, n-propyl, i-propyl, n-butyl, i-butyl, sec-butyl, t-butyl, 2-methylsulfonylethyl, 3-phenoxypropyl, trifluoromethyl or cyclopentyl), a halogen atom (for example, a chlorine atom or a bromine atom), an aryl group (for example, phenyl, 2-chlorophenyl, 2,5-dimethoxy-4-chlorophenyl or naphthyl), a heterocyclic group (for example, imidazolyl, pyrazolyl, 2-furyl, 2-pyridyl, 2-pyrimidinyl, 2-benzothiazolyl, benzimidazol-2-on-5-yl, quinoxaline-2,3-dion-6-yl), a cyano group, a hydroxyl group, a nitro group, a carboxyl group, an amino group, an alkyloxy group (for example, methoxy, ethoxy, 2-methoxyethoxy or 2-methylsulfonylethoxy), an aryloxy group (for example, phenoxy, 2-methylphenoxy, 4-t-butylphenoxy, 3-nitrophenoxy, 3-methoxycarbonylphenyloxy, an acylamino group (for example, acetamide or benzamide), an alkylamino group (for example, methylamino, butylamino, diethylamino or methylbutylamino), an arylamino group (for example, phenylamino or 2-chloroanilino), an ureido group (for example, phenylureido, methylureido or N,N-dibutylureido), a sulfamoylamino group (for example, N,N-dipropylsulfamoylamino), an alkylthio group (for example, methylthio, octylthio or 2-phenoxyethylthio), an arylthio group (for example, phenylthio or 2-carboxyphenylthio), an alkyloxycarbonylamino group (for example, methoxycarbonylamino), an alkylsulfonylamino group and an arylsulfonylamino group (for example, methylsulfonylamino, phenylsulfonylamino or p-toluenesulfonylamino), a carbamoyl group (for example, carbamoyl or N-phenylcarbamoyl), a sulfamoyl group (for example, N-ethylsulfamoyl, N,N-dipropylsulfamoyl or N-phenylsulfamoyl), a sulfonyl group (for example, methylsulfonyl, ethylsulfonyl, phenylsulfonyl or p-toluenesulfonyl), an alkyloxycarbonyl group (for example, methoxycarbonyl or ethoxycarbonyl), a heterocyclic oxy group (for example, 1-phenyltetrazol-5-oxy or 2-tetrahydropyranyloxy), an azo group (for example, phenylazo, 4-methoxyphenylazo, 4-pivaloylaminophenylazo or 2-hydroxy-4-propanoylphenylazo), an acyloxy group (for example, acetoxy), a carbamoyloxy group (for example, N-methylcarbamoyloxy or N-phenylcarbamoyloxy), a silyloxy group (for example, trimethylsilyloxy or dibutylmethylsilyloxy), an aryloxycarbonylamino group (for example, phenoxycarbonylamino), an imido group (for example, N-succinimido or N-phthalimido), a heterocyclic thio group (for example, 2-benzothiazolylthio or 2-pyridylthio), a sulfinyl group (for example, 3-phenoxypropylsulfinyl), a phosphonyl group (for example, phenoxyphosphonyl, octyloxyphosphonyl or phenylphosphonyl), an aryloxycarbonyl group (for example, phenoxycarbonyl), an acyl group (for example, acetyl, 3-phenylpropanoyl or benzoyl), and an ionic hydrophilic group (for example, a carboxyl group, a sulfo group, a phosphono group or a quaternary ammonium group).

When the azo pigment of the present invention contains an ionic hydrophilic group as a substituent, the azo pigment is preferably a salt with a polyvalent metal cation (for example, magnesium, calcium or barium), and particularly preferably a lake pigment.

When Z, Y, G and W represent a divalent group, it is preferable that the divalent group is an alkylene group (for example, methylene, ethylene, propylene, butylene or pentylene), an alkenylene group (for example, ethenylene or propenylene), an alkynylene group (for example, ethynylene or propynylene), an arylene group (for example, phenylene or naphthylene), a divalent heterocyclic group (for example, a 6-chloro-1,3,5-triazine-2,4-diyl group, a pyrimidine-2,4-diyl group, a pyrimidine-4,6-diyl group, a quinoxaline-2,3-diyl group or a pyridazine-3,6-diyl group), —CO—, —NR'— wherein R' represents a hydrogen atom, an alkyl group or an aryl group, —$SO_2$—, —SO—, or a combination thereof (for example, —NHCH$_2$CH$_2$NH—, —NHCONH—, etc.).

Each of the alkylene group, the alkenylene group, the alkynylene group, the arylene group, the divalent heterocyclic group, and the alkyl group or aryl group of R' may have a substituent. Examples of the substituent of R' include the same as those recited for Z, Y, G and W in the general formulae (I-1) to (I-9).

Further preferred are an alkylene group having 10 or fewer carbon atoms, an alkenylene group having 10 or fewer carbon atoms, an alkynylene group having 10 or fewer carbon atoms, an arylene group having from 6 to 10 carbon atoms, and a divalent heterocyclic group.

A total carbon atom number of the divalent linking group is preferably in the range of 0 to 30, and most preferably 0 to 10.

When Z, Y, G and W represent a trivalent group, it is preferable that the trivalent group is a trivalent hydrocarbon group, a trivalent heterocyclic group, >N—, or a combination thereof with a divalent group (for example, >NCH$_2$CH$_2$NH—, >NCONH—, etc.).

A total carbon atom number of the trivalent linking group is preferably in the range of 0 to 30, and most preferably 0 to 10.

In the general formulae (I-1) to (I-9), a preferred example of the substituent represented by Z and W is an electron-withdrawing group, especially having a Hammett's substituent constant σp value of 0.2 or more, and more preferably 0.3 or more. The upper limit of the σp value of the electron-withdrawing group is 1.0 or less.

Specific examples of Z and W, the electron-withdrawing group having the σp value of 0.2 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with other electron-withdrawing group(s) having the σp value of 0.2 or more, a heterocyclic group, a halogen atom, an azo group, and a selenocyanate group.

More preferred is a cyano group, an acyl group having 2 to 5 carbon atoms, a carbamoyl group having 1 to 5 carbon atoms, an alkyloxycarbonyl group having 2 to 5 carbon atoms, an aryloxycarbonyl group having 7 to 12 carbon atoms, an alkylsulfonyl group having 1 to 4 carbon atoms, an arylsulfonyl group having 6 to 12 carbon atoms, or a sulfamoyl group having 0 to 6 carbon atoms. Particularly preferred is a cyano group, an acyl group having 2 to 5 carbon atoms, a carbamoyl group having 1 to 5 carbon atoms, or an alkyloxycarbonyl group having 2 to 5 carbon atoms. Most preferred is a cyano group, an alkyloxycarbonyl group having 2 to 5 carbon atoms, or a carbamoyl group having 1 to 5 carbon atoms.

In the general formulae (I-1) to (I-9), G preferably represents a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, a substituted or unsubstituted alkylsulfonyl group, a substituted or unsubstituted arylsulfonyl group, a carbamoyl group or an acyl group. The particularly preferable substituent is a substituted or unsubstituted aryl group, a substituted or unsubstituted heterocyclic group, a substituted or unsubstituted alkylsulfonyl group, a substituted or unsubstituted arylsulfonyl group, a carbamoyl group or an acyl group. Among them, a substituted or unsubstituted heterocyclic group is particularly preferable. The substituted or unsubstituted heterocyclic group is preferably a 5- to 8-membered, substituted or unsubstituted heterocyclic group which may be a condensed ring, and more preferably a 5 or 6-membered, substituted or unsubstituted, nitrogen or oxygen-containing heterocyclic group which may be a condensed ring.

Specific preferred examples of the heterocyclic group without specifying the substituent include 2-pyridyl, 2-pyrimidinyl, 2-pyrazinyl, 3-pyridazinyl, 1,2,4-thiadiazol-5-yl, 2-benzothiazolyl, 4-quinazolinyl, and the like, preferably, 2-pyridyl, 2-pyrimidinyl, and 4-quinazolinyl. The substituents for the heterocyclic group are the same as those recited for Z, Y, G and W in the general formulae (I-1) to (I-9).

In the general formulae (I-1) to (I-9), Y each independently preferably represents a hydrogen atom, a substituted or unsubstituted alkyl group having 1 to 4 carbon atoms, a substituted or unsubstituted aryl group having 6 to 18 carbon atoms, or a substituted or unsubstituted heterocyclic group having 4 to 12 carbon atoms, and most preferably a hydrogen atom or a substituted or unsubstituted alkyl group having 1 to 4 carbon atoms.

In the general formulae (I-1) to (I-9), $X_1$, $X_2$ and $X_3$ each independently is interchangeably used with $X_{6-1}$, $X_{6-2}$ and $X_{6-3}$ and represents a nitrogen atom or a —C($R_{6-11}$)═ group.

$R_{6-11}$ represents a hydrogen atom or a substituent. When two or more of $X_{6-1}$, $X_{6-2}$ and $X_{6-3}$ represent a —C($R_{6-11}$)═ group, each $R_{6-11}$ may be the same as or different from every other $R_{6-11}$.

The substituents represented by $R_{6-11}$ are the same as those recited for Z, Y, G and W in the general formulae (I-1) to (I-9).

In the present invention, the substituent (I-1) is preferably represented by any one of the following substituents (II-1) to (II-5).

[Chem. 94]

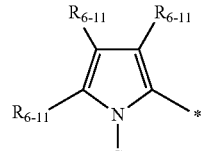

(II-1)

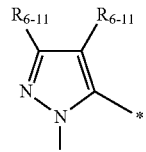

(II-2)

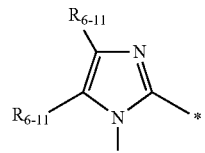

(II-3)

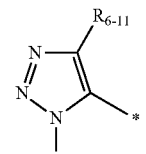

(II-4)

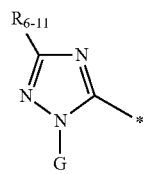

(II-5)

(In the general formulae (II-1) to (II-5), G and $R_{6-11}$ have the same definitions as G and $R_{6-11}$ in the general formulae (I-1) to (I-9), and * represents the binding site to the azo group in the general formula (6-1).)

In the general formulae (II-1) to (II-5), the 5-membered heterocyclic ring is preferably (II-2), (II-3) or (II-5), more preferably (II-2) or (II-5), and most preferably (II-2).

In the general formula (6-1), the heterocyclic group represented by $R_{6-3}$ is preferably a 5- to 8-membered substituted or unsubstituted heterocyclic group which may be a condensed ring, more preferably a 5- or 6-membered, substituted or unsubstituted, nitrogen or oxygen-containing heterocyclic group which may be a condensed ring. Specific preferred examples of the heterocyclic group of $R_{6-3}$ without specifying the substituent include 2-pyridyl, 2-pyrimidinyl, 1,3,5-triazin-2-yl, 2-imidazolyl, 2-benzoxazolyl, 2-benzimidazolyl, 2-benzthiazolyl, quinazolin-2-yl, quinoxalin-2-yl, and the like, preferably, 1,3,5-triazin-2-yl, quinazolin-2-yl and quinoxalin-2-yl, and most preferably, 1,3,5-triazin-2-yl and quinazolin-2-yl. The substituents for the heterocyclic group are the same as those recited for Z, Y, G, and W in the general formulae (I-1) to (I-9).

In the general formula (6-1), preferred examples of $R_{6-1}$ and $R_{6-2}$ will be described in more detail.

$R_{6-1}$ and $R_{6-2}$ each independently represents a hydrogen atom or a substituent.

Examples of the substituents of $R_{6-1}$ and $R_{6-2}$ are the same as those recited for Z, Y, G and W in the general formulae (I-1) to (I-9).

$R_{6-1}$ and $R_{6-2}$ preferably represents a hydrogen atom, a halogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, a substituted or unsubstituted alkylsulfonyl group, a substituted or unsubstituted arylsulfonyl group or an acyl group. The particularly preferred substituent is a hydrogen atom, a substituted or unsubstituted aryl group, a substituted or unsubstituted heterocyclic group, a substituted or unsubstituted alkylsulfonyl group, a substituted or unsubstituted arylsulfonyl group or an acyl group. The more particularly preferred substituent is a hydrogen atom, a substituted or unsubstituted aryl group or a substituted or unsubstituted heterocyclic group. Most preferably, either of $R_{6-1}$ and $R_{6-2}$ represents a hydrogen atom.

In the general formula (6-1), n preferably represents 1 or 2, and most preferably 1.

With respect to a preferred combination of the substituents in the pigment of the present invention represented by the general formula (6-1), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

The azo pigment represented by the general formula (6-1) is preferably an azo pigment represented by the following general formula (6-3).

[Chem. 95]

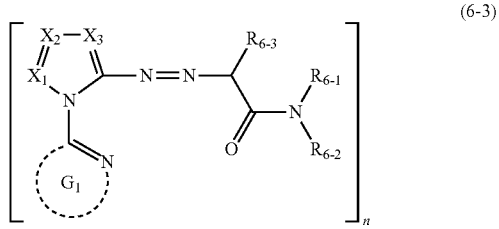

(6-3)

(In the general formula (6-3), $G_1$ represents a non-metal atomic group necessary for forming a 5- or 6-membered ring with a carbon atom and a nitrogen atom, and the heterocyclic group may be an aromatic ring or a condensed ring. $X_1$, $X_2$ and $X_3$ each independently is interchangeably used with $X_{6-1}$, $X_{6-2}$ and $X_{6-3}$ and represents a nitrogen atom or a —C($R_{6-11}$)= group. $R_{6-11}$ represents a hydrogen atom or a substituent. $R_{6-1}$ and $R_{6-2}$ each independently represents a hydrogen atom or a substituent. $R_{6-3}$ represents a heterocyclic group, and n represents an integer of 1 to 3. When n=2, the compound of formula (6-3) represents a dimer formed via $G_1$, $R_{6-1}$, $R_{6-2}$, $R_{6-3}$ or $R_{6-11}$. When n=3, the compound of formula (6-3) represents a trimer formed via $G_1$, $R_{6-1}$, $R_{6-2}$, $R_{6-3}$ or $R_{6-11}$. When n=4, the compound of formula (6-3) represents a tetramer formed via $G_1$, $R_{6-1}$, $R_{6-2}$, $R_{6-3}$ or $R_{6-11}$.)

Hereinafter, the general formula (6-3) will be described in more detail.

In the general formula (6-3), examples of the substituents of $R_{6-3}$, $R_{6-1}$, $R_{6-2}$ and $R_{6-11}$ are the same as those recited for $R_{6-3}$, $R_{6-1}$, $R_{6-2}$ and $R_{6-11}$ in the general formula (6-1). The same also applies to preferred examples thereof.

$G_1$ represents a non-metal atomic group necessary for forming a 5- or 6-membered ring with a carbon atom and a nitrogen atom. Examples of the 5- or 6-membered heterocyclic group formed together with a carbon atom and a nitrogen atom, represented by $G_1$, include an imidazolyl group, a pyrazolyl group, a thiazolyl group, an isothiazolyl group, a thiadiazolyl group, an oxazolyl group, an isoxazolyl group, an oxadiazolyl group, a pyridyl group, a pyrazinyl group, a pyrimidinyl group, a pyridazinyl group, an s-triazinyl group, and the like. Each heterocyclic group may be further a condensed ring and may have a substituent. Examples of such a substituent are the same as those recited for Z, Y, G and W in the general formulae (I-1) to (I-9).

In the general formula (6-3), n preferably represents 1 or 2, and most preferably 1.

With respect to a preferred combination of the substituents in the pigment of the present invention represented by the general formula (6-3), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

The azo pigment represented by the general formula (1), (6-1) or (6-3) is preferably an azo pigment represented by the following general formula (6-4).

[Chem. 96]

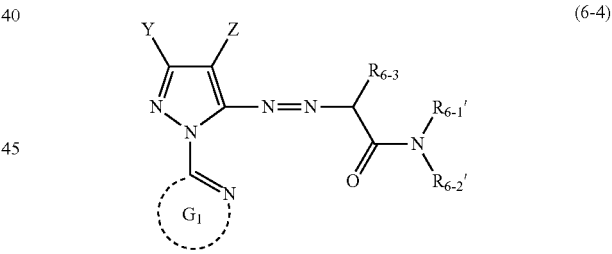

(6-4)

(In the general formula (6-4), $G_1$ represents a non-metal atomic group necessary for forming a 5- or 6-membered ring with a carbon atom and a nitrogen atom, and the heterocyclic ring may be an aromatic group or a condensed ring. Z and Y each independently represents a hydrogen atom or a substituent. $R_{6-3}$ represents a heterocyclic group, and $R_{6-1}'$ and $R_{6-2}'$ each independently represents a hydrogen atom, an alkyl group, an aryl group or a heterocyclic group.)

Hereinafter, the general formula (6-4) will be described in more detail.

$R_{6-1}'$, $R_{6-2}'$, $G_1$, $R_{6-3}$, Z and Y will be described in more detail.

Examples of the substituents of $R_{6-3}$, $R_{6-1}'$ and $R_{6-2}'$ are the same as those recited for $R_{6-3}$, $R_{6-1}'$ and $R_{6-2}'$ in the general formula (6-1). The same also applies to preferred examples thereof.

Examples of $G_1$ are the same as those recited for $G_1$ in the general formula (6-3). The same also applies to preferred examples thereof.

Examples of the substituents of Z and Y are the same as those recited for Z and Y in the general formulae (I-1) to (I-9). The same also applies to preferred examples thereof.

With respect to a preferred combination of the substituents in the pigment of the present invention represented by the general formula (6-4), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

The azo pigment represented by the general formula (6-1) or (6-3) is particularly preferably an azo pigment represented by the following general formula (6-5).

[Chem. 97]

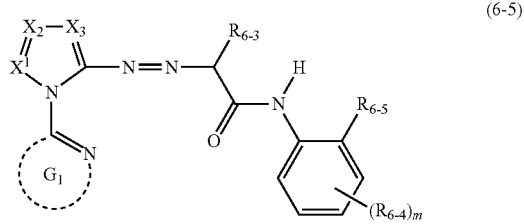

(6-5)

(In the general formula (6-5), $G_1$ represents a non-metal atomic group necessary for forming a 5- or 6-membered ring group with a carbon atom and a nitrogen atom, and the heterocyclic ring may be an aromatic ring or a condensed ring.

ethyl group, a nitro group, a cyano group or a heterocyclic group. When m represents 2 or more, each $R_{6-4}$ may be the same as or different from every other $R_{6-4}$. $R_{6-5}$ preferably represents a substituent which can form a 5- or 6-membered ring via an intramolecular hydrogen bond with a hydrogen atom of the acylamino group corresponding to the ortho position of $R_{6-5}$. Examples of such a substituent include a methoxy group, a methoxycarbonyl group, a carbamoyl group, a sulfamoyl group, a nitro group, and the like.

With respect to a preferred combination of the substituents in the pigment of the present invention represented by the general formula (6-5), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

The present invention also includes in its scope tautomers of the azo pigments represented by the general formulae (6-1) and (6-3) to (6-5). Although the general formulae (6-1) and (6-3) to (6-5) are shown in the form of limiting structure among several tautomer forms which are possible in view of chemical structure, the azo pigments may be tautomers of other structures than the ones shown, and may be used as a mixture containing plural tautomers.

For example, with regard to the pigment represented by the general formula (6-1), an azo-hydrazone tautomer represented by the following general formulae (6-1') and (6-1") can be considered.

The present invention also includes in its scope a compound represented by the general formulae (6-1') and (6-1"), which is a tautomer of the azo pigment represented by the general formula (6-1).

[Chem. 98]

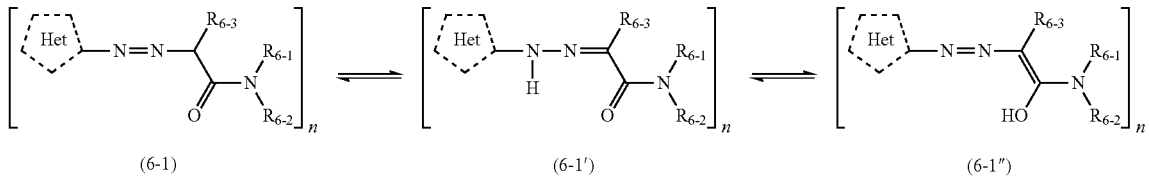

(6-1)        (6-1')        (6-1")

$X_1$, $X_2$ and $X_3$ each independently is interchangeably used with $X_{6-1}$, $X_{6-2}$ and $X_{6-3}$ and represents a nitrogen atom or a —C($R_{6-11}$)= group. $R_{6-11}$ represents a hydrogen atom or a substituent. $R_{6-3}$ represents a heterocyclic group. $R_{6-4}$ and $R_{6-5}$ represents a halogen atom, an alkyl group, an alkoxy group, an alkoxycarbonyl group, a carbamoyl group, an acylamino group, a sulfamoyl group, a trifluoromethyl group, a nitro group, a cyano group or a heterocyclic group. m represents an integer of 0 to 4.)

Hereinafter, the general formula (6-5) will be described in more detail.

$G_1$, $X_{6-1}$, $X_{6-2}$, $X_{6-3}$, $R_{6-3}$, $R_{6-4}$ and $R_{6-5}$ will be described in more detail.

Examples of $G_1$, $X_{6-1}$, $X_{6-2}$ and $X_{6-3}$ are the same as those recited for $G_1$, $X_{6-1}$, $X_{6-2}$ and $X_{6-3}$ in the general formula (6-3). The same also applies to preferred examples thereof.

Examples of the substituent represented by $R_{6-3}$ are the same as those recited for $R_{6-3}$ in the general formula (6-1). The same also applies to preferred examples thereof.

$R_{6-4}$ and $R_{6-5}$ represent a halogen atom, an alkyl group having 1 to 4 carbon atoms, an alkoxy group having 1 to 4 carbon atoms, an alkoxycarbonyl group having 2 to 5 carbon atoms, a carbamoyl group having 1 to 5 carbon atoms, an acylamino group having 2 to 7 carbon atoms, a trifluorom- (In the general formulae (6-1') and (6-1"), Het, $R_{6-1}$, $R_{6-2}$, $R_{6-3}$ and n have the same definitions as in the general formula (6-1).)

The azo pigment represented by the general formulae (6-1) and (6-3) is preferably an azo pigment represented by the following general formula (6-10).

[Chem. 99]

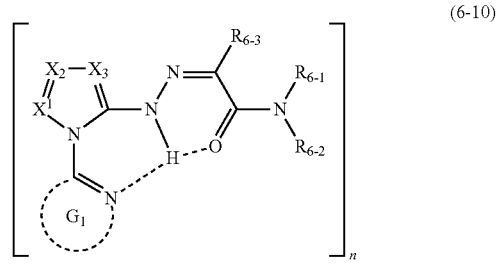

(6-10)

(In the general formula (6-10), $X_1$, $X_2$, $X_3$, $G_1$, $R_{6-1}$, $R_{6-2}$, $R_{6-3}$ and n have the same definitions as $X_1$, $X_2$, $X_3$, $G_1$, $R_{6-1}$, $R_{6-2}$, $R_{6-3}$ and n in the general formula (6-3).)

Many tautomers can be considered for the azo pigments represented by the general formulae (6-1) and (6-3) to (6-5). Of the azo pigments represented by the general formulae (6-1) and (6-3) to (6-5), azo pigments represented by the general formula (6-10) can be illustrated as particularly preferred azo pigments as has been stated hereinbefore.

The reason that such a structure is preferred is that, as is shown by the general formula (6-10), the nitrogen atom(s) constituting the heterocyclic ring contained in the azo pigment structure, hydrogen atom(s), and hetero atom(s) (the oxygen atom of the carbonyl group, or the nitrogen atom of the amino group) readily form at least one intramolecular crosslinking hydrogen bond (intramolecular hydrogen bond). As a result, planarity of the molecule is enhanced, the intramolecular and intermolecular interaction is thus further improved, crystallinity of the azo pigment represented by the general formula (6-10) is enhanced (higher structure of the pigment becoming liable to be formed), and hence performances required as pigments, i.e., light fastness, heat stability, moist heat stability, water resistance, gas resistance, and/or solvent resistance, can be markedly improved, such pigments thus being most preferred.

<Azo Compound>

Further, the present invention relates to an azo compound represented by the general formula (6-4), a tautomer of the azo compound, and a salt or a hydrate thereof.

[Chem. 100]

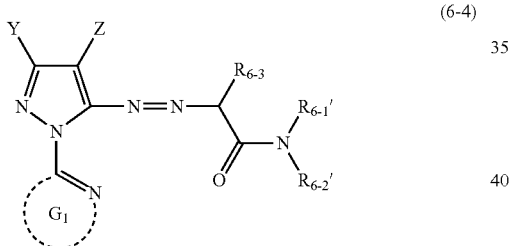

(6-4)

(In the general formula (6-4), $G_1$ represents a non-metal atomic group necessary for forming a 5- or 6-membered ring with a carbon atom and a nitrogen atom, and the heterocyclic group may be an aromatic ring or a condensed ring. Z and Y each independently represents a hydrogen atom or a substituent. $R_{6-3}$ represents a heterocyclic group, and $R_{6-1}'$ and $R_{6-2}'$ each independently represents a hydrogen atom, an alkyl group, an aryl group or a heterocyclic group.)

A salt or hydrate of the azo compound of the present invention represented by the general formula (6-4), and a tautomer thereof may be the same as the azo pigment salt of the present invention, a hydrate and a tautomer thereof.

A novel azo compound of the present invention is useful as an azo pigment.

Specific examples (illustrative azo pigments Pig6-1 to Pig6-46) of the azo pigments and azo compounds represented by the general formulae (6-1), (6-3), (6-4) and (6-5) will be shown below which, however, do not limit azo pigments to be used in the present invention and azo compounds of the present invention. Also, each of the following structures of the specific examples is shown in the limiting structural formula selected from among several tautomers possible in view of chemical structure. However, needless to say, the pigments may be in other tautomer structures than the ones described.

[Chem. 101]

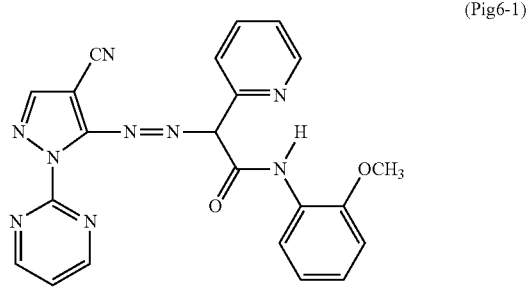

(Pig6-1)

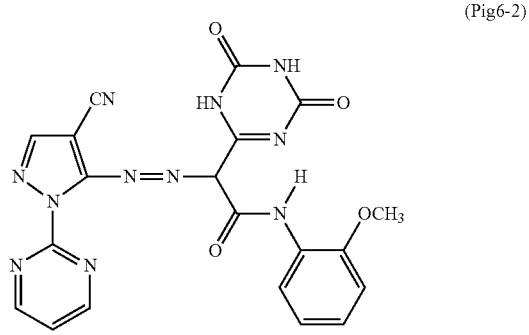

(Pig6-2)

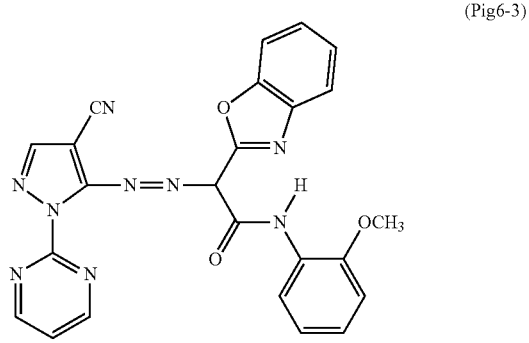

(Pig6-3)

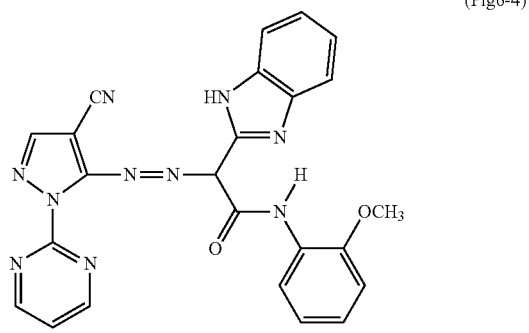

(Pig6-4)

[Chem. 102]
(Pig6-5)
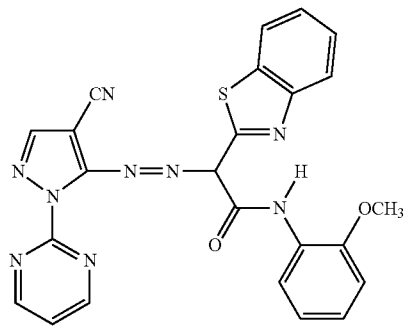
(Pig6-6)
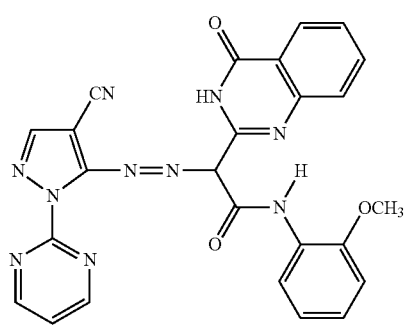
(Pig6-7)
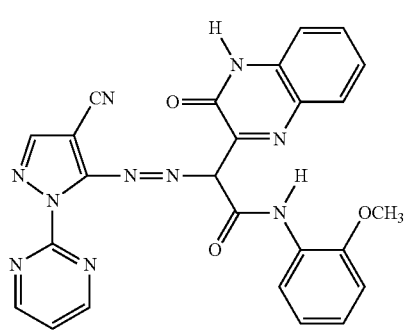
[Chem. 103]
(Pig6-8)
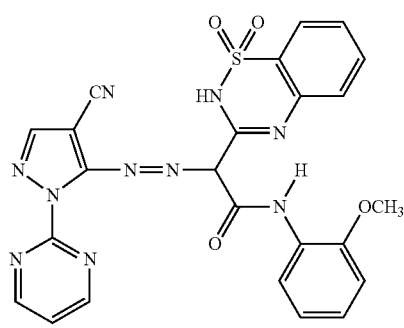
(Pig6-9)
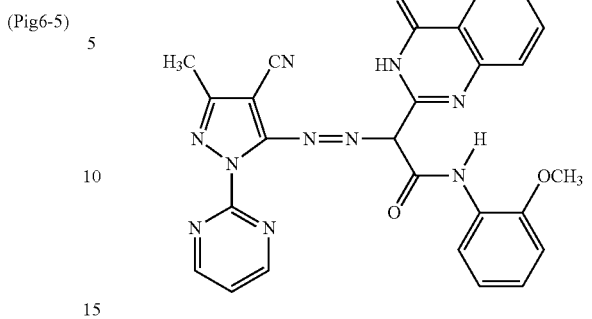
(Pig6-10)
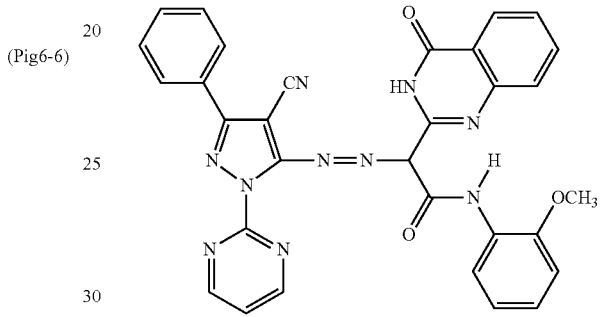
[Chem. 104]
(Pig6-11)
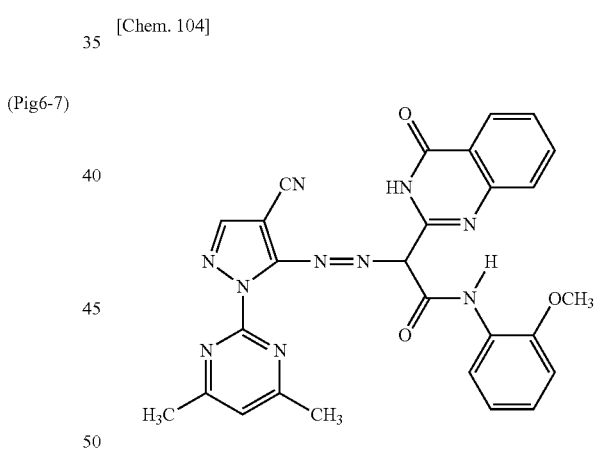
(Pig6-12)
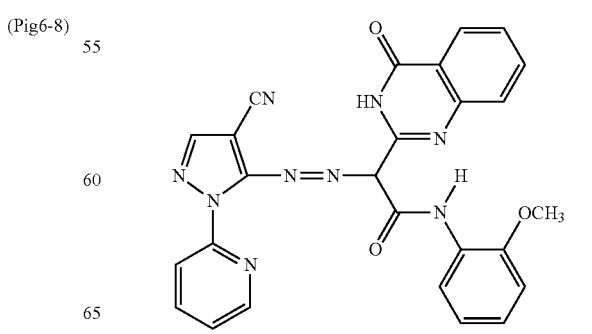

-continued
(Pig6-13)
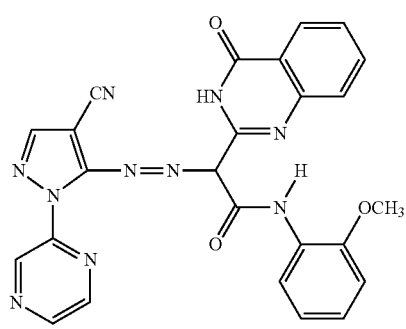
(Pig6-14)
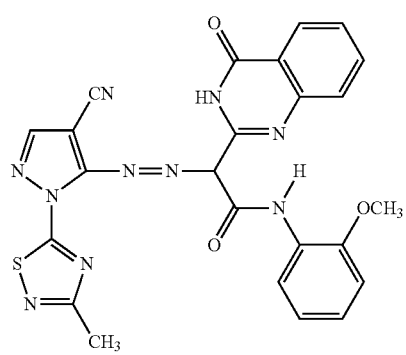
[Chem. 105]
(Pig6-15)
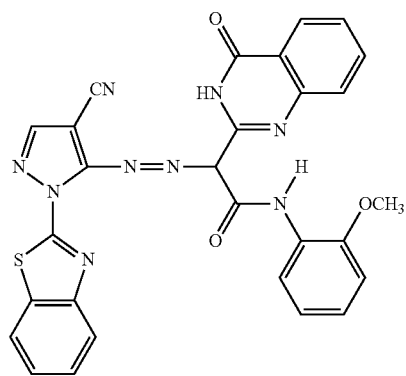
(Pig6-16)
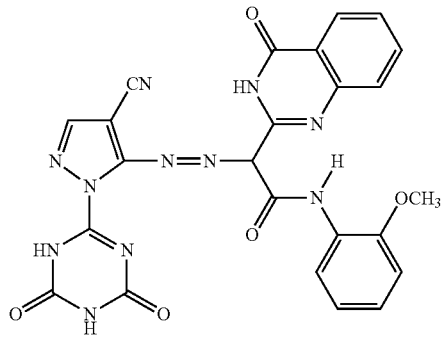
-continued
(Pig6-17)
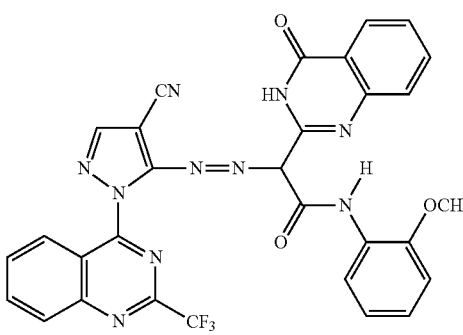
[Chem. 106]
(Pig6-18)
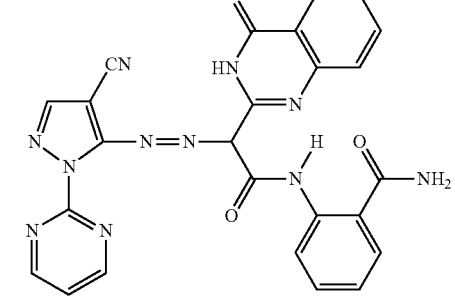
(Pig6-19)
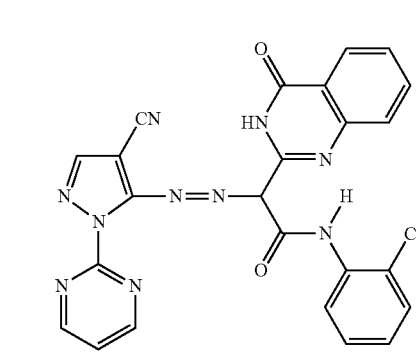
(Pig6-20)
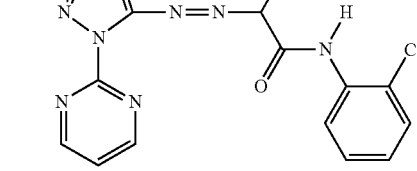

[Chem. 107]
(Pig6-21)
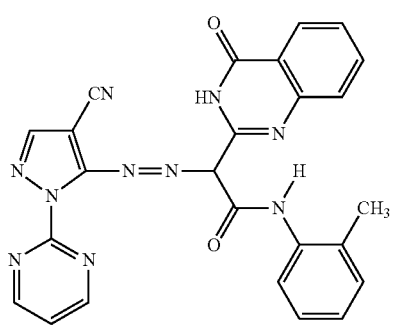
(Pig6-22)
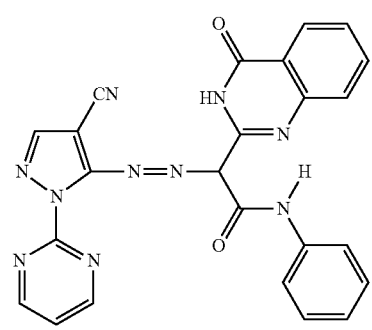
(Pig6-23)
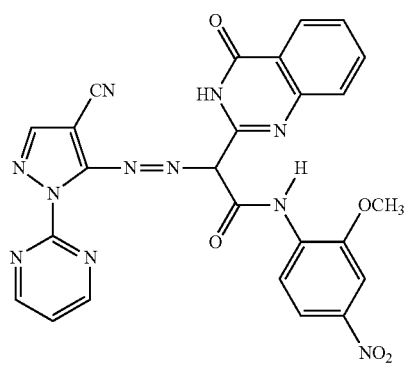
[Chem. 108]
(Pig6-24)
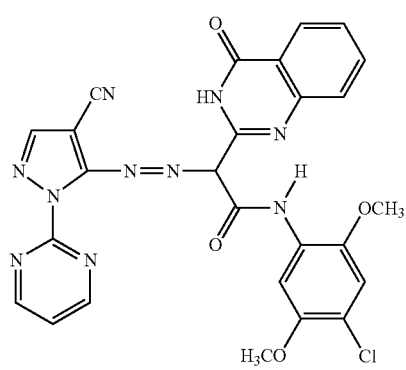
(Pig6-25)
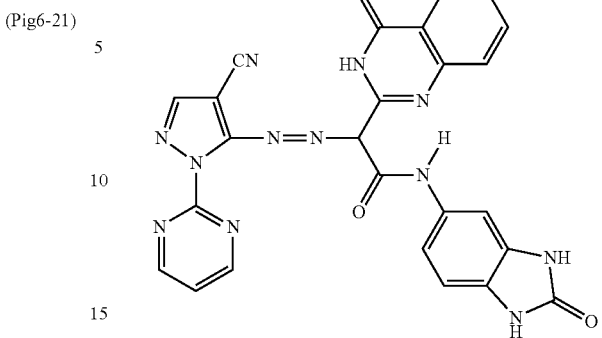
(Pig6-26)
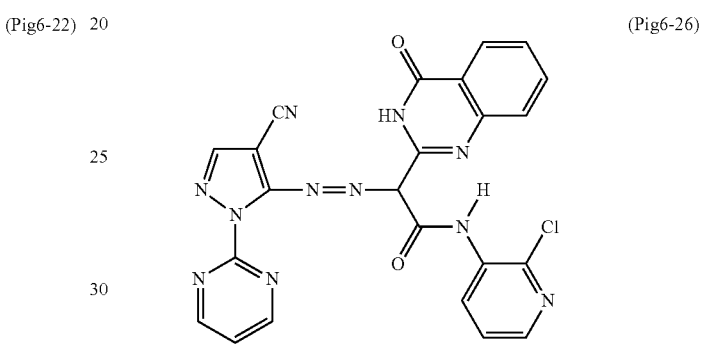
[Chem. 109]
(Pig6-27)
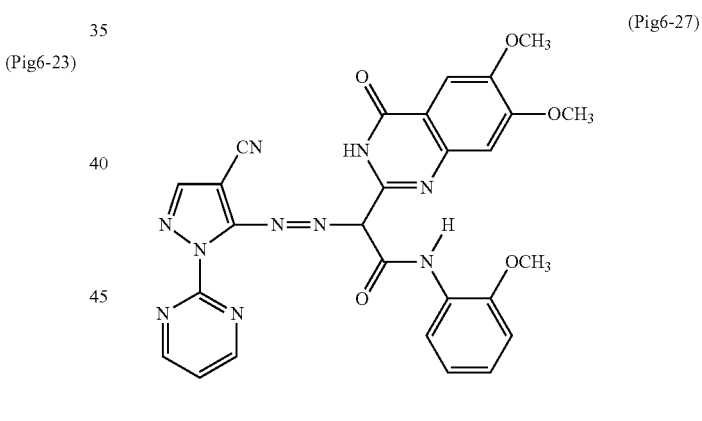
(Pig6-28)
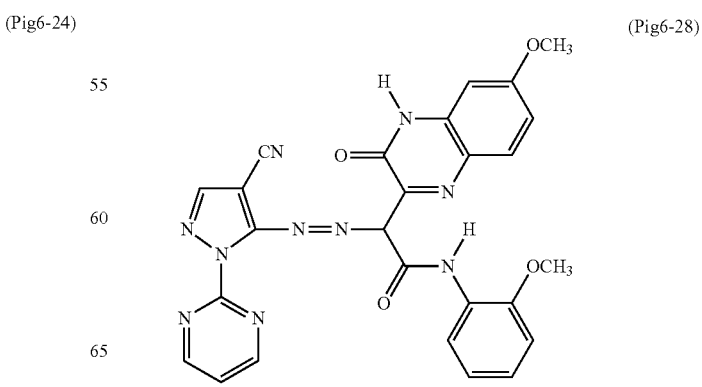

-continued
(Pig6-29)
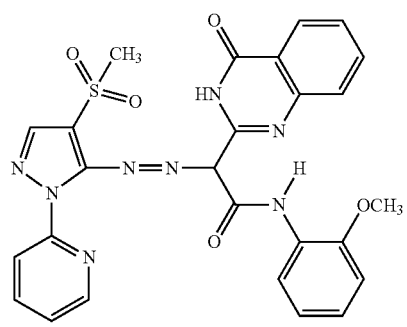
[Chem. 110]
(Pig6-30)
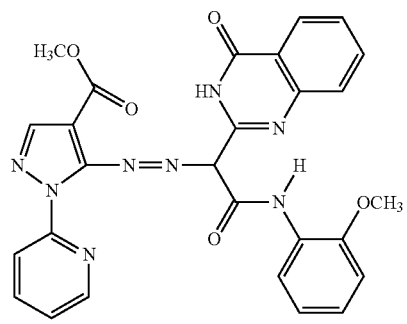
(Pig6-31)
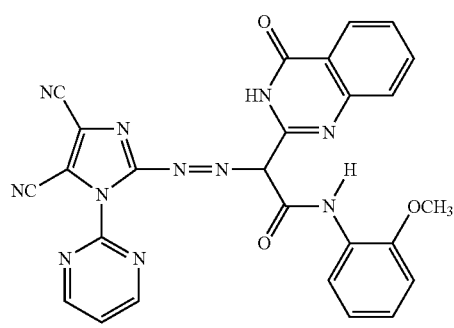
(Pig6-32)
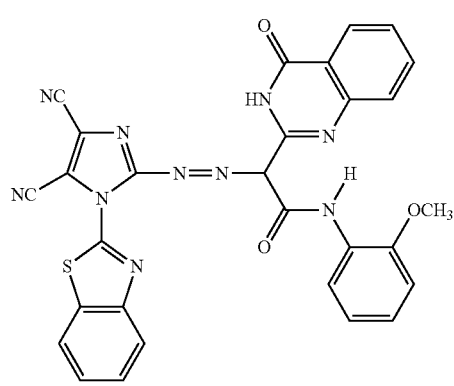
-continued
(Pig6-33)
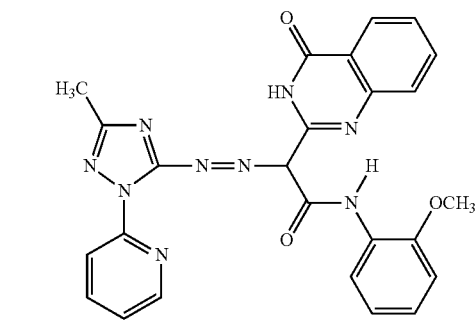
[Chem. 111]
(Pig6-34)
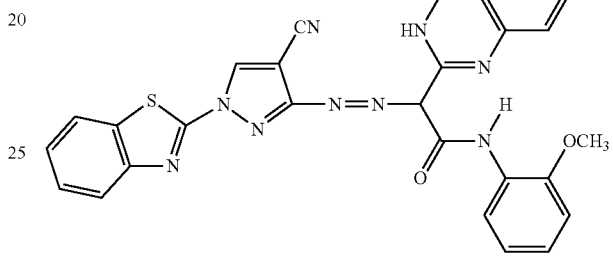
(Pig6-35)
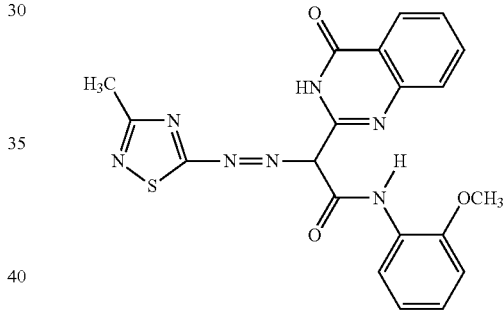
(Pig6-36)
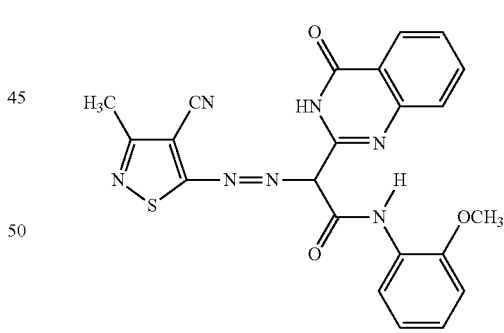
(Pig6-37)
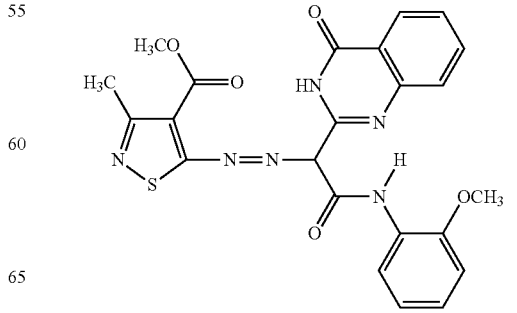

[Chem. 112]
(Pig6-38)
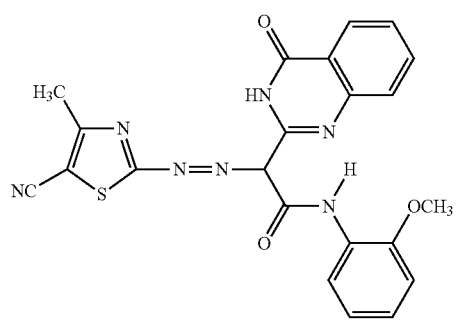
(Pig6-41)
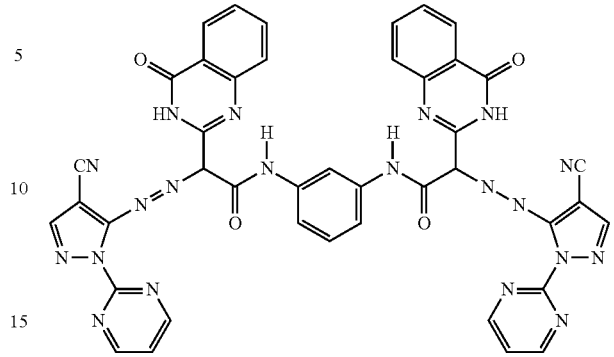
(Pig6-39)
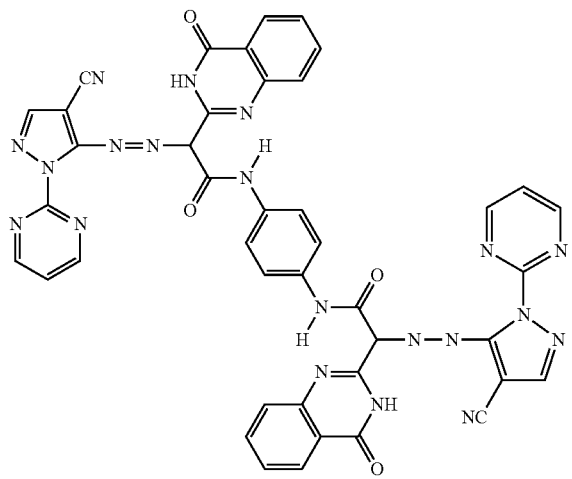
(Pig6-42)
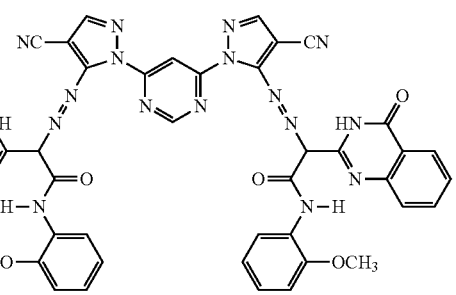
[Chem. 114]
(Pig6-43)
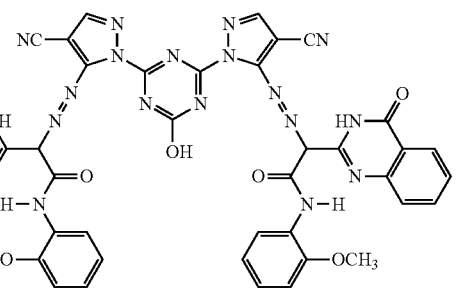
[Chem. 113]
(Pig6-40)
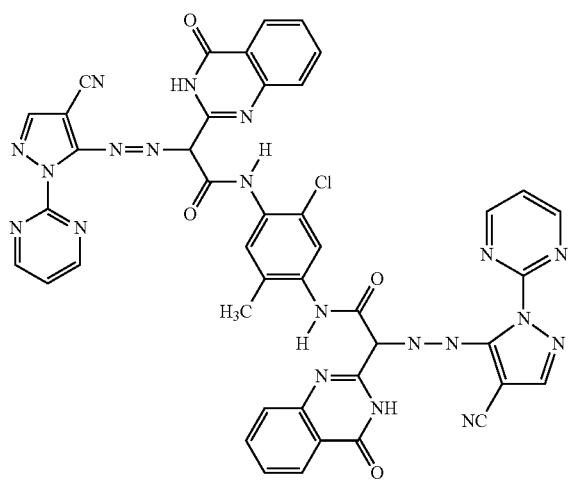
(Pig6-44)
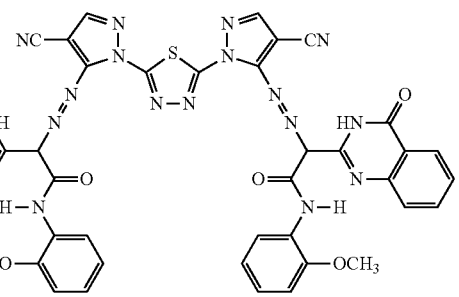

-continued (Pig6-45)

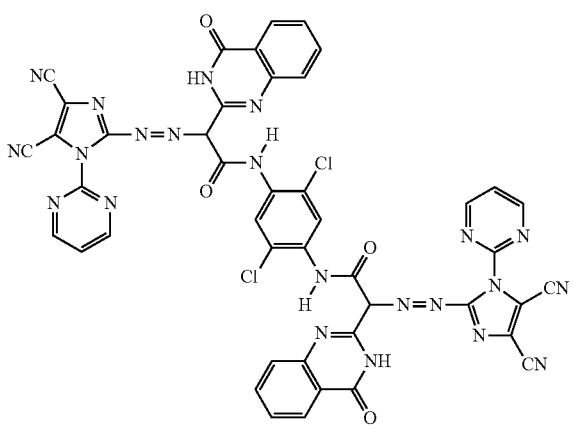

[Chem. 115]

(Pig6-46)

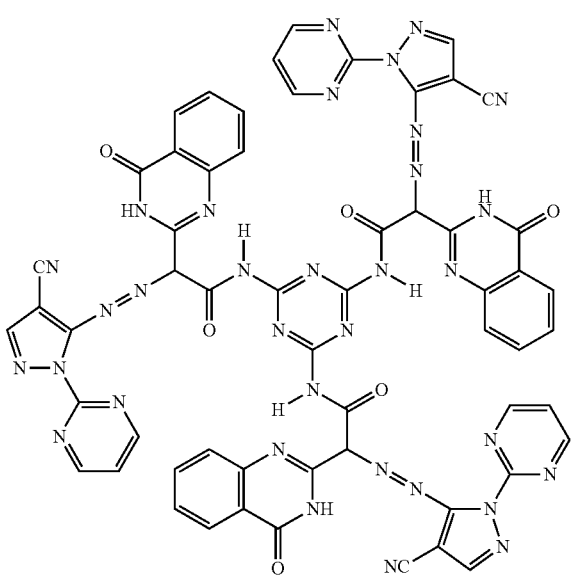

The azo pigment represented by the general formula (1) is preferably an azo pigment represented by the following general formula (7-1).

Hereinafter, an azo pigment represented by the general formula (7-1) will be described in more detail.

[Chem. 116]

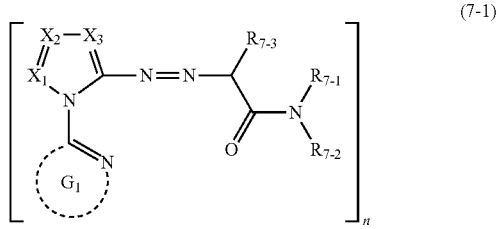

(7-1)

(In the general formula (7-1), $G_1$ represents an atomic group that forms a 5- or 6-membered heterocyclic ring which may be a condensed ring. $X_1$, $X_2$ and $X_3$ each independently is interchangeably used with $X_{7-1}$, $X_{7-2}$ and $X_{7-3}$ and represents a nitrogen atom or a —C($R_{7-11}$)= group. $R_{7-11}$ represents a hydrogen atom or a substituent. $R_{7-1}$ and $R_{7-2}$ each independently represents a hydrogen atom or a substituent. $R_{7-3}$ represents a group represented by —$COR_{7-12}$, —$COOR_{7-13}$ or —$CONR_{7-14}R_{7-15}$. $R_{7-12}$ and $R_{7-13}$ represent an alkyl group, an aryl group or a heterocyclic group. $R_{7-14}$ and $R_{7-15}$ each independently represents a hydrogen atom, an alkyl group, an aryl group or a heterocyclic group. n represents an integer of 1 to 4. When n=2, the compound of formula (7-1) represents a dimer formed via $G_1$, $R_{7-1}$, $R_{7-2}$, $R_{7-3}$ or $R_{7-11}$. When n=3, the compound of formula (7-1) represents a trimer formed via $G_1$, $R_{7-1}$, $R_{7-2}$, $R_{7-3}$ or $R_{7-11}$. When n=4, the compound of formula (7-1) represents a tetramer formed via $G_1$, $R_{7-1}$, $R_{7-2}$, $R_{7-3}$ or $R_{7-11}$.)

Hereinafter, the general formula (7-1) will be described in more detail.

$R_{7-3}$ represents a group represented by —$COR_{7-12}$, —$COOR_{7-13}$ or —$CONR_{7-14}R_{7-15}$. $R_{7-12}$ and $R_{7-13}$ preferably represent, an alkyl group having 1 to 4 carbon atoms which may be substituted, an aryl group having 6 to 12 carbon atoms which may be substituted or a heterocyclic group which may be substituted. $R_{7-14}$ and $R_{7-15}$ each independently preferably represents a hydrogen atom, an alkyl group having 1 to 4 carbon atoms which may be substituted, an aryl group having 6 to 12 carbon atoms which may be substituted or a heterocyclic group which may be substituted.

Still further preferred examples of $R_{7-3}$ include groups represented by —$COR_{7-12}$ or —$CONR_{7-14}R_{7-15}$. In the group represented by —$COR_{7-12}$, $R_{7-12}$ preferably represents an alkyl group having 1 to 4 carbon atoms, and most preferably a methyl group. In the group represented by —$CONR_{7-14}R_{7-15}$, $R_{7-14}$ and $R_{7-15}$ preferably represents a hydrogen atom, an aryl group having 6 to 12 carbon atoms which may be substituted or a heterocyclic group which may be substituted, and most preferably an aryl group having 6 to 12 carbon atoms wherein one of $R_{7-14}$ and $R_{7-15}$ represents a hydrogen atom and the other of $R_{7-14}$ and $R_{7-15}$ may be substituted.

In the general formula (7-1), preferred examples of $R_{7-1}$ and $R_{7-2}$ will be described in more detail.

$R_{7-1}$ and $R_{7-2}$ each independently represents a hydrogen atom or a substituent.

When $R_{7-1}$ and $R_{7-2}$ represent a monovalent substituent, examples of the monovalent substituent include those recited for the general formulae (I-1) to (I-9).

When the azo pigment of the present invention contains an ionic hydrophilic group as a substituent, the azo pigment is preferably a salt with a polyvalent metal cation (for example, magnesium, calcium or barium), and particularly preferably a lake pigment.

$R_{7-1}$ and $R_{7-2}$ preferably represents a hydrogen atom, a halogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, a substituted or unsubstituted alkylsulfonyl group, a substituted or unsubstituted arylsulfonyl group or an acyl group. The particularly preferred substituent is a hydrogen atom, a substituted or unsubstituted aryl group, a substituted or unsubstituted heterocyclic group, a substituted or unsubstituted alkylsulfonyl group, a substituted or unsubstituted arylsulfonyl group or an acyl group. The more particularly preferred substituent is a hydrogen atom, a substituted or unsubstituted aryl group or a substituted or unsubstituted heterocyclic group. Most preferably, either of $R_{7-1}$ and $R_{7-2}$ represents a hydrogen atom.

When $R_{7-1}$ and $R_{7-2}$ represent a divalent group, it is preferable that the divalent group is an alkylene group (for example, methylene, ethylene, propylene, butylene or pentylene), an alkenylene group (for example, ethenylene or propenylene), an alkynylene group (for example, ethynylene or propynylene), an arylene group (for example, phenylene or naphthylene), a divalent heterocyclic group (for example, a 6-chloro-1,3,5-triazine-2,4-diyl group, a pyrimidine-2,4-diyl group, a pyrimidine-4,6-diyl group, a quinoxaline-2,3-diyl group or a pyridazine-3,6-diyl group), —CO—, —NR'— wherein R' represents a hydrogen atom, an alkyl group or an aryl group, —SO₂—, —SO—, or a combination thereof (for example, —NHCH₂CH₂NH—, —NHCONH—, etc.).

Each of the alkylene group, the alkenylene group, the alkynylene group, the arylene group, the divalent heterocyclic group, and the alkyl group or aryl group of R' may have a substituent.

Further preferred are an alkylene group having 10 or fewer carbon atoms, an alkenylene group having 10 or fewer carbon atoms, an alkynylene group having 10 or fewer carbon atoms, an arylene group having from 6 to 10 carbon atoms, and a divalent heterocyclic group.

A total carbon atom number of the divalent linking group is preferably in the range of 0 to 30, and most preferably 0 to 10.

When $R_{7-1}$ and $R_{7-2}$ represent a trivalent group, it is preferable that the trivalent group is a trivalent hydrocarbon group, a trivalent heterocyclic group, >N—, or a combination thereof with a divalent group (for example, >NCH₂CH₂NH—, >NCONH—, etc.).

A total carbon atom number of the trivalent linking group is preferably in the range of 0 to 30, and most preferably 0 to 10.

$G_1$ represents a non-metal atomic group necessary for forming a 5- or 6-membered ring with a carbon atom and a nitrogen atom.

Examples of the 5- or 6-membered heterocyclic group formed together with a carbon atom and a nitrogen atom, represented by $G_1$, include an imidazole ring, a pyrazole ring, a thiazole ring, an isothiazole ring, a thiadiazole ring, an oxazole ring, an isoxazole ring, an oxadiazole ring, a pyridine ring, a pyrazine ring, a pyrimidine ring, a pyridazine ring, an s-triazine ring, and the like. Each heterocyclic group may be further a condensed ring and may have a substituent. Examples of such a substituent are the same as those recited for $R_{7-1}$ and $R_{7-2}$ in the general formula (7-1).

$X_1$, $X_2$ and $X_3$ each independently is interchangeably used with $X_{7-1}$, $X_{7-2}$ and $X_{7-3}$ and represents a nitrogen atom or a —C($R_{7-11}$)= group. $R_{7-11}$ represents a hydrogen atom or a substituent. When two or more of $X_{7-1}$, $X_{7-2}$ and $X_{7-3}$ represent a —C($R_{7-11}$)= group, each $R_{7-11}$ may be the same as or different from every other $R_{7-11}$.

The substituents represented by $R_{7-11}$ are the same as those recited for $R_{7-1}$ and $R_{7-2}$ in the general formula the general formula (7-1).

In the present invention, $X_{7-1}$, $X_{7-2}$ and $X_{7-3}$ together with a carbon atom and a nitrogen atom are described to form a 5-membered heterocyclic ring, a combination of $X_{7-1}$, $X_{7-2}$ and $X_{7-3}$ is preferably represented by any one of the following general formulae (III-1) to (III-5).

[Chem. 117]

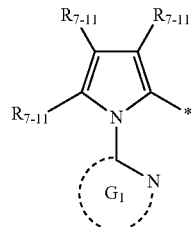

(III-1)

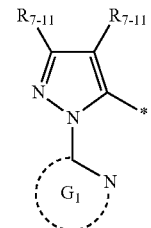

(III-2)

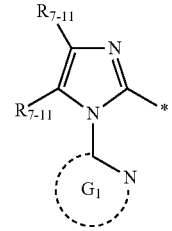

(III-3)

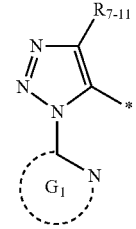

(III-4)

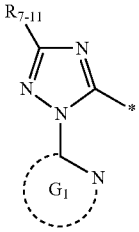

(III-5)

(In the general formulae (III-1) to (III-5), $G_1$ and $R_{7-11}$ have the same definitions as $G_1$ and $R_{7-11}$ in the general formula (7-1), and * represents the binding site to the azo group in the general formula (7-1).)

In the general formulae (III-1) to (III-5), the 5-membered heterocyclic ring is preferably (III-2), (III-3) or (III-5), more preferably (III-2) or (III-5), and most preferably (III-2).

Particularly preferred combinations of the groups in the azo pigments of the present invention represented by the general formula (7-1) contain the following (a) to (e).

(a) $R_{7-3}$ preferably represents a group represented by —COR$_{7-12}$ or —CONR$_{7-14}$R$_{7-15}$, more preferably an aryl group having 6 to 12 carbon atoms when $R_{7-12}$ represents an alkyl group having 1 to 4 carbon atoms or wherein one of $R_{7-14}$ and $R_{7-15}$ represents a hydrogen atom and the other of $R_{7-14}$ and $R_{7-15}$ may be substituted, and most preferably —COCH$_3$ or —CONHPh.
(b) $R_{7-1}$ and $R_{7-2}$ preferably represents a hydrogen atom, a substituted or unsubstituted aryl group, a substituted or unsubstituted heterocyclic group, more preferably an aryl group having 6 to 12 carbon atoms wherein one of $R_{7-1}$ and $R_{7-2}$ represents a hydrogen atom, and the other of $R_{7-1}$ and $R_{7-2}$ may be substituted, and most preferably an aryl group having 6 to 12 carbon atoms which is an o-substituted phenyl group.
(c) $G_1$ preferably represents a thiadiazole ring, a pyridine ring, a pyrimidine ring, a pyrazine ring or an s-triazine ring, and most preferably a pyrimidine ring or an s-triazine ring.
(d) n preferably represents 1 or 2, and most preferably 1.
(e) $X_{7-1}$, $X_{7-2}$ and $X_{7-3}$ preferably represents (III-2), (III-3) or (III-5), more preferably (III-2) or (III-5), and most preferably (III-2), among the general formulae (III-1) to (III-5).

The azo pigment represented by the general formula (7-1) is preferably an azo pigment represented by the following general formula (7-2).

[Chem. 118]

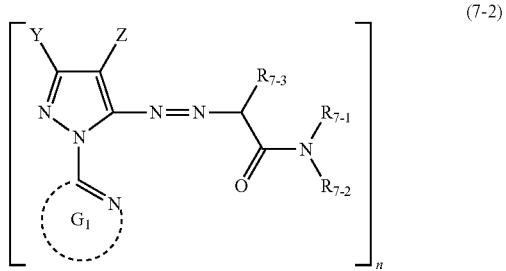

(7-2)

(In the general formula (7-2), $G_1$ represents a non-metal atomic group necessary for forming a 5- or 6-membered ring together with a carbon atom and a nitrogen atom. Z and Y each independently represents a hydrogen atom or a substituent. $R_{7-1}$ and $R_{7-2}$ each independently represents a hydrogen atom or a substituent. $R_{7-3}$ represents a group represented by —COR$_{7-12}$, —COOR$_{7-13}$ or —CONR$_{7-14}$R$_{7-15}$. $R_{7-12}$ and $R_{7-13}$ represent an alkyl group, an aryl group or a heterocyclic group. $R_{7-14}$ and $R_{7-15}$ each independently represents a hydrogen atom, an alkyl group, an aryl group or a heterocyclic group. n represents an integer of 1 to 4. When n=2, the compound of formula (7-2) represents a dimer formed via $G_1$, $R_{7-1}$, $R_{7-2}$, $R_{7-3}$ or $R_{7-11}$. When n=3, the compound of formula (7-2) represents a trimer formed via $G_1$, $R_{7-1}$, $R_{7-2}$, $R_{7-3}$ or $R_{7-41}$. When n=4, the compound of formula (7-2) represents a tetramer formed via $G_1$, $R_{7-1}$, $R_{7-2}$, $R_{7-3}$ or Y.)

Hereinafter, the general formula (7-2) will be described in more detail.

In the general formula (7-2), examples of the substituents of $R_{7-1}$, $R_{7-2}$ and $R_{7-3}$ are the same as those recited for $R_{7-1}$, $R_{7-2}$ and $R_{7-3}$ in the general formula (7-1). The same also applies to preferred examples thereof.

Examples of $G_1$ are the same as those recited for $G_1$ in the general formula (7-1). The same also applies to preferred examples thereof.

In the general formula (7-2), a preferred example of the substituent represented by Z is an electron-withdrawing group, especially having a Hammett's substituent constant σp value of 0.2 or more, and more preferably 0.3 or more. The upper limit of the σp value of the electron-withdrawing group is 1.0 or less.

Specific examples of Z, the electron-withdrawing group having the σp value of 0.2 or more include an acyl group, an acyloxy group, a carbamoyl group, an alkoxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with other electron-withdrawing group(s) having the σp value of 0.2 or more, a heterocyclic group, a halogen atom, an azo group, and a selenocyanate group.

Z preferably represents a cyano group, a carbamoyl group, an alkoxycarbonyl group, a carboxyl group or a sulfonyl group.

In the general formula (7-2), Y each independently preferably represents a hydrogen atom, a substituted or unsubstituted alkyl group having 1 to 4 carbon atoms, a substituted or unsubstituted aryl group having 6 to 18 carbon atoms, or a substituted or unsubstituted heterocyclic group having 4 to 12 carbon atoms, and most preferably a hydrogen atom or a substituted or unsubstituted alkyl group having 1 to 4 carbon atoms.

With respect to a preferred combination of the substituents in the pigment of the present invention represented by the general formula (7-2), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (7-2) contain the following (a) to (e).
(a) $R_{7-3}$ preferably represents a group represented by —COR$_{7-12}$ or —CONR$_{7-14}$R$_{7-15}$, more preferably an aryl group having 6 to 12 carbon atoms when $R_{7-12}$ represents an alkyl group having 1 to 4 carbon atoms or wherein one of $R_{7-14}$ and $R_{7-15}$ represents a hydrogen atom and the other of $R_{7-14}$ and $R_{7-15}$ may be substituted, and most preferably —COCH$_3$ or —CONHPh.
(b) $R_{7-1}$ and $R_{7-2}$ preferably represents a hydrogen atom, a substituted or unsubstituted aryl group, a substituted or unsubstituted heterocyclic group, more preferably an aryl group having 6 to 12 carbon atoms wherein one of $R_{7-1}$ and $R_{7-2}$ represents a hydrogen atom, and the other of $R_{7-1}$ and $R_{7-2}$ may be substituted, and most preferably an aryl group having 6 to 12 carbon atoms which is an o-substituted phenyl group.
(c) $G_1$ preferably represents a thiadiazole ring, a pyridine ring, a pyrimidine ring, a pyrazine ring or an s-triazine ring, and most preferably a pyrimidine ring or an s-triazine ring.
(d) n preferably represents 1 or 2, and most preferably 1.
(e) Y preferably represents a hydrogen atom or a substituted or unsubstituted alkyl group having 1 to 4 carbon atoms, and most preferably a hydrogen atom or a methyl group.
(f) Z represents a cyano group, an alkoxycarbonyl group having 2 to 5 carbon atoms, a carbamoyl group having 1 to 5 carbon atoms, an alkylsulfonyl group having 1 to 4 carbon atoms or a sulfamoyl group having 0 to 4 carbon atoms, more preferably a cyano group, an alkoxycarbonyl group having 2 to 5 carbon atoms or a carbamoyl group having 1 to 5 carbon atoms, and most preferably a cyano group.

The azo pigment represented by the general formula (7-1) is preferably an azo pigment represented by the following general formula (7-3).

Hereinafter, the general formula (7-3) will be described in more detail.

[Chem. 119]

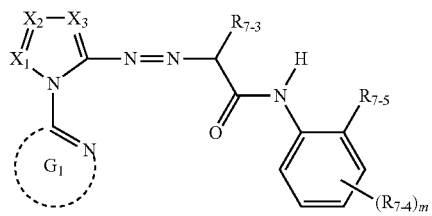

(7-3)

(In the general formula (7-3), $G_1$ represents a non-metal atomic group necessary for forming a 5- or 6-membered ring together with a carbon atom and a nitrogen atom. $X_1$, $X_2$ and $X_3$ each independently is interchangeably used with $X_{7-1}$, $X_{7-2}$ and $X_{7-3}$ and represents a nitrogen atom or a —C($R_{7-11}$)= group. $R_{7-11}$ represents a hydrogen atom or a substituent. $R_{7-3}$ represents a group represented by —COR$_{7-12}$, —COOR$_{7-13}$ or —CONR$_{7-14}$R$_{7-15}$. $R_{7-12}$ and $R_{7-13}$ represents an alkyl group, an aryl group or a heterocyclic group. $R_{7-14}$ and $R_{7-15}$ each independently represents a hydrogen atom, an alkyl group, an aryl group or a heterocyclic group. $R_{7-4}$ and $R_{7-5}$ represents a halogen atom, an alkyl group, an alkoxy group, an alkoxycarbonyl group, a carbamoyl group, an acylamino group, a sulfamoyl group, a trifluoromethyl group, a nitro group, a cyano group or a heterocyclic group. m represents an integer of 0 to 4.)

Hereinafter, $R_{7-3}$, $R_{7-4}$, $R_{7-5}$: $G_1$, $X_{7-1}$, $X_{7-2}$ and $X_{7-3}$ will be described in more detail.

Examples of the substituents of $R_{7-3}$ are the same as those recited for $R_{7-3}$ in the general formula (7-1). The same also applies to preferred examples thereof.

Examples of $G_1$, $X_{7-1}$, $X_{7-2}$ and $X_{7-3}$ are the same as those recited for $G_1$, $X_{7-1}$, $X_{7-2}$ and $X_{7-3}$ in the general formula (7-1). The same also applies to preferred examples thereof.

$R_{7-4}$ and $R_{7-5}$ each independently preferably represents a halogen atom, an alkyl group having 1 to 4 carbon atoms, an alkoxy group having 1 to 4 carbon atoms, an alkoxycarbonyl group having 2 to 5 carbon atoms, a carbamoyl group having 1 to 5 carbon atoms, an acylamino group having 2 to 7 carbon atoms, a trifluoromethyl group, a nitro group, a cyano group or a heterocyclic group.

When m represents 2 or more, each $R_{7-4}$ may be the same as or different from every other $R_{7-4}$.

$R_{7-4}$ preferably represents a halogen atom, an alkyl group having 1 to 4 carbon atoms, an alkoxy group having 1 to 4 carbon atoms, a carbamoyl group having 1 to 5 carbon atoms or a nitro group.

$R_{7-5}$ preferably represents a substituent which can form a 5- or 6-membered ring via an intramolecular hydrogen bond with a hydrogen atom of the acylamino group corresponding to the ortho position of $R_{7-5}$. Examples of $R_{7-5}$ include a methoxy group, a methoxycarbonyl group, an acetyl group, a carbamoyl group, a sulfamoyl group, a nitro group, a 2-pyridyl group, and the like.

With respect to a preferred combination of the substituents in the pigment of the present invention represented by the general formula (7-3), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Particularly preferred combinations of the groups in the azo pigments of the present invention represented by the general formula (7-3) contain the following (a) to (f).

(a) $R_{7-3}$ preferably represents a group represented by —COR$_{7-12}$ or —CONR$_{7-14}$R$_{7-15}$, more preferably an aryl group having 6 to 12 carbon atoms when $R_{7-12}$ represents an alkyl group having 1 to 4 carbon atoms or wherein one of $R_{7-14}$ and $R_{7-15}$ represents a hydrogen atom and the other of $R_{7-14}$ and $R_{7-15}$ may be substituted, and most preferably —COCH$_3$ or —CONHPh.

(b) $R_{7-4}$ preferably represents a halogen atom, an alkyl group having 1 to 4 carbon atoms, an alkoxy group having 1 to 4 carbon atoms, a carbamoyl group having 1 to 5 carbon atoms or a nitro group, and most preferably a chlorine atom, a methyl group, a methoxy group or a carbamoyl group.

(c) $R_{7-5}$ preferably represents an alkoxy group having 1 to 4 carbon atoms, an alkoxycarbonyl group having 2 to 5 carbon atoms, or a carbamoyl group having 1 to 5 carbon atoms, and most preferably a methoxy group, a methoxycarbonyl group or a carbamoyl group.

(d) $G_1$ preferably represents a thiadiazole ring, a pyridine ring, a pyrimidine ring, a pyrazine ring or an s-triazine ring, and most preferably a pyrimidine ring or an s-triazine ring.

(e) m preferably represents 0 or 1, and most preferably 0.

(f) $X_{7-1}$, $X_{7-2}$ and $X_{7-3}$ preferably represents (III-2), (III-3) or (III-5), more preferably (III-2) or (III-5), and most preferably (III-2), among the general formulae (III-1) to (III-5).

Among the azo pigments represented by the general formula (7-1), most preferred is an azo pigment represented by the following general formula (7-5) which is an azo pigment satisfying both the general formulae (7-2) and (7-3).

[Chem. 120]

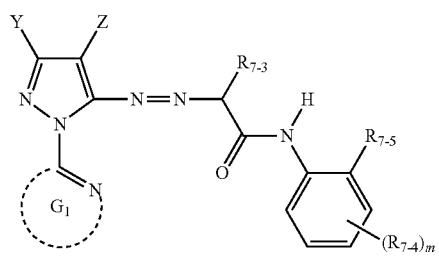

(7-5)

(In the general formula (7-5), Y, Z, $G_1$, $R_{7-3}$, $R_{7-4}$, $R_{7-5}$ and m have the same definitions as Y, Z, $G_1$, $R_{7-3}$, $R_{7-4}$, $R_{7-5}$ and m in the general formulae (7-2) and (7-3).)

The present invention also includes in its scope a tautomer of the azo pigment represented by the general formula (7-1). Although the general formula (7-1) is shown in the form of limiting structure among several tautomer forms which are possible in view of chemical structure, the azo pigments may be tautomers of other structures than the ones shown, and may be used as a mixture containing plural tautomers.

For example, with regard to the pigment represented by the general formula (7-1), an azo-hydrazone tautomer represented by the following general formulae (7-1') and (7-1") can be considered.

The present invention also includes in its scope a compound represented by the general formulae (7-1') and (7-1"), which is a tautomer of the azo pigment represented by the general formula (7-1).

[Chem. 121]

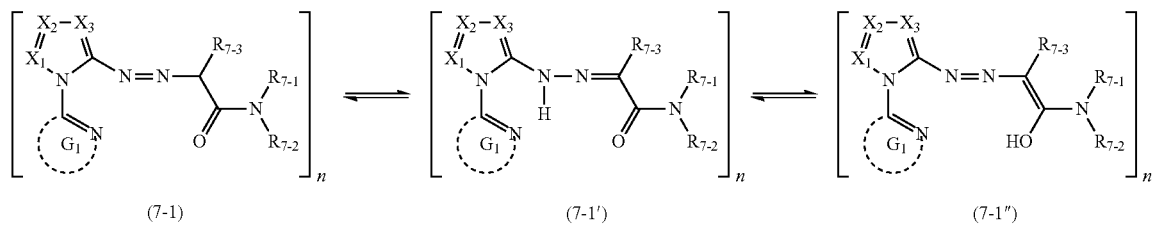

(In the general formulae (7-1') and (7-1"), $X_1$, $X_2$, $X_3$, $G_1$, $R_{7-1}$, $R_{7-2}$, $R_{7-3}$ and n have the same definitions as $X_1$, $X_2$, $X_3$, $G_1$, $R_{7-1}$, $R_{7-2}$, $R_{7-3}$ and n in the general formula (7-1).)

Tautomers of azo-hydrazone can be considered for the azo pigment represented by the general formula (7-1). Of the azo pigment represented by the general formula (7-1), azo pigments represented by the general formula (7-6) can be illustrated as particularly preferred azo pigments.

[Chem. 122]

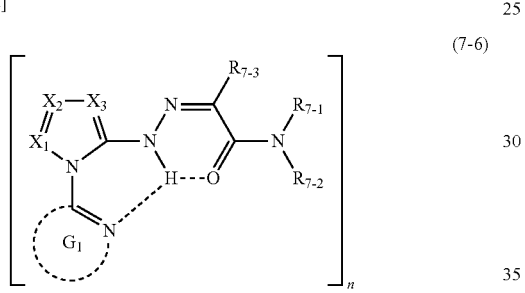

(In the general formula (7-6), $X_1$, $X_2$, $X_3$, $G_1$, $R_{7-1}$, $R_{7-2}$, $R_{7-3}$ and n have the same definitions as $X_1$, $X_2$, $X_3$, $G_1$, $R_{7-1}$, $R_{7-2}$, $R_{7-3}$ and n in the general formula (7-1).)

The reason that such a structure is preferred is that, as is shown by the general formula (7-6), the nitrogen atom(s) constituting the heterocyclic ring contained in the azo pigment structure, hydrogen atom(s), and hetero atom(s) (the oxygen atom of the carbonyl group, or the nitrogen atom of the amino group) readily form at least one intramolecular crosslinking hydrogen bond (intramolecular hydrogen bond). As a result, planarity of the molecule is enhanced, the intramolecular and intermolecular interaction is thus further improved, crystallinity of the azo pigment represented by the general formula (7-1) is enhanced (higher structure of the pigment becoming liable to be formed), and hence performances required as pigments, i.e., light fastness, heat stability, moist heat stability, water resistance, gas resistance, and/or solvent resistance, can be markedly improved, such pigments thus being most preferred.

Specific examples (illustrative azo pigments Pig7-1 to Pig7-35) of the azo pigment represented by the general formula (7-1) will be shown below which, however, do not limit azo pigments to be used in the present invention. Also, each of the following structures of the specific examples is shown in the limiting structural formula selected from among several tautomers possible in view of chemical structure. However, needless to say, the pigments may be in other tautomer structures than the ones described.

[Chem. 123]

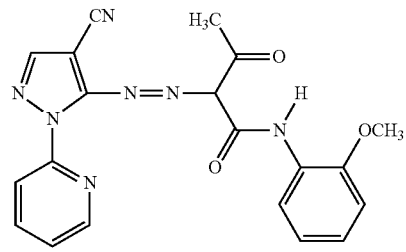

(Pig7-1)

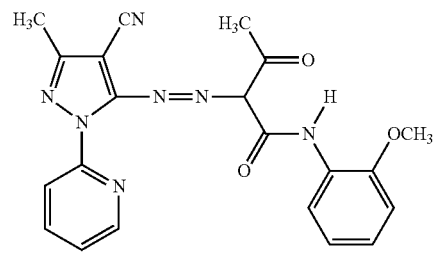

(Pig7-2)

[Chem. 124]

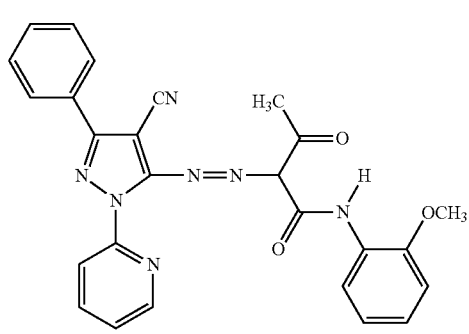

(Pig7-3)

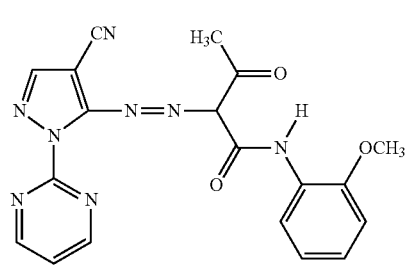

(Pig7-4)

(Pig7-5) 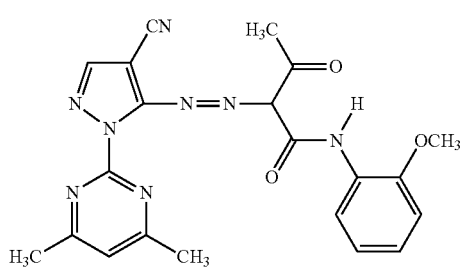
[Chem. 125]
(Pig7-6) 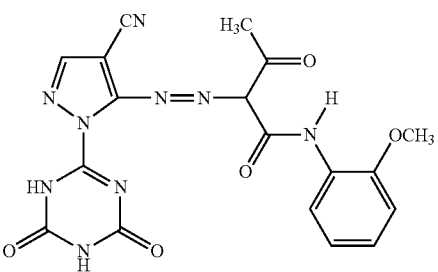
(Pig7-7) 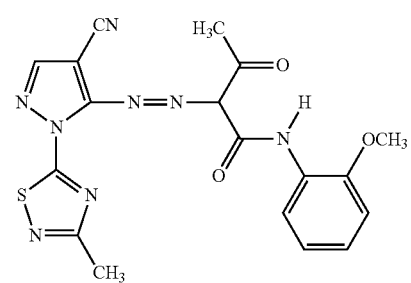
(Pig7-8) 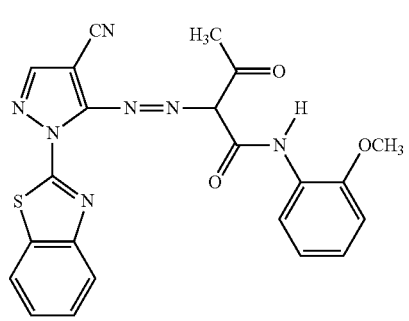
(Pig7-9) 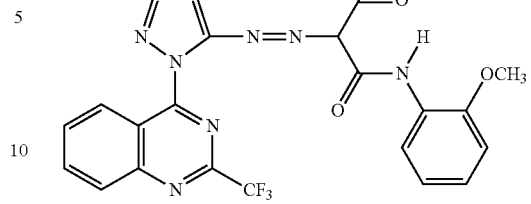
(Pig7-10) 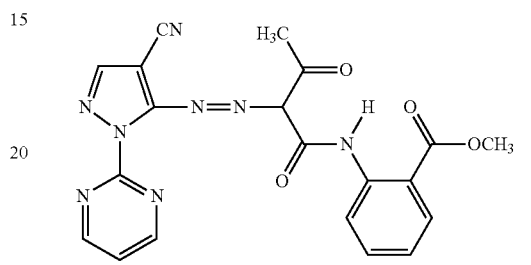
[Chem. 126]
(Pig7-11) 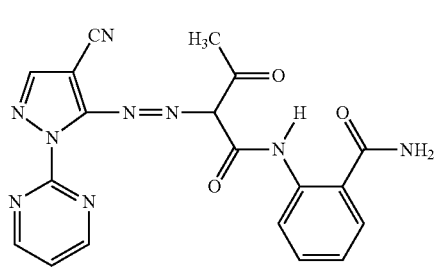
(Pig7-12) 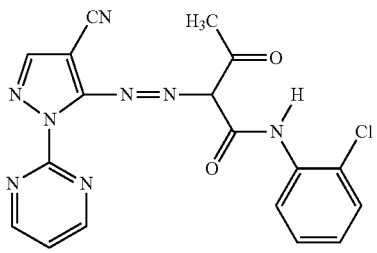
(Pig7-13) 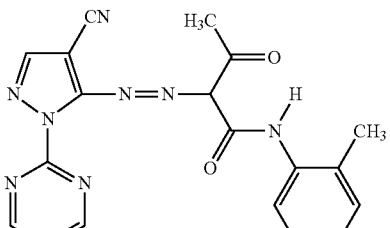
(Pig7-14) 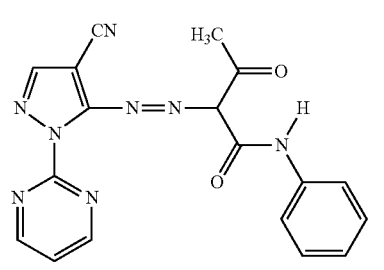
(Pig7-15)

-continued
[Chem. 127]
(Pig7-16)
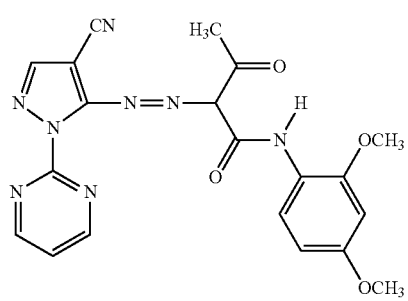
(Pig7-17)
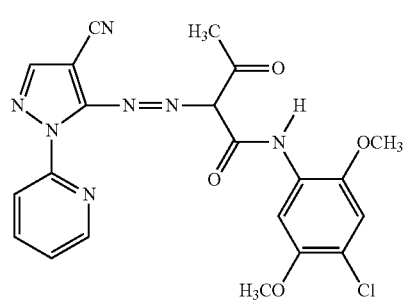
(Pig7-18)
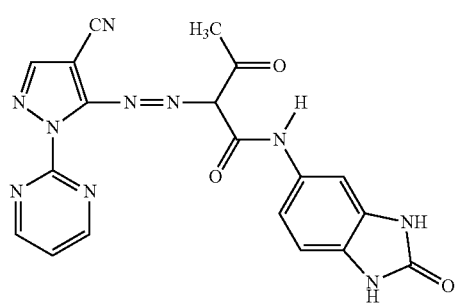
(Pig7-19)
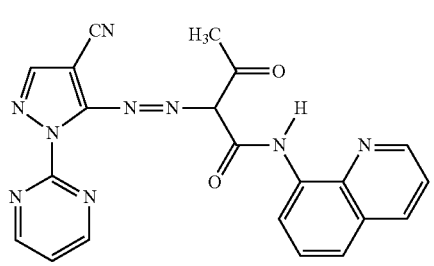
[Chem. 128]
(Pig7-20)
-continued
(Pig7-21)
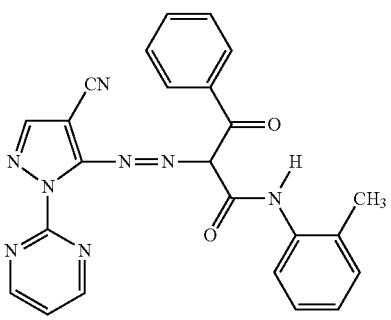
(Pig7-22)
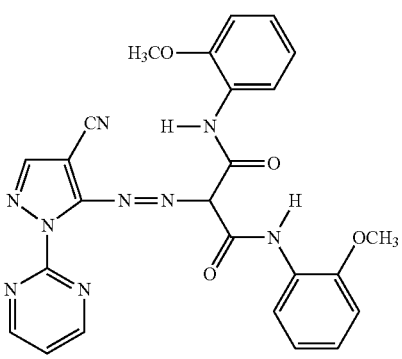
(Pig7-23)
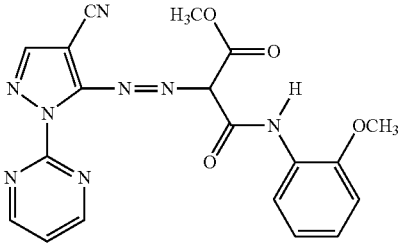
[Chem. 129]
(Pig7-24)
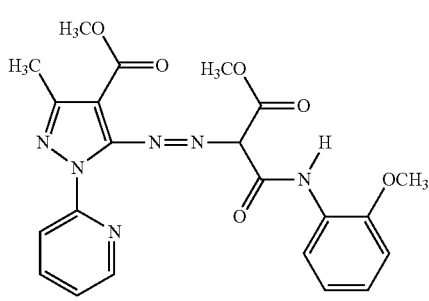
(Pig7-25)
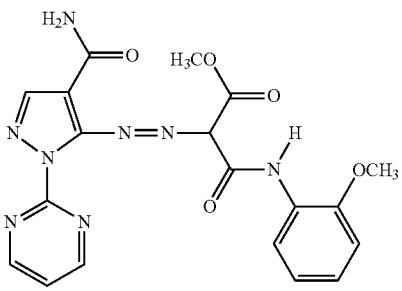

(Pig7-26)
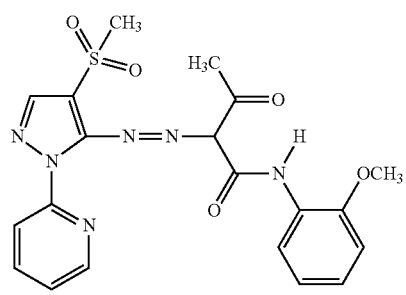
(Pig7-27)
[Chem. 130]
(Pig7-28)
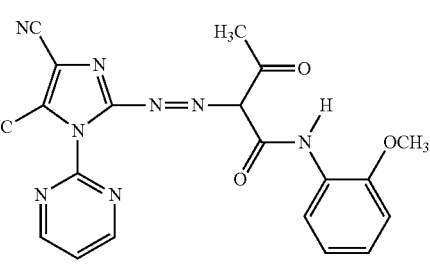
(Pig7-29)
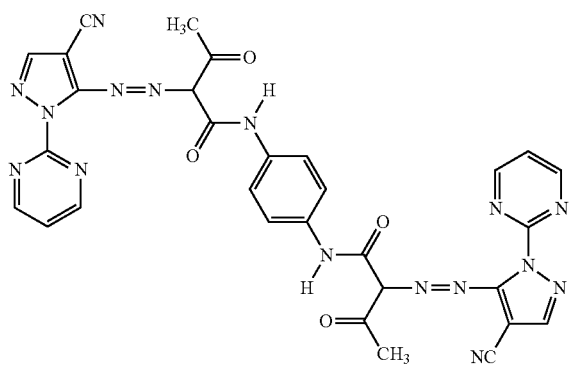
(Pig7-30)
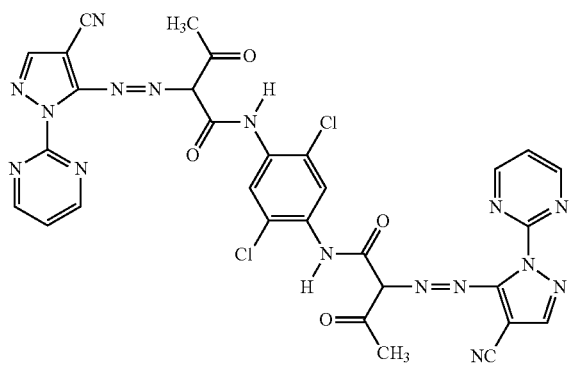
[Chem. 131]
(Pig7-31)
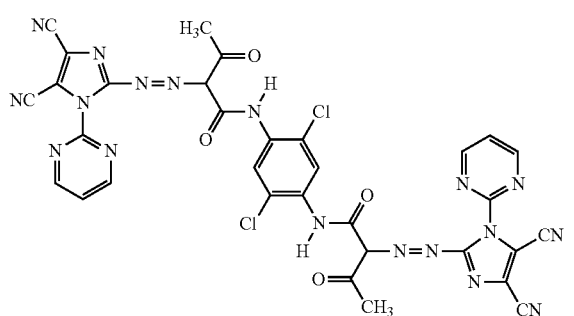
(Pig7-32)
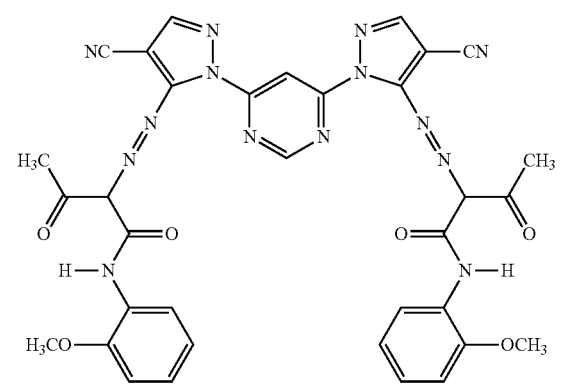
(Pig7-33)
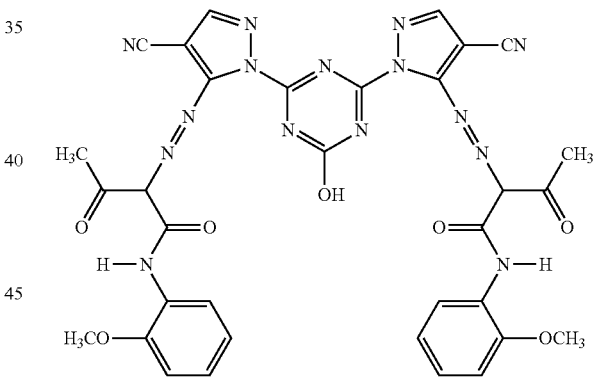
[Chem. 132]
(Pig7-34)
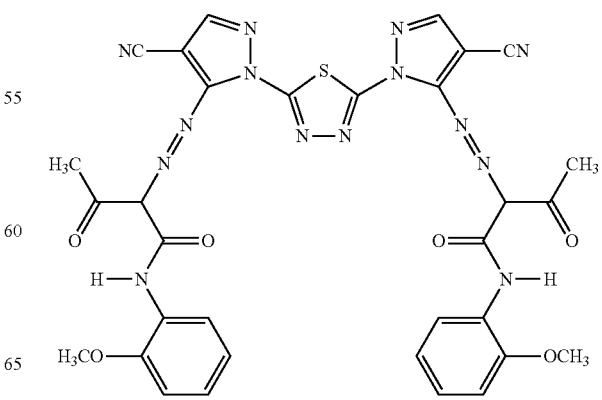

-continued (Pig7-35)

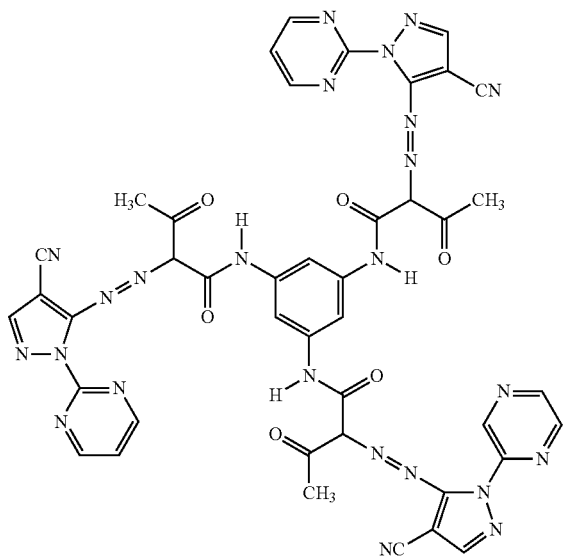

The pigments of the present invention represented by the general formulae (1), (3), (4), (5), (7), (1-1), (2-1), (3-1), (4-1), (5-1), (6-1), and (7-1) may have a chemical structure represented by the general formulae (1), (3), (4), (5), (7), (1-1), (2-1), (3-1), (4-1), (5-1), (6-1), and (7-1) or may be the tautomers thereof, and may be of any crystal form called polymorphic form.

With those which have acid groups among the azo pigments of the present invention represented by the general formulae (1), (3), (4), (5), (7), (1-1), (2-1), (3-1), (4-1), (5-1), (6-1), and (7-1), part or all of the acid groups may be in a salt form, or the pigment may be a mixture of a salt type pigment and a free acid type pigment. Examples of the salt type include salts of an alkali metal such as Na, Li or K, salts of ammonium optionally substituted by an alkyl group or a hydroxyalkyl group, and salts of an organic amine. Examples of the organic amine include a lower alkyl amine, a hydroxyl-substituted lower alkyl amine, a carboxy-substituted lower alkyl amine, a polyamine having 2 to 10 alkyleneimine units containing 2 to 4 carbon atoms, and the like. With these salt type pigments, they are not necessarily limited to one as to kind, but may be in a mixture of two or more thereof.

Further, as to the structure of the pigment to be used in the present invention, in the case where plural acid groups exist in one molecule, the plural acid groups may be of a salt type or an acid type, and may be different from each other.

In the present invention, the azo pigments represented by the general formulae (1), (3), (4), (5), (7), (1-1), (2-1), (3-1), (4-1), (5-1), (6-1), and (7-1) may be hydrates which contain water molecules within the crystal.

Hereinafter, synthesis of the azo pigment of the present invention will be described in more detail.

The azo pigment of the present invention can be synthesized, for example, by subjecting a diazo component, a diazonium salt prepared by a conventional process and a coupling component to azo coupling reaction.

The preparation of a diazonium salt and the coupling reaction can be carried out by a conventional process.

The preparation of the diazonium salt can be carried by applying a usual diazonium salt adjusting process using a nitrosonium ion source, for example nitrous acid, nitrite or nitrosylsulfuric acid, for example, in a reaction medium containing an acid (for example, hydrochloric acid, sulfuric acid, phosphoric acid, acetic acid, propionic acid, methanesulfonic acid, trifluoromethanesulfonic acid, etc.).

Examples of a more preferred acid include acetic acid, propionic acid, methanesulfonic acid, phosphoric acid, sulfuric acid and a combination thereof. Particularly preferred is phosphoric acid or a combination of acetic acid and sulfuric acid.

The reaction medium (solvent) is preferably an organic or inorganic acid, more preferably phosphoric acid, sulfuric acid, acetic acid, propionic acid or methanesulfonic acid, and still more preferably acetic acid and/or propionic acid.

As a preferred nitrosonium ion source, nitrosylsulfuric acid is used in the above-stated preferred acid-containing reaction medium for stable and efficient preparation of a diazonium salt.

The amount of the solvent to be used is preferably a 0.5 to 50-fold amount by mass, more preferably a 1 to 20-fold amount by mass, and particularly preferably a 3 to 10-fold amount by mass, based on the diazo component.

In the present invention, the diazo component may be a dispersion thereof in the solvent, or depending on the type of diazo components, may be a solution thereof.

The amount of the nitrosonium ion source to be used is preferably in the range of 0.95 to 5.0 equivalents, more preferably 1.00 to 3.00 equivalents, and particularly preferably 1.00 to 1.10 equivalents, based on the diazo component.

The reaction temperature is preferably in the range of −15° C. to 30° C., more preferably −10° C. to 10° C., and more preferably −5° C. to 5° C. If the reaction temperature is lower than −10° C., the reaction rate is significantly low and the time necessary for synthesis is therefore significantly prolonged, thus not being economical. On the other hand, if the synthesis is carried out at a high temperature exceeding 30° C., production of by-products is increased, thus being undesirable.

The reaction time is preferably in the range of from 30 minutes to 300 minutes, more preferably from 30 minutes to 200 minutes, and still more preferably from 30 minutes to 150 minutes.

Although the coupling reaction may be carried out in an acidic to alkaline reaction medium, the coupling reaction for the azo pigment of the present invention is preferably carried out in an acidic to neutral reaction medium, particularly in an acidic reaction medium which can provide efficient conversion into an azo pigment due to decomposition of a diazonium salt being inhibited.

Although preferred examples of the reaction medium (solvent) that can be used herein include an organic acid, an inorganic acid, and an organic solvent, particularly preferred is an organic solvent. Specifically, a solvent is preferable which does not cause liquid separation during the reaction, and exhibits a uniform solution with the solvent. Examples of such a solvent include alcoholic organic solvents such as methanol, ethanol, propanol, isopropanol, butanol, t-butyl alcohol, and amyl alcohol, ketone organic solvents such as acetone, and methyl ethyl ketone, diol organic solvents such as ethylene glycol, diethylene glycol, triethylene glycol, propylene glycol, dipropylene glycol, and 1,3-propanediol, ether organic solvents such as ethylene glycol monomethyl ether, ethylene glycol monoethyl ether, and ethylene glycol diethyl ether, tetrahydrofuran, dioxane, acetonitrile, and the like. These solvents may be used alone or as a mixture of two or more thereof.

The reaction medium is preferably an organic solvent having a polarity parameter (ET) of 40 or more. More preferred is a glycol solvent having two or more hydroxyl groups in the solvent molecule, or an alcohol solvent having 3 or fewer carbon atoms, preferably an alcohol solvent having 2 or fewer carbon atoms (for example, methanol or ethylene glycol). In addition, a mixed solvent thereof can also be used.

The amount of the solvent to be used is preferably a 1 to 100-fold amount by mass, more preferably a 1 to 50-fold amount by mass, and still more preferably a 2 to 10-fold amount by mass, based on the coupling component.

In the present invention, the coupling component may be a dispersion thereof in the solvent, or depending on the type of coupling components, may be a solution thereof.

With regard to the amount of the coupling component to be used, the diazo component per azo coupling site is preferably in the range of 0.95 to 5.0 equivalents, more preferably 1.00 to 3.00 equivalents, and particularly preferably 1.00 to 1.50 equivalents.

The reaction temperature is preferably in the range of −30° C. to 30° C., more preferably −15° C. to 10° C., and more preferably −10° C. to 5° C. If the reaction temperature is lower than −30° C., the reaction rate is significantly low and the time necessary for synthesis is therefore significantly prolonged, thus not being economical. On the other hand, if the synthesis is carried out at a high temperature exceeding 30° C., production of by-products is increased, thus being undesirable.

The reaction time is preferably in the range of from 30 minutes to 300 minutes, more preferably from 30 minutes to 200 minutes, and still more preferably from 30 minutes to 150 minutes.

In the synthesis process of the azo pigment of the present invention, the product (crude azo pigment) obtained by such a reaction may be provided with or without purification after treatment by a conventional post-treatment process of the organic synthesis reaction.

That is, for example, the product isolated from the reaction system may be provided without purification, or may be provided after subjecting to purification by recrystallization, salt formation, or a combination thereof.

Alternatively, the reaction product may be provided with or without removal of the reaction solvent by distillation after completion of the reaction, with or without neutralization in water or ice, or without purification of the isolated product or the extract from an organic solvent/aqueous solution or after subjecting it to recrystallization, crystallization, salt formation or a combination thereof.

A process for synthesizing the azo pigment of the present invention will be described in more detail.

The process for producing the azo pigment of the present invention includes the coupling reaction of a heterocyclic amine with a diazotized diazonium compound and a coupling component (for example, H-A where a portion with the exclusion of a heteryl azo group from >C—N=N-A in the general formula 1 is transferred to a hydrogen atom).

The diazotization reaction of the heterocyclic amine can be carried out, for example, by reacting it with a reagent such as sodium nitrite or nitrosylsulfuric acid in an acidic solvent such as sulfuric acid, phosphoric acid or acetic acid, at a temperature of 15° C. or lower for about 10 minutes to about 6 hours. The coupling reaction is preferably carried out by reacting the diazonium salt obtained by the above-stated process with the coupler component represented by H-A at 40° C. or lower, preferably 15° C. or lower, for about 10 minutes to about 12 hours.

Tautomeric forms and/or polymorphic forms can be controlled under the production conditions as in the coupling reaction.

Next, an example of a process for producing the azo pigment represented by the general formula (1-1) will be described below. For example, a heterocyclic amine represented by the following general formula (A) is diazotized under non-aqueous acidic conditions, then subjected to a coupling reaction with a compound represented by the following general formula (1-5) under acidic conditions, and subjected to a post-treatment in a conventional manner to thereby produce the azo pigment represented by the general formula (1-1).

[Chem.133]

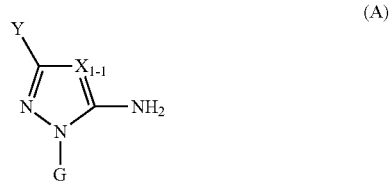

(A)

(In the formula, G, Y and $X_{1-1}$ have the same definitions as in the general formula (1-1).)

[Chem. 134]

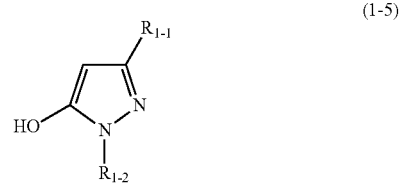

(1-5)

(In the formula, $R_{1-1}$ and $R_{1-2}$ have the same definitions as in the general formula Hereinafter, the reaction scheme will be illustrated.

[Chem. 135]

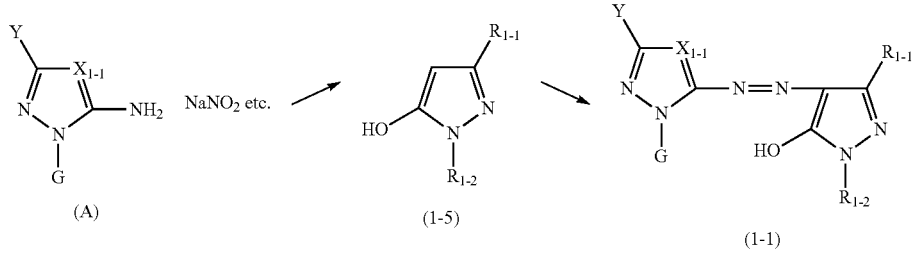

(In the formula, G, Y, $R_{1-1}$, $R_{1-2}$ and $X_{1-1}$ have the same definitions as in the general formula (1-1).)

The heterocyclic amine represented by the general formula (A) is commercially available, or can be generally produced by a known conventional process, for example, described in Japanese Patent No. 4022271. The heterocyclic coupler represented by the general formula (1-5) can be produced by a process described in Shin Jikken Kagaku koza (New Experimental Chemistry Course), Vol. 14-IV, p. 2154 (1978) or a similar process. The diazotization reaction of the heterocyclic amine represented by the general formula (1-4) can be carried out, for example, by reacting it with a reagent such as sodium nitrite, nitrosylsulfuric acid or isoamyl nitrite in an acidic solvent such as sulfuric acid, phosphoric acid or acetic acid at a temperature of 15° C. or lower for about 10 minutes to about 6 hours. The coupling reaction is preferably conducted by reacting the diazonium salt obtained by the above-stated process with the compound represented by the general formula (1-5) at 40° C. or lower, preferably 25° C. or lower, for about 10 minutes to about 12 hours.

When n in the general formulae (1-1) and (1-2) is 2 or more, the synthesis process may be carried out analogously to the above-stated scheme, by synthesizing a raw material with the introduction of a replaceable divalent or trivalent substituent, with regard to $R_{1-1}$, $R_{1-2}$, G, Y, $X_{1-1}$ and the like in the general formula (A) or (1-5).

The reaction product may form precipitated crystals but, in general, water or an alcoholic solvent is added to the reaction solution to thereby precipitate crystals, and the precipitated crystals can be collected by filtration. Also, an alcoholic solvent, water, or the like may be added to the reaction solution to thereby precipitate crystals, and the precipitated crystals can be collected by filtration. The crystals thus collected by filtration are washed and dried, if necessary, to obtain the azo pigment represented by the general formula (1-1).

Next, an example of a process for producing the azo pigment and the azo compound represented by the general formulae (2-1) and (2-2) will be described below. For example, a heterocyclic amine represented by the general formula (A) is diazotized under non-aqueous acidic conditions, then subjected to a coupling reaction with a compound represented by the following general formula (2-5) under acidic conditions, and subjected to a post-treatment in a conventional manner to thereby produce the azo pigment and the azo compound represented by the general formulae (2-1) and (2-2).

[Chem. 136]

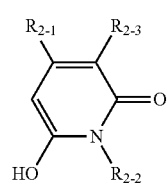

(2-5)

(In the formula, $R_{2-1}$, $R_{2-2}$ and $R_{2-3}$ have the same definitions as in the general formula (2-1).)

Hereinafter, the reaction scheme will be illustrated.

[Chem. 137]

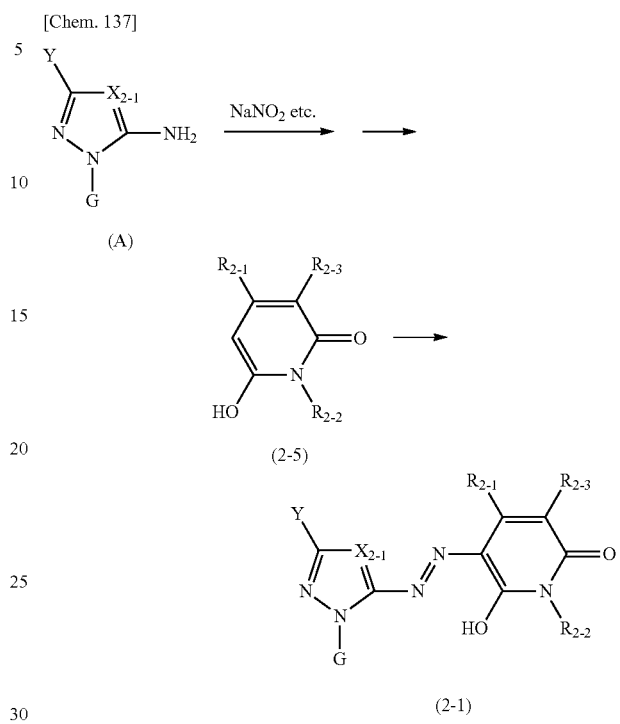

(In the formula, G, Y, $X_{2-1}$, $R_{2-1}$, $R_{2-2}$ and $R_{2-3}$ have the same definitions as in the general formula (2-1).)

The heterocyclic coupler represented by the general formula (2-5) can be produced by a process described in JP-A-2007-308636 or the like or a similar process. The diazotization reaction of the heterocyclic amine represented by the above reaction scheme can be carried out, for example, by reacting it with a reagent such as sodium nitrite, nitrosylsulfuric acid or isoamyl nitrite in an acidic solvent such as sulfuric acid, phosphoric acid or acetic acid at a temperature of 15° C. or lower for about 10 minutes to about 6 hours. The coupling reaction is preferably conducted by reacting the diazonium salt obtained by the above-stated process with the compound represented by the general formula (2-5) at 40° C. or lower, preferably 25° C. or lower, for about 10 minutes to about 12 hours.

When n in the general formulae (2-1) and (2-2) is 2 or more, the synthesis process may be carried out analogously to the above-stated scheme, by synthesizing a raw material with the introduction of a replaceable divalent, trivalent or tetravalent substituent, with regard to $R_{2-1}$, $R_{2-2}$, G, Y, $X_{2-1}$ and the like in the general formula (A) or (2-5).

The reaction product may form precipitated crystals but, in general, water or an alcoholic solvent is added to the reaction solution to thereby precipitate crystals, and the precipitated crystals can be collected by filtration. Also, an alcoholic solvent, water, or the like may be added to the reaction solution to thereby precipitate crystals, and the precipitated crystals can be collected by filtration. The crystals thus collected by filtration are washed and dried, if necessary, to obtain the azo pigment represented by the general formula (2-1).

Next, an example of a process for producing the azo pigment represented by the general formula (3-1) will be described below. For example, a heterocyclic amine represented by the following general formula (A) is diazotized under non-aqueous acidic conditions, then subjected to a coupling reaction with a compound represented by the following general formula (3-5) under acidic conditions, and subjected to a post-treatment in a conventional manner to thereby produce the azo pigment represented by the general formula (3-1).

[Chem. 138]

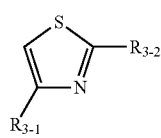
(3-5)

(In the formula, $R_{3-1}$ and $R_{3-2}$ have the same definitions as in the general formula (34).)

Hereinafter, the reaction scheme will be illustrated.

[Chem. 139]

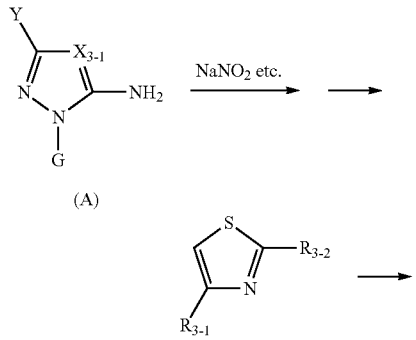

(In the formula, G, Y, $R_{3-1}$, $R_{3-2}$ and $X_{3-1}$ have the same definitions as in the general formula (3-1).)

The heterocyclic coupler represented by the general formula (3-5) can be produced by a process described in JP-A-60-228567 or in Japanese National Publication No. Hei 10-508047 or a similar process. The diazotization reaction of the heterocyclic amine represented by the above reaction scheme can be carried out, for example, by reacting it with a reagent such as sodium nitrite, nitrosylsulfuric acid or isoamyl nitrite in an acidic solvent such as sulfuric acid, phosphoric acid or acetic acid at a temperature of 15° C. or lower for about 10 minutes to about 6 hours. The coupling reaction is preferably conducted by reacting the diazonium salt obtained by the above-stated process with the compound represented by the general formula (3-5) at 40° C. or lower, preferably 25° C. or lower, for about 10 minutes to about 12 hours.

When n in the general formulae (3-1) and (3-2) is 2 or more, the synthesis process may be carried out analogously to the above-stated scheme, by synthesizing a raw material with the introduction of a replaceable divalent, trivalent or tetravalent substituent, with regard to $R_{3-1}$, $R_{3-29}$ G, Y, $X_{3-1}$ and the like in the general formula (A) or (3-5).

The reaction product may form precipitated crystals but, in general, water or an alcoholic solvent is added to the reaction solution to thereby precipitate crystals, and the precipitated crystals can be collected by filtration. Also, an alcoholic solvent, water, or the like may be added to the reaction solution to thereby precipitate crystals, and the precipitated crystals can be collected by filtration. The crystals thus collected by filtration are washed and dried, if necessary, to obtain the azo pigment represented by the general formula (3-1).

Next, an example of a process for producing the azo pigment represented by the general formula (4-1) will be described below. For example, a heterocyclic amine represented by the following general formula (A) is diazotized under non-aqueous acidic conditions, then subjected to a coupling reaction with a compound represented by the following general formula (4-5) under acidic conditions, and subjected to a post-treatment in a conventional manner to thereby produce the azo pigment represented by the general formula (4-1).

[Chem. 140]

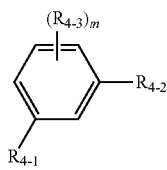
(4-5)

(In the formula, $R_{4-1}$, $R_{4-2}$, $R_{4-3}$ and m have the same definitions as in the general formula (4-1).)

Hereinafter, the reaction scheme will be illustrated.

[Chem. 141]

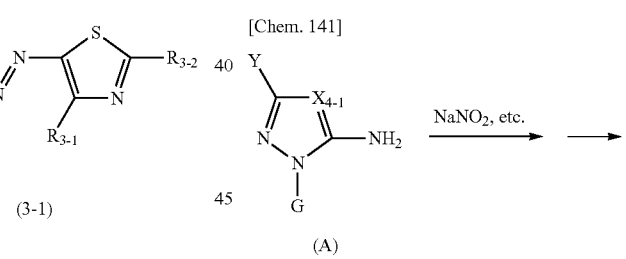

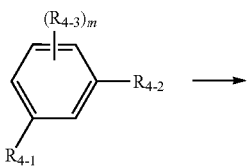

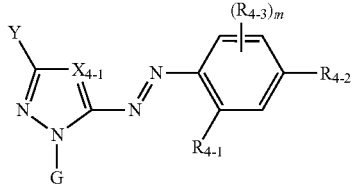
(4-1)

(In the formula, Y, G, $R_{4-1}$ to $R_{4-3}$, $X_{4-1}$ and m have the same definitions as in the general formulae (4-1) to (4-2).)

The heterocyclic coupler represented by the general formula (4-5) can be produced by a process described in JP-A-7-195841 or in JP-A-9-127666 or a similar process. The diazotization reaction of the heterocyclic amine represented by the above reaction scheme can be carried out, for example, by reacting it with a reagent such as sodium nitrite, nitrosylsulfuric acid or isoamyl nitrite in an acidic solvent such as sulfuric acid, phosphoric acid or acetic acid at a temperature of 15° C. or lower for about 10 minutes to about 6 hours. The coupling reaction is preferably conducted by reacting the diazonium salt obtained by the above-stated process with the compound represented by the general formula (4-5) at 40° C. or lower, preferably 25° C. or lower, for about 10 minutes to about 12 hours.

When n in the general formulae (4-1) and (4-2) is 2 or more, the synthesis process may be carried out analogously to the above-stated scheme, by synthesizing a raw material with the introduction of a replaceable divalent, trivalent or tetravalent substituent, with regard to $R_{4-1}$, $R_{4-2}$, $R_{4-3}$, G, Y, $X_{4-1}$ and the like in the general formula (A) or (4-5).

The reaction product may form precipitated crystals but, in general, water or an alcoholic solvent is added to the reaction solution to thereby precipitate crystals, and the precipitated crystals can be collected by filtration. Also, an alcoholic solvent, water, or the like may be added to the reaction solution to thereby precipitate crystals, and the precipitated crystals can be collected by filtration. The crystals thus collected by filtration are washed and dried, if necessary, to obtain the azo pigment represented by the general formula (4-1).

Next, an example of a process for producing the azo pigment and the azo compound represented by the general formulae (5-1) and (5-2) will be described below. For example, a heterocyclic amine represented by the general formula (A) is diazotized under non-aqueous acidic conditions, then subjected to a coupling reaction with a compound represented by the following general formula (5-5) under acidic conditions, and subjected to a post-treatment in a conventional manner to thereby produce the azo pigment and the azo compound represented by the general formulae (5-1) and (5-2).

[Chem. 142]

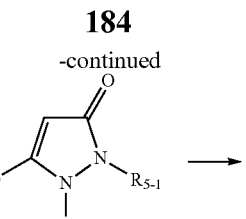

(5-5)

(In the general formula (5-5), $R_{5-1}$ and $R_{5-2}$ have the same definitions as in the general formula (5-1).)

Hereinafter, the reaction scheme will be illustrated.

[Chem. 143]

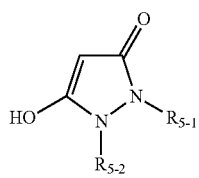

(A)

-continued

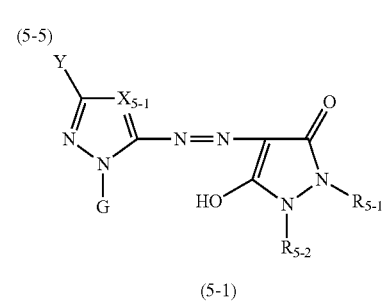

(5-5)

(5-1)

(In the formula, G, Y, $R_{5-1}$, $R_{5-2}$ and $X_{5-1}$ have the same definitions as in the general formulae (5-1) to (5-2).)

The heterocyclic coupler represented by the general formula (5-5) can be produced by a process described in JP-A-11-193353 or a similar process. The diazotization reaction of the heterocyclic amine represented by the general formula (A) can be carried out, for example, by reacting it with a reagent such as sodium nitrite, nitrosylsulfuric acid or isoamyl nitrite in an acidic solvent such as sulfuric acid, phosphoric acid or acetic acid at a temperature of 15° C. or lower for about 10 minutes to about 6 hours. The coupling reaction is preferably conducted by reacting the diazonium salt obtained by the above-stated process with the compound represented by the general formula (5-5) at 40° C. or lower, preferably 25° C. or lower, for about 10 minutes to about 12 hours.

When n in the general formulae (5-1) and (5-2) is 2 or more, the synthesis process may be carried out analogously to the above-stated scheme, by synthesizing a raw material with the introduction of a replaceable divalent, trivalent or tetravalent substituent, with regard to $R_{5-1}$, $R_{5-2}$, G, Y, $X_{5-1}$ and the like in the general formula (A) or (5-5).

The reaction product may form precipitated crystals but, in general, water or an alcoholic solvent is added to the reaction solution to thereby precipitate crystals, and the precipitated crystals can be collected by filtration. Also, an alcoholic solvent, water, or the like may be added to the reaction solution to thereby precipitate crystals, and the precipitated crystals can be collected by filtration. The crystals thus collected by filtration are washed and dried, if necessary, to obtain the azo pigment and the azo compound represented by the general formulae (5-1) and (5-2).

The azo pigment represented by the general formula (6-1) can be produced by the following process. That is, the azo pigment represented by the general formula (6-1) can be produced by subjecting the heterocyclic amine represented by the following general formula (6-8) to diazotization,

[Chem. 144]

(6-8)

(In the general formula (6-8), Het represents a heterocyclic group.), and subsequently subjecting the diazotized compound to a coupling reaction with a compound represented by the following general formula (6-9).

[Chem. 145]

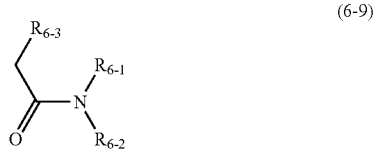

(6-9)

(In the general formula (6-9), $R_{6-3}$, $R_{6-1}$ and $R_{6-2}$ each independently represents a hydrogen atom or a substituent.)

In the general formula (6-8), Het has the same definition as Het in the general formula (6-1). The same also applies to preferred examples thereof.

In the general formula (6-9), $R_{6-3}$, $R_{6-1}$ and $R_{6-2}$ have the same definitions as $R_{6-3}$, $R_{6-1}$ and $R_{6-2}$ in the general formula (6-1). The same also applies to preferred examples thereof.

With respect to a preferred combination of the substituents in the intermediate of the azo pigment of the present invention represented by the general formulae (6-8) and (6-9), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Hereinafter, synthesis of the azo pigment of the present invention will be described in more detail.

The azo pigment of the present invention can be synthesized, for example, by subjecting a diazo component of the general formula (6-8), a diazonium salt prepared by a conventional process and a coupling component of the general formula (6-9) to an azo coupling reaction.

The preparation of a diazonium salt and the coupling reaction can be carried out by a conventional process.

The preparation of the diazonium salt of the general formula (6-8) can be carried by applying a usual diazonium salt adjusting process using a nitrosonium ion source, for example nitrous acid, nitrite or nitrosylsulfuric acid, for example, in a reaction medium containing an acid (for example, hydrochloric acid, sulfuric acid, phosphoric acid, acetic acid, propionic acid, methanesulfonic acid, trifluoromethanesulfonic acid, etc.).

Examples of a more preferred acid include hydrochloric acid, acetic acid, propionic acid, methanesulfonic acid, phosphoric acid, sulfuric acid and a combination thereof. Particularly preferred is hydrochloric acid, phosphoric acid or a combination of acetic acid and phosphoric acid.

The reaction medium (solvent) is preferably an organic or inorganic acid, more preferably phosphoric acid, sulfuric acid, acetic acid, propionic acid or methanesulfonic acid, and still more preferably acetic acid and/or propionic acid.

As a preferred nitrosonium ion source, sodium nitrite or nitrosylsulfuric acid is used in the above-stated preferred acid-containing reaction medium for stable and efficient preparation of a diazonium salt.

The amount of the solvent to be used is preferably a 0.5 to 50-fold amount by mass, more preferably a 1 to 20-fold amount by mass, and particularly preferably a 3 to 15-fold amount by mass, based on the diazo component of the general formula (6-8).

In the present invention, the diazo component of the general formula (6-8) may be a dispersion thereof in the solvent, or depending on the type of diazo components, may be a solution thereof.

The amount of the nitrosonium ion source to be used is preferably in the range of 0.95 to 5.0 equivalents, more preferably 1.00 to 3.00 equivalents, and particularly preferably 1.00 to 1.30 equivalents, based on the diazo component.

The reaction temperature is preferably in the range of −15° C. to 30° C., more preferably −10° C. to 10° C., and more preferably −5° C. to 5° C. If the reaction temperature is lower than −10° C., the reaction rate is significantly low and the time necessary for synthesis is therefore significantly prolonged, thus not being economical. On the other hand, if the synthesis is carried out at a high temperature exceeding 30° C., production of by-products is increased, thus being undesirable.

The reaction time is preferably in the range of from 30 minutes to 300 minutes, more preferably from 30 minutes to 200 minutes, and still more preferably from 30 minutes to 150 minutes.

Although the coupling reaction may be carried out in an acidic to alkaline reaction medium, the coupling reaction for the azo pigment of the present invention is preferably carried out in an acidic to neutral reaction medium, particularly in an acidic reaction medium which can provide efficient conversion into an azo pigment due to decomposition of a diazonium salt being inhibited.

Although preferred examples of the reaction medium (solvent) that can be used herein include water, an organic acid, an inorganic acid, and an organic solvent, particularly preferred is an organic solvent. Specifically, a solvent is preferable which does not cause liquid separation during the reaction, and exhibits a uniform solution with the solvent. Examples of such a solvent include alcoholic organic solvents such as methanol, ethanol, propanol, isopropanol, butanol, t-butyl alcohol, and amyl alcohol, ketone organic solvents such as acetone, and methyl ethyl ketone, diol organic solvents such as ethylene glycol, diethylene glycol, triethylene glycol, propylene glycol, dipropylene glycol, and 1,3-propanediol, ether organic solvents such as ethylene glycol monomethyl ether, ethylene glycol monoethyl ether, and ethylene glycol diethyl ether, tetrahydrofuran, dioxane, acetonitrile, and the like. These solvents may be used alone or as a mixture of two or more thereof.

The amount of the solvent to be used is preferably a 1 to 100-fold amount by mass, more preferably a 1 to 50-fold amount by mass, and still more preferably a 2 to 30-fold amount by mass, based on the coupling component of the general formula (6-9).

In the present invention, the coupling component of the general formula (6-9) may be a dispersion thereof in the solvent, or depending on the type of coupling components, may be a solution thereof.

With regard to the amount of the coupling component to be used, the diazo component per azo coupling site is preferably in the range of 0.95 to 5.0 equivalents, more preferably 1.00 to 3.00 equivalents, and particularly preferably 1.00 to 1.50 equivalents.

The reaction temperature is preferably in the range of −30° C. to 30° C., more preferably −15° C. to 10° C., and more preferably −10° C. to 5° C. If the reaction temperature is lower than −30° C., the reaction rate is significantly low and the time necessary for synthesis is therefore significantly prolonged, thus not being economical. On the other hand, if the synthesis is carried out at a high temperature exceeding 30° C., production of by-products is increased, thus being undesirable.

The reaction time is preferably in the range of from 30 minutes to 300 minutes, more preferably from 30 minutes to 200 minutes, and still more preferably from 30 minutes to 150 minutes.

In the synthesis process of the azo pigment of the present invention, the product obtained by such a reaction may be provided with or without purification after treatment by a conventional post-treatment process of the organic synthesis reaction.

That is, for example, the product isolated from the reaction system may be provided without purification, or may be provided after subjecting to purification by washing with an acid, base or organic solvent, recrystallization, salt formation, or a combination thereof.

The azo pigment represented by the general formula (7-1) can be produced by the following process. That is, the azo pigment represented by the general formula (7-1) can be produced by subjecting the heterocyclic amine represented by the following general formula (7-7) to diazotization,

[Chem. 146]

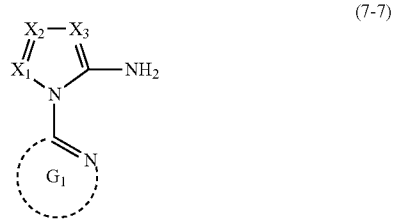

(7-7)

(In the general formula (7-7), ring $G_1$ represents a non-metal atomic group necessary for forming a 5- or 6-membered heterocyclic ring with a carbon atom and a nitrogen atom, and the heterocyclic ring may be a condensed ring. $X_1$, $X_2$ and $X_3$ each independently is interchangeably used with $X_{7-1}$, $X_{7-2}$ and $X_{7-3}$ and represents a nitrogen atom or a —$C(R_{7-11})$= group. $R_{7-11}$ represents a hydrogen atom or a substituent.), and subsequently subjecting the diazotized compound to a coupling reaction with a compound represented by the following general formula (7-8).

[Chem. 147]

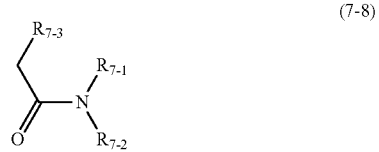

(7-8)

(In the general formula (7-8), $R_{7-3}$ represents a group represented by —$COR_{7-12}$, —$COOR_{7-13}$ or —$CONR_{7-14}R_{7-15}$. $R_{7-12}$ and $R_{7-13}$ represent an alkyl group, an aryl group or a heterocyclic group. $R_{7-14}$ and $R_{7-15}$ each independently represents a hydrogen atom, an alkyl group, an aryl group or a heterocyclic group. $R_{7-1}$ and $R_{7-2}$ each independently represents a hydrogen atom or a substituent.)

In the general formula (7-7), $G_1$, $X_{7-1}$, $X_{7-2}$ and $X_{7-3}$ have the same definitions as $G_1$, $X_{7-1}$, $X_{7-2}$ and $X_{7-3}$ in the general formula (7-1). The same also applies to preferred examples thereof.

In the general formula (7-8), $R_{7-1}$, $R_{7-2}$ and $R_{7-3}$ have the same definitions as $R_{7-1}$, $R_{7-2}$ and $R_{7-3}$ in the general formula (7-1). The same also applies to preferred examples thereof.

With respect to a preferred combination of the substituents in the intermediate of the azo pigment of the present invention represented by the general formulae (7-7) and (7-8), those compounds are preferred wherein at least one of the various substituents is the preferred group described hereinbefore, those compounds are more preferred wherein more of the various substituents are the preferred groups described hereinbefore, and those compounds are most preferred wherein all of the substituents are the preferred groups described hereinbefore.

Hereinafter, synthesis of the azo pigment of the present invention will be described in more detail.

The azo pigment of the present invention can be synthesized, for example, by subjecting a diazo component of the general formula (7-7), a diazonium salt prepared by a conventional process and a coupling component of the general formula (7-8) to an azo coupling reaction.

The preparation of a diazonium salt and the coupling reaction can be carried out by a conventional process.

The preparation of the diazonium salt of the general formula (7-7) can be carried by applying a usual diazonium salt adjusting process using a nitrosonium ion source, for example nitrous acid, nitrite or nitrosylsulfuric acid, for example, in a reaction medium containing an acid (for example, hydrochloric acid, sulfuric acid, phosphoric acid, acetic acid, propionic acid, methanesulfonic acid, trifluoromethanesulfonic acid, etc.).

Examples of a more preferred acid include hydrochloric acid, acetic acid, propionic acid, methanesulfonic acid, phosphoric acid, sulfuric acid and a combination thereof. Particularly preferred is hydrochloric acid, phosphoric acid or a combination of acetic acid and phosphoric acid.

The reaction medium (solvent) is preferably an organic or inorganic acid, more preferably phosphoric acid, sulfuric acid, acetic acid, propionic acid or methanesulfonic acid, and still more preferably acetic acid and/or propionic acid.

As a preferred nitrosonium ion source, sodium nitrite or nitrosylsulfuric acid is used in the above-stated preferred acid-containing reaction medium for stable and efficient preparation of a diazonium salt.

The amount of the solvent to be used is preferably a 0.5 to 50-fold amount by mass, more preferably a 1 to 20-fold amount by mass, and particularly preferably a 3 to 15-fold amount by mass, based on the diazo component of the general formula (7-7).

In the present invention, the diazo component of the general formula (7-7) may be a dispersion thereof in the solvent, or depending on the type of diazo components, may be a solution thereof.

The amount of the nitrosonium ion source to be used is preferably in the range of 0.95 to 5.0 equivalents, more preferably 1.00 to 3.00 equivalents, and particularly preferably 1.00 to 1.30 equivalents, based on the diazo component.

The reaction temperature is preferably in the range of −15° C. to 30° C., more preferably −10° C. to 10° C., and more preferably −5° C. to 5° C. If the reaction temperature is lower than −10° C., the reaction rate is significantly low and the time necessary for synthesis is therefore significantly prolonged, thus not being economical. On the other hand, if the synthesis is carried out at a high temperature exceeding 30° C., production of by-products is increased, thus being undesirable.

The reaction time is preferably in the range of from 30 minutes to 300 minutes, more preferably from 30 minutes to 200 minutes, and still more preferably from 30 minutes to 150 minutes.

Although the coupling reaction may be carried out in an acidic to alkaline reaction medium, the coupling reaction for the azo pigment of the present invention is preferably carried out in an acidic to neutral reaction medium, particularly in an acidic reaction medium which can provide efficient conversion into an azo pigment due to decomposition of a diazonium salt being inhibited.

Although preferred examples of the reaction medium (solvent) that can be used herein include water, an organic acid, an inorganic acid, and an organic solvent, particularly preferred is an organic solvent. Specifically, a solvent is preferable which does not cause liquid separation during the reaction, and exhibits a uniform solution with the solvent. Examples of such a solvent include alcoholic organic solvents such as methanol, ethanol, propanol, isopropanol, butanol, t-butyl alcohol, and amyl alcohol, ketone organic solvents such as acetone, and methyl ethyl ketone, diol organic solvents such as ethylene glycol, diethylene glycol, triethylene glycol, propylene glycol, dipropylene glycol, and 1,3-propanediol, ether organic solvents such as ethylene glycol monomethyl ether, ethylene glycol monoethyl ether, and ethylene glycol diethyl ether, tetrahydrofuran, dioxane, acetonitrile, and the like. These solvents may be used alone or as a mixture of two or more thereof.

The reaction medium is preferably an organic solvent having a polarity parameter (ET) of 40 or more. More preferred is a glycol solvent having two or more hydroxyl groups in the solvent molecule, or an alcohol solvent having 3 or fewer carbon atoms, preferably an alcohol solvent having 2 or fewer carbon atoms (for example, methanol or ethylene glycol). In addition, a mixed solvent thereof can also be used.

The amount of the solvent to be used is preferably a 1 to 100-fold amount by mass, more preferably a 1 to 50-fold amount by mass, and still more preferably a 2 to 30-fold amount by mass, based on the coupling component of the general formula (7-8).

In the present invention, the coupling component of the general formula (7-8) may be a dispersion thereof in the solvent, or depending on the type of coupling components, may be a solution thereof.

With regard to the amount of the coupling component to be used, the diazo component per azo coupling site is preferably in the range of 0.95 to 5.0 equivalents, more preferably 1.00 to 3.00 equivalents, and particularly preferably 1.00 to 1.50 equivalents.

The reaction temperature is preferably in the range of −30° C. to 30° C., more preferably −15° C. to 10° C., and more preferably −10° C. to 5° C. If the reaction temperature is lower than −30° C., the reaction rate is significantly low and the time necessary for synthesis is therefore significantly prolonged, thus not being economical. On the other hand, if the synthesis is carried out at a high temperature exceeding 30° C., production of by-products is increased, thus being undesirable.

The reaction time is preferably in the range of from 30 minutes to 300 minutes, more preferably from 30 minutes to 200 minutes, and still more preferably from 30 minutes to 150 minutes.

In the synthesis process of the azo pigment of the present invention, the product obtained by such a reaction may be provided with or without purification after treatment by a conventional post-treatment process of the organic synthesis reaction.

That is, for example, the product isolated from the reaction system may be provided without purification, or may be provided after subjecting to purification by washing with an acid, base or organic solvent, recrystallization, salt formation, or a combination thereof.

The compounds represented by the general formulae (1), (2), (1-1), (2-1), (3-1), (4-1), (5-1), (6-1), and (7-1) are obtained as a crude azo pigment (crude) by the above-described production process. In the case of using them as the pigments of the present invention, they are preferably subjected to post-treatment. As methods of the post-treatment, there are illustrated, for example, a pigment particle-controlling step such as milling treatment (such as solvent-salt milling, salt milling, dry milling, solvent milling or acid pasting) or solvent heating treatment; and a surface-treating step using, for example, a resin, a surfactant or a dispersant.

The compounds of the present invention represented by the general formulae (1), (2), (1-1), (2-1), (3-1), (4-1), (5-1), (6-1), and (7-1) are preferably subjected to the solvent heating treatment and/or the solvent-salt milling as the post-treatment.

Examples of the solvent to be used for the solvent heating treatment include water; aromatic hydrocarbon solvents such as toluene and xylene; halogenated hydrocarbon solvents such as chlorobenzene and o-dichlorobenzene; alcoholic solvents such as isopropanol and isobutanol; polar aprotic organic solvents such as N,N-dimethylformamide, N,N-dimethylacetamide, and N-methyl-2-pyrrolidone; glacial acetic acid; pyridine; and a mixture thereof. An inorganic or organic acid or base may be further added to the above-described solvents. The temperature of the solvent heating treatment varies depending upon the size of the primary particle diameter of the desired pigment, but is preferably in the range of 40 to 150° C., and more preferably 60 to 100° C. The treatment time is preferably in the range of 30 minutes to 24 hours.

As the solvent-salt milling, there is illustrated, for example, the procedure wherein a crude azo pigment, an inorganic salt, and an organic solvent which does not dissolve them are placed in a kneader, and knead-milling of the mixture is conducted therein. As the inorganic salt, water-soluble inorganic salts can be preferably used. For example, inorganic salts such as sodium chloride, potassium chloride, and sodium sulfate are preferably used. Also, it is more preferred to use inorganic salts having an average particle diameter of 0.5 to 50 µm. The amount of the inorganic salt to be used is preferably a 3- to 20-fold amount by mass, more preferably a 5- to 15-fold amount by mass, based on the crude pigment. As the organic solvent, water-soluble organic solvents can be preferably used and, since the solvent becomes easily vaporizable due to an increase in temperature upon kneading, high-boiling solvents are preferred in view of safety. Examples of such organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and a mixture thereof. The amount of the water-soluble organic solvent to be used is preferably a 0.1- to 5-fold amount by mass, based on the crude azo pigment. The kneading temperature is preferably in the range of 20 to 130° C., and particularly preferably 40 to 110° C. As a kneader, there can be used, for example, a kneader, a mix muller, or the like.

[Pigment Dispersion]

The pigment dispersion of the present invention is characterized in that it contains at least one of the azo pigments represented by the general formula (1), (3), (4), (5) or (7), the tautomers of the azo pigments, and the salts or hydrates thereof. Thus, there can be obtained a pigment dispersion having excellent coloring characteristics, durability, and dispersion stability.

The pigment dispersion of the present invention may be aqueous or non-aqueous, but is preferably an aqueous pigment dispersion. As the aqueous liquid for dispersing the pigment in the aqueous pigment dispersion of the present invention, a mixture containing water as a major component and, as needed, a hydrophilic organic solvent can be used. Examples of the hydrophilic organic solvent include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanedial, glycerin, hexanetriol, and thiodiglycol; glycol derivatives such as ethylene glycol monomethyl ether, ethylene glycol monoethyl ether, ethylene glycol butyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, and ethylene glycol monophenyl ether; amines such as ethanolamine, diethanolamine, triethanolamine, N-methyldi ethanolamine, N-ethyldiethanolamine, morpholine, N-ethylmorpholine, ethylenediamine, diethyl enetriamine, triethylenetetramine, polyethyleneimine, and tetramethylpropylenediamine; formamide; N,N-dimethylformamide; N,N-dimethylacetamide; dimethylsulfoxide; sulfolane; 2-pyrrolidone; N-methyl-2-pyrrolidone; N-vinyl-2-pyrrolidone; 2-oxazolidone; 1,3-dimethyl-2-imidazolidinone; acetonitrile; acetone, and the like.

Further, the aqueous pigment dispersion of the present invention may contain an aqueous resin. As the aqueous resin, there are illustrated water-soluble resins which dissolve in water, water-dispersible resins which can be dispersed in water, colloidal dispersion resins, and a mixture thereof. Specific examples of the aqueous resin include acrylic resins, styrene-acrylic resins, polyester resins, polyamide resins, polyurethane resins, and fluorine-containing resins.

Further, in order to improve dispersibility of the pigment and quality of image, a surfactant and a dispersant may be used. As the surfactant, there are illustrated anionic, nonionic, cationic, and amphoteric surfactants, and any of them may be used. However, anionic or nonionic surfactants are preferred to use. Examples of the anionic surfactants include fatty acid salts, alkyl sulfate salts, alkylbenzene sulfonate salts, alkylnaphthalene sulfonate salts, dialkyl sulfosuccinate salts, alkyldiaryl ether disulfonate salts, alkyl phosphate salts, polyoxyethylene alkyl ether sulfate salts, polyoxyethylene alkylaryl ether sulfate salts, naphthalenesulfonic acid-formalin condensates, polyoxyethylene alkyl phosphate salts, glycerol borate fatty acid esters, polyoxyethylene glycerol fatty acid esters, and the like.

Examples of the nonionic surfactants include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, fluorine-containing surfactants, and silicon-containing surfactants.

The non-aqueous pigment dispersion contains the azo pigment represented by the general formula (1) dispersed in a non-aqueous vehicle. Examples of the resin to be used as the non-aqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, vinyl chloride, vinyl chloride-vinyl acetate copolymer, acrylic resin, methacrylic resin, polyurethane resin, silicone resin, fluorine-containing resin, drying oil, synthetic drying oil, styrene/maleic acid resin, styrene/acrylic resin, polyamide resin, polyimide resin, benzoguanamine resin, melamine resin, urea resin, chlorinated polypropylene, butyral resin, vinylidene chloride resin, and the like. A photo-curable resin may also be used as the non-aqueous vehicle.

Examples of the solvents to be used in the non-aqueous vehicle include aromatic solvents such as toluene, xylene, and methoxybenzene; acetate solvents such as ethyl acetate, butyl acetate, propylene glycol monomethyl ether acetate, and propylene glycol monoethyl ether acetate; propionate solvents such as ethoxyethyl propionate; alcoholic solvents such as methanol and ethanol; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen-containing compound solvents such as N,N-dimethylformamide, γ-butyrolactam, N-methyl-2-pyrrolidone, aniline, and pyridine; lactone solvents such as γ-butyrolactone; carbamic acid esters such as a 48:52 mixture of methyl carbamate and ethyl carbamate; and the like.

The pigment dispersion of the present invention is obtained by dispersing the azo pigment and the aqueous or non-aqueous medium using a dispersing apparatus. As the dispersing apparatus, there can be used a simple stirrer, an impeller-stirring system, an in-line stirring system, a mill system (for example, colloid mill, ball mill, sand mill, beads mill, attritor, roll mill, jet mill, paint shaker, agitator mill, etc.), a ultrasonic wave system, a high-pressure emulsion dispersion system (high-pressure homogenizer; specific commercially available apparatuses being Gaulin homogenizer, a microfluidizer, DeBEE2000, etc.).

In the present invention, the volume-average particle diameter of the pigment is preferably from 10 nm to 250 nm. As used herein, the term "volume-average particle diameter of the pigment" means the particle diameter of the pigment itself or, in the case where an additive such as a dispersant is adhered to the coloring material, means the diameter of the particle with the additive being adhered thereto. In the present invention, as an apparatus for measuring the volume-average particle diameter of the pigment, a particle size distribution analyzer of Nanotrac UPA (UPA-EX150; manufactured by Nikkiso Co., Ltd.) is used. The measurement is conducted according to a predetermined measuring method placing 3 mL of a pigment dispersion in a measuring cell. Additionally, with respect to parameters to be input upon measurement, an ink viscosity is used as a viscosity, and a pigment density is used as a density of dispersion particles.

The volume-average particle diameter of the pigment is more preferably from 20 nm to 250 nm, and still more preferably from 30 nm to 230 nm. If the number-average particle diameter of the particles in the pigment dispersion is lower than 20 nm, storage stability may be not achieved. On the other hand, if the number-average particle diameter of the particles in the pigment dispersion is higher than 250 nm, the optical density may be decreased.

The content of the pigment contained in the pigment dispersion of the present invention is preferably in the range of 1 to 35% by mass, and more preferably in the range of 2 to 25% by mass. If the content of the pigment is lower than 1% by mass, a sufficient image density may be not obtained when the pigment dispersion is used alone as a coloring material (ink). If the content of the pigment is higher than 35% by mass, the dispersion stability may be decreased.

As uses of the azo pigments of the present invention, there are illustrated image recording materials for forming images, particularly color images. Specifically, there are illustrated inkjet-type recording materials to be described in detail below, heat-sensitive recording materials, pressure-sensitive recording materials, electrophotographic recording materials, transfer-type silver halide photosensitive materials, printing inks, recording pens, color filters, color toners, and dying materials, preferably inkjet system recording materials, heat-sensitive recording materials, and electrophotographic recording materials, color filters, color toners, and dying materials, and more preferably inkjet system recording materials (particularly inkjet recording inks), color filters, color toners, and dying materials.

In addition, the pigments can find application to color filters for recording and reproducing color images to be used in solid state imaging devices such as CCDs and in displays such as LCD and PDP and to a pigmenting solution for pigmenting various fibers.

The azo pigments of the present invention are used by adjusting physical properties such as solvent resistance, dispersibility, and heat conductivity through the selection of the substituents so as to be adapted for a particular use. In addition, the azo pigments of the present invention may be used in an emulsion dispersion state or in a solid dispersion state, depending on the systems where the pigments are used.

[Coloring Composition]

The coloring composition of the present invention refers to a coloring composition containing at least one of the azo pigments of the present invention. The coloring composition of the present invention may contain a medium and, in the case where a solvent is used as the medium, the composition is particularly appropriate as an inkjet recording ink. The coloring composition of the present invention can be prepared by using an oleophilic medium or an aqueous medium as the medium and dispersing the azo pigment of the present invention in the medium. Preferably, the aqueous medium is used. The coloring composition of the present invention also includes an ink composition excluding the medium. The coloring composition of the present invention may contain, as needed, other additives within the range of not spoiling the effect of the present invention. Examples of the other additives include known additives (described in JP-A-2003-306623) such as a drying inhibitor (a wetting agent), an antifading agent, an emulsion stabilizer, a penetration accelerator, a UV absorbent, a preservative, an antifungal agent, a pH-adjusting agent, a surface tension-adjusting agent, an anti-foaming agent, a viscosity-adjusting agent, a dispersant, a dispersion stabilizer, a rust inhibitor, and a chelating agent. In the case of water-based inks, these various additives are added directly to the ink liquid. In the case of oil-based inks, it is general to add those additives to a dispersion after preparing the azo pigment dispersion, but they may be added to an oil phase or an aqueous phase upon preparation.

[Ink]

Next, the ink of the present invention will be described below.

The ink of the present invention contains the pigment dispersion of the present invention described above and is preferably prepared by mixing the pigment dispersion with a water-soluble solvent, water, or the like. However, in the case where no particular problems are involved, the pigment dispersion of the present invention described above may be used as such.

The ink of the present invention contains the pigment dispersion of the present invention and can also be used as an inkjet recording ink.

Further, the coloring composition containing the pigment of the present invention can be preferably used as an inkjet recording ink.

The ink of the present invention uses the pigment dispersion described above. Preferably, the ink is prepared by mixing the pigment dispersion with a water-soluble solvent, water, or the like. However, in the case where no particular problems are involved, the pigment dispersion of the present invention described above may be used as such.

[Inkjet Recording Ink]

Next, the inkjet recording ink of the present invention will be described below.

The inkjet recording ink of the present invention (hereinafter, often referred to as "ink") contains the pigment dispersion described above. Preferably, the ink is prepared by mixing the pigment dispersion with a water-soluble solvent, water, or the like. However, in the case where no particular problems are involved, the pigment dispersion of the present invention described above may be used as such.

With regard to the hue, color density, saturation, and transparency of an image formed on a recording medium, the content of the pigment dispersion in the ink of the present invention is preferably in the range of 1 to 100% by mass, particularly preferably 3 to 20% by mass, and most preferably 3 to 10% by mass.

The azo pigment of the present invention is preferably contained in an amount of from 0.1 parts by mass to 20 parts by mass, more preferably from 0.2 parts by mass to 10 parts by mass, and still more preferably from 1 to 10 parts by mass, in 100 parts by mass of the ink of the present invention. The ink of the present invention may further contain other pigments in combination with the azo pigment of the present invention. In the case of using two or more kinds of pigments, the total content of the pigments is preferably within the above-specified range.

The ink of the present invention can be used for forming a full-color image as well as a mono-color image. In order to form the full-color image, a magenta tone ink, a cyan tone ink, and a yellow tone ink can be used. Further, a black tone ink can be used for adjusting tone.

Further, in the ink of the present invention may be used other pigments in addition to the azo pigment of the present invention. As yellow pigments to be applied, there are illustrated, for example, C.I.P.Y.-74, C.I.P.Y.-128, C.I.P.Y.-155 and C.I.P.Y.-213. As magenta pigments to be applied, there are illustrated C.I.P.V.-19 and C.I.P.R.-122. As cyan pigments to be applied, there are illustrated C.I.P.B.-15:3 and C.I.P.B.-15:4. Apart from these pigments, any pigment may be used as each pigment. As a black color material to be applied, there can be illustrated a dispersion of carbon black as well as disazo, trisazo, and tetraazo pigments.

As the water-soluble solvents to be used in the inkjet recording ink of the present invention, polyhydric alcohols, polyhydric alcohol derivatives, nitrogen-containing solvents, alcohols, sulfur-containing solvents, and the like are used.

Specific examples of the polyhydric alcohols include ethylene glycol, diethylene glycol, propylene glycol, butylene glycol, triethylene glycol, 1,5-pentanediol, 1,2,6-hexanetriol, glycerin, and the like.

Examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, an ethylene oxide adduct of diglycerin, and the like.

Examples of the nitrogen-containing solvents include pyrrolidone, N-methyl-2-pyrrolidone, cyclohexylpyrrolidone, triethanolamine, and the like. Examples of the alcohols include ethanol, isopropyl alcohol, butyl alcohol, benzyl alcohol, and the like. Examples of the sulfur-containing solvents include thiodiethanol, thiodiglycerol, sulfolane, dimethylsulfoxide, and the like. In addition, propylene carbonate, ethylene carbonate, and the like may also be used.

The water-soluble solvents to be used in the present invention may be used alone or as a mixture of two or more thereof. As to the content of the water-soluble solvent, the solvent is used in an amount of from 1% by mass to 60% by mass, preferably from 5% by mass to 40% by mass, based on the total mass of the ink. If the content of the water-soluble solvent in the ink is lower than 1% by mass, a sufficient optical density may be not obtained. On the other hand, if the content of the water-soluble solvent is higher than 60% by mass, there might result unstable jet properties of the ink liquid due to an increased viscosity of the liquid.

The preferred physical properties of the inkjet recording ink of the present invention are as follows. The surface tension of the ink is preferably from 20 mN/m to 60 mN/m, more preferably from 20 mN/m to 45 mN/m, and still more preferably from 25 mN/m to 35 mN/m. If the surface tension is lower than 20 mN/m, the liquid may overflow onto the nozzle surface of the recording head, thus normal printing not being performed. On the other hand, if the surface tension is higher than 60 mN/m, the ink may slowly penetrate into the recording medium after printing, thus the drying time becoming longer.

The surface tension is measured under the environment of 23° C. and 55% RH by using a Wilhelmy surface tension balance as is the same described above.

The viscosity of the ink is preferably from 1.2 mPa·s to 8.0 mPa·s, more preferably from 1.5 mPa·s to 6.0 mPa·s, and still more preferably from 1.8 mPa·s to 4.5 mPa·s. If the viscosity is higher than 8.0 mPa·s, ink ejection properties may be deteriorated. On the other hand, if the viscosity is lower than 1.2 mPa·s, the long-term ejection properties may be deteriorated. The viscosity (including that to be described hereinafter) is measured by using a rotational viscometer Rheomat 115 (manufactured by Contraves AG.) at 23° C. and a shear rate of $1400s^{-1}$.

In addition to the above-stated individual components, water is added to the ink within an amount of providing the preferred surface tension and viscosity described above. The addition amount of water is not particularly limited, but is in the range of preferably from 10% by mass to 99% by mass, more preferably from 30% by mass to 80% by mass, based on the total mass of the ink.

Further, for the purpose of controlling characteristic properties such as improvement of ejection properties, there can be used, as needed, polyethyleneimine, polyamines, polyvinylpyrrolidone, polyethylene glycol, cellulose derivatives such as ethyl cellulose and carboxymethyl cellulose, polysaccharides and derivatives thereof, water-soluble polymers, polymer emulsions such as an acrylic polymer emulsion, a polyurethane emulsion, and a hydrophilic latex, hydrophilic polymer gels, cyclodextrin, macrocyclic amines, dendrimers, crown ethers, urea and derivatives thereof, acetamide, silicon surfactants, fluorine-containing surfactants, and the like.

Also, in order to adjust conductivity and pH, there can be used compounds of alkali metals such as potassium hydroxide, sodium hydroxide, and lithium hydroxide; nitrogen-containing compounds such as ammonium hydroxide, triethanolamine, diethanolamine, ethanolamine, and 2-amino-2-methyl-1-propanol; compounds of alkaline earth metals such as calcium hydroxide; acids such as sulfuric acid, hydrochloric acid, and acetic acid; salts between a strong acid and a weak alkali, such as ammonium sulfate; and the like. In addition, pH buffers, antioxidants, antifungal agents, viscosity-adjusting agents, conductive agents, UV absorbents, and the like may also be added, if necessary.

<Inkjet Recording Method, Inkjet Recording Apparatus and an Inkjet Recording Ink Tank>

The inkjet recording method of the present invention is a method of forming an image on a recording medium surface by ejecting an ink on the recording medium surface from a recording head according to recording signals, using the inkjet recording ink of the present invention.

Further, the inkjet recording apparatus of the present invention is an apparatus which includes a recording head for ejecting an ink (treatment liquid, if necessary) on a recording medium surface, using the inkjet recording ink of the present invention and which forms an image by ejecting the ink on the recording medium surface from the recording head. Further, the inkjet recording apparatus of the present invention may also include an inkjet recording ink tank (hereinafter, referred to often as "ink tank") which can supply an ink to the recording head and is detachable from the main body of the inkjet recording apparatus. In this case, the ink of the present invention is received in the inkjet recording ink tank.

As the inkjet recording apparatus of the present invention, a conventional inkjet recording apparatus may be used having a printing type which can use the inkjet recording ink of the present invention. If necessary, the inkjet recording apparatus include a heater for controlling drying of an ink, and the like, or an intermediate transfer mechanism that ejects (prints) an ink and a treatment liquid to an intermediate, and then transfers them to a recording medium such as paper.

Further, the inkjet recording ink tank of the present invention may employ a conventional known ink tank, as long as such a tank has a configuration such that the tank is detachable from the inkjet recording apparatus having a recording head, and can supply an ink to recording head while being mounted on the inkjet recording apparatus.

From the viewpoint of improving effects on ink bleeding and color bleeding, the inkjet recording method (apparatus) of the present invention preferably adopts a thermal inkjet recording type or a piezo inkjet recording type. In the thermal inkjet recording type, an ink is heated upon ejection and becomes low in viscosity, but an ink temperature on the recording medium is lowered to rapidly increase the viscosity. Accordingly, provided are improving effects on ink bleeding and color bleeding. On the other hand, the piezo inkjet type enables the ejection of a high-viscosity liquid which can thus suppress spreading thereof on a recording medium in the paper surface direction, thereby providing improving effects on ink bleeding and color bleeding.

In the inkjet recording method (apparatus) of the present invention, replenishment (supply) of the ink to the recording head is preferably performed from the ink-filled ink tank (including a treatment liquid tank, if necessary). The ink tank is preferably a cartridge type which is detachable from the main body of the apparatus, and replenishment of the ink is simply and conveniently carried out by changing such a cartridge type ink tank.

[Color Toner]

The content of the azo pigment of the present invention in 100 parts by mass of the color toner of the present invention is not particularly limited, but is preferably 0.1 parts by mass or more, more preferably 1 to 20 parts by mass, and most preferably 2 to 10 parts by mass. As the binder resin for a color toner into which the monoazo pigment of the present invention is introduced, any kinds of the binders commonly used can be used. Examples of the binder include a styrene resin, an acrylic resin, a styrene/acrylic resin, a polyester resin, and the like.

For the purpose of imparting flowability enhancement, electric charge control or the like to the toner, an inorganic fine powder or an organic fine particle may be externally added. A silica fine particle or titanium dioxide fine particle of which surface is treated with an alkyl group-containing coupling agent or the like is preferably used. The number average primary particle diameter thereof is preferably in the range of 10 to 500 nm, and such a fine particle is preferably added in an amount of 0.1 to 20% by mass to the toner.

As the releasing agent, any releasing agents which have been conventionally used may be used. Specific examples of the release agent include olefins such as low-molecular weight polypropylene, low-molecular weight polyethylene and ethylene-propylene copolymer, microcrystalline wax, carnauba wax, Sasol wax and paraffin wax. The amount of the releasing agent added to the toner is preferably in the range of 1 to 5% by mass.

If desired, a charge-controlling agent may be added to the toner, and it is preferably colorless from the viewpoint of developability of the toner. Examples of the charge-controlling agent include those having a quaternary ammonium salt structure or a calixarene structure.

The carrier to be used may be either a non-coated carrier composed only of a magnetic material particle such as iron and ferrite, or a resin-coated carrier prepared by coating the surface of a magnetic material particle with a resin or the like. The average particle diameter of the carrier is preferably in the range of 30 to 150 μm in terms of volume-average particle diameter.

The image forming method to which the toner of the present invention is applied is not particularly limited, but examples thereof include a method of repeatedly forming a color image on a photoreceptor and then transferring it to form an image, and a method of sequentially transferring an image formed on a photoreceptor to an intermediate transfer medium or the like to form a color image on the intermediate transfer medium or the like, and then transferring the image on an image-forming member such as paper to form a color image.

[Heat-sensitive Recording (Transfer) Material]

The heat-sensitive recording material of the present invention is constituted of: an ink sheet obtained by applying the azo pigment of the present invention to a support together with a binder, and an image-receiving sheet for fixing the pigment migrated correspondingly to the heat energy applied from the thermal head according to an image recording signal. The ink sheet can be formed by dispersing the trisazo pigment of the present invention and a binder in a fine particle state in a solvent to prepare an ink liquid, coating the ink on a support and appropriately drying it. The amount of the ink applied to the support is not particularly limited, but is preferably in the range of 30 to 1000 mg/m². With respect to the binder resin, ink solvent, support and image-receiving sheet to be used, those described, for example, in JP-A-7-137466 can be preferably used.

For applying this heat-sensitive recording material to a heat-sensitive recording material capable of full-color image recording, a cyan ink sheet containing a heat-diffusible cyan colorant capable of forming a cyan image, a magenta ink sheet containing a heat-diffusible magenta colorant capable of forming a magenta image, and a yellow ink sheet containing a heat-diffusible yellow colorant capable of forming an yellow image are preferably formed on a support by coating them in sequence. If necessary, an ink sheet containing a black image-forming material may be further formed.

[Color Filter]

The method for forming a color filter includes: a method in which a pattern is first formed with a photoresist and then dyed; and a method in which a pattern is formed from a photoresist containing a colorant, as disclosed in, e.g., JP-A-4-163552, JP-A-4-128703 and JP-A-4-175753. In introducing the colorant of the present invention into a color filter, any of these methods may be used, but the color filter is preferably formed by the method described in JP-A-4-175753 or JP-A-6-35182 where a positive resist composition containing a thermosetting resin, a quinone diazide compound, a crosslinking agent, a colorant and a solvent is applied to a substrate and exposed through a mask, the exposed area is developed to form a positive resist pattern, the entire surface of the positive resist pattern is entirely exposed, and then the exposed positive resist pattern is cured. Further, it is possible to form a black matrix in an ordinary manner to obtain a color filter based on the RGB primary color system or Y.M.C complementary color system. Similarly, the amount of the azo pigment of the present invention to be used in the color filter is not limited, but it is preferably in the range of 0.1 to 50% by mass.

With respect to the thermosetting resin, quinone diazide compound, crosslinking agent and solvent used herein and to the amounts of these ingredients to be used, those described in the above-described patent publications can be preferably used.

EXAMPLE 1

The present invention will be described in more detail with reference to the following Synthesis Examples, but the present invention should not be construed as being limited thereto. Additionally, "parts" in Examples are by mass.

SYNTHESIS EXAMPLE 1

Synthesis of illustrative azo pigment (Pig-1):

The azo pigment of the present invention (illustrative azo pigment: Pig-1) can be derived, for example, from the following synthesis route.

[Chem. 148]

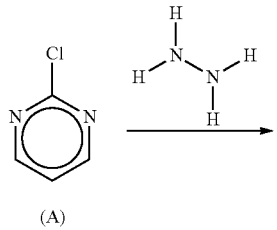

(A)

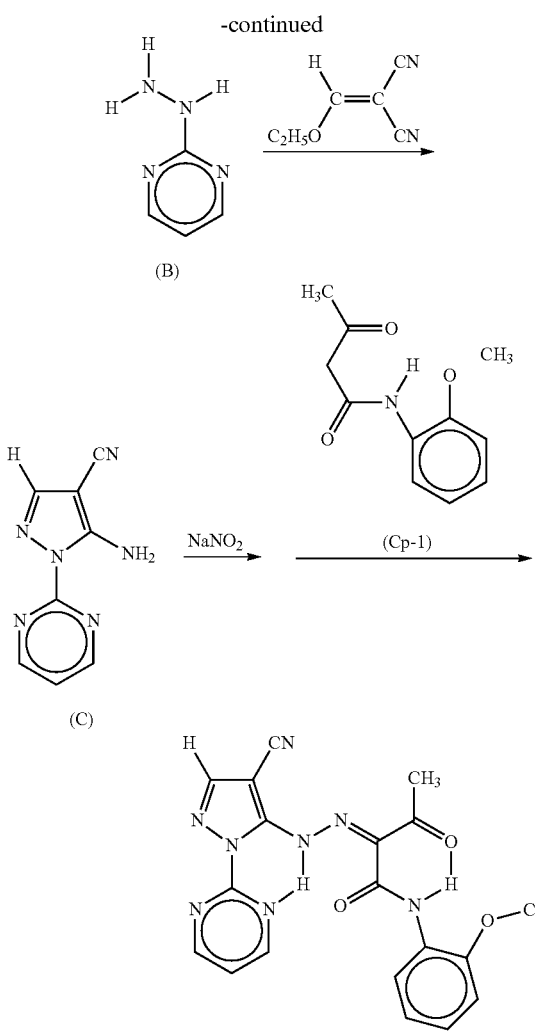

(1) Synthesis of Compound B:

A solution of 26.2 g of a hydrazine monohydrate (manufactured by Wako Pure Chemical Industries, Ltd.) and 30 mL of methanol was adjusted to an internal temperature of 10° C., and 15 g of Compound (A) (manufactured by Wako Pure Chemical Industries, Ltd.) is gradually added thereto, followed by stirring for 0.5 hours at the same temperature. Then, an internal temperature was elevated to 40° C., and the mixture was stirred for 1.0 hour. Subsequently, the reaction liquid was allowed to cool to room temperature, and 30 mL of water was added thereto, followed by filtration and washing with 30 mL of each of water and isopropyl alcohol. The resulting crystals were dried at room temperature for 8 hours to obtain 12.4 g of Compound (B). ($^{1}$H-NMR (DMSO-d6), δ value TMS standard: 4.08 to 4.20(2H, brs), 6.55 to 6.72(2H, d), 8.10 to 8.15(1H, s), 8.27 to 8.35(2H, d))

(2) Synthesis of Compound C:

To a suspension of 15.0 g of Compound (B) separately obtained according to the procedure of Section (1) and 90 mL of ethanol was gradually added 17.5 g of ethoxymethylene malononitrile (manufactured by ALDRICH) at room temperature, and the internal temperature was elevated to 60° C., followed by reflux for 3.0 hours. Then, the reaction liquid was cooled to room temperature and filtered. Subsequently, the reaction liquid was washed with 40 mL of ethanol, and the resulting crystals were dried at 60° C. for 3 hours to obtain 21.9 g of Compound (C). ($^{1}$H-NMR (DMSO-d6), δ value TMS standard: 7.47 to 7.55(1H, t), 7.95 to 7.98(1H, s), 8.03 to 8.13(2H, brs), 8.85 to 8.92(2H, d))

(3) Synthesis of Pig.-1:

2.2 g of Compound (C) separately obtained according to the procedure of Section (2) was added to 27 mL of phosphoric acid, and the mixture was heated and dissolved with heating to 40° C. Then, the solution was cooled on ice and maintained at −3° C., and 1.0 g of sodium nitrite was added thereto, followed by stirring at the same temperature for 1 hour, thereby obtaining a diazonium salt solution. Separately, 1.5 g of Cp-1 (o-acetoacetanisidide) was added and completely dissolved in 30 mL of methanol to prepare a solution to which the above diazonium salt solution was then added dropwise at 4° C. Then, the reaction solution was stirred at an internal temperature of 5 to 10° C. for 1.5 hours. The precipitated powder was separated by filtration and washed with 100 mL of methanol. The powder was added to 200 g of water, and an excess of the acid was neutralized with sodium hydrogen carbonate. The reaction solution was filtered to obtain a crude pigment Pig-1. The crude pigment was added to a mixed solvent of 15 mL of N,N-dimethylacetamide and 15 mL of water, followed by aging under heating at 85° C. for 2 hours. The aged solution was filtered under heating, and further washed with 100 mL of methanol to obtain 2.7 g of Pig.-1. An infrared absorption spectrum (KBr method) of Pig.-1 is shown in FIG. 1.

SYNTHESIS EXAMPLE 2

Synthesis of illustrative azo pigment (Pig-3):

The azo pigment (illustrative azo pigment: Pig-3) of the present invention, can be derived, for example, from the following synthesis route.

[Chem. 149]

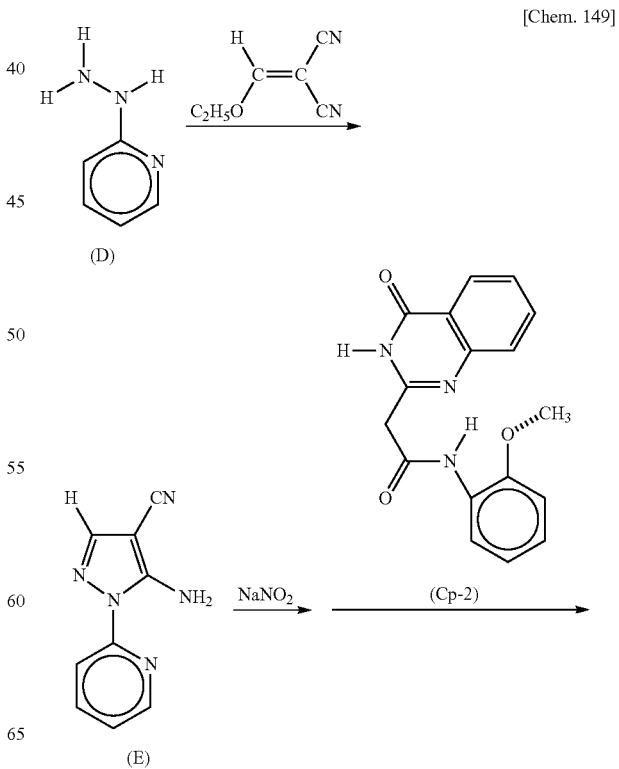

(4) Synthesis of Compound E:

To a suspension of 5 g of Compound (D) (manufactured by Wako Pure Chemical Industries, Ltd.) and 25 mL of ethanol was gradually added 5.9 g of ethoxymethylenemalononitrile (manufactured by ALDRICH) at room temperature. Then, an internal temperature was elevated to 60° C., and the mixture was refluxed for 3.0 hours, cooled to room temperature, and filtered, followed by washing with 100 mL of isopropyl alcohol. The resulting crystals were dried at room temperature for 8 hours to obtain 7.1 g of Compound (E). ($^1$H-NMR (DMSO-d6), δ value TMS standard: 7.32 to 7.40(1H, m), 7.80 to 7.90(2H, m), 7.98 to 8.08(1H, t), 8.07 to 8.18(2H, brs), 8.45 to 8.53(1H, t))

Figure 2:
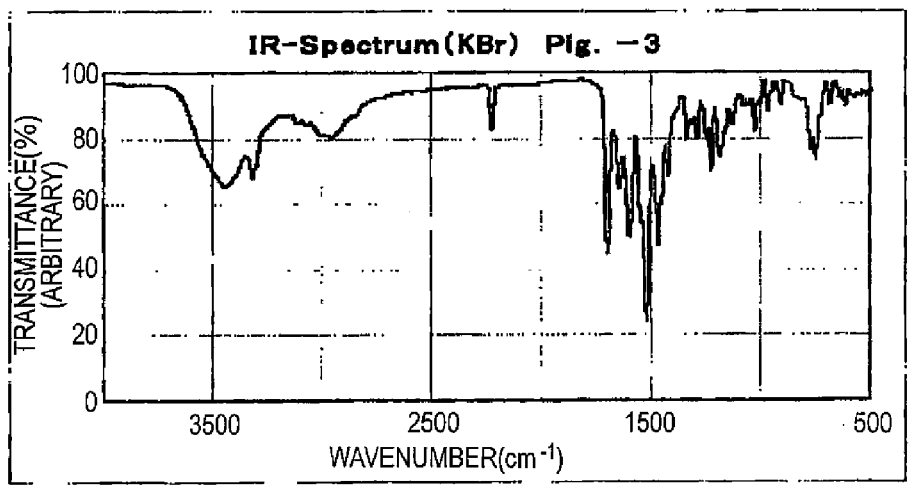
FIG. 2 is an infrared absorption spectrum of an azo pigment Pig.-3 obtained in Synthesis Example 2.

(5) Synthesis of Pig.-3:

2.9 g of (E) synthesized in Section (4) was added to 35 mL of phosphoric acid at room temperature, and dissolved by warming the reaction system to an internal temperature of 60° C. The solution was maintained at an internal temperature of −5 to 0° C. under cooling with ice, and 1.2 g of sodium nitrite was gradually added thereto, followed by stirring at the same temperature for 1 hour to obtain a diazonium salt solution. Then, 3.5 g of Cp-2 was added to 120 mL of methanol to prepare a suspension to which the above diazonium salt solution was then added dropwise at 4° C., followed by stirring at a temperature of 5 to 10° C. for 4 hours. The precipitated powder was separated by filtration and washed with 100 mL of methanol. The powder was added to 200 mL of water, and an excess of the acid was neutralized with sodium hydrogen carbonate. The reaction solution was then filtered to obtain a crude pigment Pig-3. The crude pigment was added to 30 mL of N,N-dimethylacetamide, followed by aging under heating at 85° C. for 2 hours. The aged solution was filtered under heating, and further washed with 100 mL of methanol to obtain 2.6 g of Pig.-3. An infrared absorption spectrum (KBr method) of Pig.-3 is shown in FIG. 2.

SYNTHESIS EXAMPLE 3

The azo pigment (illustrative azo pigment: Pig-5) of the present invention, can be derived, for example, from the following synthesis route.

[Chem. 150]

Figure 3:
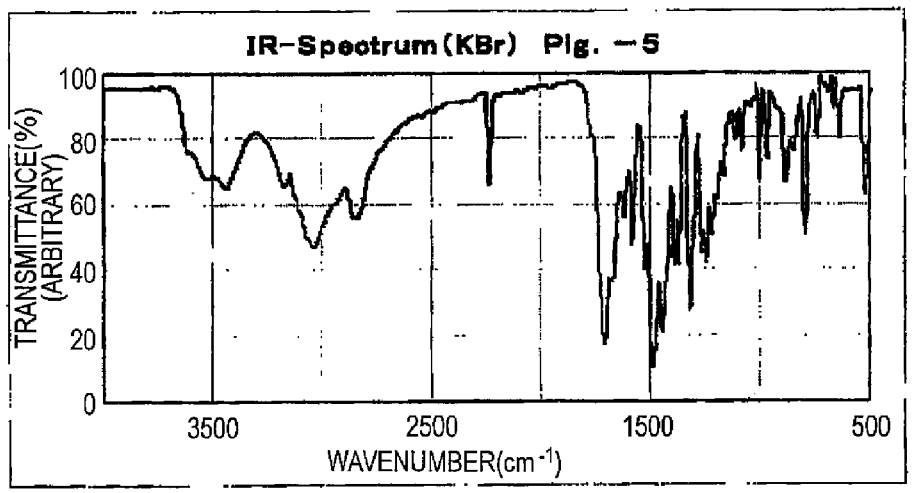
FIG. 3 is an infrared absorption spectrum of an azo pigment Pig.-5 obtained in Synthesis Example 3.

(6) Synthesis of Pig.-5:

2.9 g of (E) synthesized in Section (4) was added to 35 mL of phosphoric acid at room temperature, and dissolved by warming the reaction system to an internal temperature of 60° C. The solution was maintained at an internal temperature of −5 to 0° C. under cooling with ice, and 1.2 g of sodium nitrite was gradually added thereto, followed by stirring at the same temperature for 1 hour to obtain a diazonium salt solution. Then, 2.7 g of Pig.-5 was obtained in the same manner as in Synthesis Example 1-(3) except that Cp-1 was changed to Cp-3. An infrared absorption spectrum (KBr method) of Pig.-5 is shown in FIG. 3.

SYNTHESIS EXAMPLE 4

The azo pigment (illustrative azo pigment: Pig-9) of the present invention can be derived, for example, from the following synthesis route.

[Chem. 151]

-continued

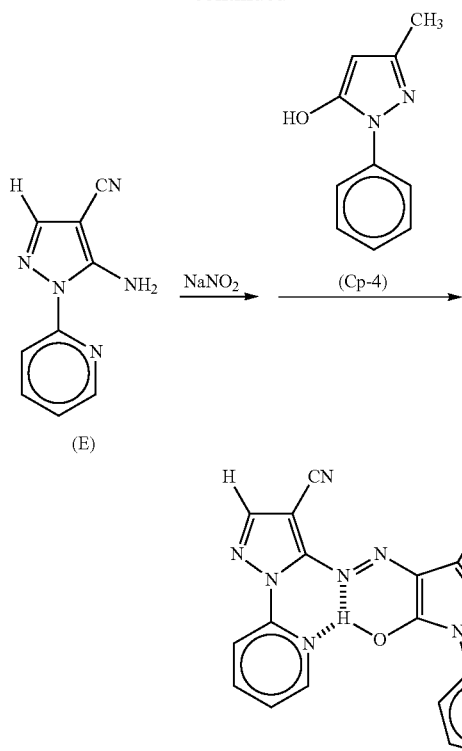

(E) → NaNO₂ → (Cp-4) →

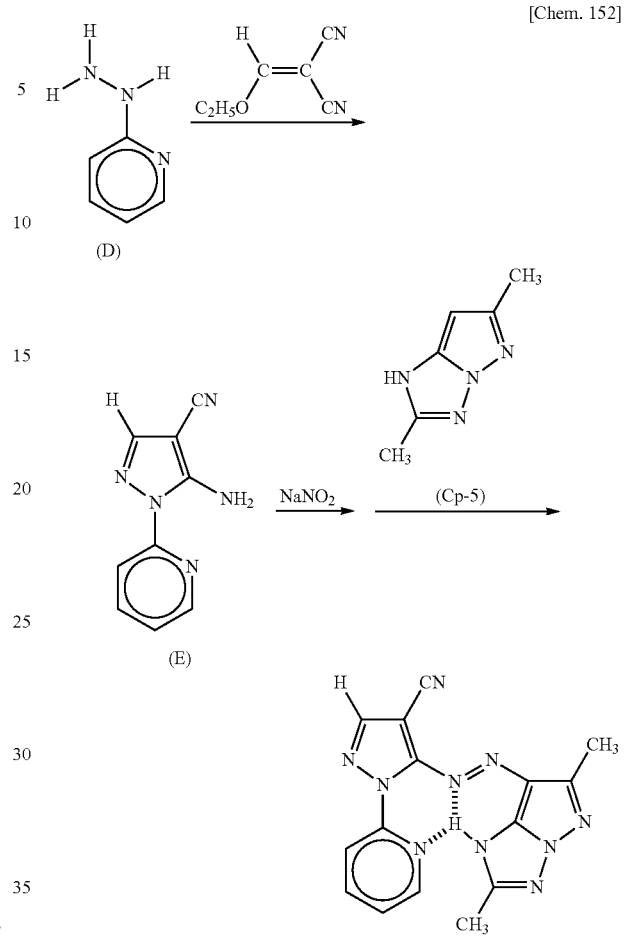

Figure 4:
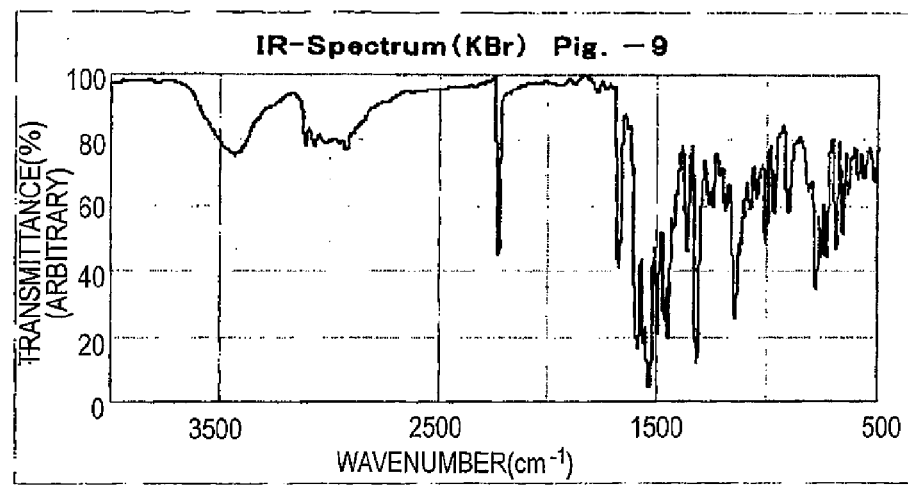
FIG. 4 is an infrared absorption spectrum of an azo pigment Pig.-9 obtained in Synthesis Example 4.

(7) Synthesis of Pig.-9:

1.2 g of (E) synthesized in Section (4) was added to 14 mL of phosphoric acid at room temperature, and dissolved by warming the reaction system to an internal temperature of 60° C. The solution was maintained at an internal temperature of −5 to 0° C. under cooling with ice, and 0.5 g of sodium nitrite was gradually added thereto, followed by stirring at the same temperature for 1 hour to obtain a diazonium salt solution. Then, 1.0 g of Cp-4 was suspended in 30 mL of methanol, to which the above-adjusted diazonium salt solution was added dropwise at an internal temperature of 5° C. or lower. After being stirred at the same temperature for 1 hour, the ice bath was removed and the reaction solution was further stirred at room temperature for 1 hour. Then, the precipitated crystals were separated by filtration, washed with 50 mL of methanol, and further washed with 100 mL of water. The resulting crystals were added without drying to 50 mL of methanol and 25 mL of water, and an internal temperature was elevated to 65° C., followed by stirring under heating at the same temperature for 3 hours. Thereafter, the reaction solution was stirred for 1 hour under air cooling, and the crystals precipitated at room temperature were filtered and washed with 50 mL of methanol. The resulting crystals were dried at room temperature for 12 hours, and then at 50° C. for 6 hours to obtain 1.9 g of Pig.-9 as the specific example of the present invention. An infrared absorption spectrum (KBr method) of Pig.-9 is shown in FIG. 4.

SYNTHESIS EXAMPLE 5

The azo pigment (illustrative azo pigment: Pig-10) of the present invention, can be derived, for example, from the following synthesis route.

Figure 5:
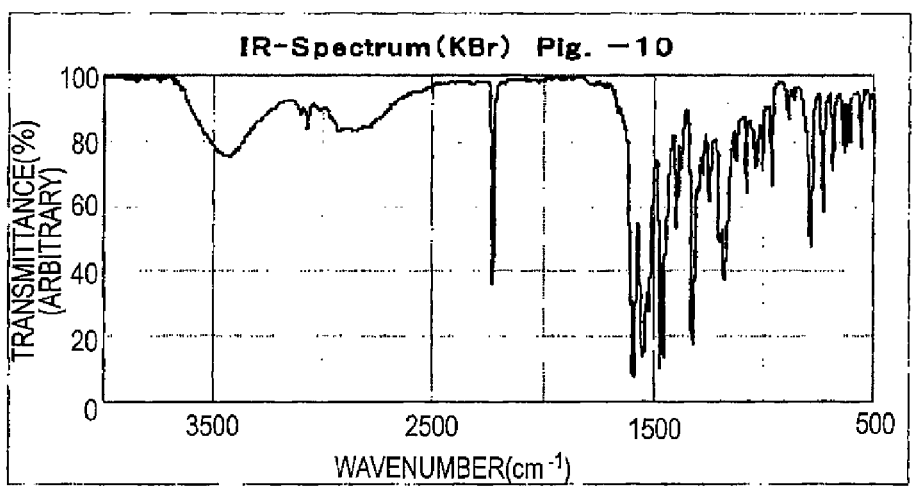
FIG. 5 is an infrared absorption spectrum of an azo pigment Pig.-10 obtained in Synthesis Example 5.

(8) Synthesis of Pig.-10:

1.4 g of (E) synthesized in Section (4) was added to 17 mL of phosphoric acid at room temperature, and dissolved by warming the reaction system to an internal temperature of 60° C. The solution was maintained at an internal temperature of −5 to 0° C. under cooling with ice, and 0.6 g of sodium nitrite was gradually added thereto, followed by stirring at the same temperature for 1 hour to obtain a diazonium salt solution. Then, 1.0 g of Cp-5 was suspended in 50 mL of methanol, to which the above-adjusted diazonium salt solution was added dropwise at an internal temperature of 5° C. or lower. After being stirred at the same temperature for 1 hour, an ice bath was removed and the reaction solution was further stirred at room temperature for 1 hour. Then, the precipitated crystals were separated by filtration, washed with 50 mL of methanol, and further washed with 100 mL of water. The resulting crystals were added without drying to 20 mL of methanol and 10 mL of water, and an internal temperature was elevated to 65° C., followed by stirring under heating at the same temperature for 3 hours. Thereafter, the reaction solution was stirred for 1 hour under air cooling, and the crystals precipitated at room temperature were filtered and washed with 30 mL of methanol. The resulting crystals were dried at room temperature for 12 hours, and then at 50° C. for 6 hours to obtain 1.6 g of Pig.-10 as the specific example of the present invention. An infrared absorption spectrum (KBr method) of Pig.-10 is shown in FIG. 5.

SYNTHESIS EXAMPLE 6

The azo pigment (illustrative azo pigment: Pig-11) of the present invention can be derived, for example, from the following synthesis route.

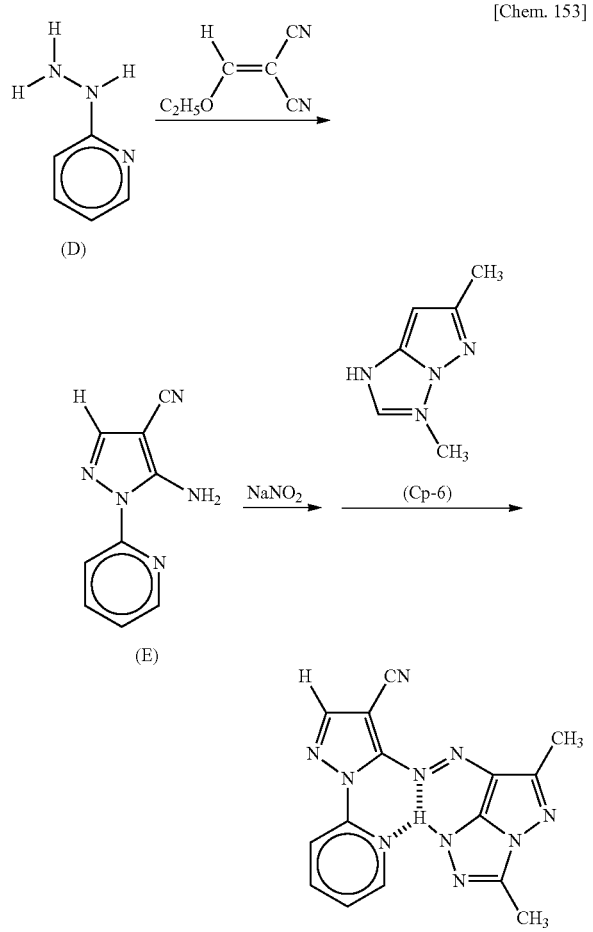

(9) Synthesis of Pig.-11:

1.3 g of (E) synthesized in Section (4) was added to 15 g (or mL) of phosphoric acid at room temperature, and dissolved by warming the reaction system to an internal temperature of 60° C. The solution was maintained at an internal temperature of −5 to 0° C. under cooling with ice, and 0.5 g of sodium nitrite was gradually added thereto, followed by stirring at the same temperature for 1 hour to obtain a diazonium salt solution. Then, 0.9 g of Cp-6 was suspended in 40 mL of methanol, to which the above-adjusted diazonium salt solution was added dropwise at an internal temperature of 5° C. or lower. After being stirred at the same temperature for 1 hour, an ice bath was removed and the reaction solution was further stirred at room temperature for 1 hour.

Figure 6:
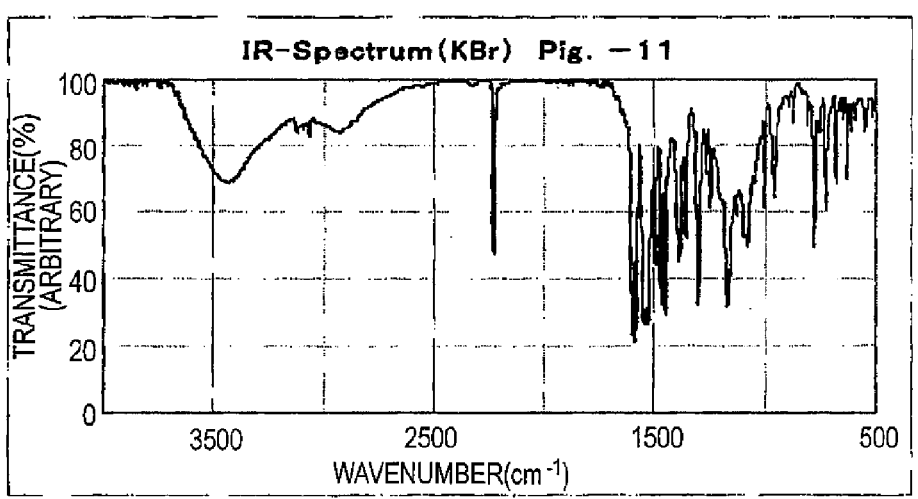
FIG. 6 is an infrared absorption spectrum of an azo pigment Pig.-11 obtained in Synthesis Example 6.

Then, the precipitated crystals were separated by filtration, washed with 50 mL of methanol, and further washed with 100 mL of water. The resulting crystals were added without drying to 20 mL of methanol and 10 mL of water, and an internal temperature was elevated to 65° C., followed by stirring under heating at the same temperature for 3 hours. Thereafter, the reaction solution was stirred for 1 hour under air cooling, and the crystals precipitated at room temperature were filtered and washed with 30 mL of methanol. The resulting crystals were dried at room temperature for 12 hours, and then at 50° C. for 6 hours to obtain 1.8 g of Pig.-11 as the specific example of the present invention. An infrared absorption spectrum (KBr method) of Pig.-11 is shown in FIG. 6.

SYNTHESIS EXAMPLE 101

Synthesis of Illustrative Specific Compound D1-1

The illustrative specific compound D1-1 was synthesized according to the following route.

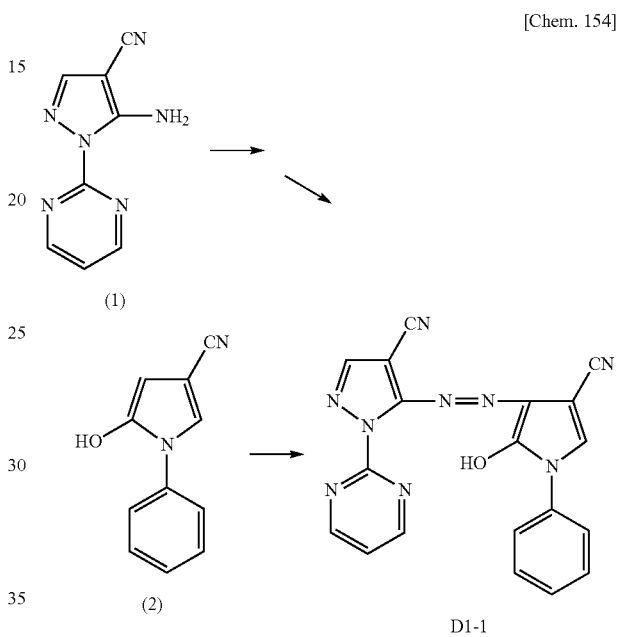

Synthesis of D1-1

Figure 7:
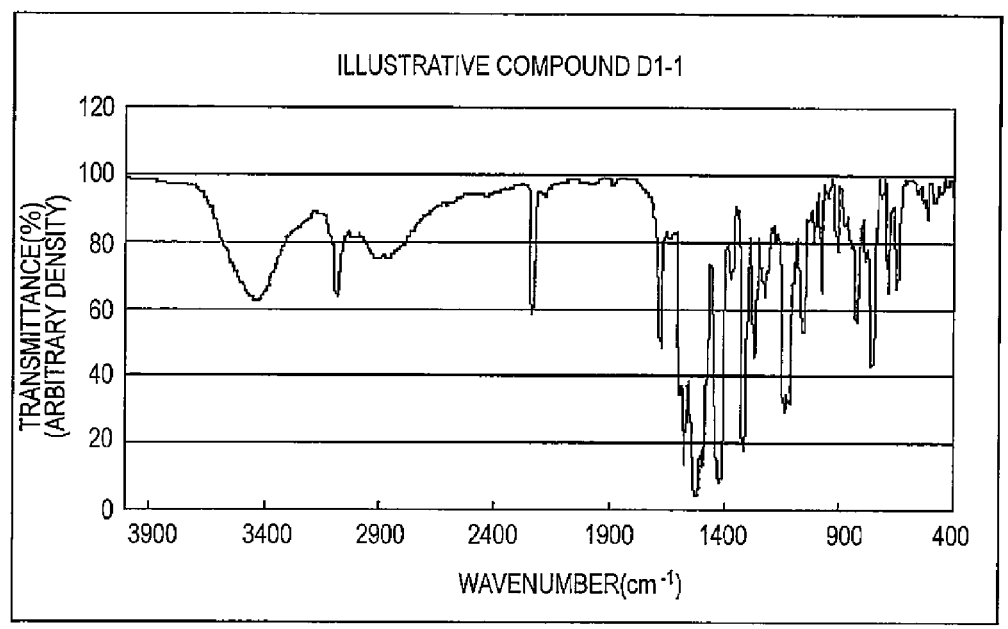
FIG. 7 is an infrared absorption spectrum of an illustrative specific compound D1-1 synthesized according to Synthesis Example 101.

1.5 g of Compound (1) was added to 20 mL of phosphoric acid and dissolved with heating to 30° C. The solution was cooled on ice and maintained at a temperature of −5 to 0° C., and 0.61 g of sodium nitrite was added thereto, followed by stirring for 1 hour to obtain a diazonium salt solution. Meanwhile, 1.50 g of Compound (2) was suspended with stirring in 30 mL of methanol, during which the above diazonium salt solution was added at a temperature of 10° C. or lower. The ice bath was removed immediately after the addition was complete, and the reaction solution was further stirred for 2 hours. To the reaction solution was added 50 mL of methanol, followed by stirring for 30 minutes, and the precipitated crystals were separated by filtration and washed with 30 mL of methanol. The crystals were added without drying to 100 mL of water, to which a solution of 1 g of sodium hydrogen carbonate dissolved in 30 mL of water was added, followed by stirring at a temperature of 20 to 25° C. for 30 minutes. The precipitated crystals were separated by filtration and further washed sufficiently with water. The resulting crystals were added to 100 mL of dimethylacetamide and dissolved by overheating, and insolubles were filtered. To the resulting solution was added dropwise 40 mL of water, followed by stirring at 60° C. for 1 hour and further stirring at room temperature for 30 minutes. The precipitated crystals were filtered and washed with 20 mL of methanol. The resulting crystals were dried to obtain 2.1 g (yield: 67.7%) of Compound D1-1 of the present invention. FIG. 7 shows an infrared absorption spectrum (KBr method).

SYNTHESIS EXAMPLE 201

Synthesis of Illustrative Specific Compound D2-1

The illustrative specific compound D2-1 was synthesized according to the following route.

[Chem. 155]

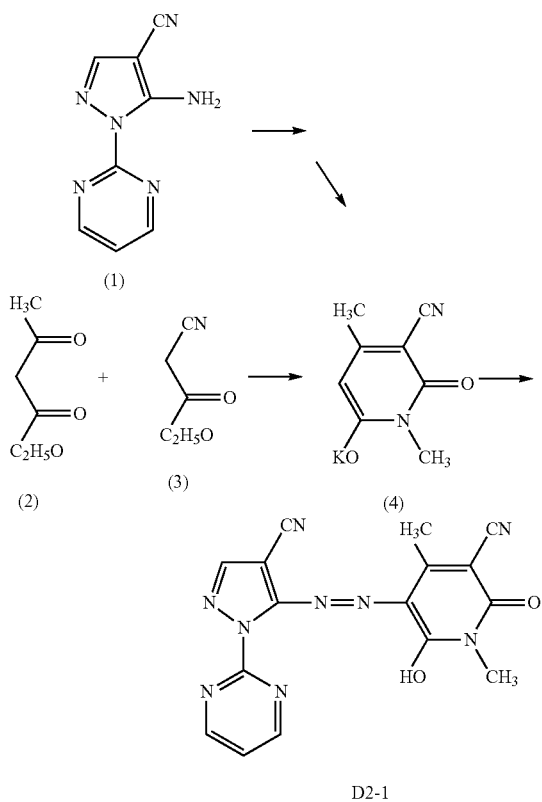

Synthesis of Compound (4)

13 g of (2) and 10 g of (3) were dissolved in 150 mL of methanol, and under stirring at 25° C., a solution of 12 g of potassium hydroxide dissolved in 120 mL of methanol was added dropwise thereto at 30° C. or lower. An internal temperature was elevated to 50° C., followed by stirring for 2 hours. The reaction solution was cooled to 25° C. and 200 mL of acetonitrile was added thereto. The precipitated crystals were filtered and dried to obtain 14.0 g (yield: 85.4%) of Compound (4).

Synthesis of D2-1

Figure 8:
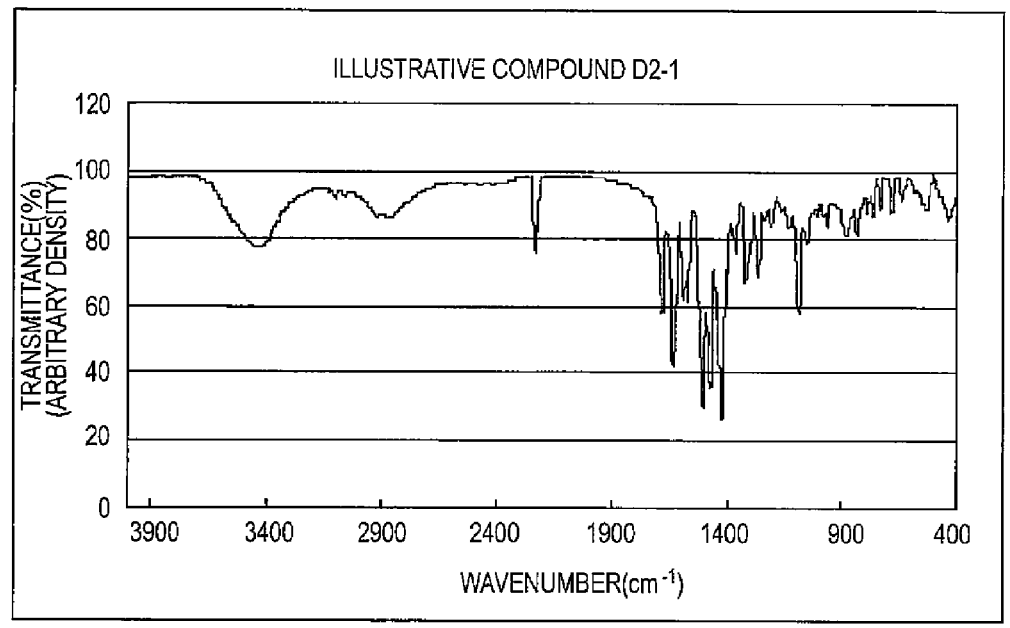
FIG. 8 is an infrared absorption spectrum of an illustrative specific compound D2-1 synthesized according to Synthesis Example 201.

1.5 g of Compound (1) was added to 15 mL of phosphoric acid and dissolved with heating to 30° C. The solution was cooled on ice and maintained at a temperature of −5 to 0° C., and 0.61 g of sodium nitrite was added thereto, followed by stirring for 1 hour to obtain a diazonium salt solution. Meanwhile, 1.8 g of Compound (4) was added to 15 mL of methanol, and under stirring, the above diazonium salt solution was added at a temperature of 8° C. or lower. The ice bath was removed immediately after the addition was complete, and the reaction solution was further stirred for 3 hours. The reaction solution was poured into 100 mL of water, and a solution of 10 g of potassium hydroxide dissolved in 50 mL of water was added thereto at 25° C. or lower under stirring. After another 1 hour, the precipitated crystals were filtered and washed with 10 mL of cold water. The resulting crystals were added without drying to 25 mL of water, to which 2 mL of acetic acid was added under stirring at 25° C., followed by further stirring for 1 hour. The precipitated crystals were filtered and washed with 10 mL of cold water. The resulting crystals were added without drying to 100 mL of methanol, followed by reflux under overheating. 50 mL of water was added slowly dropwise thereto, followed by stirring at 50° C. for 1 hour and further stirring at room temperature for 30 minutes. The precipitated crystals were filtered and washed with 20 mL of cold methanol. The resulting crystals were dried to obtain 1.8 g (yield: 61.8%) of Compound D2-1 of the present invention. λmaX: 438 nm, ε: 1.93×10$^4$ (DMF). FIG. 8 shows an infrared absorption spectrum (KBr method).

SYNTHESIS EXAMPLE 301

Synthesis of Illustrative Specific Compound D3-1

The illustrative specific compound D3-1 was synthesized according to the following route.

[Chem. 156]

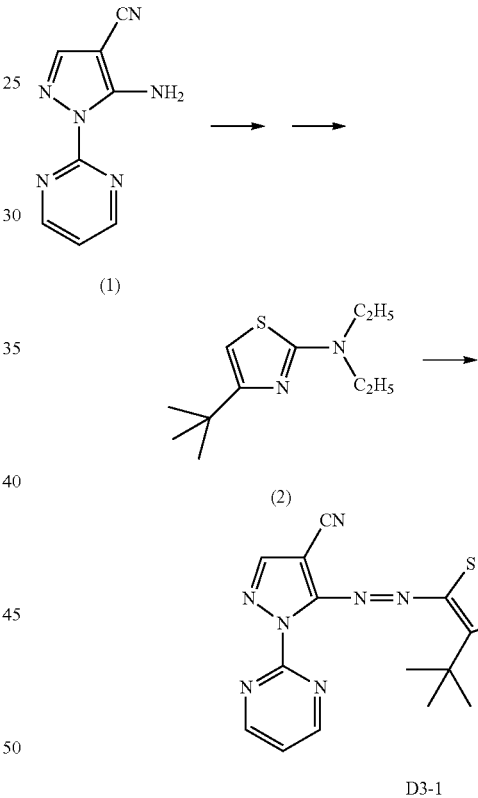

Synthesis of D3-1

Figure 9:
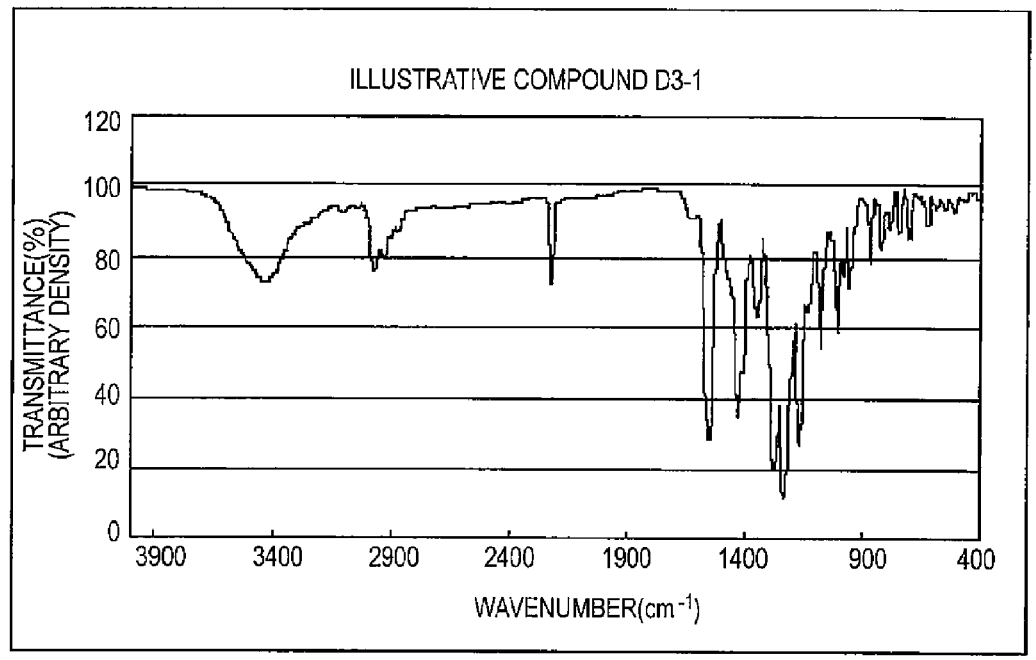
FIG. 9 is an infrared absorption spectrum of an illustrative specific compound D3-1 synthesized according to Synthesis Example 301.

1.5 g of Compound (1) was added to 15 mL of phosphoric acid and dissolved with heating to 30° C. The solution was cooled on ice and maintained at a temperature of −5 to 0° C., and 0.6 g of sodium nitrite was added thereto, followed by stirring for 1 hour to obtain a diazonium salt solution. To the diazonium salt solution was added 1.7 g of Compound (2), and the ice bath was removed, followed by further stirring for 3 hours. The reaction solution was added to 100 mL of water, and a solution of 10 g of sodium hydroxide dissolved in 50 mL of water was added thereto at 25° C., followed by stirring for 30 minutes. The precipitated crystals were separated by filtration and washed with 50 mL of water. The crystals were added without drying to 50 mL of methanol, followed by dissolution under overheating. 50 mL of water was added slowly dropwise, followed by stirring at 50° C. for 1 hour and further stirring at room temperature for 30 minutes. The precipitated crystals were filtered and washed with 20 mL of cold methanol. The resulting crystals were dried to obtain 2.1 g (yield: 63.6%) of Compound D3-1 of the present invention. FIG. 9 shows an infrared absorption spectrum (KBr method).

SYNTHESIS EXAMPLE 401

Synthesis of Illustrative Specific Compound D4-1

The illustrative specific compound D4-1 was synthesized according to the following route.

[Chem. 157]

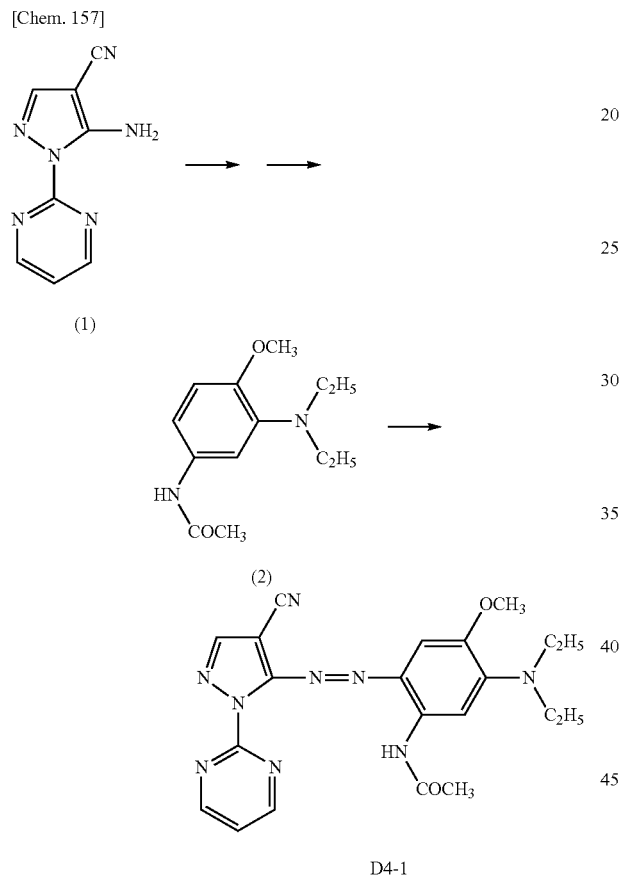

Synthesis of D4-1

Figure 10:
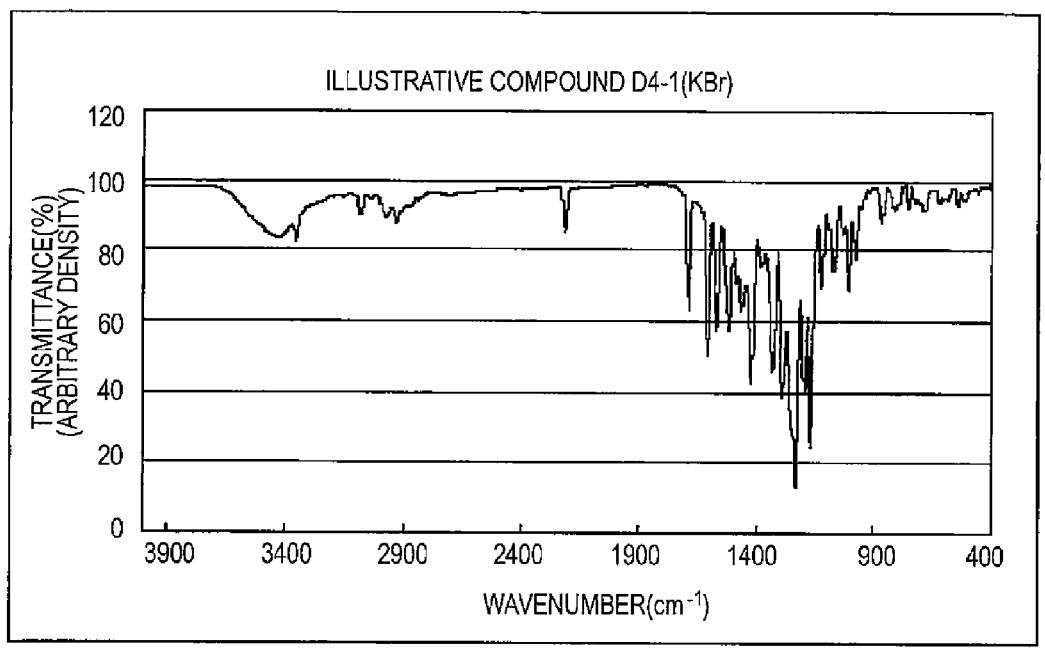
FIG. 10 is an infrared absorption spectrum of an illustrative specific compound D4-1 synthesized according to Synthesis Example 401.

1.0 g of Compound (1) was added to 10 mL of phosphoric acid and dissolved with heating to 30° C. The solution was cooled on ice and maintained at a temperature of −5 to 0° C., and 0.4 g of sodium nitrite was added thereto, followed by stirring for 1 hour to obtain a diazonium salt solution. To the diazonium salt solution was added 1.27 g of Compound (2), and the ice bath was removed, followed by further stirring for 3 hours. The reaction solution was added to 50 mL of ice water, and a solution of 10 g of sodium hydroxide dissolved in 50 mL of water was further added thereto at 20° C. or lower, followed by stirring for 30 minutes at room temperature. The precipitated crystals were separated by filtration and washed with 100 mL of water. The crystals were dissolved without drying in 30 mL of methanol by overheating. The reaction solution was collected and filtered, and under stirring at 50° C., 30 mL of water was added slowly dropwise, followed by stirring at 50° C. for 1 hour and further stirring at room temperature for 30 minutes. The precipitated crystals were filtered and washed with 20 mL of a water/methanol mixture (1:1). The resulting crystals were dried to obtain 1.5 g (yield: 65.6%) of Compound D4-1 of the present invention. FIG. 10 shows an infrared absorption spectrum (KBr method).

SYNTHESIS EXAMPLE 501

Synthesis of Illustrative Specific Compound D5-1

The illustrative specific compound D5-1 was synthesized according to the following route.

[Chem. 158]

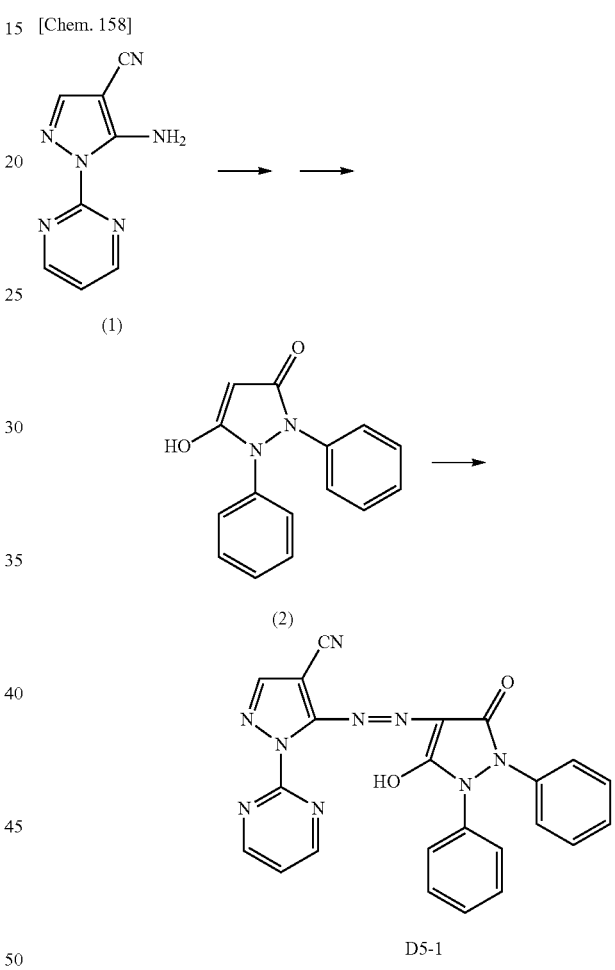

Synthesis of D5-1

Figure 11:
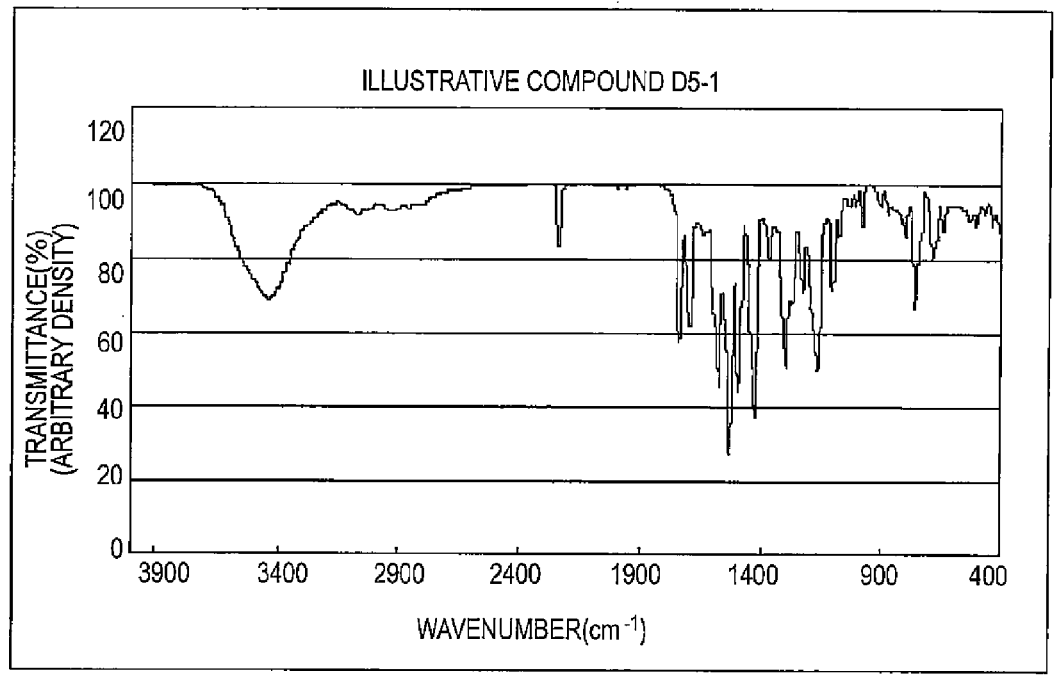
FIG. 11 is an infrared absorption spectrum of an illustrative specific compound D5-1 synthesized according to Synthesis Example 501.

1.5 g of Compound (1) was added to 20 mL of phosphoric acid and dissolved with heating to 30° C. The solution was cooled on ice and maintained at a temperature of −5 to 0° C., and 0.61 g of sodium nitrite was added thereto, followed by stirring for 1 hour to obtain a diazonium salt solution. Meanwhile, 2.03 g of Compound (2) was suspended with stirring in 50 mL of acetonitrile, during which the above diazonium salt solution was added at a temperature of 15° C. or lower. The ice bath was removed immediately after the addition was complete, and the reaction solution was further stirred for 2 hours. To the reaction solution was added 50 mL of methanol, followed by stirring for 30 minutes, and the precipitated crystals were separated by filtration and washed with 30 mL of methanol. The crystals were added without drying to 100 mL of water, to which a solution of 1 g of sodium hydrogen carbonate dissolved in 30 mL of water was added, followed by stirring at a temperature of 20 to 25° C. for 30 minutes. The precipitated crystals were separated by filtration and further washed sufficiently with water. The resulting crystals were added to 70 mL of dimethylacetamide and 3 mL of triethylamine, and dissolved by overheating, followed by filtration of insolubles. To the resulting solution were added slowly dropwise 1.5 mL of acetic acid and further 50 mL of water, followed by stirring at 80° C. for 1 hour and further stirring at room temperature for 30 minutes. The precipitated crystals were filtered and washed with 20 mL of methanol. The resulting crystals were dried to obtain 2.4 g (yield: 66.6%) of Compound D5-1 of the present invention. λmaX: 398 nm, ε: 2.39×10$^4$(DMF). FIG. 11 shows an infrared absorption spectrum (KBr method).

SYNTHESIS EXAMPLE 601

Synthesis of Illustrative Azo Pigment (Pig6-3)
Synthesis scheme of an illustrative compound (Pig6-3) is shown as follows.

(2) Synthesis of Intermediate (Pig6-3c)
5.1 parts of o-anisidine were added to 8.5 parts of the intermediate (Pig6-3b) synthesized according to the method described in JP-A-50-19937, followed by stirring under heating at 120° C. for 2 hours. After the reaction was complete, the reaction solution was cooled to room temperature, and the resulting oily material was isolated and purified by silica gel chromatography to obtain 1.8 parts (yield: 15.4%) of an intermediate (Pig6-3c).
$^1$H-NMR (CDCl$_3$): 9.58(s br, 1H), 8.36(d, 1H), 7.72(m, 1H), 7.54(m, 1H), 7.35(m, 2H), 7.05(m, 1H), 6.96(m, 1H), 6.87(d, 1H), 4.12(s, 2H), 3.89(s, 3H)

(3) Synthesis of Azo Pigment (Pig6-3)
1.25 parts of the intermediate (Pig6-30a) were added to 15 parts of phosphoric acid and dissolved with heating to 40° C. The solution was cooled on ice and maintained at −3° C., and 0.6 parts of sodium nitrite were added thereto, followed by stirring for 1 hour to obtain a diazonium salt solution. Meanwhile, 1.5 parts of the intermediate (Pig6-3c) were added to 45 parts of methanol to prepare a solution to which the above diazonium salt solution was then added at 4° C., followed by reaction for 2.5 hours. The precipitated powder was separated

[Chem. 159]

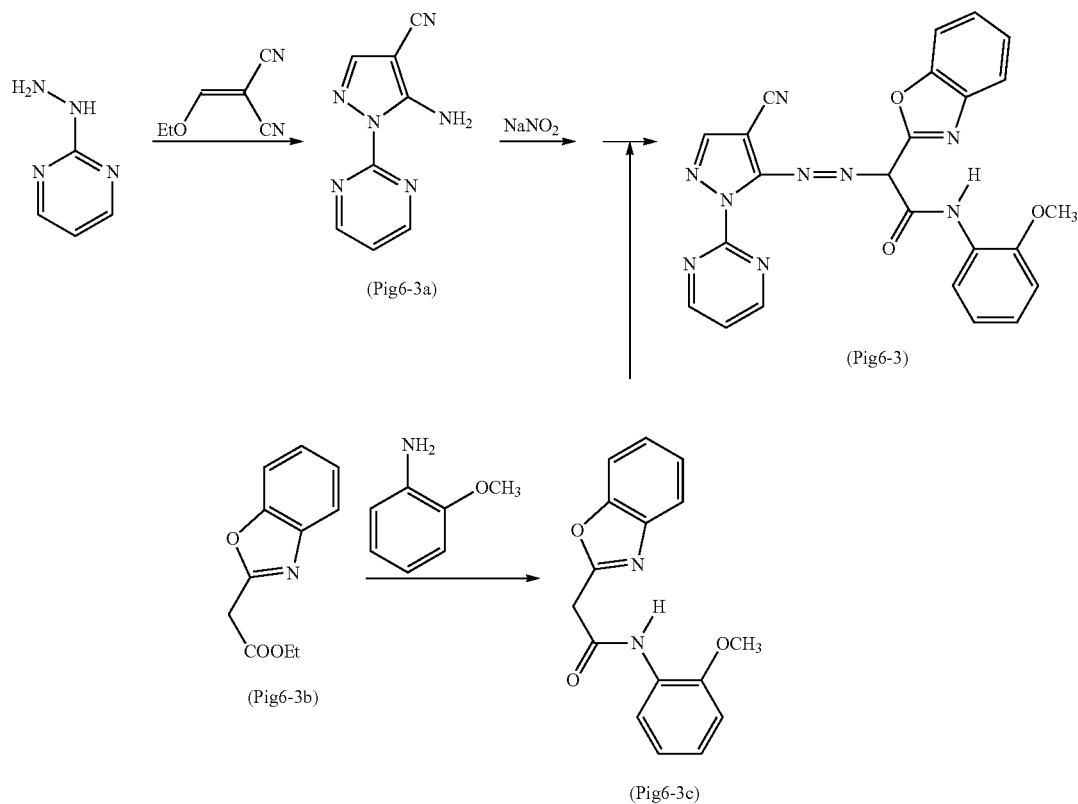

Figure 12:
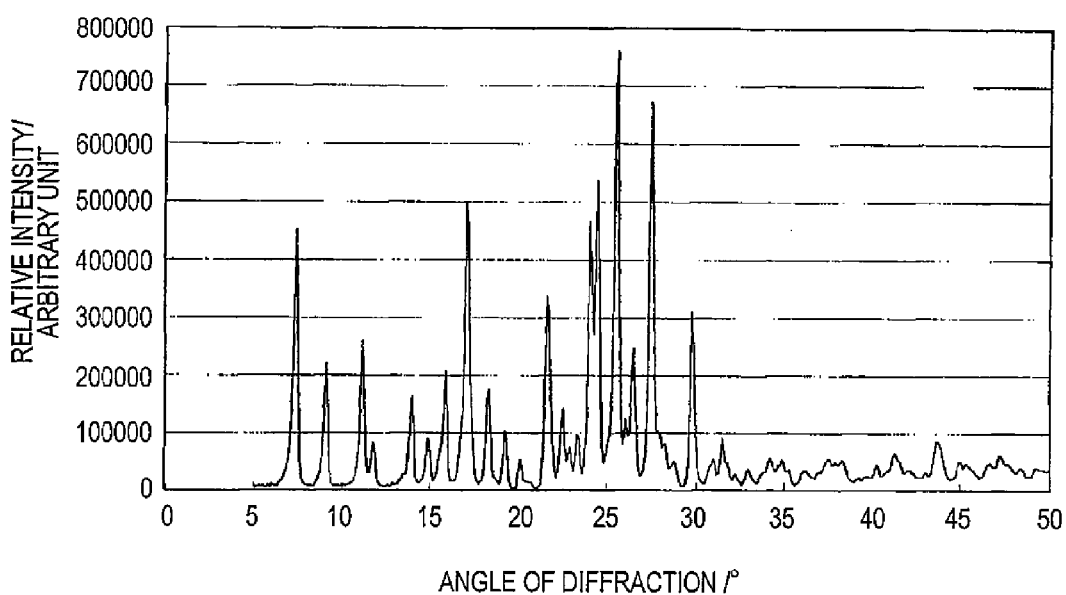
FIG. 12 is a powder X-ray diffraction spectrum view of Pig6-3 synthesized according to Synthesis Example 601.

(1) Synthesis of Intermediate (Pig6-30a)
To a suspension of 15.0 g of 2-hydranopyrimidine and 90 mL of ethanol was gradually added 17.5 g of ethoxymethylenemalononitrile (manufactured by ALDRICH) at room temperature. Then, an internal temperature was elevated to 60° C., and the mixture was refluxed for 3.0 hours, cooled to room temperature, and filtered, followed by washing with 40 mL of ethanol. The resulting crystals were dried at 60° C. for 3 hours to obtain 21.9 g of an intermediate (Pig6-30a). ($^1$H-NMR (DMSO-d6), δ value TMS standard: 7.47 to 7.55(1H, t), 7.95 to 7.98(1H, s), 8.03 to 8.13(2H, brs), 8.85 to 8.92(2H, d))

by filtration and washed with methanol. The powder was added to 200 parts of water, and an excess of the acid was neutralized with sodium hydrogen carbonate. Filtration was carried out again to obtain a crude pigment of Pig-3. The crude pigment was added to 30 parts of N,N-dimethylacetamide, followed by aging under heating at 85° C. for 2 hours. The aged solution was filtered under heating and washed with methanol to obtain 2.0 parts (yield: 78.5%) of an azo pigment (Pig6-3).
The powder X-ray diffraction spectrum of the resulting azo pigment (Pig6-3) is shown in FIG. 12.

SYNTHESIS EXAMPLE 602

Synthesis of Illustrative Azo Pigment (Pig6-6)
Synthesis scheme of an illustrative compound (Pig6-6) is shown as follows.

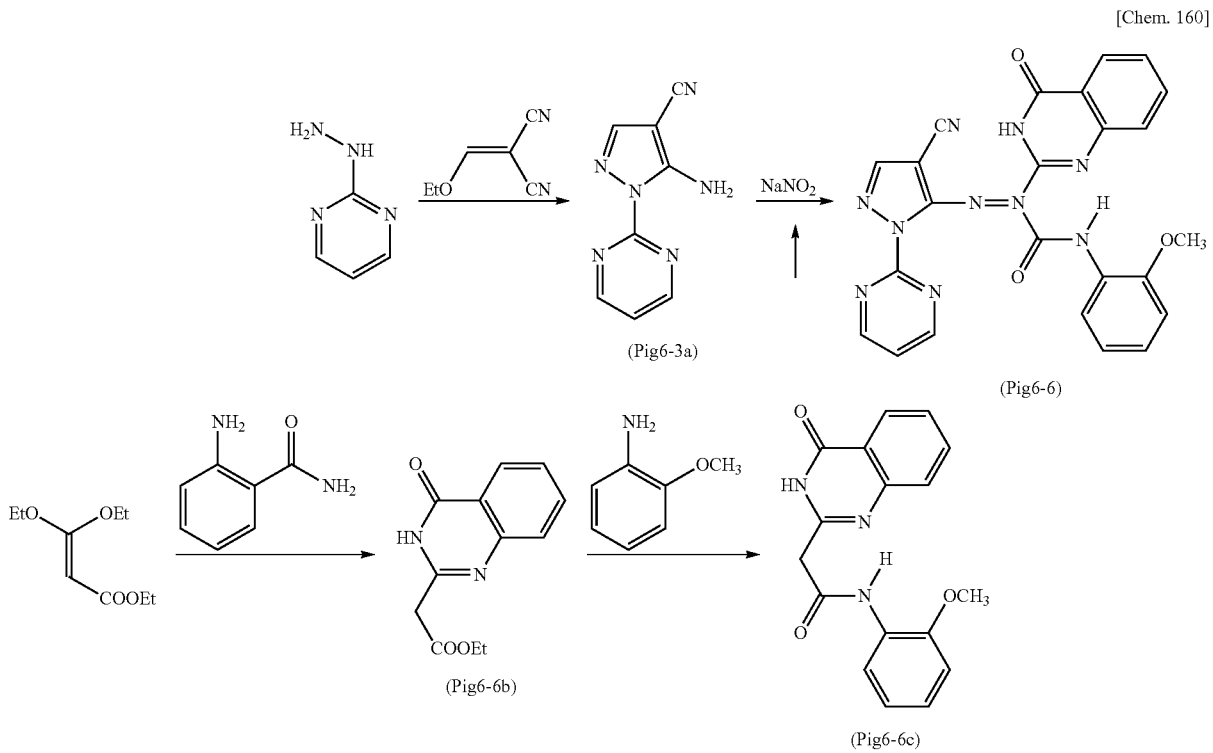

[Chem. 160]

(1) Synthesis of Intermediate (Pig6-6B)

To a solution of 67.5 parts of toluene in 13 parts of ethyl 3,3-diethoxyacrylate were added 6.8 parts of o-aminobenzamide and 0.1 parts of p-toluenesulfonic acid, followed by heating at 90° C., and stirring for 1 hour while distilling off low-boiling components from the reaction system. After the reaction was complete, the reaction solution was cooled to room temperature, and the precipitated crystals were separated by filtration and washed with hexane to obtain 8.0 parts (yield: 69.4%) of an intermediate (Pig-6b).

$^1$H-NMR (CDCl$_3$): 10.90(s br, 1H), 8.28(d, 2H), 7.75(m, 1H), 7.66(m, 1H), 7.48(m, 1H), 4.26(q, 2H), 1.31(t, 3H)

(2) Synthesis of Intermediate (Pig6-6c)

To 10 parts of the intermediate (Pig6-6b) were added 60 parts of xylene and 7.9 parts of o-anisidine, followed by stirring under heating at 120° C. for 5 hours. After the reaction was complete, the reaction solution was cooled to room temperature, and the precipitated crystals were separated by filtration. The crystals were added to 60 parts of methanol, followed by stirring at room temperature, and insoluble crystals were separated by filtration to obtain 11.8 parts (yield: 88.0%) of an intermediate (Pig-6c).

$^1$H-NMR (DMSO-d6): 12.35(s br, 1H), 10.06(s br, 1H), 8.10(m, 2H), 7.84(m, 1H), 7.66(d, 11-1), 7.51(m, 1H), 7.07 (m, 2H), 6.90(m, 1H), 3.88(s br, 3H+2H)

(3) Synthesis of Azo Pigment (Pig6-6)

2.2 parts of the intermediate (Pig6-30a) were added to 27 parts of phosphoric acid and dissolved with heating to 40° C. The solution was cooled on ice and maintained at −3° C., and 1.0 part of sodium nitrite was added thereto, followed by stirring for 1 hour to obtain a diazonium salt solution. Meanwhile, 3 parts of the intermediate (Pig6-6c) were added to 90 parts of methanol to prepare a suspension to which the above diazonium salt solution was then added at 4° C., followed by reaction for 4 hours. The precipitated powder was separated by filtration and washed with methanol. The powder was added to 200 parts of water, and an excess of the acid was neutralized with sodium hydrogen carbonate. Filtration was carried out again to obtain a crude pigment of Pig6-6. The crude pigment was added to 30 parts of N,N-dimethylacetamide, followed by aging under heating at 85° C. for 2 hours. The aged solution was filtered under heating and washed with methanol to obtain 2.6 parts (yield: 52.9%) of the azo pigment.

Figure 13:
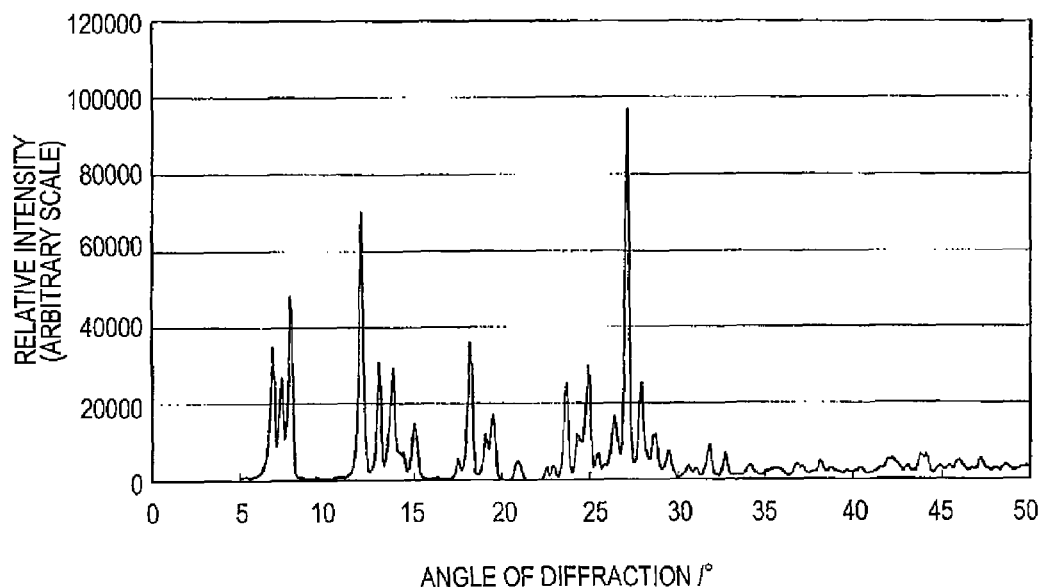
FIG. 13 is a powder X-ray diffraction spectrum view of Pig6-6 synthesized according to Synthesis Example 602.

The powder X-ray diffraction spectrum of the resulting azo pigment (Pig6-6) is shown in FIG. 13.

SYNTHESIS EXAMPLE 603

Synthesis of Illustrative Azo Pigment (Pig6-6)

36.1 parts of the intermediate (Pig6-30a) was added and dissolved in 435 parts of 50% sulfuric acid at 5° C. 67.9 parts of nitrosylsulfuric acid (40% sulfuric acid solution) were added dropwise thereto at 7° C. or lower over 20 minutes, thereby obtaining a diazonium salt solution. Meanwhile, 50 parts of the intermediate (Pig6-6c) were added and dissolved in a mixed solution of 1125 parts of methanol, 350 parts of water, and 21.3 parts of potassium hydroxide. The above diazonium salt solution was added thereto at 10° C., followed by reaction for 2 hours. The precipitated powder was separated by filtration and washed with methanol. The powder was added to 2000 parts of water, and an excess of the acid was neutralized with an aqueous potassium hydroxide solution. Filtration was carried out again to obtain a crude pigment of Pig6-6. The crude pigment was added to 500 parts of N,N-dimethylacetamide, followed by aging under heating at 85° C. for 2 hours. The aged solution was filtered under heating and washed with methanol to obtain 65.9 parts (yield: 80.4%) of an azo pigment.

SYNTHESIS EXAMPLES 604 to 615

According to synthesis details of the azo pigments of the present invention and the procedure described in Synthesis Examples 601 and 602, synthesis of azo pigments shown in Table 1 below was carried out. Powder X-ray diffraction spectra of the resulting azo pigments are shown in FIGS. 14 to 25.

TABLE 1

Figure 14:
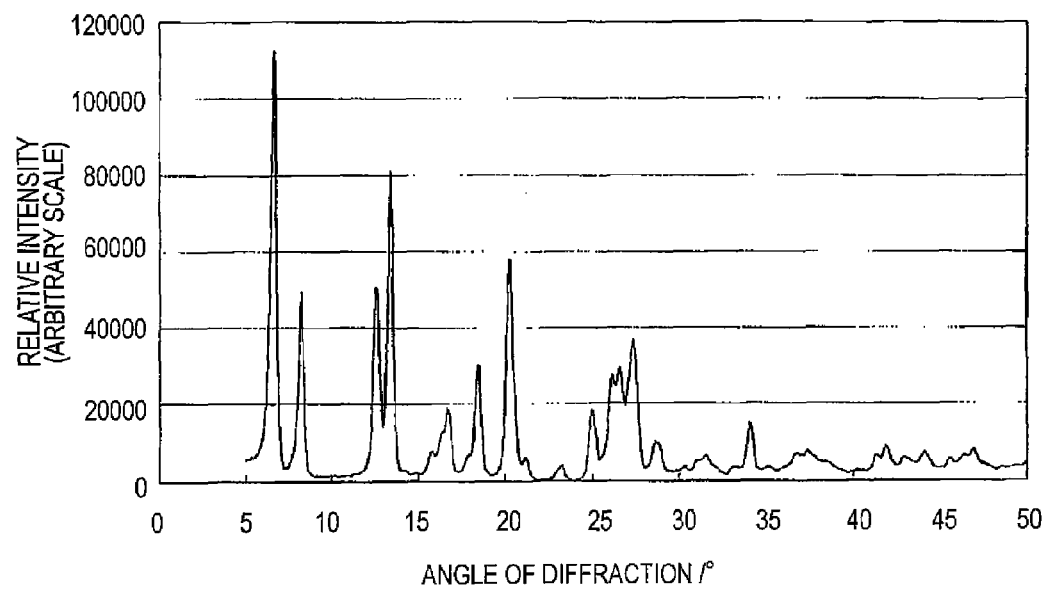
FIG. 14 is a powder X-ray diffraction spectrum view of Pig6-2 synthesized according to Synthesis. Example 603.
Figure 15:
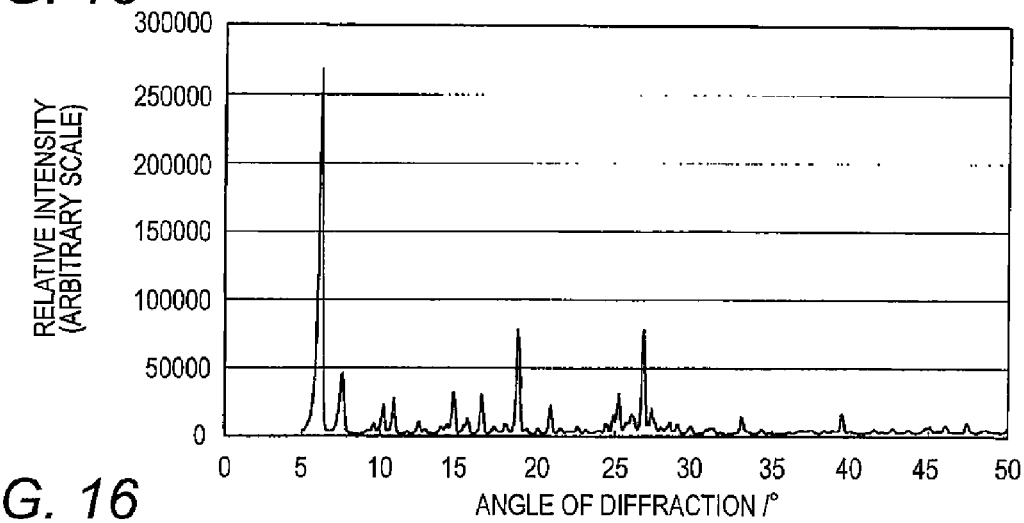
FIG. 15 is a powder X-ray diffraction spectrum view of Pig6-4 synthesized according to Synthesis Example 604.
Figure 16:
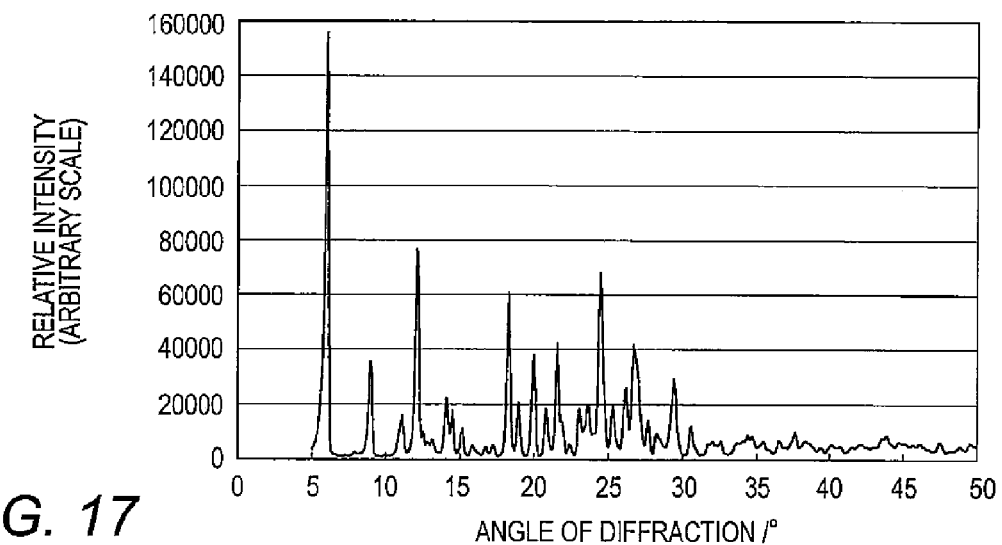
FIG. 16 is a powder X-ray diffraction spectrum view of Pig6-7 synthesized according to Example 605.
Figure 17:
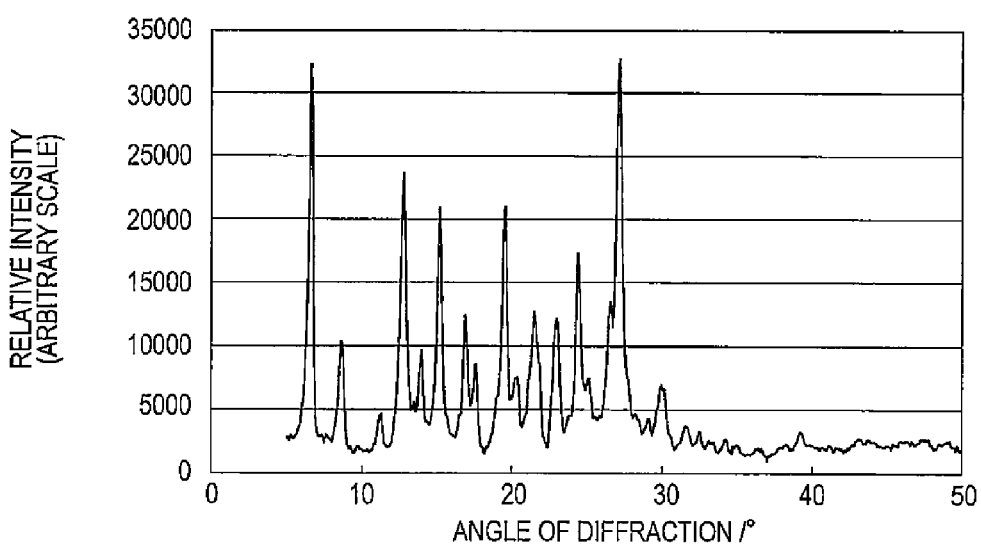
FIG. 17 is a powder X-ray diffraction spectrum view of Pig6-8 synthesized according to Example 606.
Figure 18:
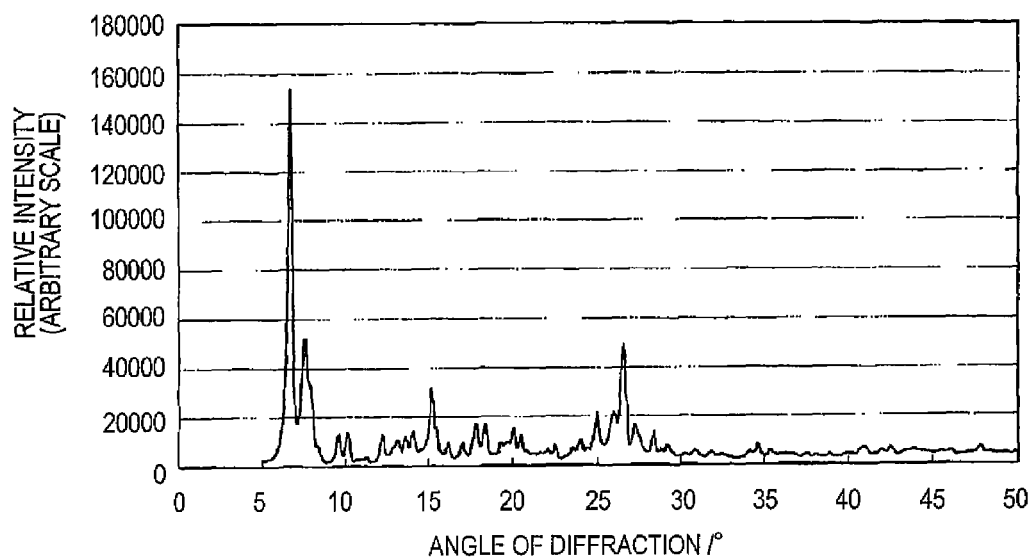
FIG. 18 is a powder X-ray diffraction spectrum view of Pig6-9 synthesized according to Synthesis Example 607.

| Synthesis Example No. | Azo pigment | Powder X-ray diffraction spectrum |
|---|---|---|
| Synthesis Example 604 | Pig6-2 | FIG. 14 |
| Synthesis Example 605 | Pig6-4 | FIG. 15 |
| Synthesis Example 606 | Pig6-7 | FIG. 16 |
| Synthesis Example 607 | Pig6-8 | FIG. 17 |
| Synthesis Example 608 | Pig6-9 | FIG. 18 |

Formula (A):

[Chem. 161]

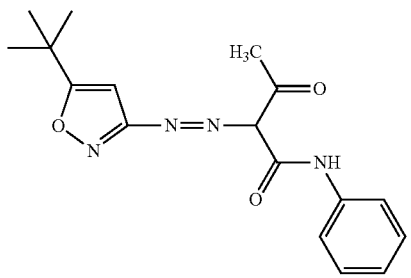

SYNTHESIS EXAMPLE 701

Synthesis of Illustrative Azo Pigment (Pig7-8)

Synthesis scheme of an illustrative compound (Pig7-8) is shown as follows.

[Chem. 162]

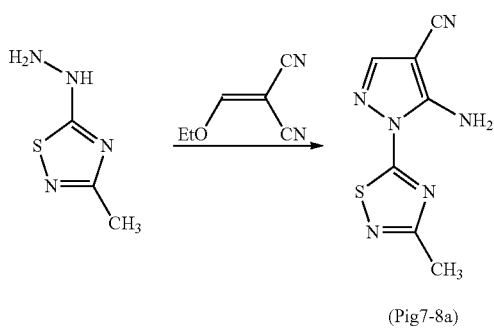

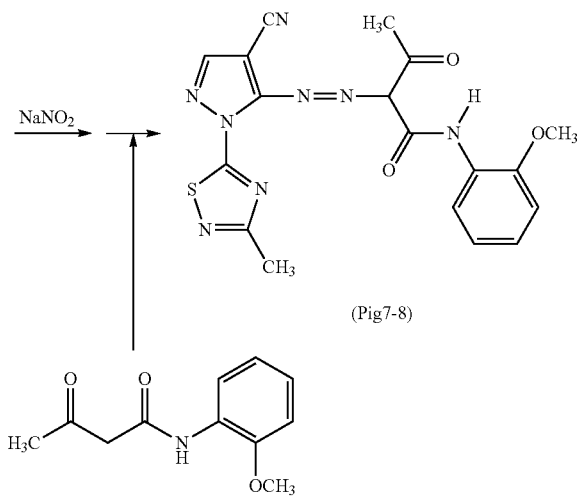

TABLE 1-continued

Figure 19:
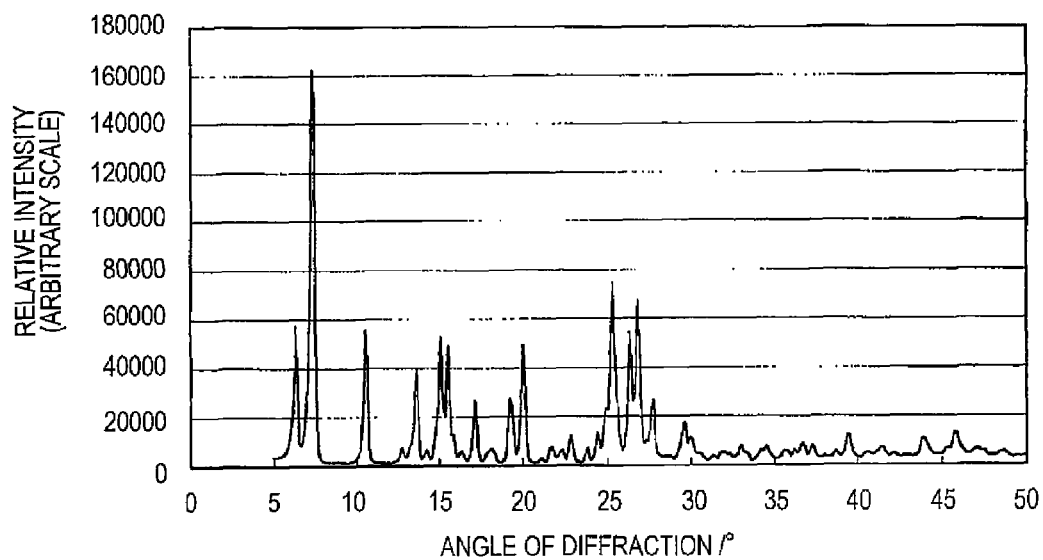
FIG. 19 is a powder X-ray diffraction spectrum view of Pig6-12 synthesized according to Synthesis Example 608.
Figure 20:
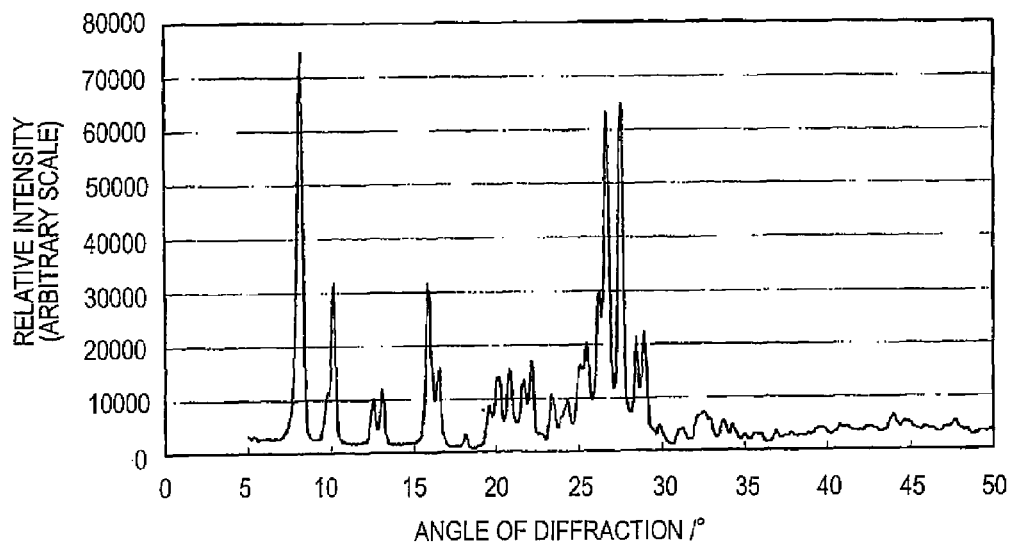
FIG. 20 is a powder X-ray diffraction spectrum view of Pig6-20 synthesized according to Synthesis Example 609.
Figure 21:
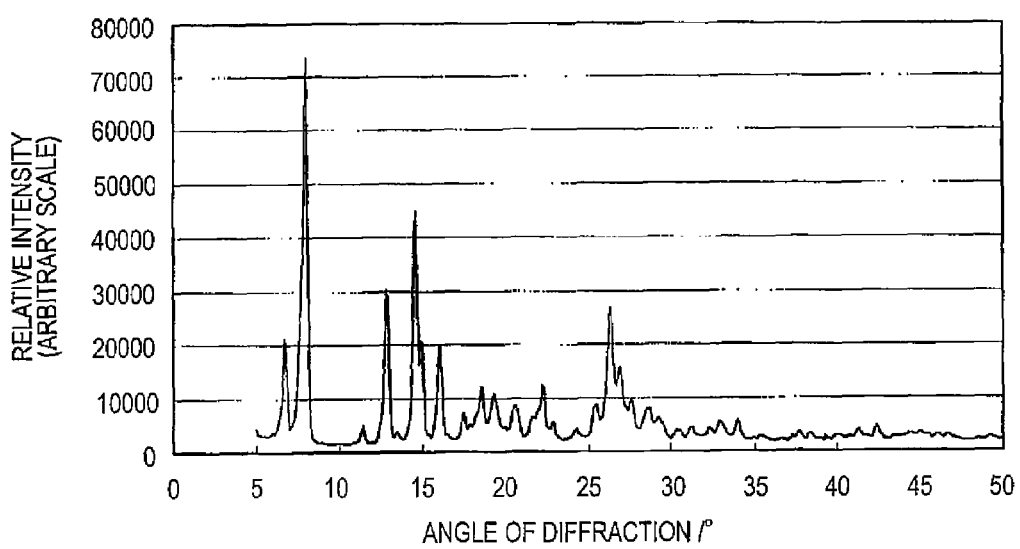
FIG. 21 is a powder X-ray diffraction spectrum view of Pig6-22 synthesized according to Synthesis Example 610.
Figure 22:
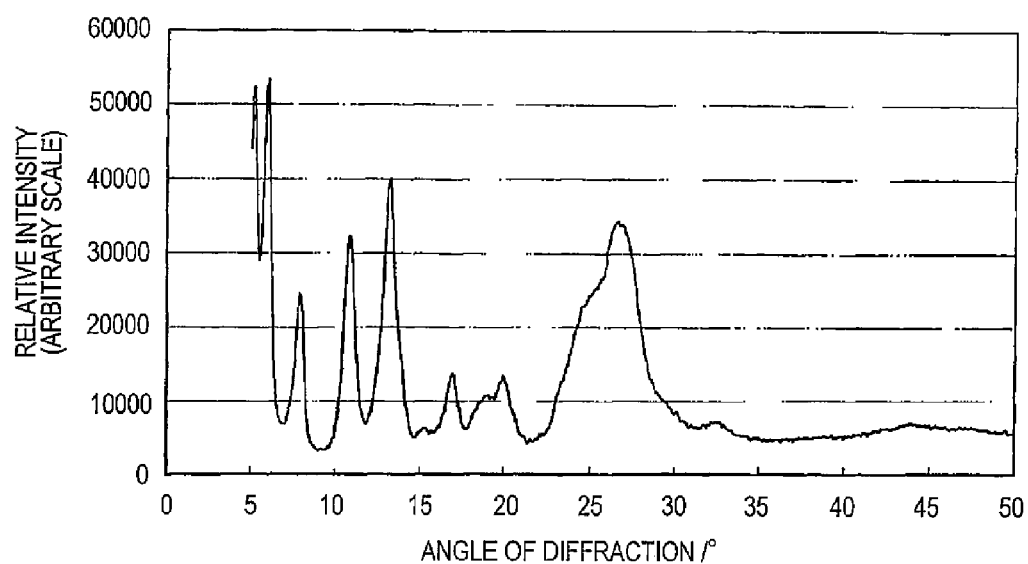
FIG. 22 is a powder X-ray diffraction spectrum view of Pig6-23 synthesized according to Synthesis Example 611.
Figure 23:
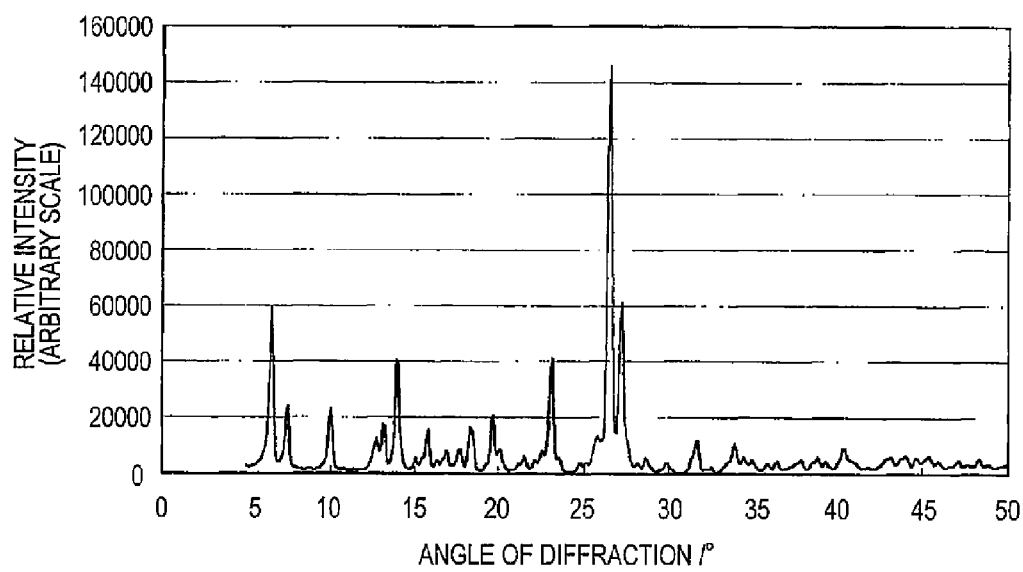
FIG. 23 is a powder X-ray diffraction spectrum view of Pig6-24 synthesized according to Synthesis Example 612.
Figure 24:
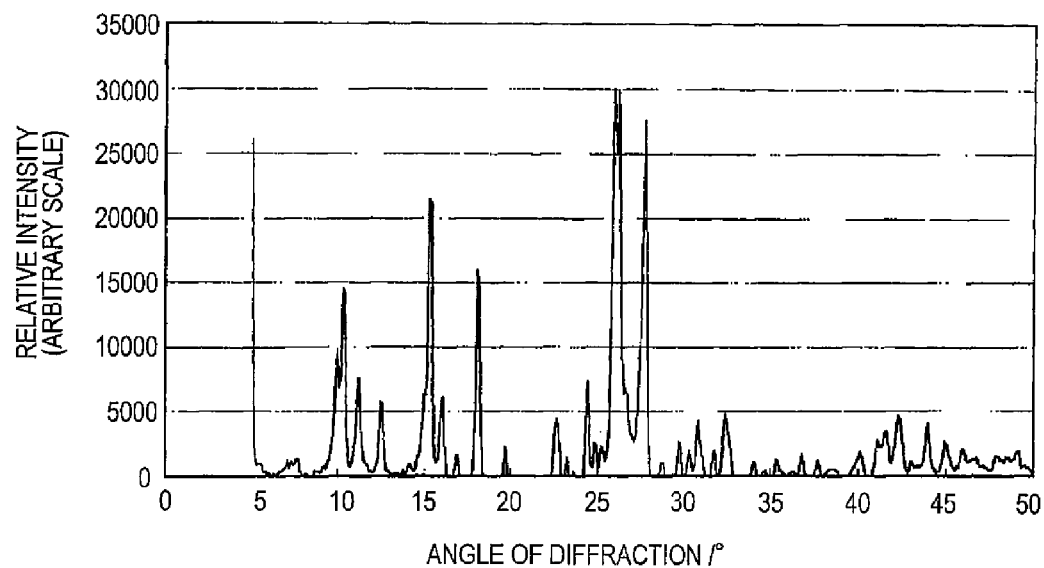
FIG. 24 is a powder X-ray diffraction spectrum view of Pig6-34 synthesized according to Synthesis Example 613.
Figure 25:
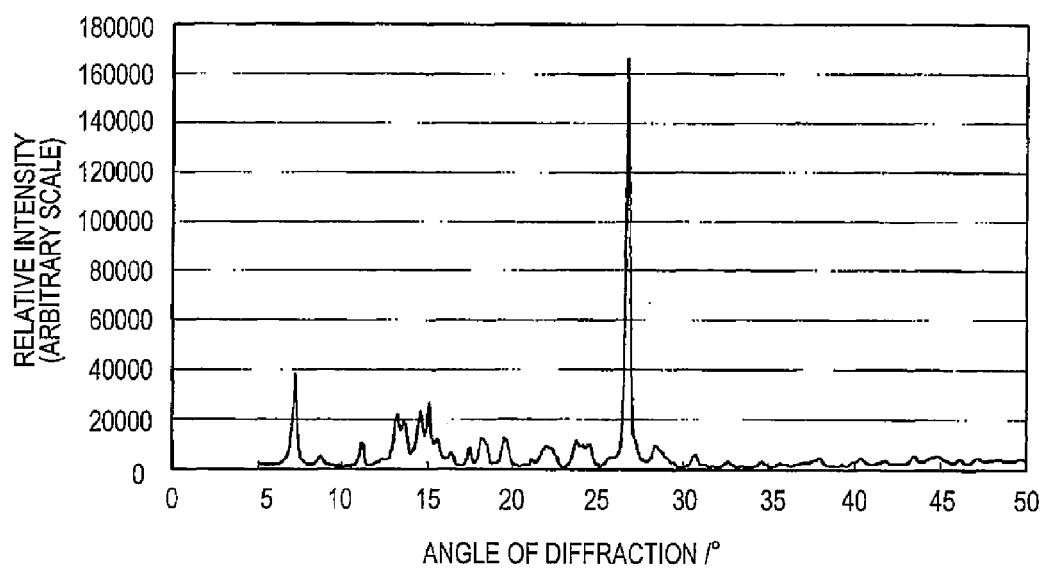
FIG. 25 is a powder X-ray diffraction spectrum view of Pig6-35 synthesized according to Synthesis Example 614.

| Synthesis Example No. | Azo pigment | Powder X-ray diffraction spectrum |
|---|---|---|
| Synthesis Example 609 | Pig6-12 | FIG. 19 |
| Synthesis Example 610 | Pig6-20 | FIG. 20 |
| Synthesis Example 611 | Pig6-22 | FIG. 21 |
| Synthesis Example 612 | Pig6-23 | FIG. 22 |
| Synthesis Example 613 | Pig6-24 | FIG. 23 |
| Synthesis Example 614 | Pig6-34 | FIG. 24 |
| Synthesis Example 615 | Pig6-35 | FIG. 25 |

COMPARATIVE EXAMPLE 601

According to the method described in Example 4 of JP-A-2001-271001, a compound of the following formula (A) was synthesized.

(1) Synthesis of Intermediate (Pig7-80a):

10.0 parts of 5-hydrazino-3-methyl-1,2,4-thiadiazole synthesized according to the method described in Chem. Ber. 95 1983 (1962) was added to 50.0 parts of ethanol to prepare a solution to which 11.7 parts of ethoxymethylenemalononitrile were then added, followed by stirring under heating at 60° C. for 1 hour. After the reaction was complete, the reaction solution was cooled to room temperature, and the precipitated crystals were separated by filtration and washed with isopropanol to obtain 14.4 parts (yield: 85.0%) of an intermediate (Pig7-80a). $^1$H-NMR (DMSO-d6): 8.12(s br, 2H), 8.09(s, 1H), 2.57(s, 3H)

(2) Synthesis of Azo Pigment (Pig7-8)

1.9 parts of the intermediate (Pig7-80a) were added to 22 parts of phosphoric acid, and dissolved with heating to 40° C. The solution was cooled on ice and maintained at −3° C., and 0.8 parts of sodium nitrite were added thereto, followed by stirring for 1 hour to obtain a diazonium salt solution. Meanwhile, 1.5 parts of o-acetoacetanisidide were added and completely dissolved in 45 parts of methanol to prepare a solution to which the above diazonium salt solution was then added at 4° C., followed by reaction for 3 hours. The precipitated powder was separated by filtration and washed with methanol. The powder was added to 200 parts of water, and an excess of the acid was neutralized with sodium hydrogen carbonate. Filtration was carried out again to obtain a crude pigment of Pig7-8. The crude pigment was added to a mixed solvent of 15 parts of N,N-dimethylacetamide and 15 parts of water, followed by aging under heating at 85° C. for 2 hours. The aged solution was filtered under heating and washed with methanol to obtain 0.3 parts (yield: 10.4%) of an azo pigment.

Figure 26:
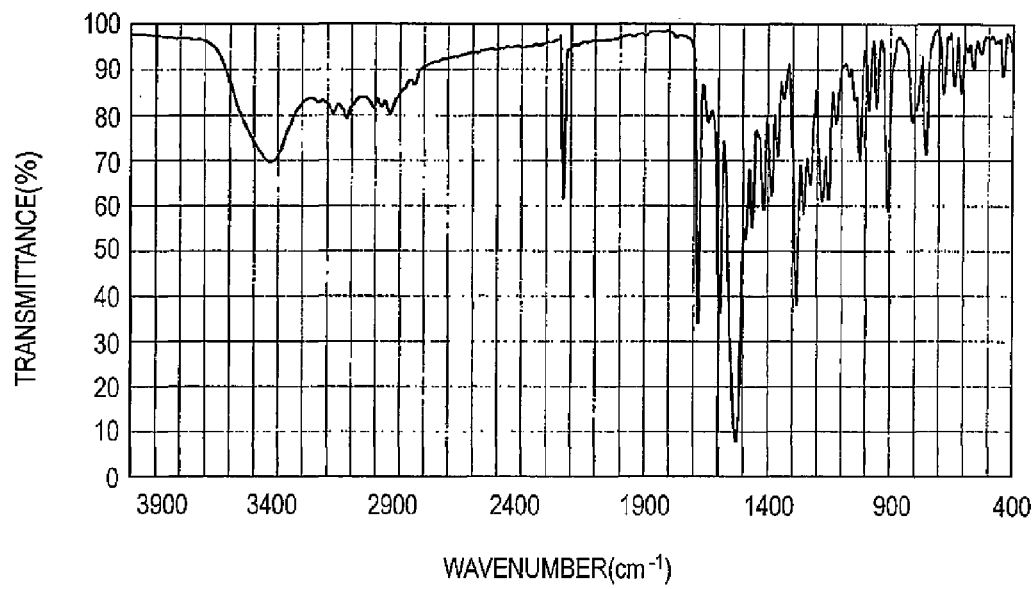
FIG. 26 is an infrared absorption spectrum view of Pig7-8 synthesized according to Synthesis Example 701.

An infrared absorption spectrum of the resulting azo pigment (Pig7-8) is shown in FIG. 26.

SYNTHESIS EXAMPLE 702

Synthesis of Illustrative Pigment (Pig7-30)
Synthesis scheme of an illustrative compound (Pig7-30) is shown as follows.

to the method described in Specification of U.S. Pat. No. 2,936,306 was added. 5 parts of methanol were added thereto, followed by reaction at about 5° C. for 7 hours. The precipitated powder was separated by filtration and washed with methanol. The powder was added to 200 parts of water, and an excess of the acid was neutralized with sodium hydrogen carbonate. Filtration was carried out again to obtain a crude pigment of Pig7-30. The crude pigment was added to 30 parts of N,N-dimethylacetamide, followed by aging under heating at 85° C. for 2 hours. The aged solution was filtered under heating and washed with methanol to obtain 2.0 parts (yield: 78.5%) of an azo pigment (Pig7-30).

Figure 27:
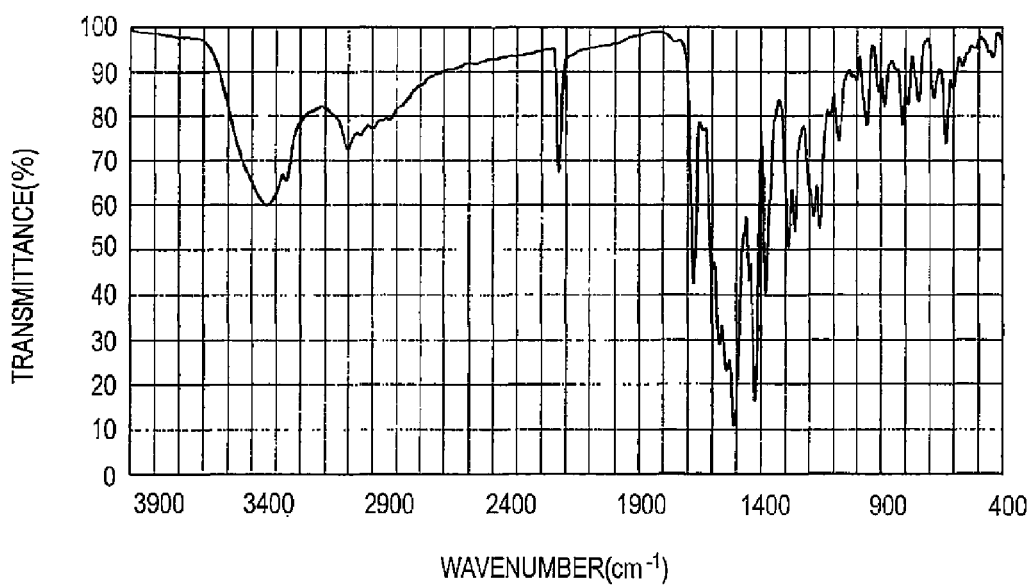
FIG. 27 is an infrared absorption spectrum view of Pig7-30 synthesized according to Synthesis Example 702.

An infrared absorption spectrum of the resulting azo pigment (Pig7-30) is shown in FIG. 27.

SYNTHESIS EXAMPLES 703 to 719

According to synthesis details of the azo pigments of the present invention and the procedure described in Synthesis Examples 701 and 702, synthesis of azo pigments shown in

[Chem. 163]

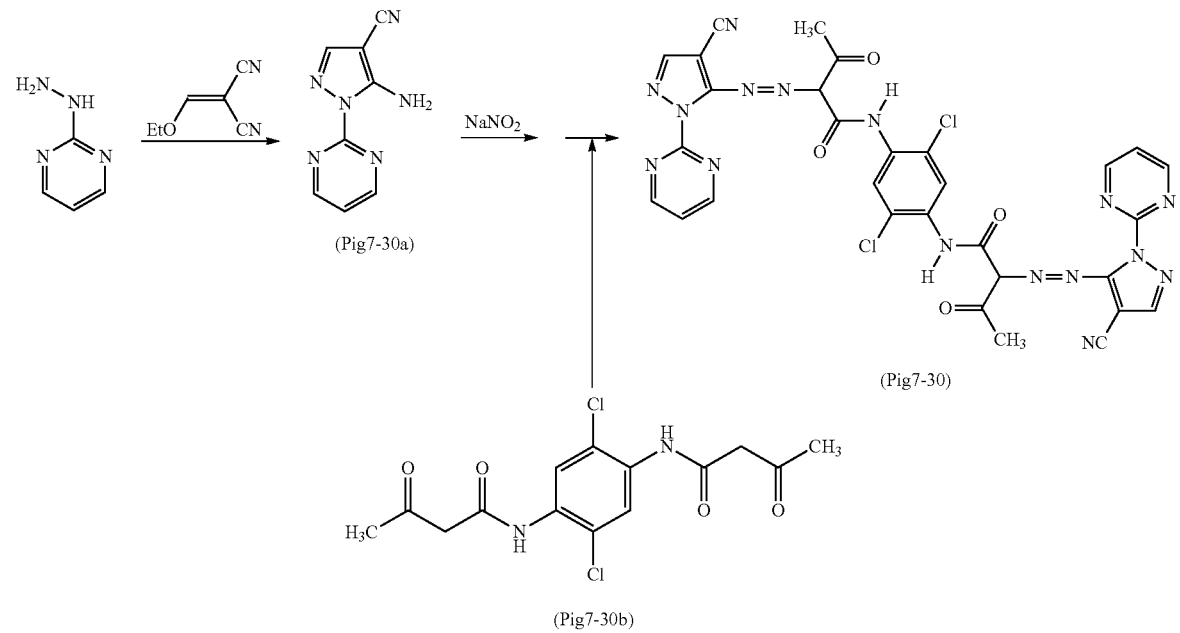

(1) Synthesis of Intermediate (Pig7-300a)

10.0 parts of 2-hydrazinopyrimidine were added to 50 parts of ethanol to prepare a suspension to which 11.8 parts of ethoxymethylenemalononitrile were then added, followed by stirring under heating at 60° C. for 1 hour. After the reaction was complete, the reaction solution was cooled to room temperature, and the precipitated crystals were separated by filtration and washed with isopropanol to obtain 13.3 parts (yield: 80.8%) of an intermediate (Pig-30a). $^1$H-NMR (DMSO-d6): 8.90(d, 2H), 8.09(s br, 114), 7.89(s, 1H), 7.48(t, 1H)

(2) Synthesis of Azo Pigment (Pig7-30)

1.62 parts of the intermediate (Pig7-300a) were added to 25 parts of phosphoric acid and dissolved with heating to 40° C. The solution was cooled on ice and maintained at −3° C., and 0.75 parts of sodium nitrite were added thereto, followed by stirring for 1 hour to obtain a diazonium salt solution to which 1.0 part of the intermediate (Pig-30b) synthesized according Table 2 below was carried out. Infrared absorption spectra of the resulting azo pigments are shown in FIGS. 28 to 44.

TABLE 2

Figure 28:
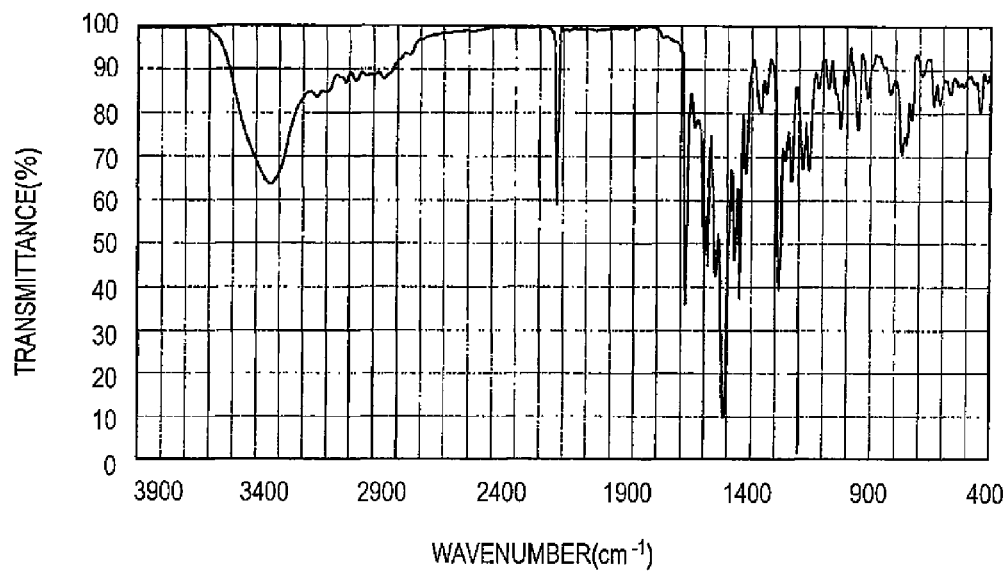
FIG. 28 is an infrared absorption spectrum view of Pig7-1 synthesized according to Synthesis Example 703.
Figure 29:
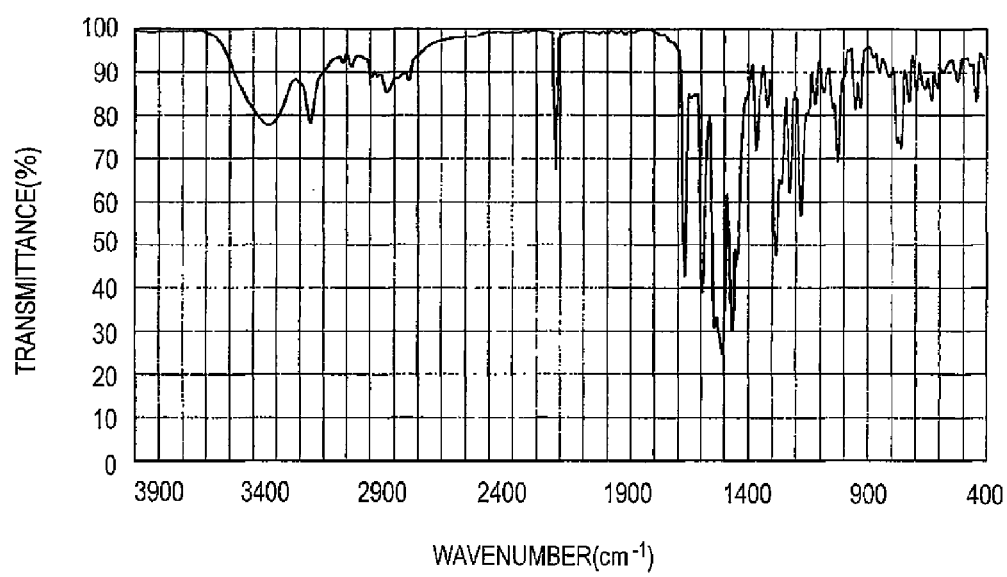
FIG. 29 is an infrared absorption spectrum view of Pig7-2 synthesized according to Synthesis Example 704.
Figure 30:
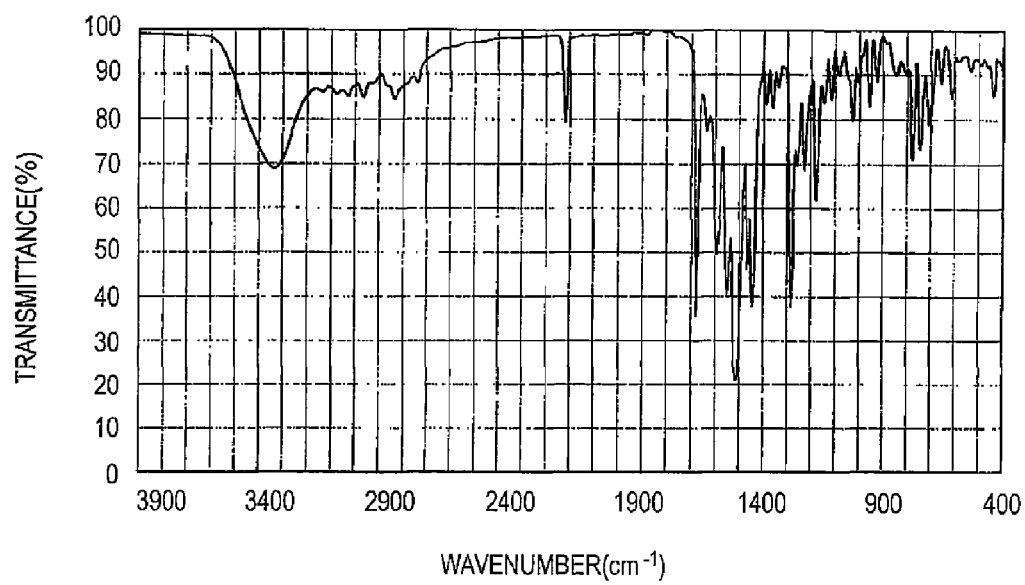
FIG. 30 is an infrared absorption spectrum view of Pig7-3 synthesized according to Synthesis Example 705.
Figure 31:
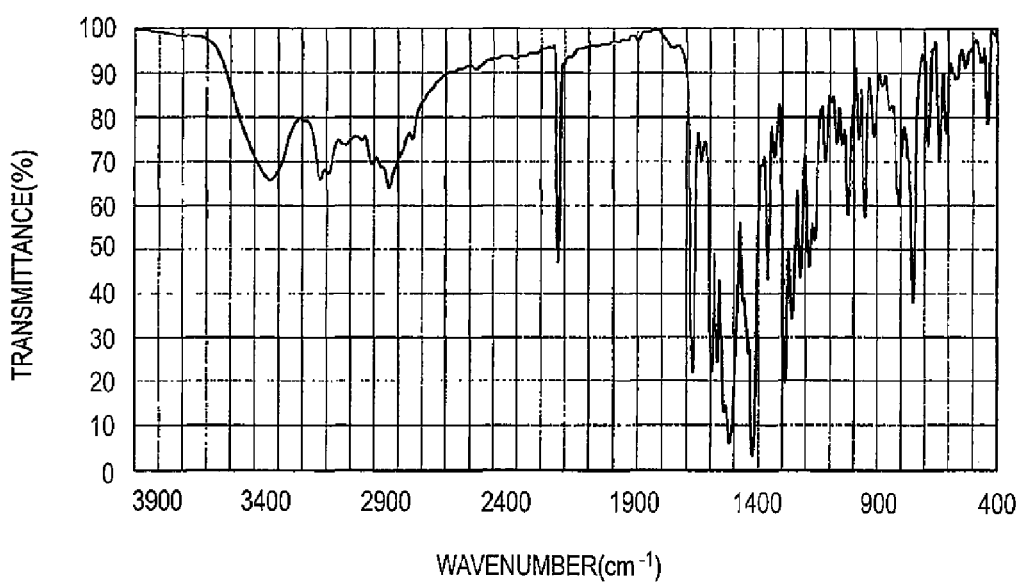
FIG. 31 is an infrared absorption spectrum view of Pig7-4 synthesized according to Synthesis Example 706.
Figure 32:
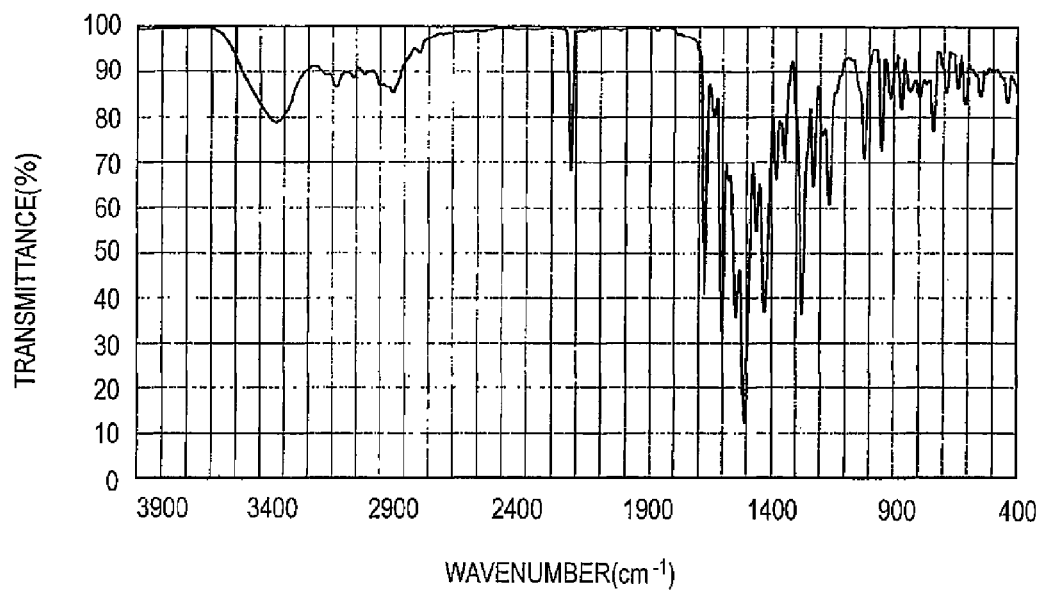
FIG. 32 is an infrared absorption spectrum view of Pig7-5 synthesized according to Synthesis Example 707.
Figure 33:
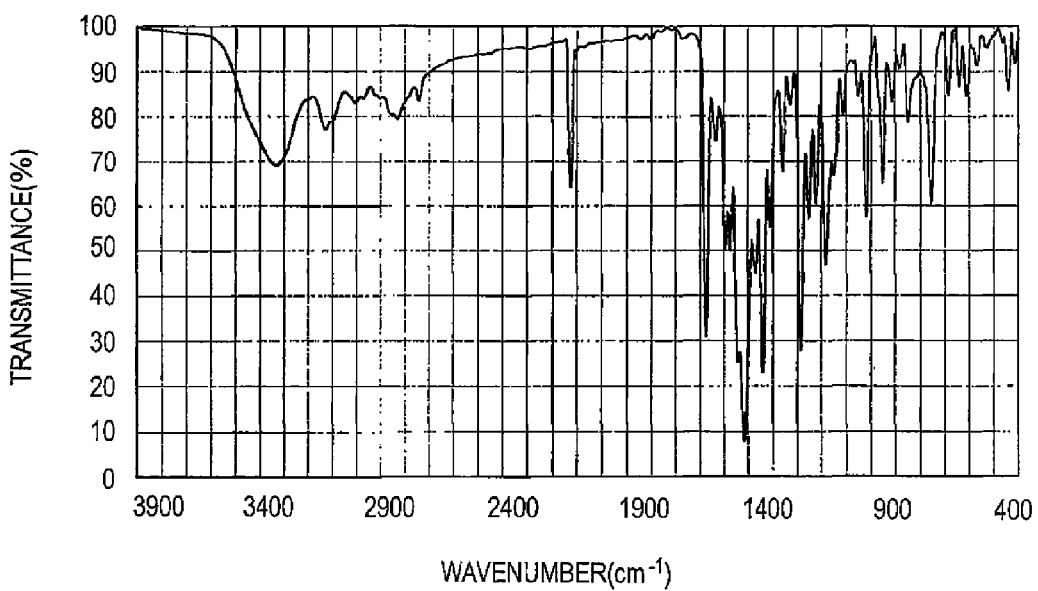
FIG. 33 is an infrared absorption spectrum view of Pig7-6 synthesized according to Synthesis Example 708.
Figure 34:
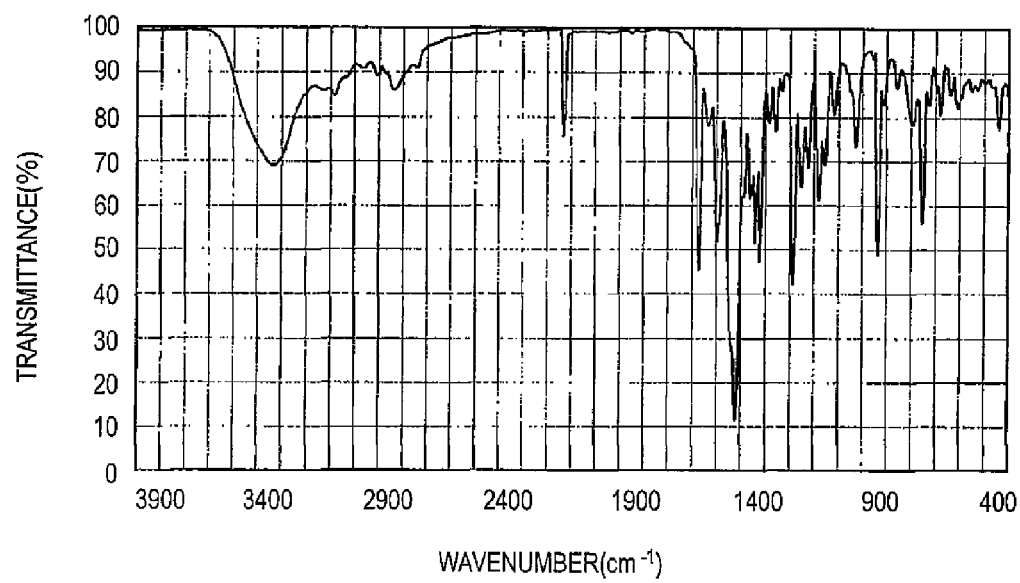
FIG. 34 is an infrared absorption spectrum view of Pig7-9 synthesized according to Synthesis Example 709.
Figure 35:
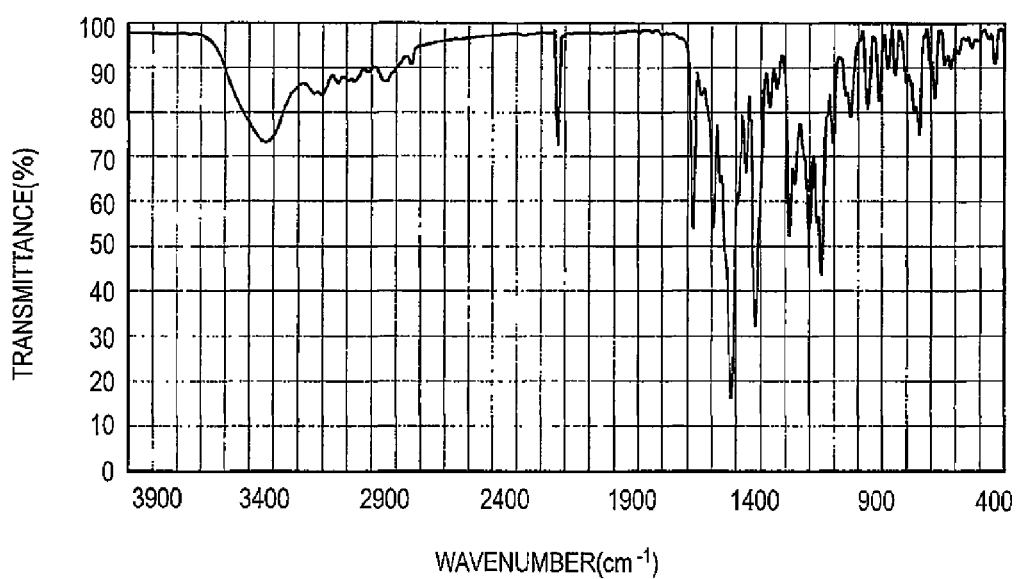
FIG. 35 is an infrared absorption spectrum view of Pig7-10 synthesized according to Synthesis Example 710.
Figure 36:
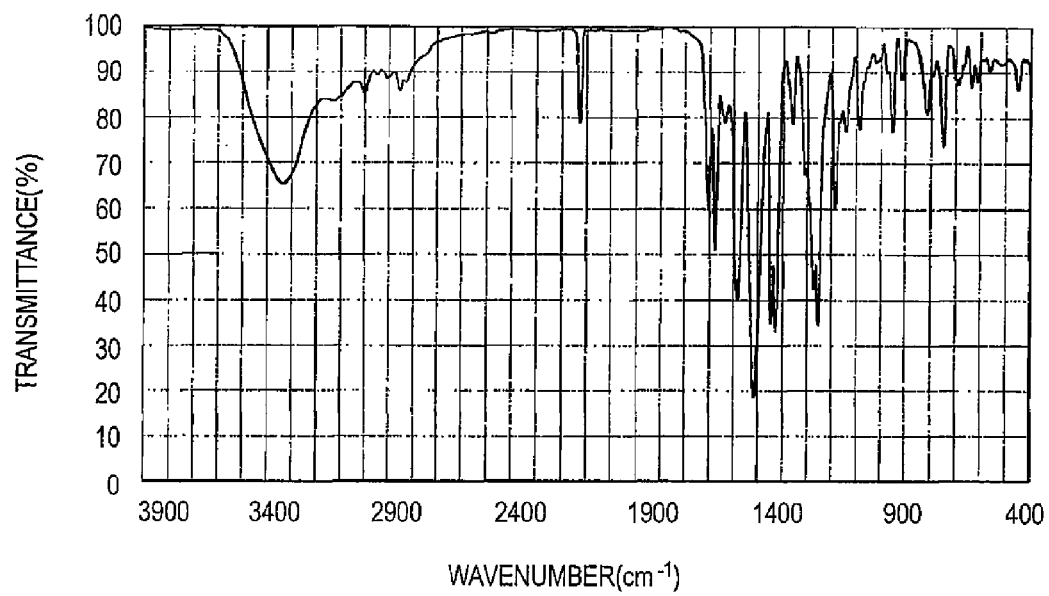
FIG. 36 is an infrared absorption spectrum view of Pig7-11 synthesized according to Synthesis Example 711.
Figure 37:
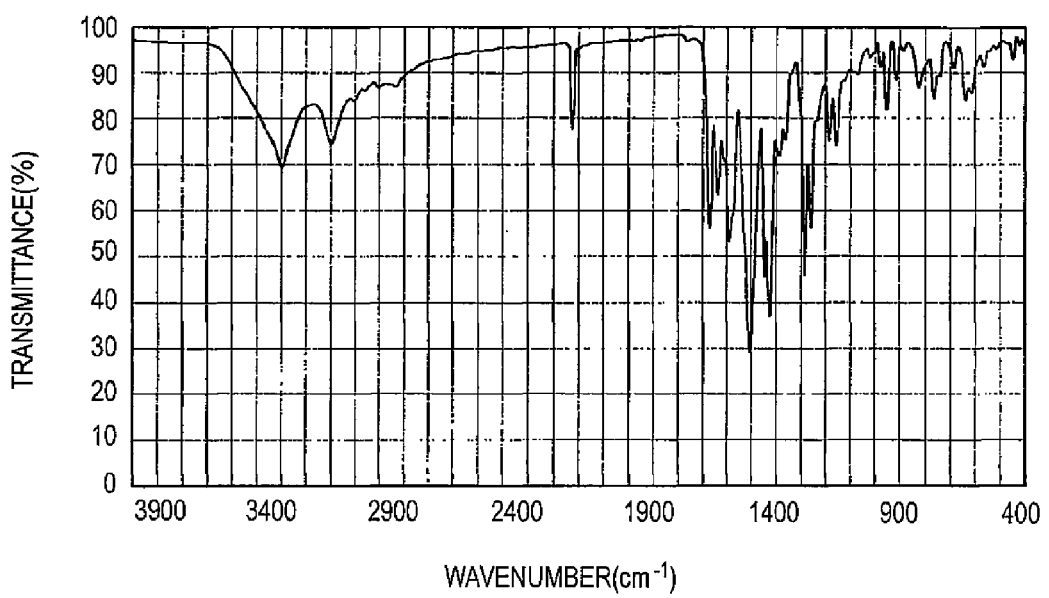
FIG. 37 is an infrared absorption spectrum view of Pig7-12 synthesized according to Synthesis Example 712.
Figure 38:
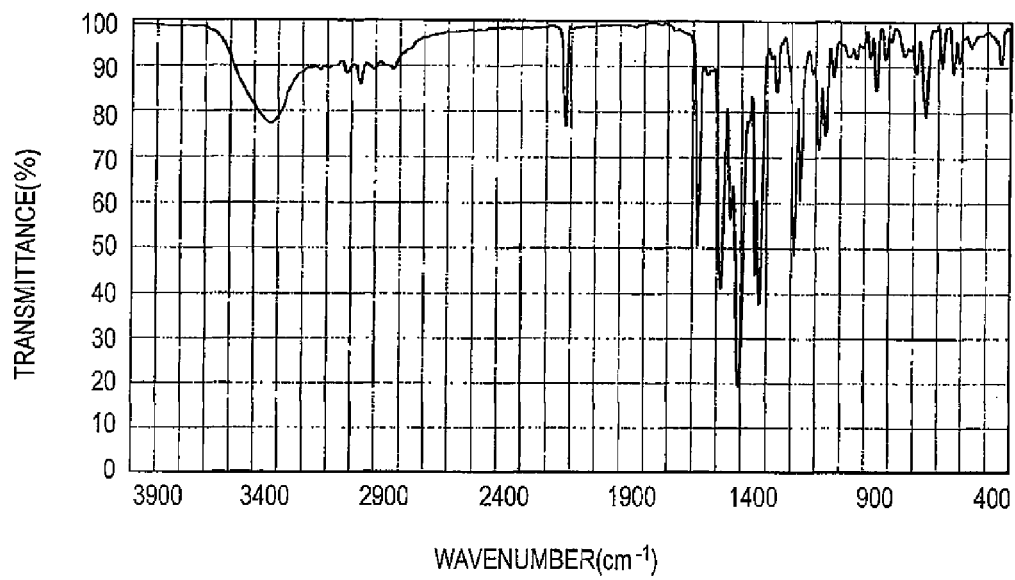
FIG. 38 is an infrared absorption spectrum view of Pig7-13 synthesized according to Synthesis Example 713.
Figure 39:
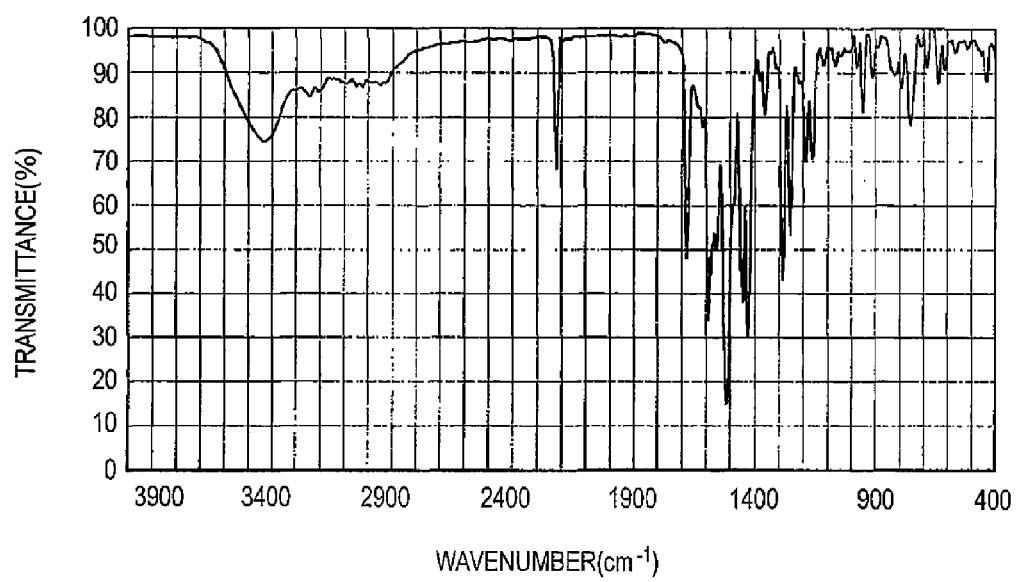
FIG. 39 is an infrared absorption spectrum view of Pig7-14 synthesized according to Synthesis Example 714.

| Synthesis Example No. | Azo pigment | Infrared absorption spectrum |
|---|---|---|
| Synthesis Example 703 | Pig7-1 | FIG. 28 |
| Synthesis Example 704 | Pig7-2 | FIG. 29 |
| Synthesis Example 705 | Pig7-3 | FIG. 30 |
| Synthesis Example 706 | Pig7-4 | FIG. 31 |
| Synthesis Example 707 | Pig7-5 | FIG. 32 |
| Synthesis Example 708 | Pig7-6 | FIG. 33 |
| Synthesis Example 709 | Pig7-9 | FIG. 34 |
| Synthesis Example 710 | Pig7-10 | FIG. 35 |
| Synthesis Example 711 | Pig7-11 | FIG. 36 |
| Synthesis Example 712 | Pig7-12 | FIG. 37 |
| Synthesis Example 713 | Pig7-13 | FIG. 38 |
| Synthesis Example 714 | Pig7-14 | FIG. 39 |

TABLE 2-continued

Figure 40:
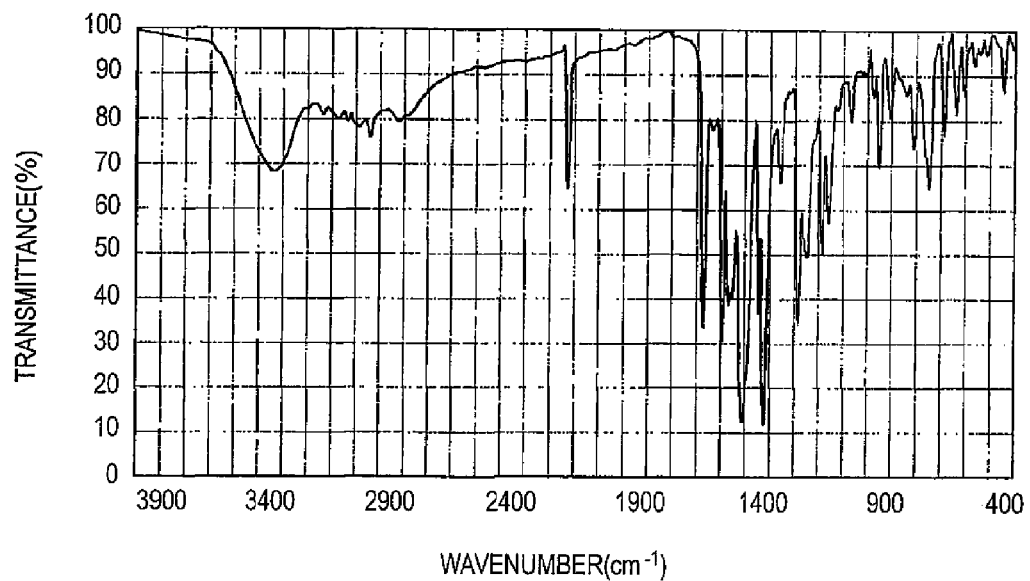
FIG. 40 is an infrared absorption spectrum view of Pig7-15 synthesized according to Synthesis Example 715.
Figure 41:
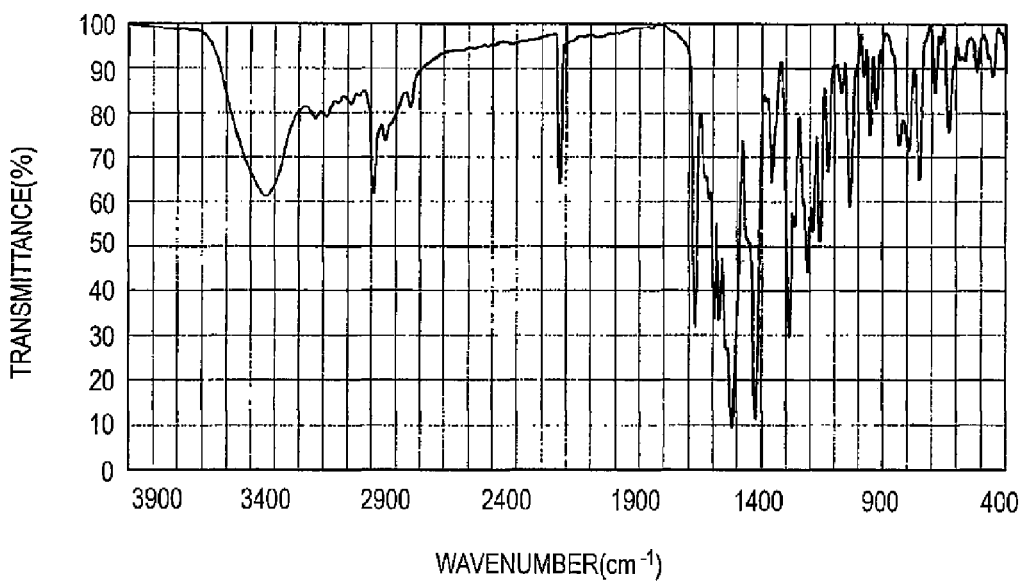
FIG. 41 is an infrared absorption spectrum view of Pig7-16 synthesized according to Synthesis Example 716.
Figure 42:
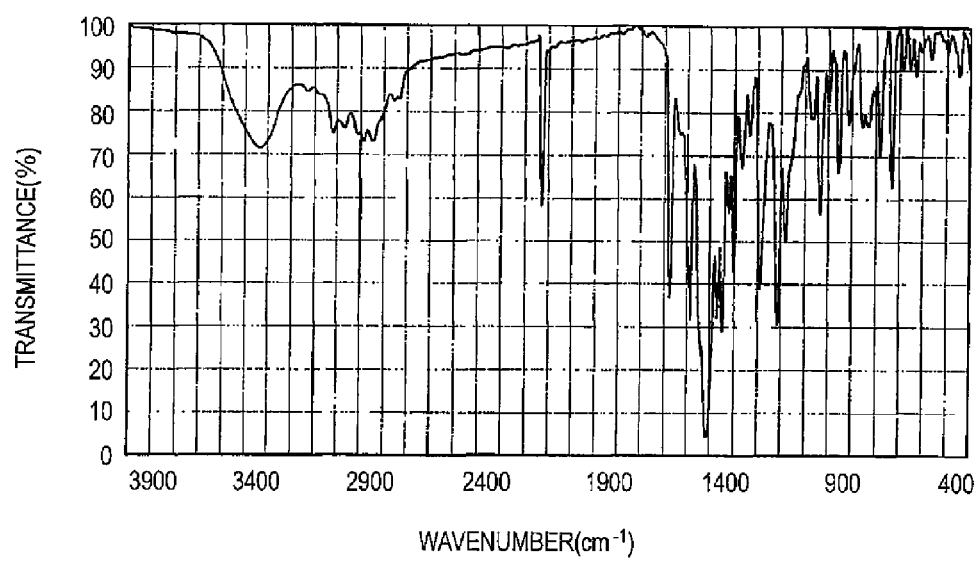
FIG. 42 is an infrared absorption spectrum view of Pig7-17 synthesized according to Synthesis Example 717.
Figure 43:
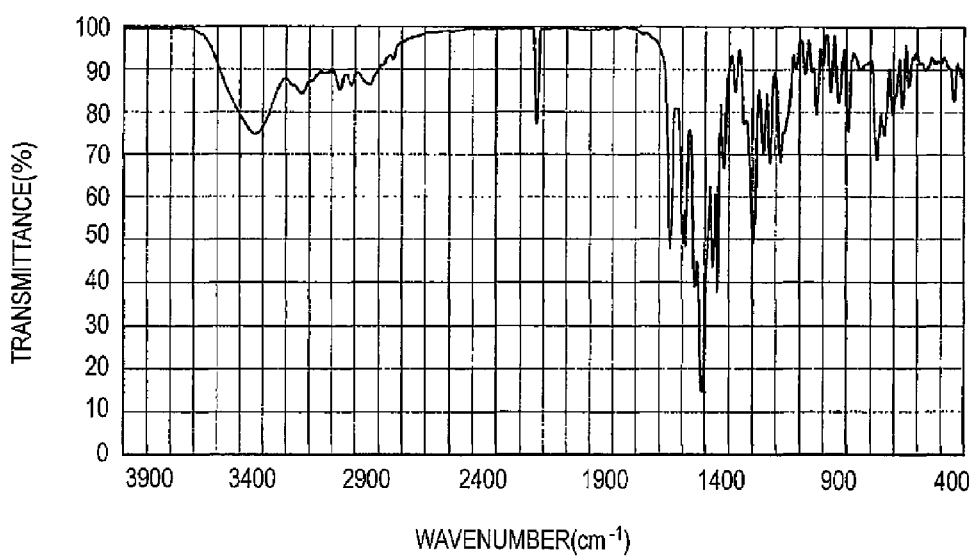
FIG. 43 is an infrared absorption spectrum view of Pig7-21 synthesized according to Synthesis Example 718.
Figure 44:
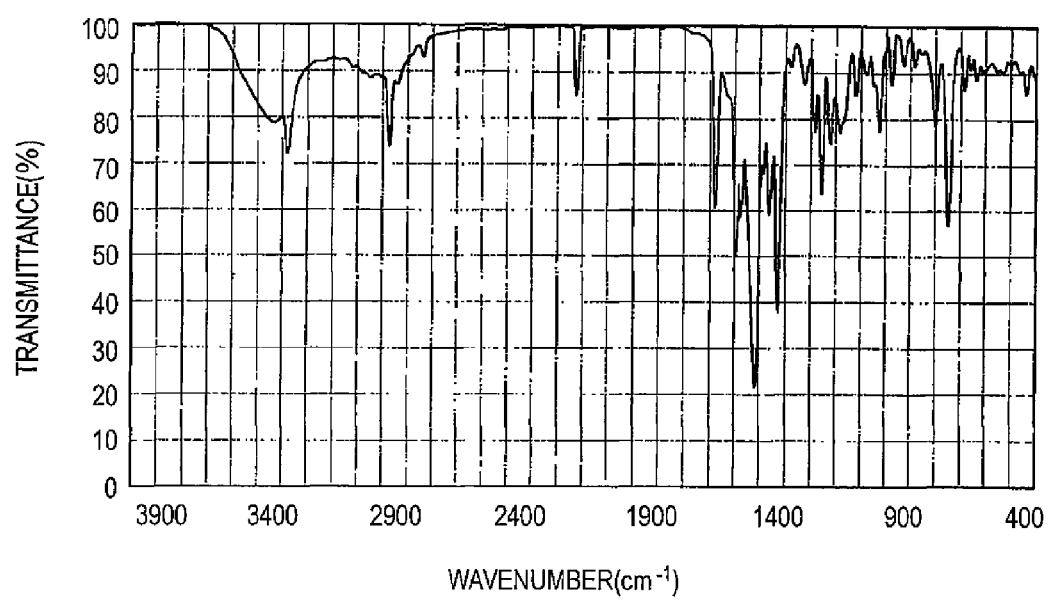
FIG. 44 is an infrared absorption spectrum view of Pig7-22 synthesized according to Synthesis Example 719.

| Synthesis Example No. | Azo pigment | Infrared absorption spectrum |
|---|---|---|
| Synthesis Example 715 | Pig7-15 | FIG. 40 |
| Synthesis Example 716 | Pig7-16 | FIG. 41 |
| Synthesis Example 717 | Pig7-17 | FIG. 42 |
| Synthesis Example 718 | Pig7-21 | FIG. 43 |
| Synthesis Example 719 | Pig7-22 | FIG. 44 |

EXAMPLE 11

2.5 parts of the pigment (Pig-1) synthesized according to Synthesis Example 1, 0.5 parts of sodium oleate, 5 parts of glycerin, and 42 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain yellow pigment dispersion 1.

EXAMPLE 12

Yellow pigment dispersion 2 was obtained in the same procedure as in Example 1, except that a pigment dispersion (Pig-3) was used in place of the pigment (Pig-1) used in Example 1.

EXAMPLE 13

Yellow pigment dispersion 3 was obtained in the same procedure as in Example 11, except that a pigment dispersion (Pig-10) was used in place of the pigment (Pig-1) used in Example 11.

COMPARATIVE EXAMPLE 1

Yellow comparative pigment dispersion 1 was obtained in the same manner as in Example 11, except that C.I. Pigment Yellow 128 (CROMOPHTAL YELLOW 8GN, manufactured by CIBA Specialty Chemicals) was used in place of the pigment (Pig-1) used in Example 11.

COMPARATIVE EXAMPLE 2

Yellow comparative pigment dispersion 2 was obtained in the same manner as in Example 11, except that C.I. Pigment Yellow 74 (Iralite YELLOW GO, manufactured by CIBA Specialty Chemicals) was used in place of the pigment (Pig-1) used in Example 11.

COMPARATIVE EXAMPLE 3

Yellow comparative pigment dispersion 3 was obtained in the same manner as in Example 11, except that C.I. Pigment Yellow 155 (INKJET YELLOW 4G VP 2532, manufactured by Clariant) was used in place of the pigment (Pig-1) used in Example 11.

<Evaluation of Tinctorial Strength>

Each of the pigment dispersions obtained in above Examples and Comparative Examples was coated on a photo mat paper (for pigment only) manufactured by Seiko Epson Corporation by using a No. 3 bar coater. Image density of each of the thus-obtained coated products was measured by means of a reflection densitometer (X-Rite 938; manufactured by X-Rite Co.). The results in terms of tinctorial strength (OD: Optical Density) are shown in Table 3.

<Evaluation of Hue>

Hue was evaluated according to the following criteria: samples of the above-described coated products which are less reddish and have large vividness in terms of chromaticity when viewed with the eye are ranked ○ (good); samples which are reddish or have less vividness are ranked Δ; and samples which are reddish and have less vividness are ranked X (bad).

<Evaluation of Light Resistance>

Each of the coated products of 1.0 in image density used in evaluation of hue was irradiated for 14 days with a xenon light (170000 lux; in the presence of a cut filter which cuts light of 325 nm or less) using a fade meter and image density thereof before and after xenon light irradiation was measured using a reflection densitometer. The pigment dispersions 1 to 3 and the comparative pigment dispersions 1 to 3 were evaluated in terms of colorant residual ratio [(density after irradiation/density before irradiation)×100%]. The results are shown in Table 3.

TABLE 3

| | Pigment | Tinctorial strength | Hue | Light resistance |
|---|---|---|---|---|
| Example 11 | Pigment dispersion 1 | Pig.-1 | 1.20 | ○ | 98.8% |
| Example 12 | Pigment dispersion 2 | Pig.-3 | 1.30 | ○ | 92.5% |
| Example 13 | Pigment dispersion 3 | Pig.-10 | 1.25 | ○ | 91.0% |
| Comparative Example 1 | Comparative pigment dispersion 1 | PY-128 | 1.05 | X | 77.6% |
| Comparative Example 2 | Comparative pigment dispersion 2 | PY-74 | 1.45 | ○ | 12.5% |
| Comparative Example 3 | Comparative pigment dispersion 3 | PY-155 | 1.10 | X | 51.9% |

EXAMPLE 14

A high-molecular weight dispersant represented by Dispersant 10 described in the pamphlet of International publication No. WO2006/064193, page 22 was neutralized with an aqueous potassium hydroxide solution. To 75 parts by mass (solid content 20%) of the resulting dispersant aqueous solution were added 30 parts by mass of the azo pigment (Pig.-1) synthesized in Example 1 and 95 parts by mass of ion-exchanged water, followed by mixing and roughly dispersing with a disper stirring blade. To the mixed and roughly dispersed liquid was added 600 parts by mass of zirconium oxide beads, followed by dispersion in a dispersion machine (sand grinder mill) for 4 hours, and beads were separated from the dispersion. To the resulting mixture were added slowly 2 parts by mass of polyethylene glycol diglycidyl ether at 25° C. under stirring, followed by stirring at 50° C. for 6 hours. Further, impurities were removed using an ultrafiltration membrane having a molecular weight cut-off of 300 K, and the residue was filtered through a 20-mL volume syringe equipped with a 5-μm filter (acetylcellulose membrane; outer diameter: 25 mm; manufactured by Fujifilm Corporation) to remove coarse particles, thus obtaining pigment dispersion 4 (particle diameter: 58 nm, as measured by Nanotrac 150 (UPA-EX150) manufactured by Nikkiso Co., Ltd.) having a solid content of 10%.

COMPARATIVE EXAMPLE 4

A comparative pigment dispersion 4 was obtained in the same manner as in Example 4, except that a yellow pigment (C.I. Pigment Yellow 155 (INKJET YELLOW 4 G VP2532, manufactured by Clariant International Ltd.) was used in place of the azo pigment (Pig-1) used in Example 14.

EXAMPLE 15

Pigment ink liquid 5 shown in Table 4 was obtained as follows: Individual components were added to the pigment dispersion 4 obtained in Example 14 such that the dispersion contains a solid content of 5% by mass, 10% by mass of glycerin, 5% by mass of 2-pyrrolidone, 2% by mass of 1,2-hexanediol, 2% by mass of triethylene glycol monobutyl ether, 0.5% by mass of propylene glycol, and 75.5% by mass of ion-exchanged water. The resulting mixture was filtered through a 20-mL volume syringe equipped with a 1-μm filter (acetylcellulose membrane; outer diameter: 25 mm; manufactured by Fujifilm Corporation) to remove coarse particles, thus obtaining pigment ink liquid 5 given in Table 4.

COMPARATIVE EXAMPLE 5

Comparative pigment ink liquid 5 was obtained in the same procedure as in Example 15, except that comparative pigment dispersion 4 obtained in Comparative Example 4 was used in place of pigment dispersion 4 used in Example 14.

The ink liquids of Example 5 and Comparative Example 5 were used as yellow pigment ink liquids.

COMPARATIVE EXAMPLE 6

As a comparative type of an ink, a yellow ink cartridge of PX-V630 (comparative pigment ink liquid 6) manufactured by SEIKO EPSON CORPORATION was used.

In Table 4, "ejection stability", "light fastness", "moist heat fastness", "ozone (gas) resistance", "metal gloss", "chromaticity", and "ink liquid stability" were rated in the following manner. Each ink was charged in the cartridge of yellow ink liquid of an inkjet printer PX-V630 manufactured by SEIKO EPSON CORPORATION. For other color inks, pigment ink liquids of PX-V630 were used. For the image receiving sheets, SEIKO EPSON photo paper sheets <gloss>, and SEIKO EPSON photo paper sheets CRISPIA <high gloss> were used. Thereon, yellow monochrome image patterns, and green, red, and gray image patterns were neatly printed in the recommended mode with stepwise changing densities. Thus, the image quality, and the ink ejection property and image fastness were evaluated.

For the inkjet inks of Example 15 (pigment ink liquid 5) and Comparative Example (comparative pigment ink liquid 5 and yellow pigment ink liquid of PX-V630; comparative pigment ink liquid 6), the following evaluations were carried out. The results are shown in Table 4.

(Evaluation Experiment)

1) For the ejection stability, a cartridge was set in a printer, and ejection of an ink from all the nozzles was checked. Then, 20 A4 size paper sheets were output and rated based on the following criteria.

A: No irregular printing from the start of printing till the completion;

B: Output with irregular printing occurs; and

C: Irregular printing occurs from the start of printing till the completion.

2) As for the yellow image storability, the following evaluations were carried out using three printing samples having a reflection density of 1, 1.5, and 2 immediately after printing.

[1] As for the light fastness, the image density Ci immediately after printing was measured by means of X-rite 310 (manufactured by X-Rite). Then, by means of a weather meter manufactured by Atlas Co., the image was irradiated with xenon light (99000 Lux.) for 28 days. Then, the image density Cf was measured again to determine the yellow image residual ratio Cf/Ci×100. Thus, the evaluation was carried out. As for the image residual ratio of three printing samples, the evaluations were carried out as follows: The case where the yellow image residual ratios in all the printing samples were 80% or more was rated as A; the case where the ratios at two printing samples were less than 80% was rated as B; and the case where the ratios at all the printing samples were less than 80% was rated as C.

[2] As for the moist heat fastness, printing samples were stored for 10 days under the conditions of 80° C. and 70% RH. Then, the densities before and after storage of printing samples were measured by means of X-Rite 310 to determine the yellow image residual ratio. Thus, the evaluation was carried out. As for the image residual ratio of three printing samples, the evaluations were carried out as follows: The case where the yellow image residual ratios in all the printing samples were 95% or more was rated as A; the case where the ratios at two points were less than 95% was rated as B; and the case where the ratios at all the densities were less than 95% was rated as C.

[3] As for the ozone resistance (ozone fastness), samples were allowed to stand in a box with an ozone gas concentration set at 5 ppm (23° C.; 50%) for 28 days. Then, the image densities before and after standing under an ozone gas were measured by means of a reflection densitometer (Photographic Densitometer 310 manufactured by X-Rite). Thus, evaluation was carried out as the yellow image residual ratio. Incidentally, the measurements were carried out at 3 points with the reflection densities of 1, 1.5, and 2.0. The ozone gas concentration in the box was set by means of an ozone gas monitor (model: OZG-EM-01) manufactured by APPLICS.

As for the image residual ratio of three printing samples, the evaluations were carried out as follows: The case where the yellow image residual ratios at all densities were 80% or more was rated as A; the case where the ratios at one or two points were less than 80% was rated as B; and the case where the ratios at all the densities were less than 70% was rated as C. Thus, rating was conducted on a scale of three levels.

[4] Occurrence or non-occurrence of metal gloss: The yellow, and green and red solid printed image portions were visually observed by reflected light, and evaluated.
○: non-occurrence of metal gloss, X: occurrence of metal gloss.
[5] Chromaticity: A yellow monochrome image pattern with a stepwise changing density was measured for CIE L*a*b* by Spectro Eye manufactured by Gretag Macbeth. The a* and the b* at a reflection density of 1.0 are shown in Table below. As the image receiving sheets, SEIKO EPSON photo paper sheets CRISPIA <high gloss> were used.
[6] Ink liquid stability: The pigment ink liquids of Examples and Comparative Examples were allowed to stand at 60° C. for 10 days. The evaluation was carried out as follows:
○: no change in diameter of particles in pigment ink liquids, Δ: change in diameter of particles, and X: occurrence of precipitation.

The results are given in Table 4 below.

TABLE 4

| Ink | Ejection stability | Light fastness | Moist heat fastness | Ozone fastness | Metal gloss | Ink liquid stability | Pigment |
|---|---|---|---|---|---|---|---|
| Example 15 (Invention) | A | A | A | A | ○ | ○ | Pig-1 |
| Comparative Example 5 | A | B | A | A | X | Δ | C.I.PY-155 |
| Comparative Example 6 | A | C | B | B | ○ | ○ | PX-V630 |

As can be seen from the results of Table 4, with the pigment ink liquid using the pigment of the present invention, the ejectability and the weatherability are excellent, and the occurrence of metal gloss is suppressed. The hue as yellow is excellent (a* is minus=less reddish, and b* is large=high color saturation), and the pigment ink liquid stability is excellent.

As can be seen from the results of Table 4, with the system using the ink of the present invention, all the performances are excellent. Particularly, as compared with Comparative Examples, the light fastness and the ink liquid stability are excellent.

EXAMPLE 16

Using the pigment ink liquid prepared in Example 15, an image was printed on the inkjet paper photo gloss paper "Gasai" manufactured by Fujifilm Corporation, in PX-V630 manufactured by SEIKO EPSON CORPORATION. Then, the same evaluations as those in Example 15 were carried out. As a result, the same results were obtained.

As can be seen from the results of Tables 3 and 4, pigment dispersions 1 to 5 and pigment ink liquid 5 using the pigment of the present invention exhibited excellent hue, and high tinctorial strength and light resistance.

EXAMPLE 17

3 parts by mass of the azo pigment of the present invention (Pig.-21) and 100 parts by mass of a resin for toner [styrene-acrylic acid ester copolymer; trade name HIMER TB-1000F (manufactured by Sanyo Chemical Industries, Ltd.)] were mixed and ground in a ball mill. Then, the mixture was heated to 150° C. to be molten and mixed. After cooling, the mixture was coarsely crushed using a hammer mill, and then finely pulverized by a pulverizer of an air jet system. The resulting particles were further classified, and 1 to 20 micro was selected, resulting in a toner. To 10 parts of the toner, 900 parts by mass of carrier iron powder (trade name EFV250/400; manufactured by Nippon Iron Powder) were uniformly mixed, resulting in a developer. Similarly, each sample was prepared in the same manner, except that the colorant shown in Table 5 was used in an amount of 3 parts by mass. By the use of these developers, copying was carried out by means of a dry ordinary paper electrophotographic copier [trade name NP-5000; manufactured by CANON, Corp.].

Reflected images (images on paper) and transmitted images (OHP images) were formed on paper and OHP sheets, respectively, with a developer using the color toner of the present invention in accordance with the foregoing image forming method, and the evaluation tests were conducted in the following manner. The amount of the toner deposited was evaluated in the range of 0.7±0.05 (mg/cm$^2$).

The resulting images were evaluated for hue and light fastness. The hue was visually rated on a scale of three levels of best, good, and bad. The evaluation results are shown in Table 5. In Table 5 below, ○ denotes that the hue is best; Δ denotes that the hue is good; and X denotes that the hue is bad. The light fastness was evaluated in the following manner. The image density Ci immediately after recording was measured and thereafter, the image was irradiated with xenon light (85,000 Lux) for 5 days, by means of a weather meter (Atlas C. 165). Then, the image density Cf was measured again, and the colorant residual ratio ({Ci−Cf/Ci}×100%) was calculated from the difference in image density between before and after xenon light irradiation. The image density was measured by means of a reflection densitometer (X-Rite 310TR). The evaluation results are shown in Table 5 below. In Table 5, the case where the colorant residual ratio was higher than 90% is indicated with ○; the case of 90 to 80%, Δ; and the case of less than 80%, X.

The transparency of the OHP image was evaluated in the following manner. By means of a "330 model autographic spectrophotometer" manufactured by Hitachi Ltd., the visible spectral transmittance of the image was measured with the OHP sheet having no toner carried thereon as a reference. The spectral transmittance at 650 nm was determined and taken as the scale for the transparency of the OHP image. The case of the spectral transmittance of higher than 80% is indicated with ○; 70 to 80%, Δ; and less than 70%, X. The results up to this point are shown in Table 5.

TABLE 5

|  | Colorant No. | Hue | Light fastness | Transparency |
|---|---|---|---|---|
| Invention | Pig.-21 | ○ | ○ | ○ |
| Comparative | C.I.SOLVENT.YELLOW162 | Δ | Δ | Δ |

As can be seen from Table 5, the use of the color toner of the present invention provides faithful color reproduction and high OHP quality. Accordingly, the color toner of the present invention is suitable for use as a full color toner. Further, it is good in light resistance, which can provide images storable over a long period.

EXAMPLE 19

The color filter was manufactured in the following manner. Onto a silicon wafer was spin coated a positive type resist composition containing a thermosetting resin, a quinonediazide compound, a crosslinking agent, a colorant, and a solvent. The solvent was evaporated by heating, followed by exposure to light through a mask, to decompose the quinonediazide compound. If necessary, after heating, development was carried out to obtain a mosaic pattern. The exposure to light was carried out by means of an i-ray exposure stepper HITACHI LD-5010-i (NA=0.40) manufactured by Hitachi Ltd. The developer used was SOPD or SOPD-B manufactured by Sumitomo Chemical Co., Ltd.
<Preparation of Positive Type Resist Composition>

3.4 parts by mass of a cresol novolak resin (mass-average molecular weight of 4300 in terms of polystyrene) resulting from a m-cresol/p-cresol/formaldehyde (reaction mole ratio=5/5/7.5) mixture, 1.8 parts by mass of o-naphthoquinonediazide-5-sulfonic acid ester (an average of two hydroxyl groups have been esterified) prepared by using a phenol compound represented by the following formula, 0.8 parts by mass of hexamethoxymethylolated melamine, 20 parts by mass of ethyl lactate, and 1 part by mass of the azo pigment (Pig.-31) of the present invention shown in Table 6 were mixed to obtain a positive type resist composition.

[Chem. 164]

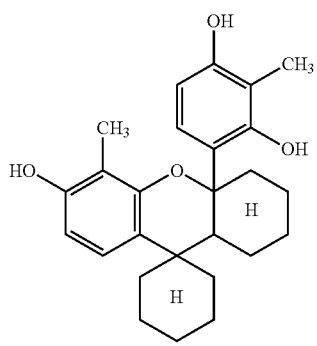

<Preparation of Color Filter>

The resulting positive type resist composition was spin coated onto a silicon wafer. Then, the solvent was evaporated. The silicon wafer was exposed to light, and then heated at 100° C. Then, the exposed portion was removed by alkali development to obtain a positive type colored pattern having a 0.8-μm resolution. This was entirely exposed to light and then heated at 150° C. for 15 minutes, resulting in a yellow complementary color type color filter.
<Comparative Example>

In place of the azo pigment of the present invention used in the examples, 1 part by mass of Oleosol yellow 2G manufactured by Sumitomo Chemical Co., Ltd. was mixed, resulting in a positive type resist composition. The resulting positive type resist composition was spin coated onto a silicon wafer. Then, the solvent was evaporated. The silicon wafer was exposed to light and then subjected to alkali development, resulting in a positive type colored pattern having a 1-μm resolution. This was entirely exposed to light and then heated at 150° C. for 10 minutes, resulting in a yellow color filter.
<Evaluation>

The transmission spectrum of the resulting yellow color filter was measured, and the cutting on the short wavelength side or the long wavelength side of the spectrum important for color reproduction was relatively evaluated. ○ denotes good; Δ denotes somewhat acceptable level; and X, unacceptable level. Further, the filter was irradiated with xenon light (85000 Lux) by means of a weather meter (Atlas C. 165) for 7 days. Then, the image densities before and after xenon irradiation were measured, and the evaluation was carried out in terms of colorant residual ratio.

TABLE 6

|  | Colorant | Absorption characteristics | Light fastness |
|---|---|---|---|
| Invention | Pig.-31 | ○ | 98% |
| Comparative | Oleosol yellow 2G | Δ | 59% |

The colorant of the present invention exhibits a sharper cutting on the short wavelength side or on the long wavelength side of the spectrum, and is excellent in color reproducibility as compared with Comparative Example. Further, it has been shown that the pigment of the present invention is superior in light fastness to the comparative pigment.

Accordingly, a pigment dispersion using the pigment of the present invention can be preferably used, for example, in inks for printing of inkjet or the like, color toners for electrophotography, color filters for displays such as LCDs and PDPs or image pick-up devices such as CCDs, dying materials, colored plastics, and the like.

EXAMPLE 2

EXAMPLE 101

2.5 parts of the pigment of illustrative specific compound D1-1, 0.5 parts of sodium oleate, 5 parts of glycerin, and 42 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain pigment dispersion 101.

EXAMPLE 102

5 parts of the pigment (D1-1) synthesized according to Synthesis Example 101, 25.5 parts of a methacrylic acid-methacrylic acid ester copolymer aqueous solution represented by Dispersant Solution 10 described in the pamphlet of International publication No. WO2006/064193, page 22, as a high-molecular weight dispersant, and 19.5 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain pigment dispersion 102.

COMPARATIVE EXAMPLE 101

Yellow comparative pigment dispersion 1 was obtained in the same manner as in Example 101, except that C.I. Pigment Yellow 128 (CROMOPHTAL YELLOW 8GN, manufactured by CIBA Specialty Chemicals) was used in place of the pigment used in Example 101.

COMPARATIVE EXAMPLE 102

Yellow comparative pigment dispersion 2 was obtained in the same manner as in Example 101, except that C.I. Pigment Yellow 74 (Iralite YELLOW GO, manufactured by CIBA Specialty Chemicals) was used in place of the pigment (D1-1) used in Example 101.

COMPARATIVE EXAMPLE 103

Yellow comparative pigment dispersion 103 was obtained in the same manner as in Example 101, except that C.I. Pigment Yellow 155 (INKJET YELLOW 4G VP 2532, manufactured by Clariant) was used in place of the pigment (D1-1) used in Example 101.

Using the above-prepared pigment dispersions, the following evaluations were carried out.

(Evaluation)

<Dispersion Stability>

The volume-average particle diameter of the resulting pigment dispersion was measured using a dynamic-light-scattering-based particle size analyzer (Microtrac UPA150, manufactured by Nikkiso Co., Ltd.), in accordance with a conventional method. The evaluations were carried out as follows: The case where both the volume-average particle diameter measured 2 hours after the preparation of the pigment dispersion, and the volume-average particle diameter measured after the storage of the pigment dispersion at 70° C. for 2 days were 230 nm or less was rated as ○ (good); and either of two values was 230 nm or more was rated as X (bad). The results are given in Table 7 below.

<Evaluation of Tinctorial Strength>

The evaluation was carried out in the same manner as in Section <Evaluation of tinctorial strength> as described above. The results are given in Table 7 below.

<Evaluation of Light Resistance>

The evaluation was carried out in the same manner as in Section <Evaluation of light resistance> as described above. The results are given in Table 7 below.

EXAMPLES 103 to 106

Pigment dispersions 103 to 106 were prepared in the same manner as in Example 101, except that the illustrative specific compound D1-1 of Example 101 was changed as shown in Table 7 below. Evaluations were carried out as described hereinbefore.

TABLE 7

| | Pigment | Dispersion stability | Tinctorial strength | Light resistance |
|---|---|---|---|---|
| Example 101 | D1-1 | ○ | 1.35 | 90.7% |
| Example 102 | D1-1 | ○ | 1.35 | 90.7% |
| Example 103 | D1-2 | ○ | 1.39 | 90.5% |
| Example 104 | D1-4 | ○ | 1.33 | 90.4% |
| Example 105 | D1-5 | ○ | 1.36 | 89.0% |
| Example 106 | D1-10 | ○ | 1.25 | 88.0% |
| Comparative Example 101 | P.Y.128 | ○ | 1.05 | 77.6% |
| Comparative Example 102 | P.Y.74 | ○ | 1.45 | 12.5% |
| Comparative Example 103 | P.Y.155 | ○ | 1.10 | 51.9% |

EXAMPLE 107

A high-molecular weight dispersant represented by Dispersant 10 described in the pamphlet of International publication No. WO2006/064193, page 22 was neutralized with an aqueous potassium hydroxide solution. To 75 parts by mass (solid content 20%) of the resulting dispersant aqueous solution were added 30 parts by mass of the azo pigment (D1-1) synthesized in Synthesis Example 101 and 95 parts by mass of ion-exchanged water, followed by mixing and roughly dispersing with a disper stirring blade. To the mixed and roughly dispersed liquid was added 600 parts by mass of zirconium oxide beads, followed by dispersion in a dispersion machine (sand grinder mill) for 4 hours, and beads were separated from the dispersion. To the resulting mixture were added slowly 2 parts by mass of polyethylene glycol diglycidyl ether at 25° C. under stirring, followed by stirring at 50° C. for 6 hours. Further, impurities were removed using an ultrafiltration membrane having a molecular weight cut-off of 300 K, and the residue was filtered through a 20-mL volume syringe equipped with a 5-µm filter (acetylcellulose membrane; outer diameter: 25 mm; manufactured by Fujifilm Corporation) to remove coarse particles, thus obtaining pigment dispersion 107 (particle diameter: 80 nm, as measured by Nanotrac 150 (UPA-EX150) manufactured by Nikkiso Co., Ltd.) having a solid content of 10%.

COMPARATIVE EXAMPLE 104

Comparative pigment dispersion 104 was obtained in the same manner as in Example 107, except that a yellow pigment (C.I. Pigment Yellow 128, (CROMOPHTAL YELLOW 8GN, manufactured by CIBA Specialty Chemicals)) was used in place of the azo pigment (D1-1) used in Example 107.

EXAMPLE 108

Pigment ink liquid 105 shown in Table 8 was obtained as follows: Individual components were added to the pigment dispersion 107 obtained in Example 107 such that the dispersion contains a solid content of 5% by mass, 10% by mass of glycerin, 5% by mass of 2-pyrrolidone, 2% by mass of 1,2-hexanediol, 2% by mass of triethylene glycol monobutyl ether, 0.5% by mass of propylene glycol, and 75.5% by mass of ion-exchanged water. The resulting mixture was filtered through a 20-mL volume syringe equipped with a 1-µm filter (acetylcellulose membrane; outer diameter: 25 mm; manufactured by Fujifilm Corporation) to remove coarse particles, thus obtaining pigment ink liquid 105 given in Table 8.

COMPARATIVE EXAMPLE 105

Comparative pigment ink liquid 105 was obtained in the same procedure as in Example 108, except that comparative pigment dispersion 104 obtained in Comparative Example 104 was used in place of pigment dispersion 107 obtained in Example 107.

COMPARATIVE EXAMPLE 106

As for a comparative type of an ink, an ink liquid used in a yellow ink cartridge of PX-V630 (manufactured by SEIKO EPSON CORPORATION) was used as a comparative pigment ink liquid 106.

In Table 8, "ejection stability", "light fastness", "heat fastness", "ozone fastness", "metal gloss", and "ink liquid stability" were rated in the following manner. Each ink was charged in the cartridge of yellow ink liquid of an inkjet printer PX-V630 manufactured by SEIKO EPSON CORPORATION. For other color inks, pigment ink liquids of PX-V630 were used. For the image receiving sheets, SEIKO EPSON photo paper sheets <gloss>, and SEIKO EPSON photo paper sheets CRISPIA <high gloss> were used. Thereon, monochrome image patterns, and green, red, and gray image patterns were neatly printed in the recommended mode with stepwise changing densities. Thus, the image quality, and the ink ejection property and image fastness were evaluated. Evaluations were monochromatically carried out except for metal gloss.

For the inkjet inks of Example 108 (pigment ink liquid 105) and Comparative Example (comparative pigment ink liquid 105 and yellow pigment ink liquid of PX-V630; comparative pigment ink liquid 106), the following evaluations were carried out. The results are shown in Table 8.
(Evaluation Experiment)
1) For the ejection stability, a cartridge was set in a printer, and ejection of an ink from all the nozzles was checked. Then, 20 A4 size paper sheets were output and rated based on the following criteria.
   A: No irregular printing from the start of printing till the completion;
   B: Output with irregular printing occurs; and
   C: Irregular printing occurs from the start of printing till the completion.
2) As for the image storability, the following evaluations were carried out using three printing samples having a reflection density of 1, 1.5, and 2 immediately after printing.
[1] As for the light fastness, the image density Ci immediately after printing was measured by means of X-rite 310 (manufactured by X-Rite). Then, by means of a weather meter manufactured by Atlas Co., the image was irradiated with xenon light (100000 Lux) for 14 days. Then, the image density Cf was measured again to determine the image residual ratio Cf/Ci×100. Thus, the evaluation was carried out. As for the image residual ratio of three printing samples, the evaluations were carried out as follows: The case where the yellow image residual ratios in all the printing samples were 80% or more was rated as A; the case where the ratios at two printing samples were less than 80% was rated as B; and the case where the ratios at all the printing samples were less than 80% was rated as C.
[2] As for the heat fastness, printing samples were stored for 7 days under the conditions of 80° C. and 60% RH. Then, the densities before and after storage of printing samples were measured by means of X-Rite 310 to determine the image residual ratio. Thus, the evaluation was carried out. As for the image residual ratio of three printing samples, the evaluations were carried out as follows: The case where the yellow image residual ratios in all the printing samples were 95% or more was rated as A; the case where the ratios at two points were less than 95% was rated as B; and the case where the ratios at all the densities were less than 95% was rated as C.
[3] As for the ozone resistance (ozone fastness), samples were allowed to stand in a box with an ozone gas concentration set at 5 ppm (25° C.; 50%) for 14 days. Then, the image densities before and after standing under an ozone gas were measured by means of a reflection densitometer (Photographic Densitometer 310 manufactured by X-Rite). Thus, evaluation was carried out as the image residual ratio. Incidentally, the measurements were carried out at 3 points with the reflection densities of 1, 1.5, and 2.0. The ozone gas concentration in the box was set by means of an ozone gas monitor (model: OZG-EM-01) manufactured by APPLICS.

As for the image residual ratio of three printing samples, the evaluations were carried out as follows: The case where the yellow image residual ratios in all the printing samples were 80% or more was rated as A; the case where the ratios at one or two points were less than 80% was rated as B; and the case where the ratios at all the densities were less than 70% was rated as C. Thus, rating was conducted on a scale of three levels.
3) Occurrence or non-occurrence of metal gloss: The yellow, and green and red solid printed image portions were visually observed by reflected light, and evaluated.
   ○: non-occurrence of metal gloss, X: occurrence of metal gloss.
4) Ink liquid stability: The pigment ink liquids of Examples and Comparative Examples were allowed to stand at 60° C. for 10 days. The evaluation was carried out as follows:
   ○: no change in diameter of particles in pigment ink liquids, and X: change in diameter of particles.

The results are given in Table 8 below.

TABLE 8

| Ink liquid | Ejection stability | Light fastness | Heat fastness | Ozone fastness | Metal gloss | Ink liquid stability | Pigment |
|---|---|---|---|---|---|---|---|
| Example 108 | A | A | A | A | ○ | ○ | D1-1 |
| Comparative Example 105 | A | B | A | A | X | ○ | C.I.P.Y.-128 |
| Comparative Example 106 | A | C | A | A | ○ | ○ | PX-V630 |

As can be seen from the results of Table 8, with the pigment ink liquid using the pigment of the present invention, the ejectability and the weatherability are excellent, and the occurrence of metal gloss is suppressed, and the pigment ink liquid stability is excellent.

As can be seen from the results of Table 8, with the system using the ink of the present invention, all the performances are excellent. Particularly, as compared with Comparative Examples, the light fastness and the ink liquid stability are excellent.

EXAMPLE 109

Using the pigment ink liquid prepared in Example 108, an image was printed on the inkjet paper photo gloss paper "Gasai" manufactured by Fujifilm Corporation, in PX-V630 manufactured by SEIKO EPSON CORPORATION. Then, the same evaluations as those in Example 108 were carried out. As a result, the same results were obtained.

As can be seen from the results of Tables 7 and 8, pigment dispersions 101 to 106 and 107, and pigment ink liquid 105 using the pigment of the present invention exhibited excellent hue, and high tinctorial strength and light resistance.

Accordingly, a pigment dispersion using the pigment of the present invention can be preferably used, for example, in inks for printing of inkjet or the like.

EXAMPLE 3

EXAMPLE 201

2.5 parts of the pigment of illustrative specific compound D2-1, 0.5 parts of sodium oleate, 5 parts of glycerin, and 42 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain pigment dispersion 201.

EXAMPLE 202

5 parts of the pigment (D2-1) synthesized according to Synthesis Example 201, 25.5 parts of a methacrylic acid-methacrylic acid ester copolymer aqueous solution represented by Dispersant Solution 10 described in the pamphlet of International publication No. WO06/064193, page 22, as a high-molecular weight dispersant, and 19.5 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain yellow pigment dispersion 202.

COMPARATIVE EXAMPLE 201

Yellow comparative pigment dispersion 201 was obtained in the same manner as in Example 201, except that C.I. Pigment Yellow 128 (CROMOPHTAL YELLOW 8GN, manufactured by CIBA Specialty Chemicals) was used in place of the pigment used in Example 201.

COMPARATIVE EXAMPLE 202

Yellow comparative pigment dispersion 202 was obtained in the same manner as in Example 201, except that C.I. Pigment Yellow 74 (Iralite YELLOW GO, manufactured by CIBA Specialty Chemicals) was used in place of the pigment (D2-1) used in Example 201.

COMPARATIVE EXAMPLE 203

Yellow comparative pigment dispersion 203 was obtained in the same manner as in Example 201, except that C.I. Pigment Yellow 155 (INKJET YELLOW 4G VP 2532, manufactured by Clariant) was used in place of the pigment (D2-1) used in Example 201.
(Evaluation)

Evaluations of dispersion stability, tinctorial strength and light resistance were carried out in the same manner as in Sections <Evaluation of dispersion stability>, <Evaluation of tinctorial strength> and <Evaluation of light resistance> of Examples 101 to 106. The results are given in Table 9 below.

EXAMPLES 203 to 206

Pigment dispersions were prepared in the same manner as in Example 201, except that the illustrative specific compound D2-1 of Example 201 was changed as shown in Table 9 below. Evaluations were carried out as described hereinbefore.

TABLE 9

| | Pigment | Dispersion stability | Tinctorial strength | Light resistance |
|---|---|---|---|---|
| Example 201 | D2-1 | A | 1.45 | 91.6% |
| Example 202 | D2-1 | A | 1.40 | 91.0% |
| Example 203 | D2-2 | A | 1.33 | 90.8% |
| Example 204 | D2-4 | A | 1.40 | 90.4% |
| Example 205 | D2-5 | A | 1.36 | 90.0% |
| Example 206 | D2-10 | A | 1.35 | 89.6% |
| Comparative Example 201 | P.Y.128 | A | 1.05 | 77.6% |
| Comparative Example 202 | P.Y.74 | A | 1.45 | 12.5% |
| Comparative Example 203 | P.Y.155 | A | 1.10 | 51.9% |

EXAMPLE 207

A high-molecular weight dispersant represented by Dispersant 10 described in the pamphlet of International publication No. WO06/064193, page 22 was neutralized with an aqueous potassium hydroxide solution. To 75 parts by mass (solid content 20%) of the resulting dispersant aqueous solution were added 30 parts by mass of the azo pigment (D2-1) synthesized in Synthesis Example 201 and 95 parts by mass of ion-exchanged water, followed by mixing and roughly dispersing with a disper stirring blade. To the mixed and roughly dispersed liquid was added 600 parts by mass of zirconium oxide beads, followed by dispersion in a dispersion machine (sand grinder mill) for 4 hours, and beads were separated from the dispersion. To the resulting mixture were added slowly 2 parts by mass of polyethylene glycol diglycidyl ether at 25° C. under stirring, followed by stirring at 50° C. for 6 hours. Further, impurities were removed using an ultrafiltration membrane having a molecular weight cut-off of 300 K, and the residue was filtered through a 20-mL volume syringe equipped with a 5-12 m filter (acetylcellulose membrane; outer diameter: 25 mm; manufactured by Fujifilm Corporation) to remove coarse particles, thus obtaining pigment dispersion 207 (particle diameter: 80 nm, as measured by Nanotrac 150 (UPA-EX150) manufactured by Nikkiso Co., Ltd.) having a solid content of 10%.

COMPARATIVE EXAMPLE 204

Comparative pigment dispersion 204 was obtained in the same manner as in Example 207, except that a yellow pigment (C.I. Pigment Yellow 128, (CROMOPHTAL YELLOW 8GN, manufactured by CIBA Specialty Chemicals)) was used in place of the azo pigment (D2-1) used in Example 207.

EXAMPLE 208

Pigment ink liquid 205 shown in Table 10 was obtained as follows: Individual components were added to the pigment dispersion 207 obtained in Example 207 such that the dispersion contains a solid content of 5% by mass, 10% by mass of glycerin, 5% by mass of 2-pyrrolidone, 2% by mass of 1,2-hexanediol, 2% by mass of triethylene glycol monobutyl ether, 0.5% by mass of propylene glycol, and 75.5% by mass of ion-exchanged water. The resulting mixture was filtered through a 20-mL volume syringe equipped with a 1-μm filter (acetylcellulose membrane; outer diameter: 25 mm; manufactured by Fujifilm Corporation) to remove coarse particles, thus obtaining pigment ink liquid 205 given in Table 10.

COMPARATIVE EXAMPLE 205

Comparative pigment ink liquid 205 was obtained in the same procedure as in Example 208, except that comparative pigment dispersion 204 obtained in Comparative Example 204 was used in place of pigment dispersion 207 obtained in Example 207.

The ink liquids of Example 208 and Comparative Example 205 were used as pigment ink liquids.

COMPARATIVE EXAMPLE 206

As a comparative type of an ink, a yellow ink cartridge of PX-V630 (comparative pigment ink liquid 206) manufactured by SEIKO EPSON CORPORATION was used.

In Table 10, "ejection stability", "light fastness", "heat fastness", "ozone fastness", "metal gloss", and "ink liquid stability" were rated in the following manner. Each ink was charged in the cartridge of yellow ink liquid of an inkjet printer PX-V630 manufactured by SEIKO EPSON CORPORATION. For other color inks, pigment ink liquids of PX-V630 were used. For the image receiving sheets, SEIKO EPSON photo paper sheets <gloss>, and SEIKO EPSON photo paper sheets CRISPIA <high gloss> were used. Thereon, monochrome image patterns, and green, red, and gray image patterns were neatly printed in the recommended mode with stepwise changing densities. Thus, the image quality, and the ink ejection property and image fastness were evaluated. Evaluations were monochromatically carried out except for metal gloss.

For the inkjet inks of Example 208 (pigment ink liquid 205) and Comparative Example (comparative pigment ink liquid 205 and yellow pigment ink liquid of PX-V630; comparative pigment ink liquid 206), the following evaluations were carried out. The results are shown in Table 10.

(Evaluation Experiment)

Ejection stability, image storability, occurrence or non-occurrence of metal gloss, and ink liquid stability were evaluated in the same manner as in Example 108.

TABLE 10

| Ink | Ejection stability | Light fastness | Heat fastness | Ozone fastness | Metal gloss | Ink liquid stability | Pigment |
|---|---|---|---|---|---|---|---|
| Example 208 (Invention) | A | A | A | A | ○ | ○ | D2-1 |
| Comparative Example 205 | A | B | A | A | X | ○ | C.I.P.Y. 128 |
| Comparative Example 206 | A | C | A | A | ○ | ○ | PX-V630 |

As can be seen from the results of Table 10, with the pigment ink liquid using the pigment of the present invention, the ejectability and the weatherability are excellent, and the occurrence of metal gloss is suppressed, and the pigment ink liquid stability is excellent.

As can be seen from the results of Table 10, with the system using the ink of the present invention, all the performances are excellent. Particularly, as compared with Comparative Examples, the light fastness and the ink liquid stability are excellent.

EXAMPLE 209

Using the pigment ink liquid prepared in Example 208, an image was printed on the inkjet paper photo gloss paper "Gasai" manufactured by Fujifilm Corporation, in PX-V630 manufactured by SEIKO EPSON CORPORATION. Then, the same evaluations as those in Example 208 were carried out. As a result, the same results were obtained.

As can be seen from the results of Tables 9 and 10, pigment dispersions 201 to 205 and 206, and pigment ink liquid 205 using the pigment of the present invention exhibited excellent hue, and high tinctorial strength and light resistance.

Accordingly, a pigment dispersion using the pigment of the present invention can be preferably used, for example, in inks for printing of inkjet or the like.

EXAMPLE 4

EXAMPLE 301

2.5 parts of the pigment of illustrative specific compound D3-1, 0.5 parts of sodium oleate, 5 parts of glycerin, and 42 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain yellow pigment dispersion 301.

EXAMPLE 302

5 parts of the pigment (D3-1) synthesized according to Synthesis Example 301, 25.5 parts of a methacrylic acid-methacrylic acid ester copolymer aqueous solution represented by Dispersant Solution 10 described in the pamphlet of International publication No. WO06/064193, page 22, as a high-molecular weight dispersant, and 19.5 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain yellow pigment dispersion 302.

COMPARATIVE EXAMPLE 301

Yellow comparative pigment dispersion 301 was obtained in the same manner as in Example 301, except that C.I. Pigment Yellow 128 (CROMOPHTAL YELLOW 8GN, manufactured by CIBA Specialty Chemicals) was used in place of the pigment used in Example 301.

COMPARATIVE EXAMPLE 302

Yellow comparative pigment dispersion 302 was obtained in the same manner as in Example 301, except that C.I. Pigment Yellow 74 (Iralite YELLOW GO, manufactured by CIBA Specialty Chemicals) was used in place of the pigment (D3-1) used in Example 301.

COMPARATIVE EXAMPLE 303

Yellow comparative pigment dispersion 303 was obtained in the same manner as in Example 301, except that C.I. Pigment Yellow 155 (INKJET YELLOW 4G VP 2532, manufactured by Clariant) was used in place of the pigment (D3-1) used in Example 301.

(Evaluation)

Evaluations of dispersion stability, tinctorial strength and light resistance were carried out in the same manner as in Sections <Evaluation of dispersion stability>, <Evaluation of tinctorial strength> and <Evaluation of light resistance> of Examples 101 to 106. The results are given in Table 11 below.

EXAMPLES 303 to 306

Pigment dispersions 303 to 306 were prepared in the same manner as in Example 301, except that the illustrative specific compound D3-1 of Example 301 was changed as shown in Table 11 below. Evaluations were carried out as described hereinbefore.

TABLE 11

| | Pigment | Dispersion stability | Tinctorial strength | Light resistance |
|---|---|---|---|---|
| Example 301 | D3-1 | ○ | 1.39 | 88.6% |
| Example 302 | D3-1 | ○ | 1.40 | 90.1% |
| Example 303 | D3-3 | ○ | 1.49 | 91.8% |
| Example 304 | D3-4 | ○ | 1.42 | 90.4% |
| Example 305 | D3-5 | ○ | 1.42 | 89.0% |
| Example 306 | D3-10 | ○ | 1.35 | 88.5% |
| Comparative Example 301 | P.Y.128 | ○ | 1.05 | 77.6% |
| Comparative Example 302 | P.Y.74 | ○ | 1.45 | 12.5% |
| Comparative Example 303 | P.Y.155 | ○ | 1.10 | 51.9% |

EXAMPLE 307

A high-molecular weight dispersant represented by Dispersant 10 described in the pamphlet of International publication No. WO06/064193, page 22 was neutralized with an aqueous potassium hydroxide solution. To 75 parts by mass (solid content 20%) of the resulting dispersant aqueous solution were added 30 parts by mass of the azo pigment (D3-1) synthesized in Synthesis Example 301 and 95 parts by mass of ion-exchanged water, followed by mixing and roughly dispersing with a disper stirring blade. To the mixed and roughly dispersed liquid was added 600 parts by mass of zirconium oxide beads, followed by dispersion in a dispersion machine (sand grinder mill) for 4 hours, and beads were separated from the dispersion. To the resulting mixture were added slowly 2 parts by mass of polyethylene glycol diglycidyl ether at 25° C. under stirring, followed by stirring at 50° C. for 6 hours. Further, impurities were removed using an ultrafiltration membrane having a molecular weight cut-off of 300 K, and the residue was filtered through a 20-mL volume syringe equipped with a 5-μm filter (acetylcellulose membrane; outer diameter: 25 mm; manufactured by Fujifilm Corporation) to remove coarse particles, thus obtaining pigment dispersion 307 (particle diameter: 80 nm, as measured by Nanotrac 150 (UPA-EX150) manufactured by Nikkiso Co., Ltd.) having a solid content of 10%.

COMPARATIVE EXAMPLE 304

Comparative pigment dispersion 304 was obtained in the same manner as in Example 307, except that a yellow pigment (C.I. Pigment Yellow 128, (CROMOPHTAL YELLOW 8GN, manufactured by CIBA Specialty Chemicals)) was used in place of the azo pigment (D3-1) used in Example 307.

EXAMPLE 308

Pigment ink liquid 305 shown in Table 12 was obtained as follows: Individual components were added to the pigment dispersion 307 obtained in Example 307 such that the dispersion contains a solid content of 5% by mass, 10% by mass of glycerin, 5% by mass of 2-pyrrolidone, 2% by mass of 1,2-hexanediol, 2% by mass of triethylene glycol monobutyl ether, 0.5% by mass of propylene glycol, and 75.5% by mass of ion-exchanged water. The resulting mixture was filtered through a 20-mL volume syringe equipped with a 1-μm filter (acetylcellulose membrane; outer diameter: 25 mm; manufactured by Fujifilm Corporation) to remove coarse particles, thus obtaining pigment ink liquid 305 given in Table 12.

COMPARATIVE EXAMPLE 305

Comparative pigment ink liquid 305 was obtained in the same procedure as in Example 308, except that comparative pigment dispersion 4 obtained in Comparative Example 304 was used in place of pigment dispersion 307 obtained in Example 307.

COMPARATIVE EXAMPLE 306

As a comparative type of an ink, a yellow ink cartridge of PX-V630 (comparative pigment ink liquid 306) manufactured by SEIKO EPSON CORPORATION was used.

In Table 12, "ejection stability", "light fastness", "heat fastness", "ozone fastness", "metal gloss", and "ink liquid stability" were rated in the following manner. Each ink was charged in the cartridge of yellow ink liquid of an inkjet printer PX-V630 manufactured by SEIKO EPSON CORPORATION. For other color inks, pigment ink liquids of PX-V630 were used. For the image receiving sheets, SEIKO EPSON photo paper sheets <gloss>, and SEIKO EPSON photo paper sheets CRISPIA <high gloss> were used. Thereon, monochrome image patterns, and green, red, and gray image patterns were neatly printed in the recommended mode with stepwise changing densities. Thus, the image quality, and the ink ejection property and image fastness were evaluated. Evaluations were monochromatically carried out except for metal gloss.

For the inkjet inks of Example 308 (pigment ink liquid 305) and Comparative Example (comparative pigment ink liquid 305 and yellow pigment ink liquid of PX-V630; comparative pigment ink liquid 306), the following evaluations were carried out. The results are shown in Table 12.

(Evaluation Experiment)

Ejection stability, image storability, occurrence or non-occurrence of metal gloss, and ink liquid stability were evaluated in the same manner as in Example 108.

TABLE 12

| Ink | Ejection stability | Light fastness | Heat fastness | Ozone fastness | Metal gloss | Ink liquid stability | Pigment |
|---|---|---|---|---|---|---|---|
| Example 308 (Invention) | A | A | A | A | ○ | ○ | D3-1 |
| Comparative Example 305 | A | B | A | A | X | ○ | C.I.P.Y. 128 |
| Comparative Example 306 | A | C | A | A | ○ | ○ | PX-V630 |

As can be seen from the results of Table 12, with the pigment ink liquid using the pigment of the present invention, the ejectability and the weatherability are excellent, and the occurrence of metal gloss is suppressed, and the pigment ink liquid stability is excellent.

As can be seen from the results of Table 12, with the system using the ink of the present invention, all the performances are excellent. Particularly, as compared with Comparative Examples, the light fastness and the ink liquid stability are excellent.

EXAMPLE 309

Using the pigment ink liquid prepared in Example 308, an image was printed on the inkjet paper photo gloss paper "Gasai" manufactured by Fujifilm Corporation, in PX-V630 manufactured by SEIKO EPSON CORPORATION. Then, the same evaluations as those in Example 308 were carried out. As a result, the same results were obtained.

As can be seen from the results of Tables 11 and 12, pigment dispersions 301 to 306 and 307, and pigment ink liquid 305 using the pigment of the present invention exhibited excellent hue, and high tinctorial strength and light resistance.

Accordingly, a pigment dispersion using the pigment of the present invention can be preferably used, for example, in inks for printing of inkjet or the like.

EXAMPLE 5

EXAMPLE 401

2.5 parts of the pigment of illustrative specific compound D4-1, 0.5 parts of sodium oleate, 5 parts of glycerin, and 42 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain yellow pigment dispersion 401.

EXAMPLE 402

5 parts of the pigment (D4-1) synthesized according to Synthesis Example 401, 25.5 parts of a methacrylic acid-methacrylic acid ester copolymer aqueous solution represented by Dispersant Solution 10 described in the pamphlet of International publication No. WO06/064193, page 22, as a high-molecular weight dispersant, and 19.5 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain pigment dispersion 402.

COMPARATIVE EXAMPLE 401

Yellow comparative pigment dispersion 401 was obtained in the same manner as in Example 401, except that C.I. Pigment Yellow 128 (CROMOPHTAL YELLOW 8GN, manufactured by CIBA Specialty Chemicals) was used in place of the pigment used in Example 401.

COMPARATIVE EXAMPLE 402

Yellow comparative pigment dispersion 402 was obtained in the same manner as in Example 401, except that C.I. Pigment Yellow 74 (Iralite YELLOW GO, manufactured by CIBA Specialty Chemicals) was used in place of the pigment (D4-1) used in Example 401.

COMPARATIVE EXAMPLE 403

Yellow comparative pigment dispersion 403 was obtained in the same manner as in Example 401, except that C.I. Pigment Yellow 155 (INKJET YELLOW 4G VP 2532, manufactured by Clariant) was used in place of the pigment (D4-1) used in Example 401.

(Evaluation)

Evaluations of dispersion stability, tinctorial strength and light resistance were carried out in the same manner as in Sections <Evaluation of dispersion stability>, <Evaluation of tinctorial strength> and <Evaluation of light resistance> of Examples 101 to 106. The results are given in Table 13 below.

EXAMPLES 403 to 406

Pigment dispersions 403 to 406 were prepared in the same manner as in Example 401, except that the illustrative specific compound D4-1 of Example 401 was changed as shown in Table 13 below. Evaluations were carried out as described hereinbefore.

TABLE 13

| | Pigment | Dispersion stability | Tinctorial strength | Light resistance |
|---|---|---|---|---|
| Example 401 | D4-1 | ○ | 1.39 | 89.5% |
| Example 402 | D4-1 | ○ | 1.40 | 90.2% |
| Example 403 | D4-4 | ○ | 1.49 | 90.8% |
| Example 404 | D4-8 | ○ | 1.42 | 90.5% |
| Example 405 | D4-9 | ○ | 1.42 | 89.0% |
| Example 406 | D4-11 | ○ | 1.35 | 88.8% |
| Comparative Example 401 | P.Y.128 | ○ | 1.05 | 77.6% |
| Comparative Example 402 | P.Y.74 | ○ | 1.45 | 12.5% |
| Comparative Example 403 | P.Y.155 | ○ | 1.10 | 51.9% |

EXAMPLE 407

A high-molecular weight dispersant represented by Dispersant 10 described in the pamphlet of International publication No. WO06/064193, page 22 was neutralized with an aqueous potassium hydroxide solution. To 75 parts by mass (solid content 20%) of the resulting dispersant aqueous solution were added 30 parts by mass of the azo pigment (D4-1) synthesized in Example 401 and 95 parts by mass of ion-exchanged water, followed by mixing and roughly dispersing with a disper stirring blade. To the mixed and roughly dispersed liquid was added 600 parts by mass of zirconium oxide beads, followed by dispersion in a dispersion machine (sand grinder mill) for 4 hours, and beads were separated from the dispersion. To the resulting mixture were added slowly 2 parts by mass of polyethylene glycol diglycidyl ether at 25° C. under stirring, followed by stirring at 50° C. for 6 hours. Further, impurities were removed using an ultrafiltration membrane having a molecular weight cut-off of 300 K, and the residue was filtered through a 20-mL volume syringe equipped with a 5-μm filter (acetylcellulose membrane; outer diameter: 25 mm; manufactured by Fujifilm Corporation) to remove coarse particles, thus obtaining pigment dispersion 407 (particle diameter: 80 nm, as measured by Nanotrac 150 (UPA-EX150) manufactured by Nikkiso Co., Ltd.) having a solid content of 10%.

COMPARATIVE EXAMPLE 404

Comparative pigment dispersion 404 was obtained in the same manner as in Example 407, except that a yellow pigment (C.I. Pigment Yellow 128, (CROMOPHTAL YELLOW 8GN, manufactured by CIBA Specialty Chemicals)) was used in place of the azo pigment (D4-1) used in Example 407.

EXAMPLE 408

Pigment ink liquid 405 shown in Table 14 was obtained as follows: Individual components were added to the pigment dispersion 407 obtained in Example 407 such that the dispersion contains a solid content of 5% by mass, 10% by mass of glycerin, 5% by mass of 2-pyrrolidone, 2% by mass of 1,2-hexanediol, 2% by mass of triethylene glycol monobutyl ether, 0.5% by mass of propylene glycol, and 75.5% by mass of ion-exchanged water. The resulting mixture was filtered through a 20-mL volume syringe equipped with a 1-μm filter (acetylcellulose membrane; outer diameter: 25 mm; manufactured by Fujifilm Corporation) to remove coarse particles, thus obtaining pigment ink liquid 405 given in Table 14.

COMPARATIVE EXAMPLE 405

Comparative pigment ink liquid 405 was obtained in the same procedure as in Example 408, except that comparative pigment dispersion 404 obtained in Comparative Example 404 was used in place of pigment dispersion 407 obtained in Example 407.

The ink liquids of Example 408 and Comparative Example 405 were used as pigment ink liquids.

COMPARATIVE EXAMPLE 406

As a comparative type of an ink, a yellow ink cartridge of PX-V630 (comparative pigment ink liquid 406) manufactured by SEIKO EPSON CORPORATION was used.

In Table 14, "ejection stability", "light fastness", "heat fastness", "ozone fastness", "metal gloss", and "ink liquid stability" were rated in the following manner. Each ink was charged in the cartridge of yellow ink liquid of an inkjet printer PX-V630 manufactured by SEIKO EPSON CORPORATION. For other color inks, pigment ink liquids of PX-V630 were used. For the image receiving sheets, SEIKO EPSON photo paper sheets <gloss>, and SEIKO EPSON photo paper sheets CRISPIA <high gloss> were used. Thereon, monochrome image patterns, and green, red, and gray image patterns were neatly printed in the recommended mode with stepwise changing densities. Thus, the image quality, and the ink ejection property and image fastness were evaluated. Evaluations were monochromatically carried out except for metal gloss.

For the inkjet inks of Example 408 (pigment ink liquid 405) and Comparative Example (comparative pigment ink liquid 405 and yellow pigment ink liquid of PX-V630; comparative pigment ink liquid 406), the following evaluations were carried out. The results are shown in Table 14.

(Evaluation Experiment)

Ejection stability, image storability, occurrence or non-occurrence of metal gloss, and ink liquid stability were evaluated in the same manner as in Example 108.

TABLE 14

| Ink | Ejection stability | Light fastness | Heat fastness | Ozone fastness | Metal gloss | Ink liquid stability | Pigment |
|---|---|---|---|---|---|---|---|
| Example 408 (Invention, pigment ink liquid 405) | A | A | A | A | ○ | ○ | D4-1 |
| Comparative Example 405 (comparative pigment ink liquid 405) | A | B | A | A | X | ○ | C.I.P.Y.128 |
| Comparative Example 406 | A | C | A | A | ○ | ○ | PX-V630 |

As can be seen from the results of Table 14, with the pigment ink liquid using the pigment of the present invention, the ejectability and the weatherability are excellent, and the occurrence of metal gloss is suppressed, and the pigment ink liquid stability is excellent.

As can be seen from the results of Table 14, with the system using the ink of the present invention, all the performances are excellent. Particularly, as compared with Comparative Examples, the light fastness and the ink liquid stability are excellent.

EXAMPLE 409

Using the pigment ink liquid 405 prepared in Example 408, an image was printed on the inkjet paper photo gloss paper "Gasai" manufactured by Fujifilm Corporation, in PX-V630 manufactured by SEIKO EPSON CORPORATION. Then, the same evaluations as those in Example 408 were carried out. As a result, the same results were obtained.

As can be seen from the results of Tables 13 and 14, pigment dispersions 401 to 406 and pigment ink liquid 405 using the pigment of the present invention exhibited excellent hue, and high tinctorial strength and light resistance.

Accordingly, a pigment dispersion using the pigment of the present invention can be preferably used, for example, in inks for printing of inkjet or the like.

EXAMPLE 6

EXAMPLE 501

2.5 parts of the pigment of illustrative specific compound D5-1, 0.5 parts of sodium oleate, 5 parts of glycerin, and 42 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain pigment dispersion 501.

EXAMPLE 502

5 parts of the pigment (D5-1) synthesized according to Synthesis Example 501, 25.5 parts of a methacrylic acid-methacrylic acid ester copolymer aqueous solution represented by Dispersant Solution 10 described in the pamphlet of International publication No. WO06/064193, page 22, as a high-molecular weight dispersant, and 19.5 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain pigment dispersion 502.

COMPARATIVE EXAMPLE 501

Yellow pigment dispersion 501 was obtained in the same manner as in Example 501, except that C.I. Pigment Yellow 128 (CROMOPHTAL YELLOW 8GN, manufactured by CIBA Specialty Chemicals) was used in place of the pigment used in Example 501.

COMPARATIVE EXAMPLE 502

Yellow comparative pigment dispersion 502 was obtained in the same manner as in Example 501, except that C.I. Pigment Yellow 74 (Iralite YELLOW GO, manufactured by CIBA Specialty Chemicals) was used in place of the pigment (D5-1) used in Example 501.

COMPARATIVE EXAMPLE 503

Yellow comparative pigment dispersion 503 was obtained in the same manner as in Example 501, except that C.I. Pigment Yellow 155 (INKJET YELLOW 4G VP 2532, manufactured by Clariant) was used in place of the pigment (D5-1) used in Example 501.
(Evaluation)

Evaluations of dispersion stability, tinctorial strength and light resistance were carried out in the same manner as in Sections <Evaluation of dispersion stability>, <Evaluation of tinctorial strength> and <Evaluation of light resistance> of Examples 101 to 106. The results are given in Table 15 below.

EXAMPLES 503 to 506

Pigment dispersions were prepared in the same manner as in Example 501, except that the illustrative specific compound D5-1 of Example 501 was changed as shown in Table 15 below. Evaluations were carried out as described hereinbefore.

TABLE 15

|  | Pigment | Dispersion stability | Tinctorial strength | Light resistance |
|---|---|---|---|---|
| Example 501 | D5-1 | ○ | 1.36 | 90.6% |
| Example 502 | D5-1 | ○ | 1.38 | 89.5% |
| Example 503 | D5-2 | ○ | 1.38 | 90.4% |
| Example 504 | D5-3 | ○ | 1.33 | 90.4% |
| Example 505 | D5-7 | ○ | 1.37 | 89.2% |
| Example 506 | D5-9 | ○ | 1.35 | 89.0% |
| Comparative Example 501 | P.Y.128 | ○ | 1.05 | 77.6% |
| Comparative Example 502 | P.Y.74 | ○ | 1.45 | 12.5% |
| Comparative Example 503 | P.Y.155 | ○ | 1.10 | 51.9% |

EXAMPLE 507

A high-molecular weight dispersant represented by Dispersant 10 described in the pamphlet of International publication No. WO06/064193, page 22 was neutralized with an aqueous potassium hydroxide solution. To 75 parts by mass (solid content 20%) of the resulting dispersant aqueous solution were added 30 parts by mass of the azo pigment (D5-1) synthesized in Synthesis Example 501 and 95 parts by mass of ion-exchanged water, followed by mixing and roughly dispersing with a disper stirring blade. To the mixed and roughly dispersed liquid was added 600 parts by mass of zirconium oxide beads, followed by dispersion in a dispersion machine (sand grinder mill) for 4 hours, and beads were separated from the dispersion. To the resulting mixture were added slowly 2 parts by mass of polyethylene glycol diglycidyl ether at 25° C. under stirring, followed by stirring at 50° C. for 6 hours. Further, impurities were removed using an ultrafiltration membrane having a molecular weight cut-off of 300 K, and the residue was filtered through a 20-mL volume syringe equipped with a 5-μm filter (acetylcellulose membrane; outer diameter: 25 mm; manufactured by Fujifilm Corporation) to remove coarse particles, thus obtaining pigment dispersion 507 (particle diameter: 80 nm, as measured by Nanotrac 150 (UPA-EX150) manufactured by Nikkiso Co., Ltd.) having a solid content of 10%.

COMPARATIVE EXAMPLE 504

Comparative pigment dispersion 507 was obtained in the same manner as in Example 507, except that a yellow pigment (C.I. Pigment Yellow 128, (CROMOPHTAL YELLOW 8GN, manufactured by CIBA Specialty Chemicals)) was used in place of the azo pigment (D5-1) used in Example 507.

EXAMPLE 508

Pigment ink liquid 505 shown in Table 16 was obtained as follows: Individual components were added to the pigment dispersion 507 obtained in Example 507 such that the dispersion contains a solid content of 5% by mass, 10% by mass of glycerin, 5% by mass of 2-pyrrolidone, 2% by mass of 1,2-hexanediol, 2% by mass of triethylene glycol monobutyl ether, 0.5% by mass of propylene glycol, and 75.5% by mass of ion-exchanged water. The resulting mixture was filtered through a 20-mL volume syringe equipped with a 1-μm filter (acetylcellulose membrane; outer diameter: 25 mm; manufactured by Fujifilm Corporation) to remove coarse particles, thus obtaining pigment ink liquid 5 given in Table 4.

COMPARATIVE EXAMPLE 505

Comparative pigment ink liquid 505 was obtained in the same procedure as in Example 508, except that comparative pigment dispersion 504 obtained in Comparative Example 504 was used in place of pigment dispersion 507 obtained in Example 507.

COMPARATIVE EXAMPLE 506

As a comparative type of an ink, a yellow ink cartridge of PX-V630 (comparative pigment ink liquid 506) manufactured by SEIKO EPSON CORPORATION was used.

In Table 16, "ejection stability", "light fastness", "heat fastness", "ozone fastness", "metal gloss", and "ink liquid stability" were rated in the following manner. Each ink was charged in the cartridge of yellow ink liquid of an inkjet printer PX-V630 manufactured by SEIKO EPSON CORPORATION. For other color inks, pigment ink liquids of PX-V630 were used. For the image receiving sheets, SEIKO EPSON photo paper sheets <gloss>, and SEIKO EPSON photo paper sheets CRISPIA <high gloss> were used. Thereon, yellow monochrome image patterns, and green, red, and gray image patterns were neatly printed in the recommended mode with stepwise changing densities. Thus, the image quality, and the ink ejection property and image fastness were evaluated. Evaluations were monochromatically carried out except for metal gloss.

For the inkjet inks of Example 508 (pigment ink liquid 505) and Comparative Example (comparative pigment ink liquid 505 and yellow pigment ink liquid of PX-V630; comparative pigment ink liquid 506), the following evaluations were carried out. The results are shown in Table 16.
(Evaluation Experiment)

Ejection stability, image storability, occurrence or non-occurrence of metal gloss, and ink liquid stability were evaluated in the same manner as in Example 108.

occurrence of metal gloss is suppressed, and the pigment ink liquid stability is excellent.

As can be seen from the results of Table 16, with the system using the ink of the present invention, all the performances are excellent. Particularly, as compared with Comparative Examples, the light fastness and the ink liquid stability are excellent.

EXAMPLE 509

Using the pigment ink liquid prepared in Example 508, an image was printed on the inkjet paper photo gloss paper "Gasai" manufactured by Fujifilm Corporation, in PX-V630 manufactured by SEIKO EPSON CORPORATION. Then, the same evaluations as those in Example 508 were carried out. As a result, the same results were obtained.

As can be seen from the results of Tables 15 and 16, pigment dispersions 501 to 505 and 506, and pigment ink liquid 505 using the pigment of the present invention exhibited excellent hue, and high tinctorial strength and light resistance.

Accordingly, a pigment dispersion using the pigment of the present invention can be preferably used, for example, in inks for printing of inkjet or the like.

EXAMPLE 7

Evaluation Experiment
<Heat Resistance>

Melting points of the compounds prepared in Synthesis Examples and Comparative Examples were measured by means of a Yanaco melting point apparatus MP-500D. Evaluations were carried out as follows: The case where the melting point or the decomposition point was lower than 200° C. was rated as C; the case where the melting point or the decomposition point was between 200° C. and 300° C. was rated as B; and the case where both of the melting point and the decomposition point were not lower than 300° C. was rated as A.
<Solvent Resistance>

Evaluation was conducted on each of the solutions prepared by adding 0.05 parts of each of the compounds used in Examples and Comparative examples in 200 parts of an organic solvent and allowed to stand at room temperature for 24 hours. The evaluation is conducted according to the criteria that: a solution wherein the compound of Example or the Comparative Example was completely dissolved in the organic solvent was rated as C; a solution wherein the compound was not completely dissolved and some insolubles remain but the filtrate is colored was rated as B; and a solution wherein insolubles remain and the filtrate is not colored was

TABLE 16

| Ink | Ejection stability | Light fastness | Heat fastness | Ozone fastness | Metal gloss | Ink liquid stability | Pigment |
|---|---|---|---|---|---|---|---|
| Example 508 (Invention) | A | A | A | A | ○ | ○ | D5-1 |
| Comparative Example 505 | A | B | A | A | X | ○ | C.I.P.Y. 128 |
| Comparative Example 506 | A | C | A | A | ○ | ○ | PX-V630 |

As can be seen from the results of Table 16, with the pigment ink liquid using the pigment of the present invention, the ejectability and the weatherability are excellent, and the rated as A. Additionally, as the organic solvent, four kinds of solvents, i.e., methanol, acetone, ethyl acetate, and xylene, were used.

The evaluation results are given in Table 17.

TABLE 17

| | Color observed | Heat resistance | Solvent resistance | | | |
| --- | --- | --- | --- | --- | --- | --- |
| | | | Methanol | Acetone | Ethyl acetate | Xylene |
| Synthesis Example 601 | Yellow | B | A | A | A | A |
| Synthesis Example 602 | Yellow | A | A | A | A | A |
| Synthesis Example 603 | Yellow | A | A | A | A | A |
| Synthesis Example 610 | Yellow | A | A | B | A | A |
| Synthesis Example 614 | Yellow | B | A | A | A | A |
| Comparative Example 601 | Milky | C | A | C | C | A |

As can be seen from the results of Table 17, the compounds of Examples of the present invention exhibited excellent heat resistance and solvent resistance, as compared to the compound of Comparative Example. Further, the compound of Comparative Example is not suitable for use as a yellow pigment, since it is a milky powder.

Further, by comparing Synthesis Example 601 with Synthesis Examples 602 and 603, it can be seen that 1,3,5-triazine-4,6-dion-2-yl or quinazolin-4-on-2-yl is more preferable as a substituent of $R_3$ in the general formula (1) in terms of heat resistance. Further, the comparison between Synthesis Example 602 and Synthesis Example 614 shows that the compound represented by the general formula (3) wherein the aromatic heterocyclic group represented by Het in the general formula (1) is a specific aromatic heterocyclic ring is more preferably in terms of heat resistance. Further, the comparison between Synthesis Example 602 and Synthesis Example 610 shows that the introduction of a substituent at the position of $R_5$ in the general formula (5) improves the solvent resistance.

EXAMPLE 601

2.5 parts of the pigment (Pig6-3) synthesized according to Synthesis Example 601, 0.5 parts of sodium oleate, 5 parts of glycerin, and 42 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain yellow aqueous pigment dispersion 601.

EXAMPLE 602

5 parts of the pigment (Pig6-3) synthesized according to Synthesis Example 601, 25.5 parts of a methacrylic acid-methacrylic acid ester copolymer aqueous solution represented by Dispersant Solution 10 described in the pamphlet of International publication No. WO06/064193, page 22, as a high-molecular weight dispersant, and 19.5 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain yellow aqueous pigment dispersion 602.

EXAMPLE 603

Yellow aqueous pigment dispersion 603 was obtained in the same manner as in Example 601, except that a pigment (Pig6-6) was used in place of the pigment (Pig6-3) used in Example 601.

COMPARATIVE EXAMPLE 602

Yellow comparative aqueous pigment dispersion 601 was obtained in the same manner as in Example 601, except that C.I. Pigment Yellow 128 (CROMOPHTAL YELLOW 8GN, manufactured by CIBA Specialty Chemicals) was used in place of the pigment (Pig6-3) used in Example 601.

COMPARATIVE EXAMPLE 603

Yellow comparative aqueous pigment dispersion 602 was obtained in the same manner as in Example 601, except that C.I. Pigment Yellow 74 (Iralite YELLOW GO, manufactured by CIBA Specialty Chemicals) was used in place of the pigment (Pig6-3) used in Example 601.

COMPARATIVE EXAMPLE 604

Yellow comparative aqueous pigment dispersion 603 was obtained in the same manner as in Example 601, except that C.I. Pigment Yellow 155 (INKJET YELLOW 4G VP 2532, manufactured by Clariant) was used in place of the pigment (Pig6-3) used in Example 601

COMPARATIVE EXAMPLE 605

Yellow comparative aqueous pigment dispersion 604 was obtained in the same manner as in Example 601, except that a compound of the following formula (B) was used in place of the pigment (Pig6-3) used in Example 601.

Formula (B):

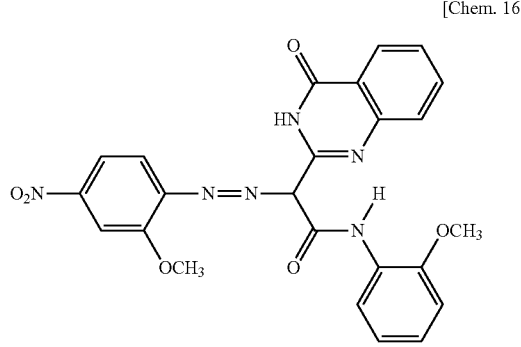
[Chem. 165]

<Evaluation of Light Resistance>

Each of the aqueous pigment dispersions obtained in above Examples and Comparative Examples was diluted with water, and coated on a photo mat paper (for pigment only) manufactured by SEIKO EPSON CORPORATION by using a No. 3 bar coater. Each of the coated products of 1.0 in image density used in evaluation of hue was irradiated for 14 days with a xenon light (170000 lux) using a fade meter, and image density thereof before and after xenon light irradiation was measured using a reflection densitometer. The aqueous pigment dispersions 601 to 603 and the comparative aqueous pigment dispersions 601 to 604 were evaluated in terms of colorant residual ratio [(density after irradiation/density before irradiation)×100%]. The results are shown in Table 18.

TABLE 18

|  | Light resistance |
| --- | --- |
| Aqueous pigment dispersion 601 | 94.1% |
| Aqueous pigment dispersion 602 | 95.2% |
| Aqueous pigment dispersion 603 | 93.0% |
| Comparative aqueous pigment dispersion 601 | 74.2% |
| Comparative aqueous pigment dispersion 602 | 71.6% |
| Comparative aqueous pigment dispersion 603 | 75.0% |
| Comparative aqueous pigment dispersion 604 | 13.4% |

As can be seen from the results of Table 18, the compounds of Examples of the present invention exhibits excellent light resistance, as compared to the compounds of Comparative Examples. Particularly, the comparison between the aqueous pigment dispersion 603 and the comparative aqueous pigment dispersion 604 shows that the light resistance is significantly improved due to effects of the aromatic heterocyclic ring represented by Het in the general formula (6-1).

EXAMPLE 604

A high-molecular weight dispersant represented by Dispersant 10 described in the pamphlet of International publication No. WO06/064193, page 22 was neutralized with an aqueous potassium hydroxide solution. To 75 parts (solid content 20%) of the resulting dispersant aqueous solution were added 30 parts of the azo pigment (Pig6-6) synthesized in Synthesis Example 602 and 95 parts of ion-exchanged water, followed by mixing and roughly dispersing with a disper stirring blade. To the mixed and roughly dispersed liquid was added 600 parts of zirconium oxide beads, followed by dispersion in a dispersion machine (sand grinder mill) for 4 hours, and beads were separated from the dispersion. To the resulting mixture were added slowly 2 parts of polyethylene glycol diglycidyl ether at 25° C. under stirring, followed by stirring at 50° C. for 6 hours. Further, impurities were removed using an ultrafiltration membrane having a molecular weight cut-off of 300 K, and the residue was filtered through a 20-mL volume syringe equipped with a 5-μm filter (acetylcellulose membrane; outer diameter: 25 mm; manufactured by Fujifilm Corporation) to remove coarse particles, thus obtaining aqueous pigment dispersion 604 having a solid content of 10%.

COMPARATIVE EXAMPLE 604

Comparative aqueous pigment dispersion 605 was obtained in the same manner as in Example 604, except that a yellow pigment (C.I. Pigment Yellow 128, (CROMOPHTAL YELLOW 8GN, manufactured by CIBA Specialty Chemicals)) was used in place of the azo pigment (Pig6-6) used in Example 604.

EXAMPLE 605

Pigment ink liquid 617 was obtained as follows: Individual components were added to the aqueous pigment dispersion 604 obtained in Example 604 such that the dispersion contains a solid content of 5% by mass, 10% by mass of glycerin, 5% by mass of 2-pyrrolidone, 2% by mass of 1,2-hexanediol, 2% by mass of triethylene glycol monobutyl ether, 0.5% by mass of propylene glycol, and 75.5% by mass of ion-exchanged water. The resulting mixture was filtered through a 20-mL volume syringe equipped with a 1-j—μm filter (acetylcellulose membrane; outer diameter: 25 mm; manufactured by Fujifilm Corporation) to remove coarse particles, thus obtaining pigment ink liquid 617.

COMPARATIVE EXAMPLE 605

Comparative pigment ink liquid 605 was obtained in the same procedure as in Example 605, except that comparative aqueous pigment dispersion 604 obtained in Comparative Example 604 was used in place of aqueous pigment dispersion 604 obtained in Example 604.

The ink liquids of Example 605 and Comparative Example 605 were used as yellow pigment ink liquids.

COMPARATIVE EXAMPLE 606

As a comparative type of an ink, a yellow ink cartridge of PX-V630 manufactured by SEIKO EPSON CORPORATION was used.

In Table 19, "ejection stability", "light fastness", "heat fastness", "ozone (gas) resistance", "metal gloss", "chromaticity", and "ink liquid stability" were rated in the following manner. Each ink was charged in the cartridge of yellow ink liquid of an inkjet printer PX-V630 manufactured by SEIKO EPSON CORPORATION. For other color inks, pigment ink liquids of PX-V630 were used. For the image receiving sheets, SEIKO EPSON photo paper sheets <gloss>, and SEIKO EPSON photo paper sheets CRISPIA <high gloss> were used. Thereon, yellow monochrome image patterns, and green, red, and gray image patterns were neatly printed in the recommended mode with stepwise changing densities. Thus, the image quality, and the ink ejection property and image fastness were evaluated.

For the inkjet inks of Example 605 and Comparative Examples, the following evaluations were carried out. The results are shown in Table 19.

(Evaluation Experiment)

Ejection stability, image storability, occurrence or non-occurrence of metal gloss, and ink liquid stability were evaluated in the same manner as in Example 108.

1) For the ejection stability, a cartridge was set in a printer, and ejection of an ink from all the nozzles was checked. Then, 20 A4 size paper sheets were output and rated based on the following criteria.
A: No irregular printing from the start of printing till the completion;
B: Output with irregular printing occurs; and
C: Irregular printing occurs from the start of printing till the completion.
2) As for the yellow image storability, the following evaluations were carried out using three printing samples having a reflection density of 1, 1.5, and 2 immediately after printing.
[1] As for the light fastness, the image density Ci immediately after printing was measured by means of X-rite 310 (manufactured by X-Rite). Then, by means of a weather meter manufactured by Atlas Co., the image was irradiated with xenon light (100000 Lux) for 14 days. Then, the image density Cf was measured again to determine the yellow image residual ratio Cf/Ci×100. Thus, the evaluation was carried out. As for the image residual ratio of three printing samples, the evaluations were carried out as follows: The case where the yellow image residual ratios in all the printing samples were 80% or more was rated as A; the case where the ratios at two printing samples were less than 80% was rated as B; and the case where the ratios at all the printing samples were less than 80% was rated as C.
[2] As for the heat fastness, printing samples were stored for 7 days under the conditions of 80° C. and 60% RH. Then, the densities before and after storage of printing samples were measured by means of X-Rite 310 to determine the yellow image residual ratio. Thus, the evaluation was carried out. As for the image residual ratio of three printing samples, the evaluations were carried out as follows: The case where the yellow image residual ratios in all the printing samples were 95% or more was rated as A; the case where the ratios at two points were less than 95% was rated as B; and the case where the ratios at all the densities were less than 95% was rated as C.
[3] As for the ozone resistance (ozone fastness), samples were allowed to stand in a box with an ozone gas concentration set at 5 ppm (23° C.; 50%) for 35 days. Then, the image densities before and after standing under an ozone gas were measured by means of a reflection densitometer (Photographic Densitometer 310 manufactured by X-Rite). Thus, evaluation was carried out as the yellow image residual ratio. Incidentally, the measurements were carried out at 3 points with the reflection densities of 1, 1.5, and 2.0. The ozone gas concentration in the box was set by means of an ozone gas monitor (model: OZG-EM-01) manufactured by APPLICS.

As for the image residual ratio of three printing samples, the evaluations were carried out as follows: The case where the yellow image residual ratios in the all the printing samples were 90% or more was rated as A; the case where the ratios at one or two points were less than 90% was rated as B; and the case where the ratios at all the densities were less than 80% was rated as C. Thus, rating was conducted on a scale of three levels.
3) Occurrence or non-occurrence of metal gloss: The yellow, and green and red solid printed image portions were visually observed by reflected light, and evaluated.
○: non-occurrence of metal gloss, X: occurrence of metal gloss.
4) Ink liquid stability: The pigment ink liquids of Examples and Comparative Examples were allowed to stand at 60° C. for 10 days. The evaluation was carried out as follows:
○: no change in diameter of particles in pigment ink liquids, X: change in diameter of particles.

The results are given in Table 19 below.

TABLE 19

| Ink | Ejection stability | Light fastness | Heat fastness | Ozone fastness | Metal gloss | Ink liquid stability | Pigment |
|---|---|---|---|---|---|---|---|
| Example 605 (Invention) | A | A | A | A | ○ | ○ | Pig6-6 |
| Comparative Example 605 | A | B | A | B | X | ○ | C.I.P.Y.-128 |
| Comparative Example 606 | A | C | A | A | ○ | ○ | PX-630 |

As can be seen from the results of Table 19, with the system using the ink of the present invention, all the performances are excellent. Particularly, as compared with Comparative Examples, the light fastness is excellent.

EXAMPLE 606

Using the pigment ink liquid prepared in Example 605, an image was printed on the inkjet paper photo gloss paper "Gasai" manufactured by Fujifilm Corporation, in PX-V630 manufactured by SEIKO EPSON CORPORATION. Then, the same evaluations as those in Example 617 were carried out. As a result, the same results were obtained.

As can be seen from the results of Tables 18 and 19, aqueous pigment dispersions 601 to 604 and pigment ink liquid 617 using the pigment of the present invention exhibited high light resistance.

Accordingly, the pigment of the present invention can be preferably used, for example, in inks for printing of inkjet or the like, color toners for electrophotography, color filters for displays such as LCDs and PDPs or image pick-up devices such as CCDs, dying materials, colored plastics, and the like.

EXAMPLE 8

COMPARATIVE EXAMPLE 701

According to the method described in Example 4 of JP-A-2001-271001, a compound of the following formula (A) was synthesized.

Formula (A):

[Chem. 166]

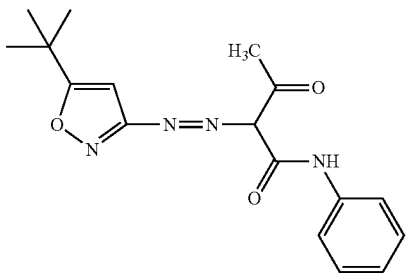

COMPARATIVE EXAMPLE 702

A compound of the following formula (B) was synthesized in the same manner as in Synthesis Example 701, except that 5-amino-4-cyano-1-phenylpyrazole was used in place of (Pig7-80a) in Synthesis Example 701.
Formula (B):

[Chem. 167]

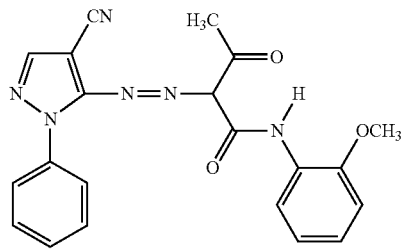

The NMR spectrum of the compound represented by Formula (B) is as follows.
$^1$H-NMR (CDCl$_3$): 15.50(s br, 1H), 11.71(s br, 1H), 8.19 (d, 1H), 7.90(s, 1H), 7.53-7.62(m, 5 H), 7.10(m, 1H), 6.89-6.95(m, 2H), 3.95(s, 3H), 2.65(s, 3H)
(Evaluation Experiment)
<Heat Resistance>

Melting points of the compounds prepared in Examples and Comparative Examples were measured by means of a Yanaco melting point apparatus MP-500D. Evaluations were carried out as follows: The case where the melting point or the decomposition point was 200° C. or lower was rated as X; the case where the melting point or the decomposition point was between 200° C. and 250° C. was rated as Δ; and the case where both of the melting point and the decomposition point were not 250° C. or lower was rated as ○.
<Solvent Resistance>

Evaluation was conducted on each of the solutions prepared by adding 0.05 parts of each of the compounds used in Examples and Comparative examples in 200 parts of an organic solvent and allowed to stand at room temperature for 24 hours. The evaluation is conducted according to the criteria that: a solution wherein the compound of Example or the Comparative Example was completely dissolved in the organic solvent was rated as C; a solution wherein the compound was riot completely dissolved and some insolubles remain but the filtrate is colored was rated as B; and a solution wherein insolubles remain and the filtrate is not colored was rated as A. Additionally, as the organic solvent, three kinds of solvents, i.e., methanol, acetone, and ethyl acetate, were used.

The evaluation results are given in Table 20.

TABLE 20

| | Color observed | Heat resistance | Solvent resistance | | |
|---|---|---|---|---|---|
| | | | Methanol | Acetone | Ethyl acetate |
| Synthesis Example 701 | Yellow | ○ | A | B | A |
| Synthesis Example 702 | Yellow | ○ | A | A | A |
| Synthesis Example 706 | Yellow | ○ | A | B | A |
| Synthesis Example 715 | Yellow | Δ | B | B | A |
| Comparative Example 701 | Milky | X | A | C | C |
| Comparative Example 702 | Yellow | Δ | B | C | B |

As can be seen from the results of Table 20, the compounds of Synthesis Examples 701, 702 and 715 of the present invention exhibited excellent heat resistance and solvent resistance, as compared to the compound of Comparative Example. Further, the comparison between the compound of Synthesis Example 706 and the compound of Synthesis Example 715 shows that the introduction of a substituent at the position of $R_{7-5}$ in the general formula (7-3) improves the heat resistance and solvent resistance.

EXAMPLE 701

2.5 parts of the pigment (Pig7-8) synthesized according to Synthesis Example 701, 0.5 parts of sodium oleate, 5 parts of glycerin, and 42 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain yellow aqueous pigment dispersion 701.

EXAMPLE 702

5 parts of the pigment (Pig7-4) synthesized according to Synthesis Example 706, 25.5 parts of a methacrylic acid-methacrylic acid ester copolymer aqueous solution represented by Dispersant Solution 10 described in the pamphlet of International publication No. WO06/064193, page 22, as a high-molecular weight dispersant, and 19.5 parts of water were mixed, and the resulting mixture was subjected to dispersing procedure together with 100 parts of 0.1-mm diameter zirconium oxide beads in a planetary ball mill at 300 rpm for 6 hours. After completion of the dispersing procedure, the zirconium oxide beads were removed to obtain yellow aqueous pigment dispersion 702.

EXAMPLE 703

Yellow aqueous pigment dispersion 703 was obtained in the same manner as in Example 701, except that a pigment (Pig7-30) was used in place of the pigment (Pig7-8) used in Example 701.

COMPARATIVE EXAMPLE 701

Yellow comparative aqueous pigment dispersion 701 was obtained in the same manner as in Example 701, except that the compound of formula (B) synthesized in Comparative Example 702 was used in place of the pigment (Pig7-8) used in Example 701.

COMPARATIVE EXAMPLE 702

Yellow comparative aqueous pigment dispersion 702 was obtained in the same manner as in Example 701, except that C.I. Pigment Yellow 74 (halite YELLOW GO, manufactured by CIBA Specialty Chemicals) was used in place of the pigment (Pig7-8) used in Example 701.
<Evaluation of Light Resistance>

Each of the aqueous pigment dispersions obtained in above Examples and Comparative Examples was diluted with water, and coated on an art paper by using a No. 3 bar coater. Each of the coated products of 1.0 in image density used in evaluation of hue was irradiated for 14 days with a xenon light (170000 lux) using a fade meter, and image density thereof before and after xenon light irradiation was measured using a reflection densitometer. The aqueous pigment dispersions 701 to 703 and the comparative aqueous pigment dispersions 701 to 702 were evaluated in terms of colorant residual ratio [(density after irradiation/density before irradiation)×100%]. The results are shown in Table 21.

TABLE 21

| | Light resistance |
|---|---|
| Aqueous pigment dispersion 701 | 95.2% |
| Aqueous pigment dispersion 702 | 98.8% |
| Aqueous pigment dispersion 703 | 72.9% |
| Comparative aqueous pigment dispersion 701 | 54.7% |
| Comparative aqueous pigment dispersion 702 | 71.6% |

EXAMPLE 723

A high-molecular weight dispersant represented by Dispersant 10 described in the pamphlet of International publication No. WO06/064193, page 22 was neutralized with an aqueous potassium hydroxide solution. To 75 parts by mass (solid content 20%) of the resulting dispersant aqueous solution were added 30 parts by mass of the azo pigment (Pig7-8) synthesized in Synthesis Example 701 and 95 parts by mass of ion-exchanged water, followed by mixing and roughly dispersing with a disper stirring blade. To the mixed and roughly dispersed liquid was added 600 parts by mass of zirconium oxide beads, followed by dispersion in a dispersion machine (sand grinder mill) for 4 hours, and beads were separated from the dispersion. To the resulting mixture were added slowly 2 parts by mass of polyethylene glycol diglycidyl ether at 25° C. under stirring, followed by stirring at 50° C. for 6 hours. Further, impurities were removed using an ultrafiltration membrane having a molecular weight cut-off of 300 K, and the residue was filtered through a 20-mL volume syringe equipped with a 5-µm filter (acetylcellulose membrane; outer diameter: 25 mm; manufactured by Fujifilm Corporation) to remove coarse particles, thus obtaining aqueous pigment dispersion 704 (particle diameter: 110 nm, as measured by Nanotrac 150 (UPA-EX150) manufactured by Nikkiso Co., Ltd.) having a solid content of 10%.

COMPARATIVE EXAMPLE 703

Comparative aqueous pigment dispersion 703 was obtained in the same manner as in Example 723, except that a yellow pigment (C.I. Pigment Yellow 128, (CROMOPHTAL YELLOW 8GN, manufactured by CIBA Specialty Chemicals)) was used in place of the azo pigment (Pig7-8) used in Example 723.

EXAMPLE 724

A pigment ink liquid shown in Table 22 was obtained as follows: Individual components were added to the aqueous pigment dispersion 704 obtained in Example 723 such that the dispersion contains a solid content of 5% by mass, 10% by mass of glycerin, 5% by mass of 2-pyrrolidone, 2% by mass of 1,2-hexanediol, 2% by mass of triethylene glycol monobutyl ether, 0.5% by mass of propylene glycol, and 75.5% by mass of ion-exchanged water. The resulting mixture was filtered through a 20-mL volume syringe equipped with a 1-µm filter (acetylcellulose membrane; outer diameter: 25 mm; manufactured by Fujifilm Corporation) to remove coarse particles, thus obtaining a pigment ink liquid given in Table 22.

COMPARATIVE EXAMPLE 704

A comparative pigment ink liquid was obtained in the same procedure as in Example 724, except that comparative aqueous pigment dispersion 703 obtained in Comparative Example 703 was used in place of aqueous pigment dispersion 704 obtained in Example 723.

The ink liquids of Example 724 and Comparative Example 704 were used as yellow pigment ink liquids.

COMPARATIVE EXAMPLE 705

As a comparative type of an ink, a yellow ink cartridge of PX-V630 (manufactured by SEIKO EPSON CORPORATION) was used.

In Table 22, "ejection stability", "light fastness", "heat fastness", "ozone (gas) resistance", "metal gloss", "chromaticity", and "ink liquid stability" were rated in the following manner. Each ink was charged in the cartridge of yellow ink liquid of an inkjet printer PX-V630 manufactured by SEIKO EPSON CORPORATION. For other color inks, pigment ink liquids of PX-V630 were used. For the image receiving sheets, SEIKO EPSON photo paper sheets <gloss>, and SEIKO EPSON photo paper sheets CRISPIA <high gloss> were used. Thereon, yellow monochrome image patterns, and green, red, and gray image patterns were neatly printed in the recommended mode with stepwise changing densities. Thus, the image quality, and the ink ejection property and image fastness were evaluated.

For the inkjet inks of Example 724 and Comparative Example 704, the following evaluations were carried out. The results are shown in Table 22.

(Evaluation Experiment)
1) For the ejection stability, a cartridge was set in a printer, and ejection of an ink from all the nozzles was checked. Then, 20 A4 size paper sheets were output and rated based on the following criteria.

A: No irregular printing from the start of printing till the completion;

B: Output with irregular printing occurs; and

C: Irregular printing occurs from the start of printing till the completion.

2) As for the yellow image storability, the following evaluations were carried out using three printing samples having a reflection density of 0.5, 1.0, and 1.2 immediately after printing.

[1] As for the light fastness, the image density Ci immediately after printing was measured by means of X-rite 310 (manufactured by X-Rite). Then, by means of a weather meter manufactured by Atlas Co., the image was irradiated with xenon light (100000 Lux) for 14 days. Then, the image density Cf was measured again to determine the yellow image residual ratio Cf/Ci×100. Thus, the evaluation was carried out. As for the image residual ratio of three printing samples, the evaluations were carried out as follows: The case where the yellow image residual ratios in all the printing samples were 80% or more was rated as A; the case where the ratios at two printing samples were less than 80% was rated as B; and the case where the ratios at all the printing samples were less than 80% was rated as C.

[2] As for the heat fastness, printing samples were stored for 7 days under the conditions of 80° C. and 60% RH. Then, the densities before and after storage of printing samples were measured by means of X-Rite 310 to determine the yellow image residual ratio. Thus, the evaluation was carried out. As for the image residual ratio of three printing samples, the evaluations were carried out as follows: The case where the yellow image residual ratios in all the printing samples were 95% or more was rated as A; the case where the ratios at two points were less than 95% was rated as B; and the case where the ratios at all the densities were less than 95% was rated as C.

[3] As for the ozone resistance (ozone fastness), samples were allowed to stand in a box with an ozone gas concentration set at 5 ppm (23° C.; 50%) for 14 days. Then, the image densities before and after standing under an ozone gas were measured by means of a reflection densitometer (Photographic Densitometer 310 manufactured by X-Rite). Thus, evaluation was carried out as the yellow image residual ratio. Incidentally, the measurements were carried out at 3 points with the reflection densities of 0.5, 1.0, and 1.2. The ozone gas concentration in the box was set by means of an ozone gas monitor (model: OZG-EM-01) manufactured by APPLICS.

As for the image residual ratio of three printing samples, the evaluations were carried out as follows: The case where the yellow image residual ratios in the all the printing samples were 80% or more was rated as A; the case where the ratios at one or two points were less than 80% was rated as B; and the case where the ratios at all the densities were less than 70% was rated as C. Thus, rating was conducted on a scale of three levels.

3) Occurrence or non-occurrence of metal gloss: The yellow, and green and red solid printed image portions were visually observed by reflected light, and evaluated.
○: non-occurrence of metal gloss, X: occurrence of metal gloss.

4) Ink liquid stability: The pigment ink liquids of Examples and Comparative Examples were allowed to stand at 60° C. for 10 days. The evaluation was carried out as follows:
○: no change in diameter of particles in pigment ink liquids, X: change in diameter of particles.

The results are given in Table 22 below.

TABLE 22

| Ink | Ejection stability | Light fastness | Heat fastness | Ozone fastness | Metal gloss | Ink liquid stability | Pigment |
|---|---|---|---|---|---|---|---|
| Example 724 (Invention) | A | A | A | A | ○ | ○ | Pig7-8 |
| Comparative Example 704 | A | B | A | A | X | ○ | C.I.PY-128 |
| PX-V630 | A | C | A | B | ○ | ○ | C.I.PY-74 |

As can be seen from the results of Table 22, with the system using the ink of the present invention, all the performances are excellent. Particularly, as compared with Comparative Examples, the light fastness is excellent.

EXAMPLE 725

Using the pigment ink liquid prepared in Example 724, an image was printed on the inkjet paper photo gloss paper "Gasai" manufactured by Fujifilm Corporation, in PX-V630 manufactured by SEIKO EPSON CORPORATION. Then, the same evaluations as those in Example 724 were carried out. As a result, the same results were obtained.

As can be seen from the results of Tables 21 and 22, aqueous pigment dispersions 701 to 704 and pigment ink liquids using the pigment of the present invention exhibited excellent hue and high tinctorial strength and light resistance.

Accordingly, the pigment of the present invention can be preferably used, for example, in inks for printing of inkjet or the like, color toners for electrophotography, color filters for displays such as LCDs and PDPs or image pick-up devices such as CCDs, dying materials, colored plastics, and the like.

Industrial Applicability

According to the present invention, there are provided an azo pigment, an azo pigment dispersion, a coloring composition and an inkjet recording ink, which have excellent coloring characteristics such as high tinctorial strength and hue and having excellent durability such as high resistance to light and ozone.

Although the present invention have been disclosed in detail or with reference to specific embodiments, it is apparent to those skilled in the art that various alterations or modifications are possible, without departing from the scope and spirit of the invention.

This application has been based on Japanese Patent Application No. 2008-58706 filed on Mar. 7, 2008, Japanese Patent Application No. 2008-58709 filed on Mar. 7, 2008, Japanese Patent Application No. 2008-58710 filed on Mar. 7, 2008, Japanese Patent Application No. 2008-58714 filed on Mar. 7, 2008, Japanese Patent Application No. 2008-58715 filed on Mar. 7, 2008, Japanese Patent Application No. 2008-58716 filed on Mar. 7, 2008, Japanese Patent Application No. 2008-58717 filed on Mar. 7, 2008, and Japanese Patent Application No. 2008-131042 filed on May 19, 2008, the disclosures of which are incorporated by reference herein in their entireties.

The invention claimed is:

1. An azo pigment represented by the following general formula (1), a tautomer of the azo pigment, and a salt or a hydrate thereof:

General formula (1):

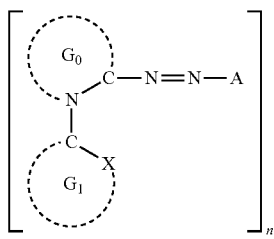

wherein $G_0$ and $G_1$ each independently represents a non-metal atomic group which can form a 5- or 6-membered heterocyclic ring wherein each heterocyclic ring may be unsubstituted or may have a substituent; each heterocyclic ring may be a monocyclic ring or a condensed ring; X represents a hetero atom; n represents an integer of 1 to 4; when n=2, the compound of formula (1) represents a dimer formed via A or a heterocyclic group represented by $G_0$ or $G_1$; when n=3, the compound of formula (1) represents a trimer formed via A and/or a heterocyclic group represented by $G_0$ or $G_1$; when n=4, the compound of formula (1) represents a tetramer formed via A and/or a heterocyclic group represented by $G_0$ or $G_1$; A represents any one selected from the group of substituents represented by (A-2) and (A-4) to (A-44) in the following general formula (2); and * represents the binding site to the N atom in the general formula (1);

General formula (2):

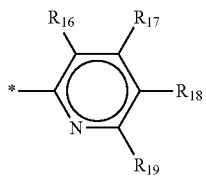 (A-2)

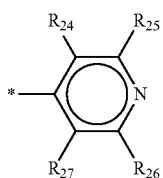 (A-4)

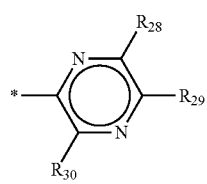 (A-5)

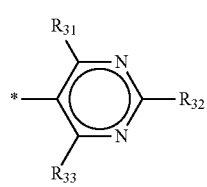 (A-6)

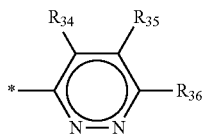 (A-7)

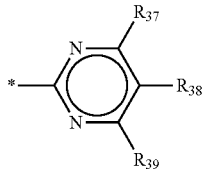 (A-8)

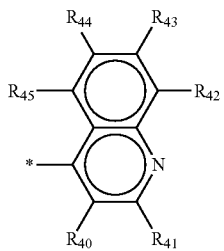 (A-9)

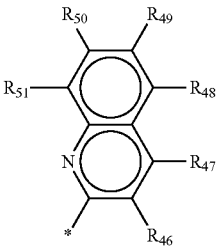 (A-10)

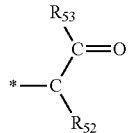 (A-11)

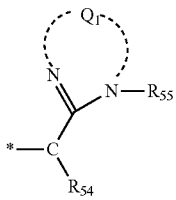 (A-12)

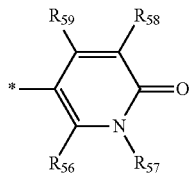 (A-13)

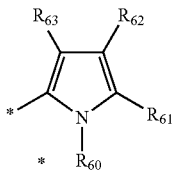 (A-14)

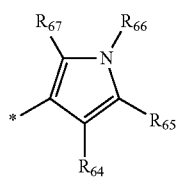 (A-15)
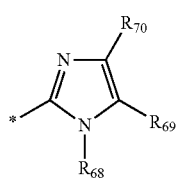 (A-16)
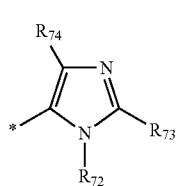 (A-17)
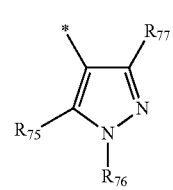 (A-18)
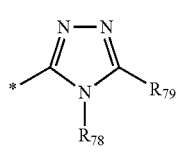 (A-19)
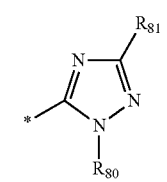 (A-20)
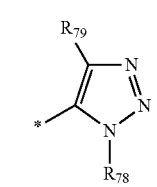 (A-21)
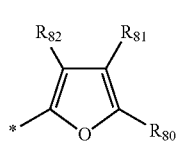 (A-22)
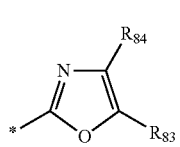 (A-23)
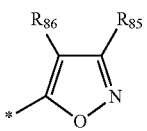 (A-24)
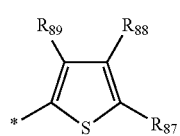 (A-25)
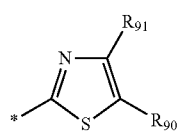 (A-26)
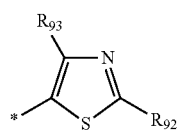 (A-27)
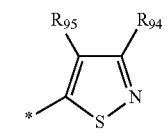 (A-28)
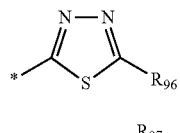 (A-29)
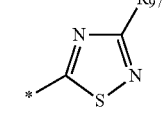 (A-30)
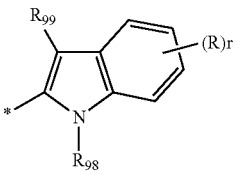 (A-31)
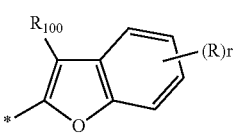 (A-32)
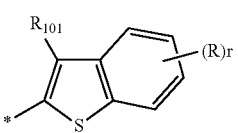 (A-33)
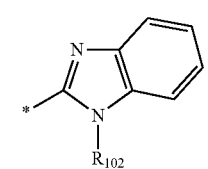 (A-34)

-continued

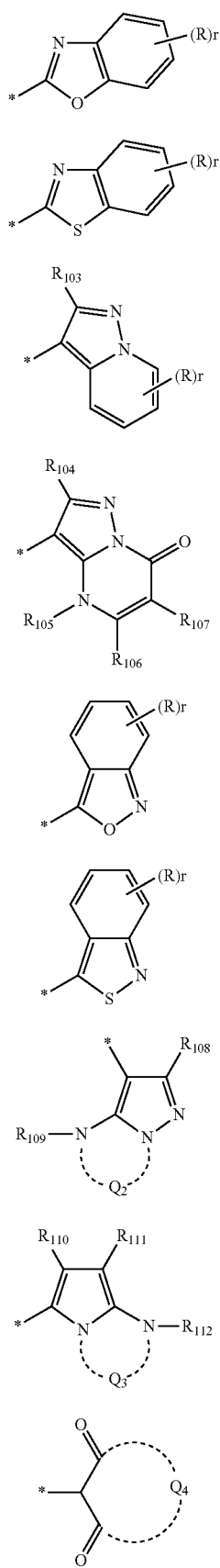

(A-35)
(A-36)
(A-37)
(A-38)
(A-39)
(A-40)
(A-41)
(A-42)
(A-43)

-continued

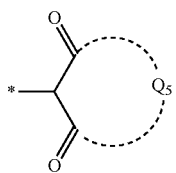

(A-44)

wherein in the group of substituents (A-2) and (A-4) to (A-44) represented by the general formula (2), $R_{11}$ to $R_{112}$ each independently represents a hydrogen atom or a substituent; $Q_1$ in (A-12), $Q_2$ in (A-41), $Q_3$ in (A-42) and $Q_4$ in (A-43) each represents a non-metal atomic group necessary for forming a 5-to 8-membered heterocyclic group with a hetero atom; $Q_5$ in (A-44) represents a non-metal atomic group necessary for forming a 5-to 8-membered hydrocarbon ring; R represents a substituent; r represents an integer of 0 to 4; and when substituent R is plural, each R may be the same as or different from every other R.

2. The azo pigment, the tautomer of the azo pigment, and the salt or hydrate thereof according to claim 1, wherein the azo pigment represented by the general formula (1) is an azo pigment represented by the following general formula (3):

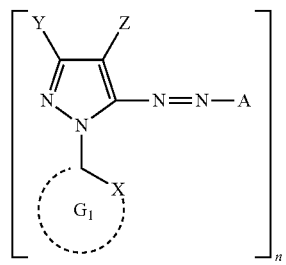

(3)

wherein Y represents a hydrogen atom or a substituent; Z represents an electron-withdrawing group having a Hammett's σp value of 0.2 or more; and $G_1$, A, X and n have the same definitions as $G_1$, A, X and n in the general formula (1).

3. The azo pigment, the tautomer of the azo pigment, and the salt or hydrate thereof according to claim 1, wherein the azo pigment represented by the general formula (1) is an azo pigment represented by the following general formula (4):

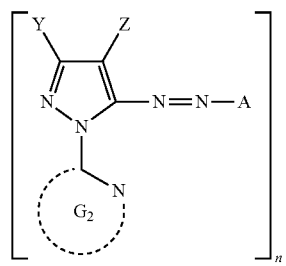

(4)

wherein Y represents a hydrogen atom or a substituent; Z represents an electron-withdrawing group having a Hammett's σp value of 0.2 or more; $G_2$ represents a non-metal atomic group which can form a 5- or 6-membered nitrogen-containing heterocyclic group, and the heterocyclic group may be unsubstituted or may have a substituent; the heterocyclic group may be a monocyclic ring or a condensed ring; and A and n have the same definitions as A and n in the general formula (1).

4. The azo pigment, the tautomer of the azo pigment, and the salt or hydrate thereof according to claim 3, wherein the azo pigment represented by the general formula (4) is an azo pigment represented by the following general formula (5):

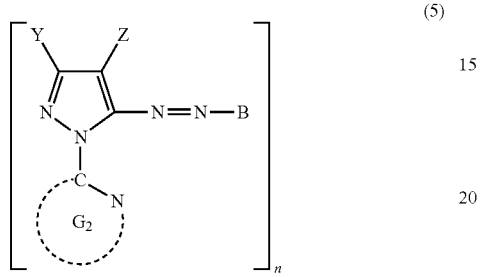

(5)

wherein $G_2$, Y, Z and n have the same definitions as $G_2$, Y, Z and n in the general formula (4); B represents any one selected from the group of substituents represented by (B-1) to (B-13) and (B-15) to (B-24) in the following general formula (6); and * represents the binding site to the N atom in the general formula (5);

General formula (6):

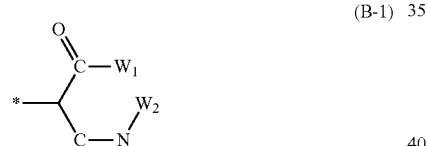
(B-1)

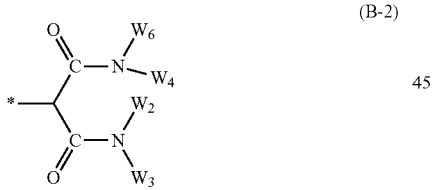
(B-2)

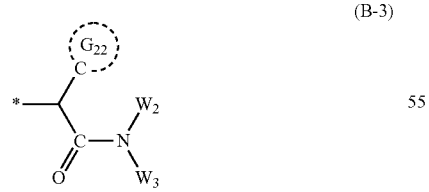
(B-3)

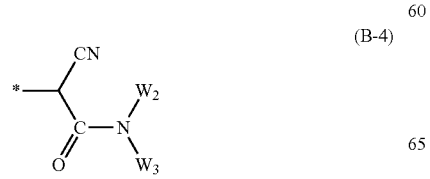
(B-4)

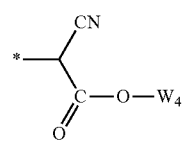
(B-5)

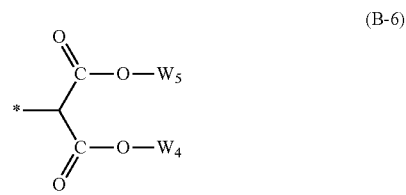
(B-6)

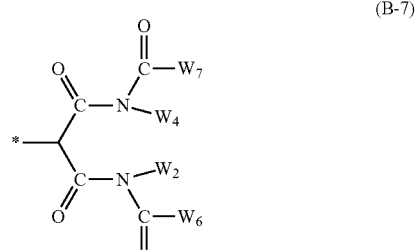
(B-7)

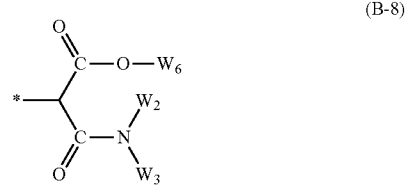
(B-8)

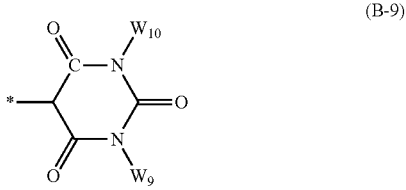
(B-9)

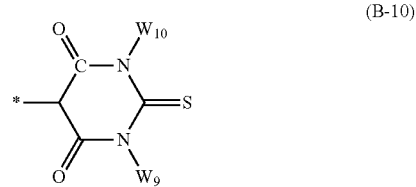
(B-10)

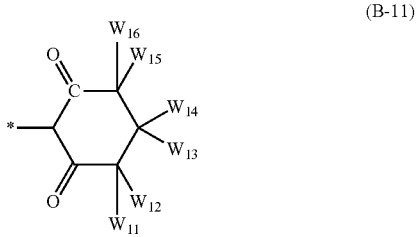
(B-11)

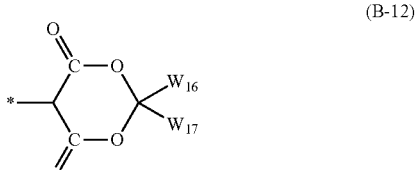
(B-12)

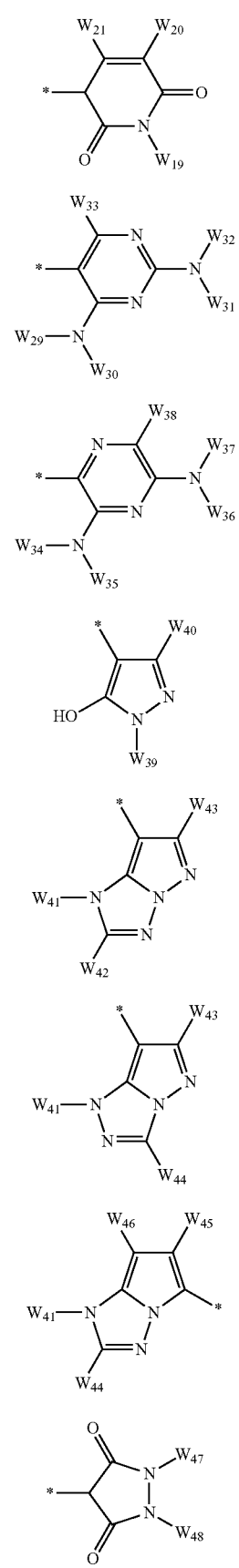

(B-13)

(B-15)

(B-16)

(B-17)

(B-18)

(B-19)

(B-20)

(B-21)

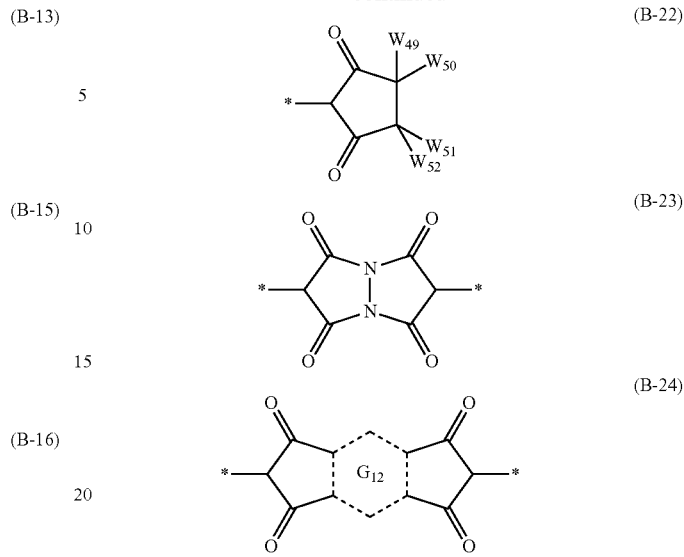

(B-22)

(B-23)

(B-24)

wherein in the group of substituents (B-1) to (B-13) and (B-15) to (B-24) represented by the general formula (6), $W_1$ to $W_{52}$ each independently represents a hydrogen atom or a substituent; $G_{22}$ in (B-3) represents a non-metal atomic group necessary for forming a 5- or 6-membered heterocyclic group; and $G_{12}$ in (B-24) represents a non-metal atomic group necessary for forming a 5- or 6-membered hydrocarbon ring or a heterocyclic group.

5. The azo pigment, the tautomer of the azo pigment, and the salt or hydrate thereof of claim 4, wherein the azo pigment represented by the general formula (5) is an azo pigment represented by the following general formula (7):

General formula (7):

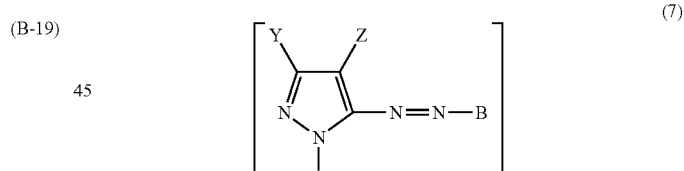

(7)

wherein Y, Z and n have the same definitions as Y, Z and n in the general formula (5); B represents any one selected from the group of substituents represented by (B-1) to (B-24) in the following general formula (6); * in the general formula (6) represents the binding site to the N atom; G represents any one selected from the group of substituents represented by (G-1) to (G-13) in the following general formula (8); * in the general formula (8) represents the binding site to the N atom; $G_{11}$ in (G-13) represents a non-metal atomic group which can form a 5- or 6-membered heterocyclic group, wherein the heterocyclic group represented by $G_{11}$ may be unsubstituted or may have a substituent; the heterocyclic group may be a monocycle ring or a condensed ring; and $Y_1$ to $Y_{11}$ each independently represents a hydrogen atom or a substituent;

General formula (8):
General formula (8):
(G-1) 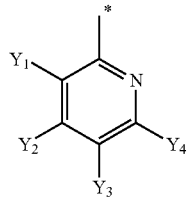
(G-2) 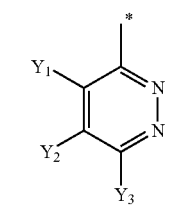
(G-3) 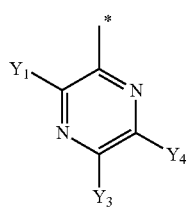
(G-4) 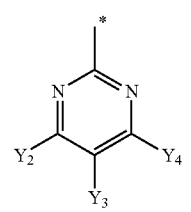
(G-5) 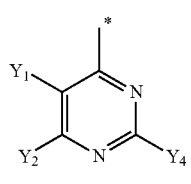
(G-6) 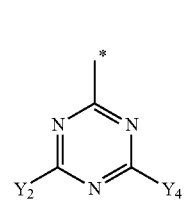
(G-7) 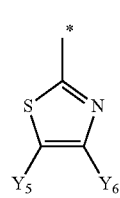
-continued
(G-8) 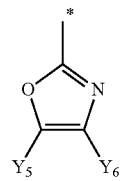
(G-9) 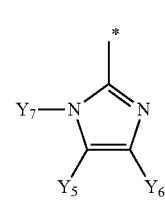
(G-10) 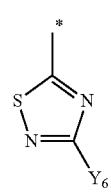
(G-11) 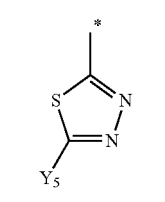
(G-12) 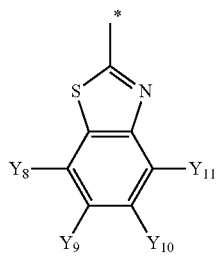
(G-13) 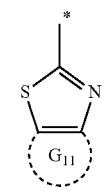
6. An azo pigment represented by the following general formula (6-1), a tautomer of the azo pigment, and a salt or a hydrate thereof:
(6-1) 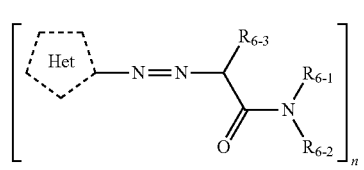
wherein Het represents a group selected from the aromatic heterocyclic group represented by the following general formulae (I-1) to (I-9); $R_{6-1}$ and $R_{6-2}$ each independently represents a hydrogen atom or a substituent; $R_{6-3}$ represents a heterocyclic group; n represents an integer of 1 to 4; when n=2, the compound of formula (6-1) represents a dimer formed via $R_{6-1}$, $R_{6-2}$, $R_{6-3}$ or Het; when n =3, the compound of formula (6-1) represents a trimer formed via $R_{6-1}$, $R_{6-2}$, $R_{6-3}$ or Het; and when n=4, the compound of formula (6-1) represents a tetramer formed via $R_{6-1}$, $R_{6-2}$, $R_{6-3}$ or Het;

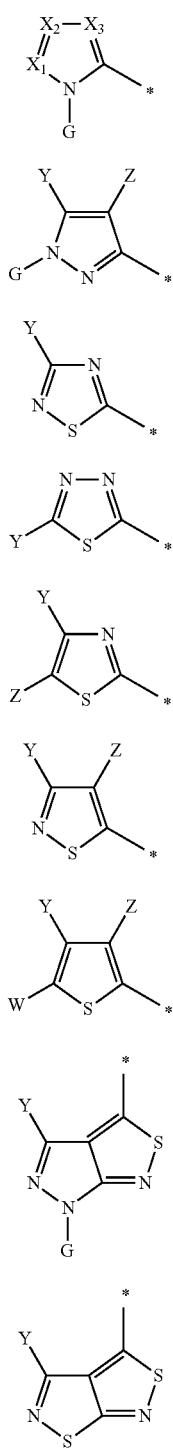

(I-1)
(I-2)
(I-3)
(I-4)
(I-5)
(I-6)
(I-7)
(I-8)
(I-9)

wherein in the general formulae (I-1) to (I-9), Z, Y, G and W each independently represents a hydrogen atom or a substituent; $X_1$, $X_2$ and $X_3$ each independently is interchangeably used with $X_{6-1}$, $X_{6-2}$ and $X_{6-3}$ and represents a nitrogen atom or a —C($R_{6-11}$)= group; $R_{6-11}$ represents a hydrogen atom or a substituent; and * represents the binding site to the azo group in the general formula (6-1).

7. The azo pigment, the tautomer of the azo pigment, and the salt or hydrate thereof according to claim 1, wherein the azo pigment represented by the general formula (1) is an azo pigment represented by the following general formula (6-3):

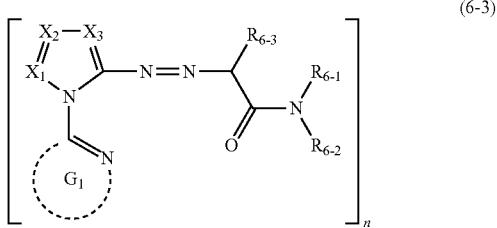

(6-3)

wherein $G_1$ represents a non-metal atomic group necessary for forming a 5- or 6-membered ring with a carbon atom and a nitrogen atom, and the heterocyclic group may be an aromatic ring or a condensed ring; $X_1$, $X_2$ and $X_3$ each independently is interchangeably used with $X_{6-1}$, $X_{6-2}$ and $X_{6-3}$ and represents a nitrogen atom or a —C($R_{6-11}$)= group; $R_{6-1}$ represents a hydrogen atom or a substituent; $R_{6-1}$ and $R_{6-2}$ each independently represents a hydrogen atom or a substituent; $R_{6-3}$ represents a heterocyclic group; n represents an integer of 1 to 3; when n=2, the compound of formula (6-3) represents a dimer formed via $G_1$, $R_{6-1}$, $R_{6-2}$, $R_{6-3}$ or $R_{6-11}$; when n=3, the compound of formula (6-3) represents a trimer formed via $G_1$, $R_{6-1}$, $R_{6-2}$, $R_{6-3}$ or $R_{6-11}$; and when n=4, the compound of formula (6-3) represents a tetramer formed via $G_1$, $R_{6-1}$, $R_{6-2}$, $R_{6-3}$ or $R_{6-11}$.

8. The azo pigment, the tautomer of the azo pigment, and the salt or hydrate thereof according to claim 1, wherein n in the general formula (1) is 1.

9. The azo pigment, the tautomer of the azo pigment, and the salt or hydrate thereof according to claim 1, wherein the azo pigment represented by the general formula (1) is an azo pigment represented by the following general formula (6-4):

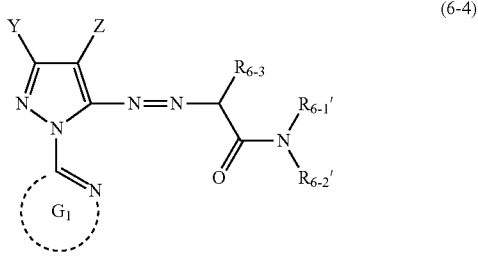

(6-4)

wherein $G_1$ represents a non-metal atomic group necessary for forming a 5- or 6-membered ring with a carbon atom and a nitrogen atom, and the heterocyclic group may be an aromatic ring or a condensed ring; Z and Y each independently represents a hydrogen atom or a substituent; $R_{6-3}$ represents a heterocyclic group; and $R_{6-1}$ and $R_{6-2}$ each independently represents a hydrogen atom, an alkyl group, an aryl group or a heterocyclic group.

10. The azo pigment, the tautomer of the azo pigment, and the salt or hydrate thereof according to claim 1, wherein the azo pigment represented by the general formula (1) is an azo pigment represented by the following general formula (6-5):

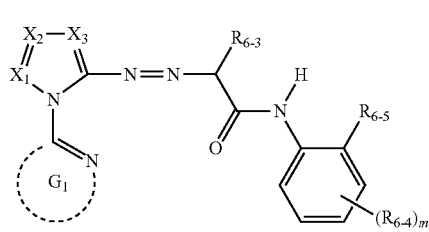

(6-5)

wherein $G_1$ represents a non-metal atomic group necessary for forming a 5- or 6-membered ring with a carbon atom and a nitrogen atom, and the heterocyclic group may be an aromatic ring or a condensed ring; $X_1$, $X_2$ and $X_3$ each independently is interchangeably used with $X_{6-1}$, $X_{6-2}$ and $X_{6-3}$ and represents a nitrogen atom or a —C($R_{6-11}$)= group; $R_{6-11}$ represents a hydrogen atom or a substituent; $R_{6-3}$ represents a heterocyclic group; $R_{6-4}$ and $R_{6-5}$ represent a halogen atom, an alkyl group, an alkoxy group, an alkoxycarbonyl group, a carbamoyl group, an acylamino group, a sulfamoyl group, a trifluoromethyl group, a nitro group, a cyano group or a heterocyclic group; and m represents an integer of 0 to 4.

11. The azo pigment, the tautomer of the azo pigment, and the salt or hydrate thereof according to claim 1, wherein the azo pigment represented by the general formula (1) is an azo pigment represented by the following general formula (7-1):

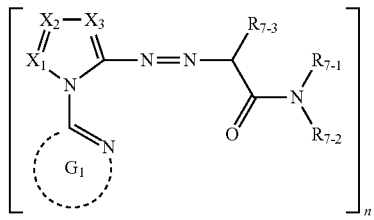

(7-1)

wherein $G_1$ represents an atomic group that forms a 5- or 6-membered heterocyclic ring which may be a condensed ring; $X_1$, $X_2$ and $X_3$ each independently is interchangeably used with $X_{7-1}$, $X_{7-2}$ and $X_{7-3}$ and represents a nitrogen atom or a —C($R_{7-11}$)= group; $R_{7-11}$ represents a hydrogen atom or a substituent; $R_{7-1}$ and $R_{7-2}$ each independently represents a hydrogen atom or a substituent; $R_{7-3}$ represents a group represented by —COR$_{7-12}$, —COOR$_{7-13}$ or —CONR$_{7-14}$R$_{7-15}$; $R_{7-12}$ and $R_{7-13}$ represent an alkyl group, an aryl group or a heterocyclic group; $R_{7-14}$ and $R_{7-15}$ each independently represents a hydrogen atom, an alkyl group, an aryl group or a heterocyclic group; n represents an integer of 1 to 4; when n=2, the compound of formula (7-1) represents a dimer formed via $G_1$, $R_{7-1}$, $R_{7-2}$, $R_{7-3}$ or $R_{7-11}$; when n=3, the compound of formula (7-1) represents a trimer formed via $G_1$, $R_{7-1}$, $R_{7-2}$, $R_{7-3}$ or $R_{7-11}$; and when n=4, the compound of formula (7-1) represents a tetramer formed via $G_1$, $R_{7-1}$, $R_{7-2}$, $R_{7-3}$ or $R_{7-11}$.

12. The azo pigment, the tautomer of the azo pigment, and the salt or hydrate thereof according to claim 1, wherein the azo pigment represented by the general formula (1) or (7-1) is an azo pigment represented by the following general formula (7-2):

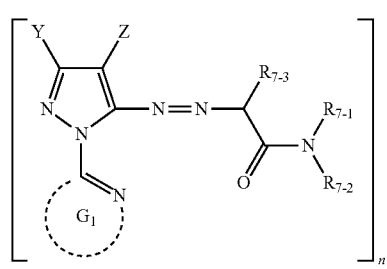

(7-2)

wherein $G_1$ represents a non-metal atomic group necessary for forming a 5- or 6-membered ring with a carbon atom and a nitrogen atom; Z and Y each independently represents a hydrogen atom or a substituent; $R_{7-1}$ and $R_{7-2}$ each independently represents a hydrogen atom or a substituent; $R_{7-3}$ represents a group represented by —COR$_{7-12}$, —COOR$_{7-13}$ or —CONR$_{7-14}$R$_{7-15}$; $R_{7-12}$ and $R_{7-13}$ represent an alkyl group, an aryl group or a heterocyclic group; $R_{7-14}$ and $R_{7-15}$ each independently represents a hydrogen atom, an alkyl group, an aryl group or a heterocyclic group; n represents an integer of 1 to 4; when n=2, the compound of formula (7-2) represents a dimer formed via $G_1$, $R_{7-1}$, $R_{7-2}$, $R_{7-3}$ or $R_{7-11}$; when n=3, the compound of formula (7-2) represents a trimer formed via $G_1$, $R_{7-1}$, $R_{7-2}$, $R_{7-3}$ or $R_{7-11}$; and when n=4, the compound of formula (7-2) represents a tetramer formed via $G_1$, $R_{7-1}$, $R_{7-2}$, $R_{7-3}$ or Y.

13. The azo pigment, the tautomer of the azo pigment, and the salt or hydrate thereof according to claim 1, wherein the azo pigment represented by the general formula (1) is an azo pigment represented by the following general formula (7-3):

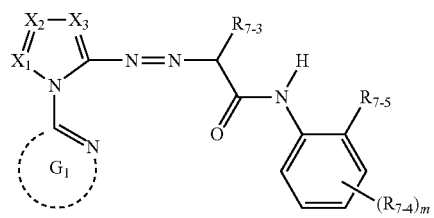

(7-3)

wherein $G_1$ represents a non-metal atomic group necessary for forming a 5- or 6-membered ring with a carbon atom and a nitrogen atom; $X_1$, $X_2$ and $X_3$ each independently is interchangeably used with $X_{7-1}$, $X_{7-2}$ and $X_{7-3}$ and represents a nitrogen atom or a —C($R_{7-11}$)= group;

$R_{7-11}$ represents a hydrogen atom or a substituent; $R_{7-3}$ represents a group represented by —$COR_{7-12}$, —$COOR_{7-13}$ or —$CONR_{7-14}R_{7-15}$; $R_{7-12}$ and $R_{7-13}$ represent an alkyl group, an aryl group or a heterocyclic group; $R_{7-14}$ and $R_{7-15}$ each independently represents a hydrogen atom, an alkyl group, an aryl group or a heterocyclic group; $R_{7-4}$ and $R_{7-5}$ represent a halogen atom, an alkyl group, an alkoxy group, an alkoxycarbony) group, a carbamoyl group, an acylamino group, a sulfamoyl group, a trifluoromethyl group, a nitro group, a cyano group or a heterocyclic group; and m represents an integer of 0 to 4.

14. A pigment dispersion containing at least one of the azo pigment, the tautomer of the azo pigment, and the salt or the hydrate thereof according to claim 1.

15. A coloring composition containing at least one of the azo pigment, the tautomer of the azo pigment, and the salt or the hydrate thereof according to claim 1.

16. An inkjet recording ink using the pigment dispersion according to claim 14.

17. An azo compound represented by the following general formula (6-4), a tautomer of the azo compound, and a salt or a hydrate thereof:

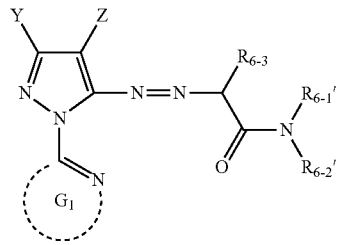

(6-4)

wherein $G_1$ represents a non-metal atomic group necessary for forming a 5- or 6-membered ring with a carbon atom and a nitrogen atom, and the heterocyclic group may be an aromatic ring or a condensed ring; Z and Y each independently represents a hydrogen atom or a substituent; $R_{6-3}$ represents a heterocyclic group; and $R_{6-1'}$ and $R_{6-2'}$ each independently represents a hydrogen atom, an alkyl group, an aryl group or a heterocyclic group.

* * * * *